US011455359B2

(12) United States Patent
Westmoreland et al.

(10) Patent No.: US 11,455,359 B2
(45) Date of Patent: *Sep. 27, 2022

(54) METHOD AND SYSTEM FOR ASYNCHRONOUS CORRELATION OF DATA ENTRIES IN SPATIALLY SEPARATED INSTANCES OF HETEROGENEOUS DATABASES

(71) Applicant: Proof of Concept LLC, Austin, TX (US)

(72) Inventors: Andrew Westmoreland, Austin, TX (US); Timothy Hanus, Austin, TX (US)

(73) Assignee: Proof of Concept LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,258

(22) Filed: Mar. 2, 2021

(65) Prior Publication Data

US 2021/0303647 A1    Sep. 30, 2021

Related U.S. Application Data

(63) Continuation-in-part of application No. 16/702,337, filed on Dec. 3, 2019, and a continuation-in-part of application No. 16/537,510, filed on Aug. 9, 2019, now Pat. No. 11,017,030, and a continuation-in-part of application No. 16/529,788, filed on Aug. 2, 2019, now Pat. No. 11,263,283, and a continuation-in-part of application No. 16/529,783, filed on Aug. 1, 2019, and a continuation-in-part of application No.

(Continued)

(51) Int. Cl.
  *G06F 16/9535*    (2019.01)
  *G06F 16/23*    (2019.01)

(52) U.S. Cl.
  CPC ...... *G06F 16/9535* (2019.01); *G06F 16/2379* (2019.01)

(58) Field of Classification Search
  CPC ...... G06F 16/95–16/9574; H04L 67/00–67/42
  See application file for complete search history.

(56) References Cited

U.S. PATENT DOCUMENTS

| 2013/0144620 A1* | 6/2013 | Lipton | G06F 21/645 |
| | | | 704/246 |
| 2014/0032964 A1* | 1/2014 | Neerincx | H04L 69/40 |
| | | | 714/18 |
| 2016/0364490 A1* | 12/2016 | Maugans, III | G06F 40/279 |

\* cited by examiner

*Primary Examiner* — Clayton R Williams

(57) ABSTRACT

A computer-implemented method including forming a first user information database stored on a first server by retrieving, from a browser session, a first piece of user information including at least local user identification data and storing the first piece of user information in a user profile of the first user information database. The method further includes querying the first user information database for a second piece of user information. Responsive to not identifying the second piece of user information in the first user information database, the method further includes querying a second user information database stored on a second server for the second piece of user information associated with the first piece of user information. The method further includes retrieving the second piece of user information from the second database and saving the second piece of user information to the user profile of the first user information database.

20 Claims, 49 Drawing Sheets

Related U.S. Application Data

16/124,889, filed on Sep. 7, 2018, now Pat. No. 10,936,686.

(60) Provisional application No. 62/679,398, filed on Jun. 1, 2018, provisional application No. 62/679,427, filed on Jun. 1, 2018, provisional application No. 62/555,182, filed on Sep. 7, 2017.

17300

17301　　17305

| | | | | | | |
|---|---|---|---|---|---|---|
| ElectronicID-10000000 | | Attribute-1BBBBB | | | | |
| ElectronicID-200 | | | Attribute-2CCCC | Attribute-2D | Attribute-2EEEEE | Attribute-2FFFF |
| ElectronicID-3000000000000000 | Attribute-3AAAAAA | Attribute-3B | Attribute-3C | Attribute-3DDDDDD | Attribute-3EEE | Attribute-3FFF |
| ElectronicID-4000000 | Attribute-4AAAAAA | | | | | Attribute-4FF |
| ElectronicID-50 | | Attribute-5BB | | Attribute-5DDDDDDD | | Attribute-5FFFFF |
| ElectronicID-600000 | | | | | | Attribute-6FFF |
| ElectronicID-70000000000000000000 | Attribute-7AAAA | | | | | |
| ElectronicID-80000 | Attribute-8AA | | | | Attribute-8EEEE | Attribute-8FFFF |
| ElectronicID-90000000 | | Attribute-9B | Attribute-9CCC | Attribute-9DD | | |

17303 points to the ElectronicID-3000000000000000 row.

| ElectronicID-10000000 | Attribute-1BBBBBB | | | | | |
| ElectronicID-200 | Attribute-2CCCC | Attribute-2D | Attribute-2EEEEE | Attribute-2FFFF | | |
| ElectronicID-3000000000000000 | Attribute-3AAAAAA | Attribute-3B | Attribute-3C | Attribute-3DDDDDD | Attribute-3EEE | Attribute-3FFF |
| ElectronicID-4000000 | Attribute-4AAAAAA | Attribute-4FF | | | | |
| ElectronicID-50 | Attribute-5BB | Attribute-5DDDDDDD | Attribute-5FFFFF | | | |
| ElectronicID-600000 | Attribute-6FFF | | | | | |
| ElectronicID-70000000000000000000 | Attribute-7AAAA | | | | | |
| ElectronicID-80000 | Attribute-8AA | Attribute-8EEEE | Attribute-8FFFF | | | |
| ElectronicID-90000000 | Attribute-9B | Attribute-9CCC | Attribute-9DD | | | |

Data Storage 9235

Matrix 26305

| | | | | | 26310 |
|---|---|---|---|---|---|
| 0th Order Domain 26315a | Web Browser 8125 | | | | |
| 1st Order Domain 26315b | A.com | B.com | C.com | D.com | E.com |
| 2nd Order Domain 26315c | F.com | G.com | H.com | I.com | J.com |
| 3rd Order Domain 26315d | K.com | L.com | M.com | N.com | O.com |
| 4th Order Domain 26315e | P.com | Q.com | R.com | S.com | T.com |
| ..... | ..... | ..... | ..... | ..... | ..... |
| Nth Order Domain 26315n | V.com | W.com | X.com | Y.com | Z.com |

FIG. 26A

Data Storage 9235

Matrix 26305

| | 26320a | Web Browser 8125 | 26320c | 26310 |
|---|---|---|---|---|
| 0th Order Domain 26315a | | | | |
| 1st Order Domain 26315b | A.com B.~~com~~ C.com D.~~com~~ E.com | | | |
| 2nd Order Domain 26315c | F.com G.com H.com I.com J.com | | | |
| 3rd Order Domain 26315d | K.~~com~~ L.com M.com N.com O.com | | | |
| 4th Order Domain 26315e | P.~~com~~ Q.com R.~~com~~ S.com T.com | | | |
| ..... | ..... ..... ..... 26320b ..... | | | |
| Nth Order Domain 26315n | V.com W.com X.com Y.~~com~~ Z.com | | | |

FIG. 26B

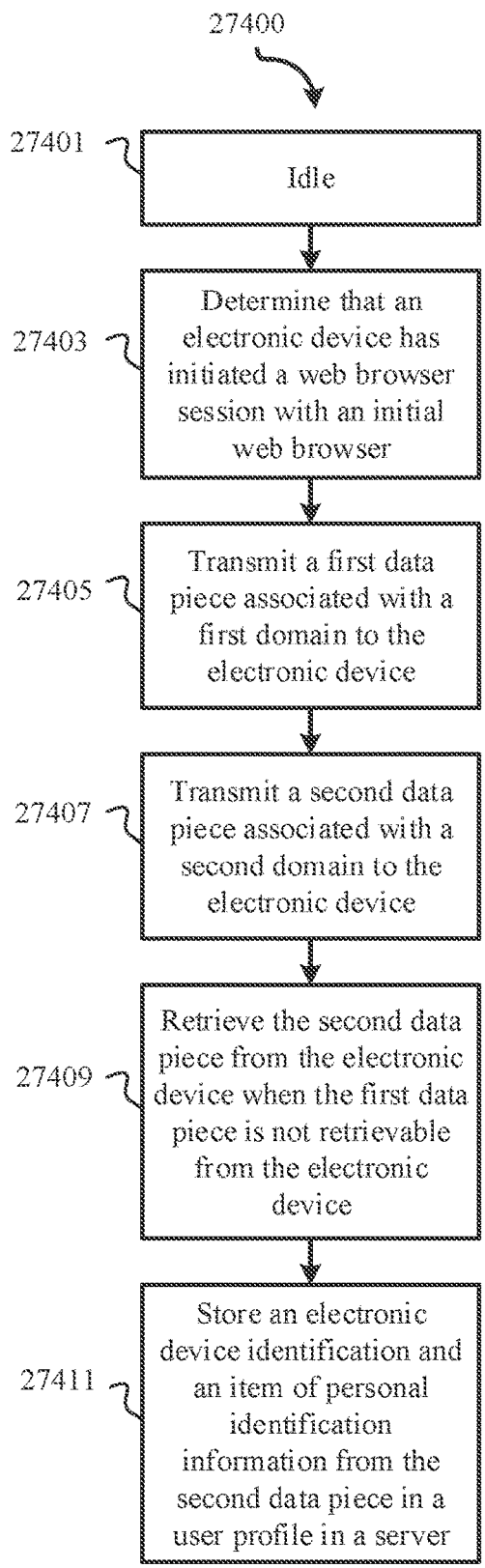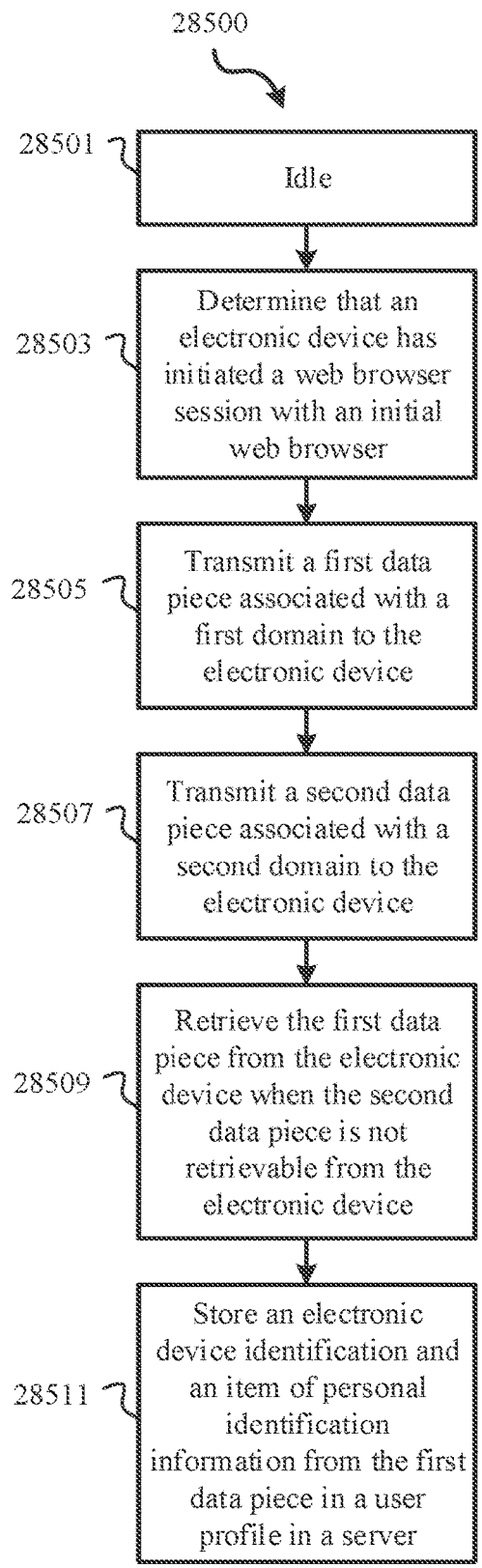
FIG. 27
FIG. 28

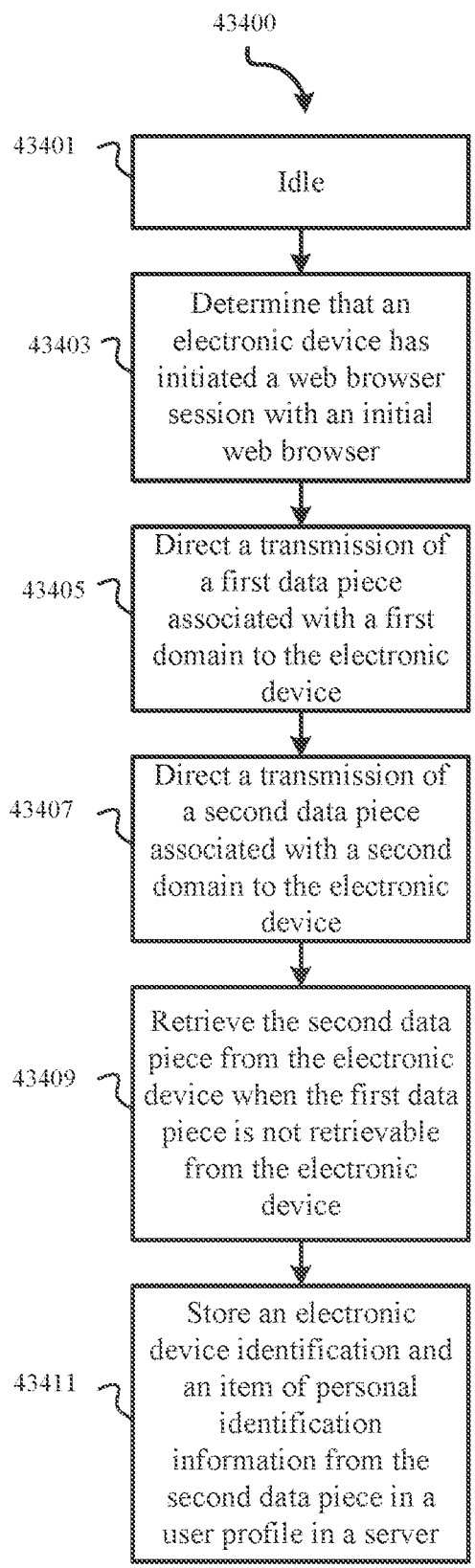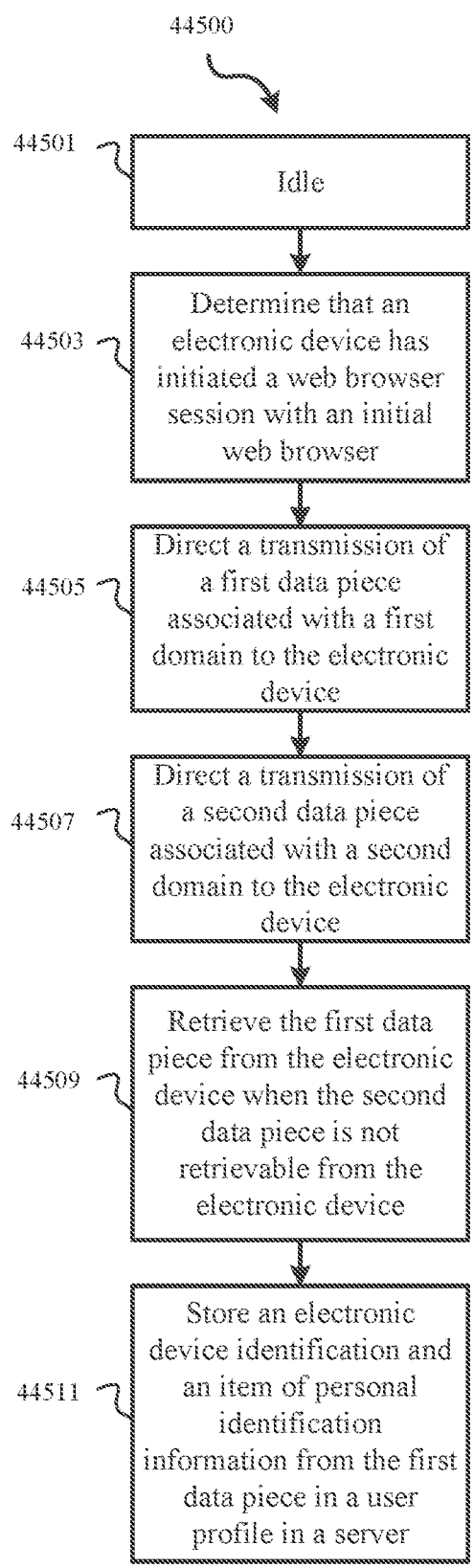
FIG. 43
FIG. 44

METHOD AND SYSTEM FOR ASYNCHRONOUS CORRELATION OF DATA ENTRIES IN SPATIALLY SEPARATED INSTANCES OF HETEROGENEOUS DATABASES

CROSS-REFERENCE TO RELATED APPLICATIONS

This application claims priority under 35 U.S.C. 120 to U.S. application Ser. No. 16/124,889 filed on Sep. 7, 2018; U.S. application Ser. No. 16/537,510 filed on Aug. 9, 2019; U.S. application Ser. No. 16/529,783 filed on Aug. 1, 2019; U.S. application Ser. No. 16/702,337 filed on Dec. 3, 2019; U.S. application Ser. No. 16/529,788 filed on Aug. 2, 2019; and also claims priority to the following provisional applications: U.S. Provisional Application No. 62/555,182 filed on Sep. 7, 2017; U.S. Provisional Application No. 62/679,398 filed on Jun. 1, 2018; U.S. Provisional Application No. 62/679,427 filed on Jun. 1, 2018, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

SECTION I. METHOD AND SYSTEM FOR ASYNCHRONOUS CORRELATION OF DATA ENTRIES IN SPATIALLY SEPARATED INSTANCES OF HETEROGENOUS DATABASES

Background for Section I

The present disclosure relates to storing user data from web browsing sessions in a user profile and retrieving a specific subset of the stored user data.

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for anonymous users (e.g. users that have not registered with the website). It is often difficult to match the data for an anonymous user to a known user or a known identity across multiple websites or databases.

SUMMARY FOR SECTION I

In one embodiment, the disclosure provides a system including a first server in communication with a first computing system including a first memory and at least one processor. The system further includes a second server in communication with a second computing system, the second computing system including a second memory and a second processor. The second server is in communication with the first server. The first memory includes program instructions executable by the at least one processor of the first computing system to: retrieve, from a browser session, a first piece of user information that includes at least anonymous user identification data; store the first piece of user information in a user profile in the first memory; and responsive to identifying a match of the first piece of user information with a match in a database of user information stored in the second memory, store a second piece of user information in the user profile in the first memory.

In another embodiment, the disclosure provides a computer-implemented method including retrieving, from a browser session, a first piece of user information that includes at least anonymous user identification data. The method further includes storing the first piece of user information in a user profile stored on a first server. The method further includes querying a plurality of databases stored on servers different that the first server for a plurality of matches related to the first piece of information. Responsive to identifying a match in one of the plurality of databases, the method includes retrieving a second piece of user information from the one of the plurality of databases and storing the second piece of user information in the user profile.

In another embodiment, the disclosure provides a computer-implemented method including retrieving, from a browser session, a first piece of user information that includes at least anonymous user identification data. The method further includes storing the first piece of user information in a user profile stored on a first server. The method further includes querying a plurality of databases stored on servers different than the first server for a plurality of matches related to the first piece of information. Responsive to identifying a match in one of the plurality of databases, the method includes retrieving a second piece of user information from one of the plurality of databases and storing the second piece of user information in the user profile.

In another embodiment, the disclosure provides a computer-implemented method including forming a first user information database stored on a first server by retrieving, from a browser session, a first piece of user information that includes at least local user identification data and storing the first piece of user information in a user profile of the first user information database. The method further includes querying the first user information database for a second piece of user information. Responsive to not identifying the second piece of user information in the first user information database, the method further includes querying a second user information database stored on a second server for the second piece of user information associated with the first piece of user information. The method further includes retrieving the second piece of user information from the second database and saving the second piece of user information to the user profile of the first information database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 17A, 17B and 17C illustrate non-limiting, example data piece storage reception structures according to certain embodiments of this disclosure;

FIGS. 26A and 26B illustrate example matrices of domains linked with web browsers according to certain embodiments of this disclosure;

FIGS. 27-49 illustrate flow diagrams of exemplary methods according to embodiments according to the disclosure.

DETAILED DESCRIPTION FOR SECTION I

Figure 1:
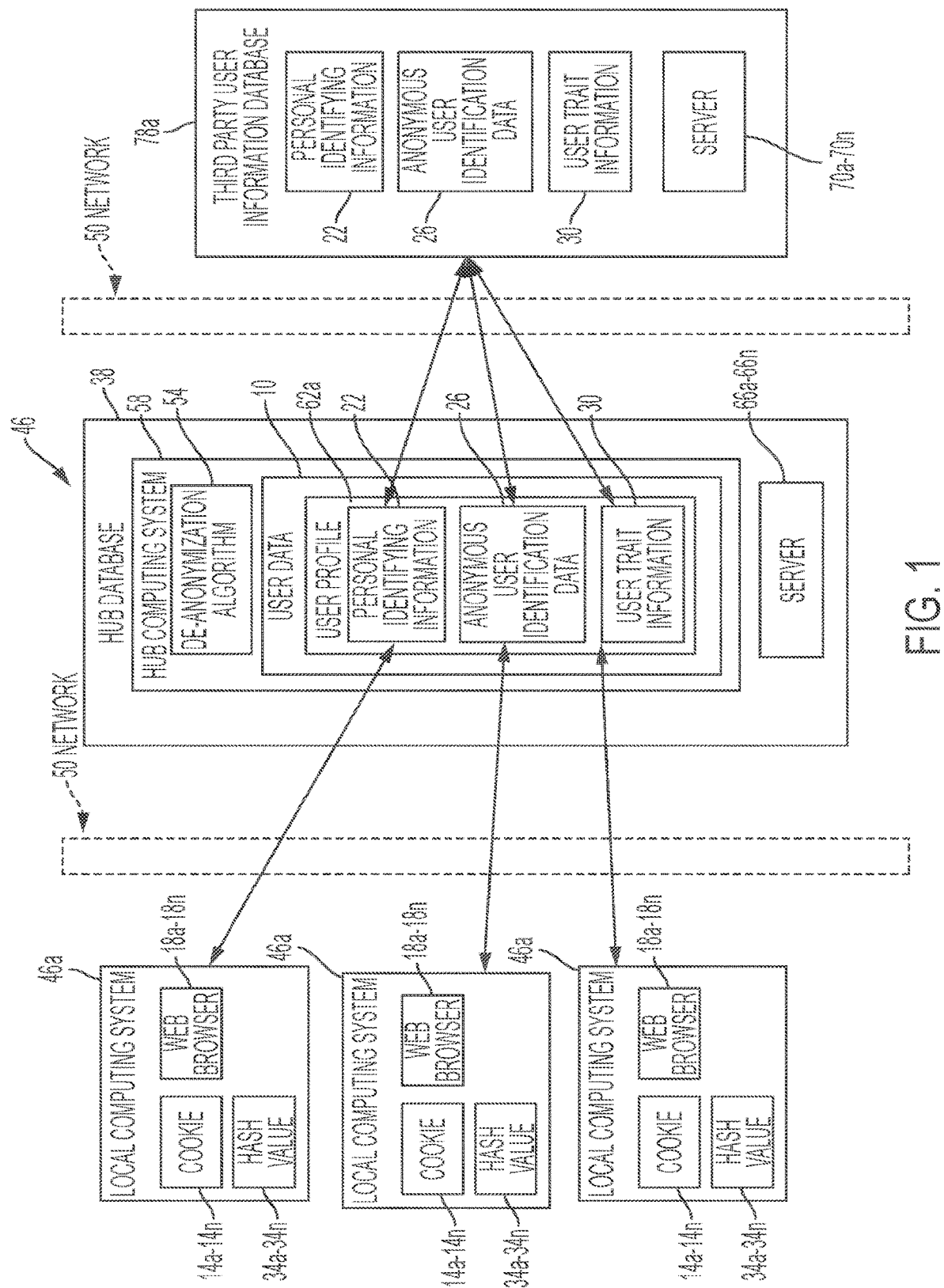
FIG. 1 is an illustration of a data infrastructure, including a local computing device, a hub database, and a plurality of third party databases according to some embodiments.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being practiced or of being carried out in various ways. Also, it is to be understood that the phraseology and terminology used herein is for the purpose of description and should not be regarded as limited. The use of "including", "comprising", or "having" and variations thereof herein is meant to encompass the items listed thereafter and equivalents thereof as well as additional items. As used herein, the word "may" is used in a permission sense (e.g. meaning having the potential to) rather than the mandatory sense (e.g. meaning must).

Some portions of the detailed description which follow are presented in terms of algorithms or symbolic representations of operations on binary digitals signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others killed in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared, or otherwise manipulated. It has been proven convenient at times, principally for reasons of common usage, to refer to signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, the terms "processing", "computing", "calculating", "determining" or the like refer to actions or processes of a specific apparatus, such as a special purpose computer or a similar special purpose electronic computing device. In the context of this specification, therefore, a special purpose computer or similar special purpose electronic computing device is capable of manipulating or transforming signals, typically represented as physical electronic or magnetic quantities within memories, registries, or other information storage devices, transmission devices, or display devices of the special purpose computer or similar special purpose electronic computing device, The use of the variable "n" is intended to indicate that a variable number of local computing devices may be in communication with the network.

In some embodiments, a system includes a first server in communications with a first computing system including a first memory and at least one processor. In some embodiments, the system includes a second server in communications with a second computing system. In some embodiments, the second computing system includes a second memory and a second processor. In some embodiments, the second server is in communication with the first server. In some embodiments, the first memory includes program instructions executable by the at least one processor of the first computing system to retrieve, from a browser session, a first piece of user information that includes at least anonymous user identification data, store the first piece of user information in a user profile in the first memory, and responsible to identifying a match of the first piece of user information with a match in a database of user information stored in the second memory, store a second piece of user information in the user profile in the first memory.

In some embodiments, the second piece of user information includes one of a gender, postal address, an age group, or a user interest. In some embodiments, the second piece of user information includes a has value. In some embodiments, the user profile is one of a plurality of user profiles, and further includes program instructions executable to query the plurality of user profiles for the second piece of user information, responsive to identifying a match in one of the user profiles of the plurality of the user profiles, and retrieve the first piece of user information.

In some embodiments, the first piece of user information is provided to an operator. In some embodiments, the first piece of user information corresponds to a user and the program instructions further include program instructions executable to calculate a probability that the second piece of user information corresponds to the user.

In some embodiments, the first memory includes program instructions executable by the at least one processor of the first computing system to store an identity of the data base of user information to the user profile in the first memory, and associate the identity of the database stored in the second memory with the second piece of user information stored in the first memory.

Some embodiments disclose a computer-implemented method, including retrieving, from a browser session, a first piece of user information that includes at least anonymous user identification data, storing the first piece of user information in a user profile stored on a first server, querying a plurality of databases stored on severs different that the first server for a plurality of matches related to the first piece of information, responsive to identifying a match in one of the plurality of databases, retrieving a second piece of user information from the one of the plurality of databases, and storing the second piece of user information in the user profile.

In some embodiments, the user profile is one of a plurality of user profiles, and the method further includes querying the plurality of profiles for a third piece of user information, and responsive to identifying a match in one of the user profiles of the plurality of user profiles, retrieving the first piece of user information. In some embodiments, the first piece of user information is provided to a consumer. Some embodiments further comprise calculating a probability that the third piece of user information corresponds to the same user as the first piece of user information.

In some embodiments, a non-transitory, computer-readable storage medium stores one or more executable instructions that, when executed by at least one processor, causes the at least one processor to retrieve, from a browser session, a first piece of user information that includes at least anonymous user identification data, store the first piece of user information in a user profile stored on a first server, query a plurality of databases stored on servers different from the first server for a plurality of matches related to the first piece of information, responsive to identifying a match in one of the plurality of databases, retrieve a second piece of user information from the one of the plurality of databases, and store the second piece of user information in the user profile.

In some embodiments, the second piece of user information includes one of a gender, a postal address, an age group, or a user interest. In some embodiments, the user profile is one of a plurality of user profiles, and the computer-readable storage medium further stores instructions that, when executed by at least one processor, cause the at least one processor to query the plurality of user profiles for a third piece of user information, and response to identifying a match in one of the user profiles of the plurality of user profiles, retrieve the first piece of user information. In some embodiments, the first piece of user information is provided to a customer.

In some embodiments, the computer-readable storage medium further stores instructions that, when executed by at least one processor, cause the at least one processor to calculate a probability that the third piece of user information corresponds to the same user as the first piece of information.

Some embodiments disclose a computer-implemented method, including forming a first user information database stored on a first server by retrieving, from a browser session, a first piece of user information that includes at least local user identification data and storing the first piece of user information in a user profile of the first user information database, querying the first user information database for a second piece of user information, responsive to not identifying the second piece of user information in the first user information database, querying a second user information database stored on a second server for the second piece of user information associated with the first piece of user information, retrieving the second piece of user information from the second database, and saving the second piece of user information to the user profile of the first user information database.

In some embodiments, the first piece of information includes a cookie or a hash value. In some embodiments, the second piece of user information includes at least anonymous user identification data related to the first piece of user information, and the method further includes querying a third user information database stored on a third server, the third user information database different than the second user information database, with the second piece of user information, and identifying a match in the third database, and saving the third piece of user information to the user profile in the first user information database.

In some embodiments, the third piece of user information includes personal identifying information. In some embodiments, the personal identifying information includes one of a gender, a personal address, an age group, or a user interest. In some embodiments, the method further includes providing both the first piece of user information and the second piece of user information to a consumer.

In some embodiments, the first piece of user information corresponds to a user, and the method further includes calculating a probability that the third piece of user information corresponds to the user. In some embodiments, the method further providing the third piece of user information to a consumer if the probability that the third piece of user information corresponds to the user is at least a predetermined probability.

Some embodiments include a non-transitory, computer-readable storage medium storing one or more executable instructions that, when executed by at least one processor, causes the at least one processor to form a first user information database stored on a first server by retrieving, from a browser session, a first piece of user information that includes at least local user identification data and storing the first piece of user information in a user profile of the first user information database, query the first user information database for a second piece of user information, responsive to not identifying the second piece of user information in the first user information database, query a second user information database stored on a second sever for the second piece of user information associated with the first piece of user information, and retrieve the second piece of user information to the user profile of the first user information database.

In some embodiments, the first piece of information includes a cookie or a hash value. In some embodiments, the second piece of user information includes at least anonymous user identification data related to the first piece of user information, and the non-transitory, computer-readable storage medium storing one or more executable instructions that further includes instructions that, when executed by at least one processor, cause the at least one processor to query a third user information database stored on a third server, the third user information database being different than the second user information database, with the second piece of user information, and identify a match in the third database, and saving the third piece of user information to the user profile in the first user information database.

In some embodiments, the third piece of user information includes personal identifying information. In some embodiments, the personal identifying information includes one of a gender, a postal address, an age group, or a user interest.

In some embodiments, the non-transitory, computer-readable storage medium storing one or more executable instructions that further includes instructions that, when executed by at least one processor, cause the at least one processor to provide both the first piece of user information and the second piece of user information to a consumer.

In some embodiments, the first piece of user information corresponds to a user, and the non-transitory, computer-readable storage medium storing one or more executable instructions that further includes instructions that, when executed by at least one processor, cause the at least one processor to calculate a probability that the third piece of user information corresponds to the user.

In some embodiments, the non-transitory, computer-readable storage medium storing one or more executable instructions that further includes instructions that, when executed by at least one processor, cause the at least one processor to provide the third piece of user information to a consumer if the probability that the third piece of user information corresponds to the user is at least a predetermined probability.

In some embodiments, a system includes a first server in communication with a first computing system including a first memory and at least one processor, and a second server in communication with a second computing system. In some embodiments, the second computing system includes a second memory and a second processor, and the second server is in communication with the first server. In some embodiments, the first memory includes program instructions executable by the at least one processor of the first computing system to form a first user information database stored on the first server by retrieving, from a browser session, a first piece of user information that includes at least local user identification data and storing the first piece of user information in a user profile of the first user information database, query the first user information database for a second piece of user information, responsive to not identifying the second piece of user information in the first user information database, query a second user information database stored on the second server for the second piece of user information associated with the first piece of user information, and retrieve the second piece of user information from the second database and saving the second piece of user information to the user profile of the first user information database.

In some embodiments, the first piece of information includes a cookie or a hash value.

In some embodiments, the second piece of user information includes at least anonymous user identification data related to the first piece of user information and the first memory includes program instructions executable by the at least one processor of the first computer system to query a third user information database stored on a third server, the third user information database different than the second user information database, with the second piece of user information, identify a match in the third database, and save the third piece of user information to the user profile in the first user information database.

In some embodiments, the third piece of user information includes personal identifying information.

In some embodiments, the personal identifying information includes one of a gender, a postal address, an age group or a user interest.

In some embodiments, the first memory includes program instructions executable by the at least one processor of the first computer system to provide both the first piece of user information and the second piece of user information to a consumer.

In some embodiments, the first piece of user information corresponds to a user, and the first memory includes program instructions executable by the at least one processor of the first computing system to calculate a probability that the third piece of user information corresponds to the user.

In some embodiments, the first memory includes program instructions executable by the at least one processor of the first computer system to provide the third piece of user information to a consumer if the probability that the third piece of user information corresponds to the user is at least a predetermined probability.

User data 10 from web browsing sessions may be stored by cookies 14a-14n associated with a web browser 18. The user data 10 stored in the cookies 14a-14n may then be transferred to a database of users. The user data 10 may include personal identifying information 22, anonymous user identification data 26, or user trait information 30. The personal identifying information 22 is information that corresponds to a specific person, such as a name, an email address, a postal address, a phone number, a photographic image, an IP address, and/or any other personal characteristic that can be used for identification.

The anonymous user identification data 26 is data that is specific to a particular anonymous user, and can be used to identify that particular anonymous user, but does not provide personal identifying information 22 about the particular anonymous user. Anonymous user identification data 26 may include a name of a cookie 14 or a value 34 of a hash function. The term "hash function" is generally used to refer to any well-defined procedure or mathematical function that converts a large, possibly variable-sized amount of data into a small datum. The values 34a-34n returned by a hash function are called hash values, hash codes, has sums, checksums, or simply hashes. Hash functions or hash values 34a-34n can be compared to determine the likelihood that a piece of newly identified user data 10 matches a particular anonymous user who has been assigned to a piece of anonymous user identification data 26. For example, a hash value 34a-34n may be used to match a piece of personal identifying information 22 with a piece of anonymous user identification data 26.

The user trait information 30 is information about a user such as age group, gender, interests, geographical region, travel habits, length of a browsing session, time of day of a browsing session, purchasing habits, travel preferences, clothing preferences, income level, residential information and/or any other information that may be associated with a person.

FIG. 1 illustrates a data infrastructure 42 according to some embodiments of the present disclosure. As shown in FIG. 1, the data infrastructure 42 includes a plurality of local computing devices 46a-46n in communication with a network 50. The term "local computing device" is used to refer to a computing device used directly by a user, such as a desktop computer, a laptop computer, a smart phone, a game console, a tablet computer, or any other device capable of communicating with the web browser 18a-18n over the network 50. In the illustrated embodiment, the local computing devices 46a-46n may be independent of one another. Each of the local computing devices 46a-46n may be autonomously administered by different entities (e.g. different home users or different companies) and may or may not share content or interact with each other. Each local computing device 46a-46n may have the same users, different users, or different sets of users.

According to various embodiments, a de-anonymization algorithm 54 is implemented by a processor of one or more hub computing systems 58 to harvest the user data 10 from the cookies 14a-14n of the web browsers 18a-18n of local computing devices 46a-46n and to store the user data 10 in user profiles 62a-62n stored in the one or more hub databases 38 saved to the one or more hub computing systems 58a-58n of a computer cluster, data center, and/or any other hardware configuration. In some embodiments, the data infrastructure 42 may include various internal APIs (e.g., RDBMS, software libraries, etc.) for internal access to the user data 10 or the user profiles 62a-62n. The term "hub database" is generally used to refer to the database 38 produced by the de-anonymization algorithm 54. The term "hub computing system" is generally used to refer to the computing system or computing systems 58 that run the de-anonymization algorithm 54. The hub computing system 58 is in communication with a server 66 that is in turn in communication with other servers 70a-70n in communication with other computing systems 74a-74n including third party user information databases 78a-78n.

According to various embodiments, the de-anonymization algorithm 54 may access, retrieve, aggregate, and/or analyze user data 10 including personal identifying information 22, anonymous user identification data 26, and user trait information 30 stored in one or more cookies 14a-14n stored on one or more web browsers 18a-18n and add the newly matched user data 10 to the hub database 38. In some embodiments, the de-anonymization algorithm 54 is configured to query the hub database 38 to retrieve content relevant to a piece of user trait information 30 of interest to obtain a list of personal identifying information 22 from the user profiles 62a-62n that include the specific piece of user trait information 30.

Figure 2:
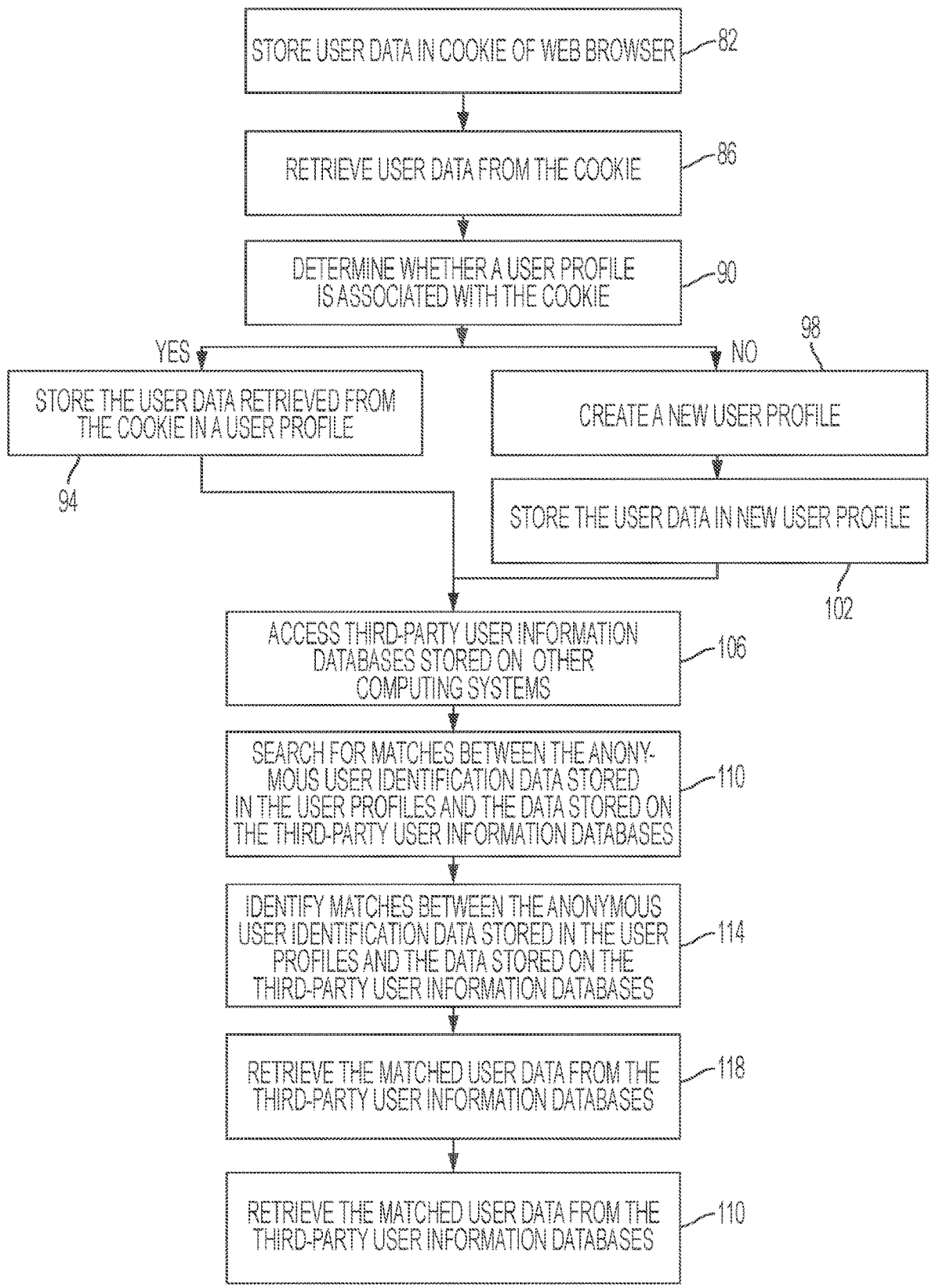
FIG. 2 is a flow diagram illustrating a method for converting local anonymous user data into personal identifying information of a user.

FIG. 2 illustrates a flow diagram showing the operations performable in retrieving the user data 10 stored in the at least one cookie 14a-14n of the at least one web browser 18a-18n in a user profile 62a-62n of the hub database 38 and matching the user 10 stored in the user profile 62a-62n with user data 10 stored on the third-party user information databases 78a-78n. The operations will be described for one local computing device 46. The same procedure may be used for multiple local computing devices 46a-46n. As an initial step, the user data 10 is stored in the cookie 14a-14n of the web browser 18a-18n (block 82). The user data 10 could consist of data input by the user (for example, a user name or a search query), links clicked by the user, or hash values generated in response to user input or user behavior. The user data 10 is retrieved from the cookie 14a-14n (block 86). The hub database 38 is queried to determine whether there is a user profile 64a-64n associated with the cookie 14a-14n (block 90). If there is a user profile 64a-64n associated with the cookie 14a-14n, the user data 10 retrieved from the cookie 14a-14n is added to the user profile 64a-64n (block 94). If there is not a user profile 64a-64n associated with the cookie 14a-14n, a new user profile 64a-64n is created for data from the cookie 14a-14n (block 98). The user data 10 retrieved from the cookie 14a-14n is added to the new user profile 61a-64n (block 102).

With continued reference to FIG. 2, the de-anonymization algorithm 54 accesses the third-party user information databases 78a-78n stored on other computing systems 74a-74n (block 106). The de-anonymization algorithm 54 searches for matches between the anonymous user identification data 26 in the user profiles 62a-62n and the anonymous user identification data 26 stored in the third party user information databases 78a-78n (block 110). In some embodiments, the anonymous user identification data 26 includes the names of the cookies 14a-14n. In other embodiments, the anonymous user identification data 26 includes hash values 34a-34n. In other embodiments, the anonymous user identification data 26 is both the names of the cookies 14a-14n and hash values 34a-34n. When the de-anonymization algorithm 54 identifies a match between the anonymous user identification data 26 stored in the user profiles 62a-62n and the anonymous user identification data 26 stored in a third-party user information database 78a-78n (block 114), the de-anonymization algorithm 54 retrieves the user data 10 associated with the anonymous user identification data 26 (block 118) and stores the user data 10 in the user profile 62a-62n in the hub database 38 (block 122). The user data 10 and the identity of the third-party user information databases 78a-78n from which the user data 10 was obtained is stored in the user profile 62a-62n as is described in more detail below. In the illustrated embodiment, the user data 10 may include personal identifying information 22, anonymous user identification data 26, user trait information 30, or any combination thereof. In some embodiments, each time the de-anonymization algorithm 54 runs, the de-anonymization algorithm 54 may query the third-party user information databases 78a-78n with all of the anonymous user identification data 26 saved to the user profiles 62a-62n. In other embodiments, a subset of the anonymous user identification data 26 saved to user profiles 62a-62n may be used to query the third-party user information databases 78a-78n. For example, in some embodiments, the de-anonymization algorithm 54 may preferentially send the newest anonymous user identification data 26 to the third-party user information databases 78a-78n. The de-anonymization algorithm 54 may repeat the steps shown in blocks 82-122 a predetermined number of times.

Figure 3:
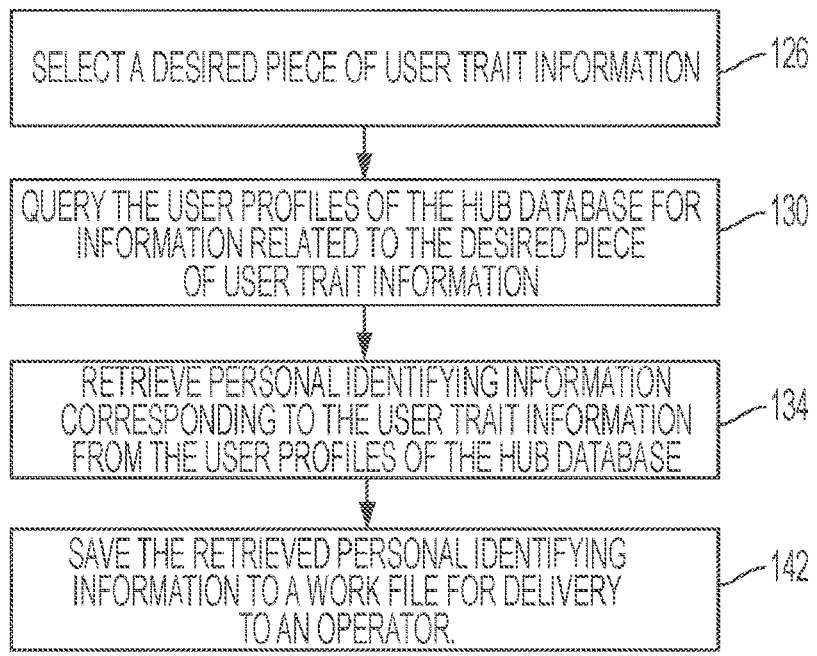
FIG. 3 is flow diagram illustrating a method for retrieving personal identifying information corresponding to user profiles that include a specific characteristic.

FIG. 3 illustrates a flow diagram illustrating the operations performable to retrieve personal identifying information 22 corresponding to the user profiles 62a-62n that include a desired piece of user trait information 30 or a group of pieces of user trait information 30a-30n. As an initial step, a desired piece of user trait information 30 is selected (block 126). The hub database 38 is queried for the user profiles 62a-62n that include the desired user trait 30 (block 130). Responsive to identifying a user profile 62a-62n that includes the user trait 30, the de-anonymization algorithm 54 retrieves the personal identifying information 22 from the user profile 62 (block 134). The de-anonymization algorithm 54 saves the retrieved personal identifying information 22 in a work file 138 for delivery to an operator (block 142). In some embodiments, the work file 138 includes all of the personal identifying information 22 associated with the user profile 62. In other embodiments, the de-anonymization algorithm 54 only returns a specific type of personal identifying information 22. In such embodiments, the de-anonymization algorithm 54 may search for user profiles 62a-62n that include the desired type of personal identifying information 22 simultaneously with searching for user profiles 62a-62n that include the desired user trait information 30 at block 130. In other embodiments, the de-anonymization algorithm 54 retrieves only the desired type of personal identifying information 22 from the work file 138 before the work file 138 is delivered to the operator.

In some embodiments, if the de-anonymization algorithm 54 does not return any user profiles 62a-62n that meet the user trait information 30 specified in the query, or if the number of user profiles 62a-62n returned by the de-anonymization algorithm 54 is less than a minimum number of user profiles 62a-62n, the de-anonymization algorithm 54 queries the third-party user information databases 78a-78n using the anonymous user identification data 26 stored in the user profiles 62a-62n as described above with respect to FIG. 2 to add new user data 10 to the hub database 38. The de-anonymization algorithm 54 is then re-run using the user trait information 30 specified in the query to return the personal identifying information 22 stored in the user profiles 62a-62n that include the specified user trait information 30.

By way of example, an operator may be interested in knowing the postal addresses of people interested in buying a new car. Such an operator may request user trait information 30 indicative of people interested in buying new cars, such as for example previous browsing of car dealership websites, filing an insurance claim related to a car accident, ownership of old cars, and people approaching their 16th birthday. The de-anonymization algorithm 54 would query the hub database 38 for the user trait information 30 of interest and return the personal identifying information 22 stored in the user profiles 62a-62n that include the user trait information 30 of interest. If the operator has indicated an interest in a specific type of personal identifying information 22, such as a postal address, only the postal addresses stored in the user profiles 62a-62n that include user trait information 30 of interest would be returned to the operator.

In some embodiments, the de-anonymization algorithm 54 may be used to differentiate between people who share a piece of personal identifying information 22 or the de-anonymization algorithm 54 may be used to retrieve a second piece of personal identifying information 22 based on a first piece of personal identifying information 22. In such an embodiment, both the shared personal identifying information 22 and a piece or pieces of user trait information 30 may be input to the de-anonymization algorithm 54, which would only return the personal identifying information 22 corresponding to the person who possesses both the queried piece of personal identifying information 22 and the user trait information 30.

For example, the de-anonymization algorithm 54 may be used to differentiate between family members who share a postal address. Specifically, if the operator wished to differentiate between the children and the adults living at shared postal address, the operator would input both the shared postal address and a desired age group (such as over 21 years old) into the de-anonymization algorithm 54. The de-anonymization algorithm 54 would query the hub database 38 using the shared postal address and the desired age group. The de-anonymization algorithm 54 would then output the personal identifying information 22 corresponding to the people at the shared postal address who fall within the appropriate age group.

Figure 4:
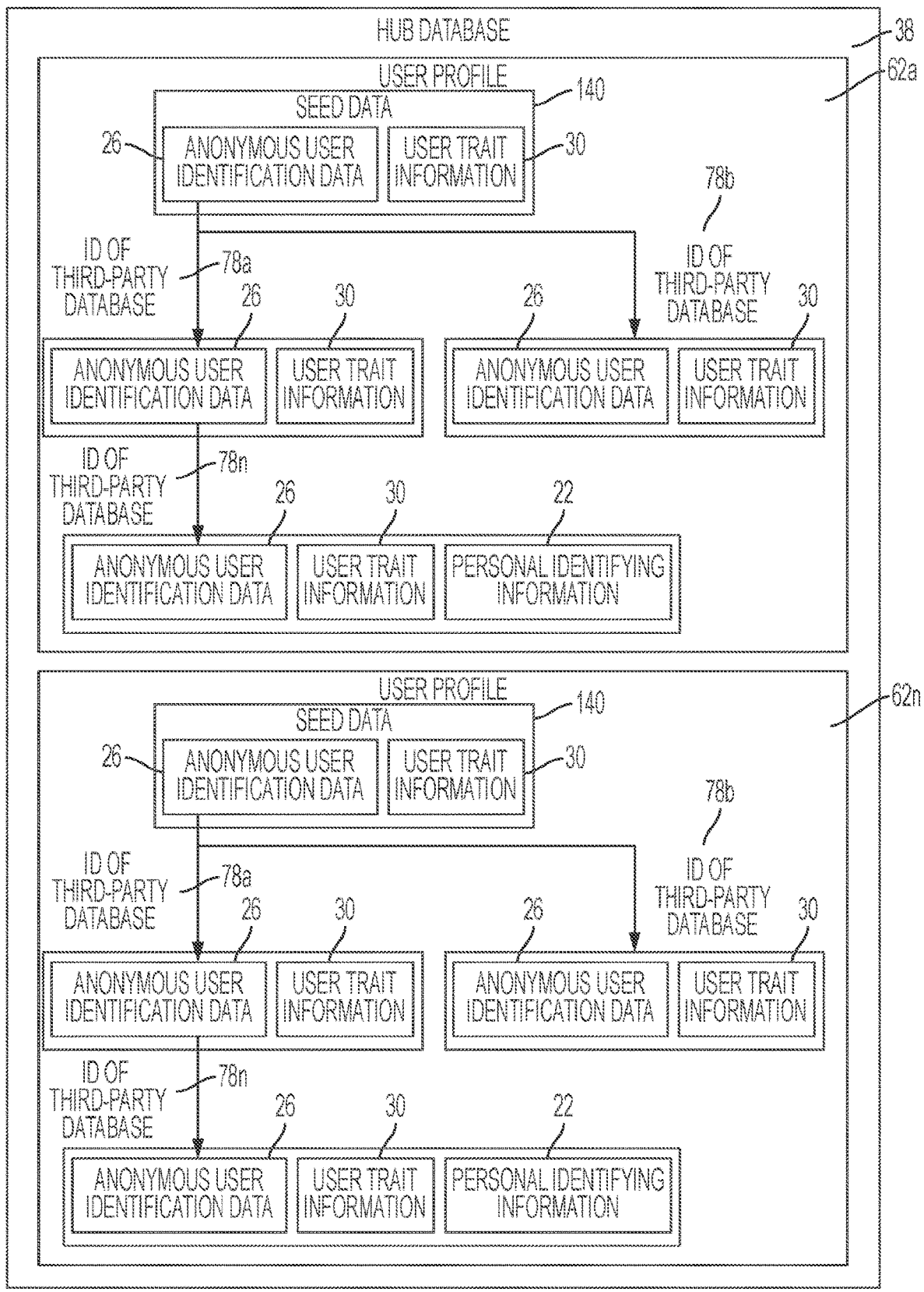
FIG. 4 is a schematic representation of a hub database according to some embodiments of the disclosure.

FIG. 4 is a schematic representation of the organization of the user data 10 stored in the user profiles 62a-62n of the hub database 38. As shown in FIG. 4, the user profiles 62a-62n are named according to seed data 140 used to establish the user profile 62. The seed data 140 is a first piece of anonymous user identification data 26 found by the de-anonymization algorithm 54 and used to establish the user profile 62a-62n. For example, when the seed data is a cookie 14a-14n, the name of the corresponding user profile 62a-62n is the name of the cookie 14a-14n. When the seed data is a hash value 34a-34n, the name of the corresponding user profile 62a-62n is the name of the hash value 34a-34n.

The user data 10 retrieved from the cookies 14a-14n and/or the third-party user information databases 78a-78n is saved to the user profiles 62a-62n stored in the hub database 38. The specific identity of any of the third-party user information databases 78a-78n that provided user data 10 is indexed to the user data 10. In some embodiments, each time the de-anonymization algorithm 54 is repeated, the newly-added anonymous user identification data 26 is sent to the third-party user information databases 78a-78n to find matches of the anonymous user identification data 26. If a match is found, the user data 10 corresponding to the matched anonymous user identification data 26 is saved to the user profile 62a-62n as a branch 150a-150n of the specific piece of anonymous user identification data 26 that was matched to retrieve the newly added user data 10. The specific third-party user information database 78a-78n that included the newly added user data 10 is saved to the user profile 62a-62n and indexed to the new user data 10. Accordingly, each user profile 62a-62n stored in the hub database 38 contains a web of user data 10 organized in a branched configuration in which each individual piece of user data 10 and the source (e.g. identity of the cookie 14a-14n or the third-party user information database 78a-78n) of the user data 10 used to find each piece of user data 10 is known.

The web structure of the hub database 38 allows the de-anonymization algorithm 54 to quickly query the hub database 38 for any type of user data 10 input by an operator. Since the user profiles 62a-62n include all available user data 10 known for each person, the hub database 38 may queried to return any type of user data 10 from the user profiles 62a-62n requested in a query.

Figure 5:
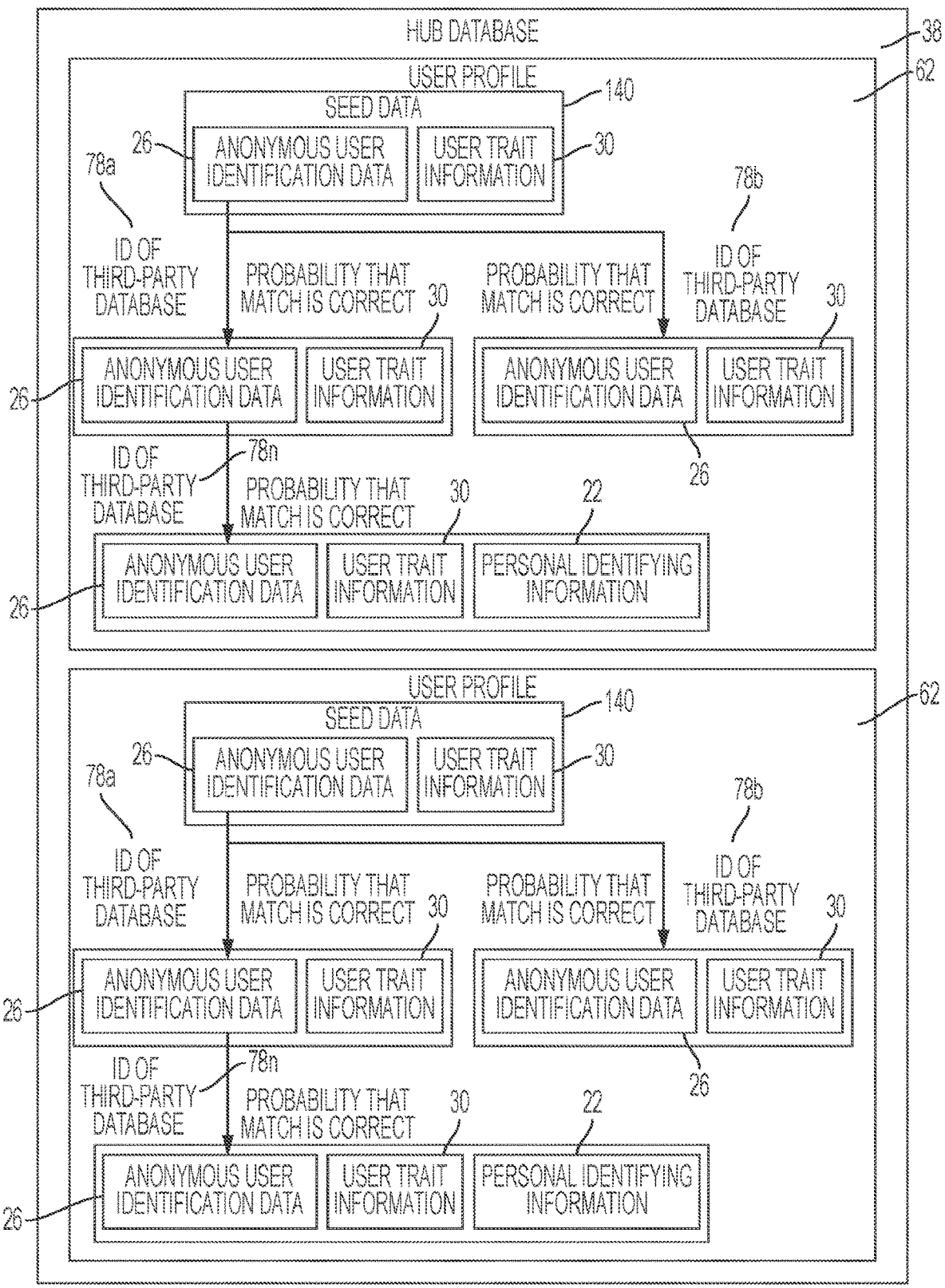
FIG. 5 is a schematic representation of a hub database according to another embodiment of the disclosure.
Figure 6:
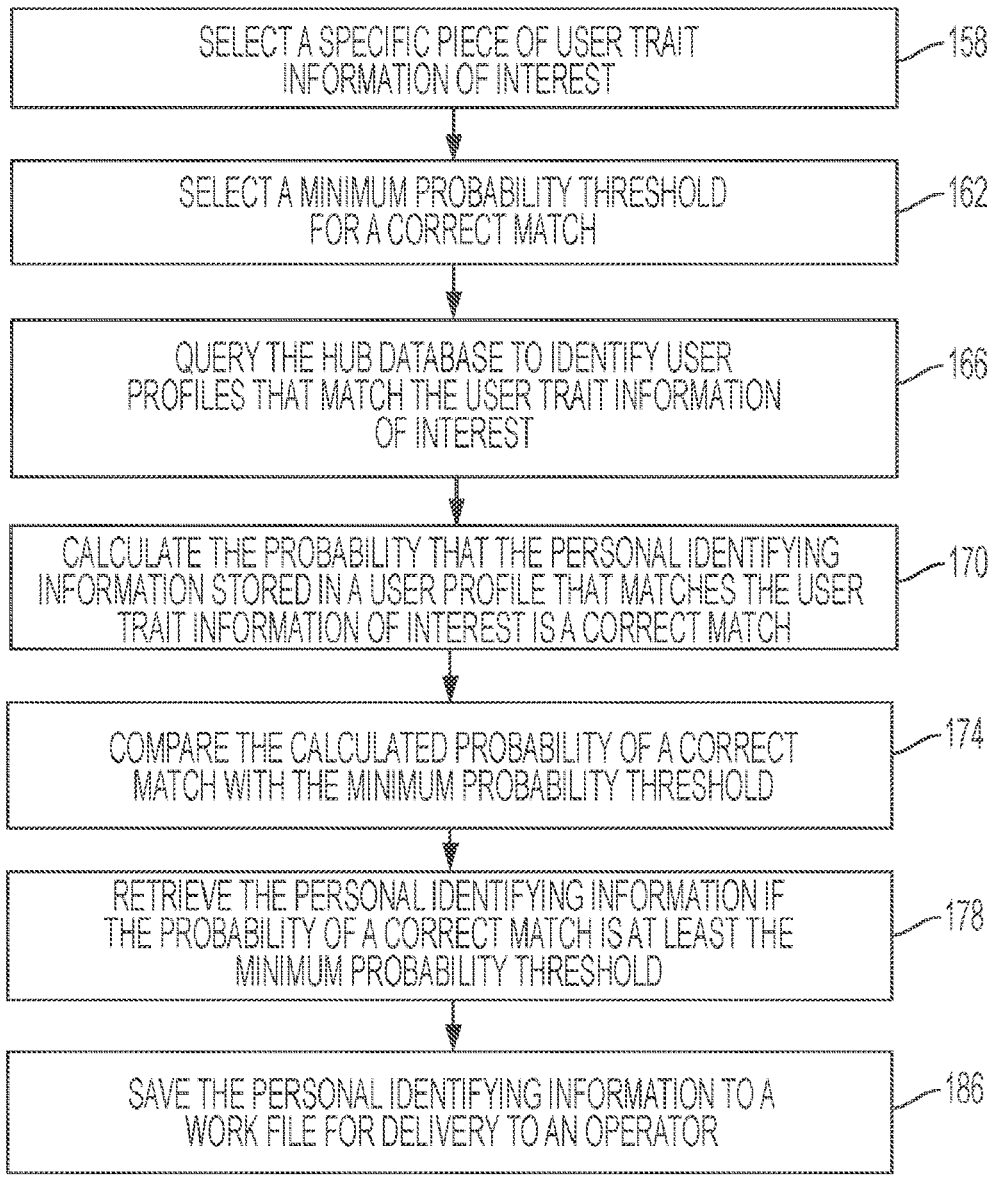
FIG. 6 is a flow diagram illustrating a method for retrieving personal identification information corresponding to user profiles that include a specific characteristic with a specified probability of accuracy.

FIG. 5 is a schematic representation of the organization of the user data 10 in the user profiles 62a-62n of the hub database 38 according to an alternate embodiment. As illustrated in FIG. 6, for every match between a piece of anonymous user identification data 26 stored in the user profile 62a-62n and a subsequent match to another piece of user data 10 stored in the user profile 62a-62n, a probability that the match is correct is calculated and saved to a branch 154a-154n linking the matched pieces of user data 10. The identity of the third-party user information database 78a-78n that included the subsequent piece of user data 10 is also saved to the branch 154a-154n. In such an embodiment, the probability that a specific piece of personal identifying information 22 or a specific piece of user trait information 30 is a correct match to the seed data used to generate the user profile 62a-62n may be calculated by multiplying the match correctness probabilities stored in each branch 154a-154n between the seed data and the piece of personal identifying information 22 or the user trait information 30 of interest. The probability that the personal identifying information 22 or the user trait information 30 is correct may be saved to the hub database 38 for each piece of personal identifying information 22 or user trait information 30.

FIG. 6 illustrates a flow diagram showing the operations performable to retrieve the personal identifying information 22 corresponding to the user profiles 62a-62n that include a desired piece of user data 10, such as user trait information 30 or a group of pieces of user trait information 30 that have a specific probability of being a correct match to the retrieved personal identifying information 22. A specific piece of user trait information 30 or a group of pieces of user trait information 30 is selected (block 158). A specific minimum probability of a correct match between the user trait information 30 queried and the personal identifying information 22 returned by the de-anonymization algorithm 54 is selected (block 162). The hub database 38 is queried using de-anonymization algorithm 54 to identify the user profiles 62a-62n that match the user trait information 30 included in the query (block 166). Responsive to identifying the user profiles 62a-62n that include the queried user trait information 30, the de-anonymization algorithm 54 computes the probability that the queried user trait information 30 is a correct match to the personal identifying information 22 saved to the user profile 62a-62n. This probability is calculated by multiplying the probability that the personal identifying information 22 information is a correct match to the seed data 140 of the user profile 62a-62n with the probability that the user trait information 30 is a correct match to the seed data 140 of the user profile 62a-62n (block 170). The de-anonymization algorithm 54 then compares the probability that the match is correct to the minimum probability threshold selected in block 162 (block 174). If the probability of a correct match is above the minimum probability threshold, the de-anonymization algorithm 54 retrieves the personal identifying information 22 from the hub database 38 (block 178). The de-anonymization algorithm 54 saves the retrieved personal identifying information 22 to a work file 182 for delivery to an operator (block 186).

In some embodiments, the work file 190 includes all of the personal identifying information 22 associated with the user profile 62a-62n that meets the minimum acceptable probability threshold. In other embodiments, the hub database 38 only returns the user profiles 62a-62n that include a specific type of personal identifying information 22. In such embodiments, the de-anonymization algorithm 54 may search for the user profiles 62a-62n that include the desired type of personal identifying information 22 simultaneously with searching for the user profiles 62a-62n that include the desired type of user trait information 30 selected at block 158. In other embodiments, the de-anonymization algorithm 54 retrieves only the desired type of personal identifying information 22 from the work file 182 for delivery to the operator.

By way of example, an operator may be interested in knowing the postal addresses of people interested in buying a new car, but the operator does not want to contact people who are not interested in buying a new car. Such an operator may use the de-anonymization algorithm 54 would request user trait information 30 indicative of people interested in buying new cars, such as for example previous browsing to car dealership websites, filing an insurance claim related to a car accident, ownership of old cars, people approaching their 16'h birthday, and the operator would also input a minimum correct match probability of, for example 0.90. The de-anonymization algorithm 54 would query the hub database 38 for the user trait data 30 of interest and return the personal identifying information 22 stored in the user profiles 62a-62n that include the user trait information 30 of interest. If the operator has indicated an interest in a specific piece of personal identifying information 22, such as a postal address, only the postal addresses stored in the user profiles 62a-62n that include user trait information 30 of interest would be returned to the operator and the probability that the match between the user trait information 30 of interest and the personal identifying information 22 of the person was at least 0.90.

In some embodiments, the de-anonymization algorithm 54 may be used to differentiate between people who share a piece of personal identifying information 22 or the de-anonymization algorithm 54 may be used to retrieve a second piece of personal identifying information 22 based on a first piece of personal identifying information 22. In such an embodiment, both the shared personal identifying information 22 and a piece or pieces of user trait information 30 may be input to the de-anonymization algorithm 54, which would only return the personal identifying information 22 corresponding to the person who possesses both the queried piece of personal identifying information 22 and the user trait information 30.

Various embodiments of a system and method for asynchronous correlation of data entries in spatially separated instances of heterogeneous databases, as described herein, may be executed on one or more computer systems 700, which may interact with various other devices. In the illustrated embodiment, the computer system 700 includes one or more processors 705 coupled to a system memory 710 via an input/output (I/O) interface 715. The computer system 700 further includes a network interface 720 coupled to I/O interface 715, and one or more input/output devices 725, such as cursor control device 740, keyboard 745, and display(s) 750. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 705a, or a multiprocessor system including several processors 705a-705n (e.g., two, four, eight, or another suitable number). The processors 705 may be any suitable processor capable of executing instructions. For example, in various embodiments the processors 705 may be general-purpose or embedded processors implementing any of a variety of instruction set architectures (ISAs), such as the x86, PowerPC, SPARC, or MIPS ISAs, or any other suitable ISA. In multiprocessor systems, each of processors 705 may commonly, but not necessarily, implement the same ISA.

The system memory 710 may be configured to store the program instructions 730 and/or existing state information and ownership transition condition data in the data storage 735 accessible by the processor 705. In various embodiments, the system memory 710 may be implemented using any suitable memory technology, such as static random access memory (SRAM), synchronous dynamic RAM (SDRAM), nonvolatile/Flash-type memory, or any other type of memory. In the illustrated embodiment, the program instructions 730 may be configured to implement a system for performing data reception and aggregation operations incorporating any of the functionality, as described herein. In some embodiments, program instructions and/or data may be received, sent, or stored upon different types of computer accessible media or on similar media separate from the system memory 710 or the computer system 700. The computer system 700 is described as implementing at least some of the functionality of functional blocks of previous Figures.

In one embodiment, the I/O interface 715 may be configured to coordinate I/O traffic between the processor 705, the system memory 710, and any peripheral devices in the device, including the network interface 720 or other peripheral interfaces, such as the input/output devices 725. In some embodiments, the I/O interface 715 may perform any necessary protocol, timing or other data transformations to convert data signals from one component (e.g., the system memory 710) into a format suitable for use by another component (e.g., the processor 705). In some embodiments, the I/O interface 715 may include support for devices attached through various types of peripheral buses, such as a variant of the Peripheral Component Interconnect (PCI) bus standard or the Universal Serial Bus (USB) standard, for example. In some embodiments, the function of the I/O interface 715 may be split into two or more separate components, such as a north bridge and a south bridge, for example. Also, in some embodiments some or all of the functionality of the I/O interface 715, such as an interface to the system memory 710, may be incorporated directly into the processor 705.

The network interface 720 may be configured to allow data to be exchanged between the computer system 700 and other devices attached to the network 105 or between nodes of the computer system 700. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 725 may, in some embodiments, include one or more display terminals, keyboards, keypads, touchpads, scanning devices, voice, or optical recognition devices, or any other devices suitable for entering or accessing data by one or more the computer systems 700. Further, various other sensors may be included in the I/O devices 725, such as imaging sensors, barometers, altimeters, LIDAR, or any suitable environmental sensor. Multiple input/output devices 725 may be present in the computer system 1100 or may be distributed on various nodes of the computer system 700. In some embodiments, similar input/output devices may be separate from the computer system 700 and may interact with one or more nodes of the computer system 700 through a wired or wireless connection, such as over the network interface 720.

Figure 7:
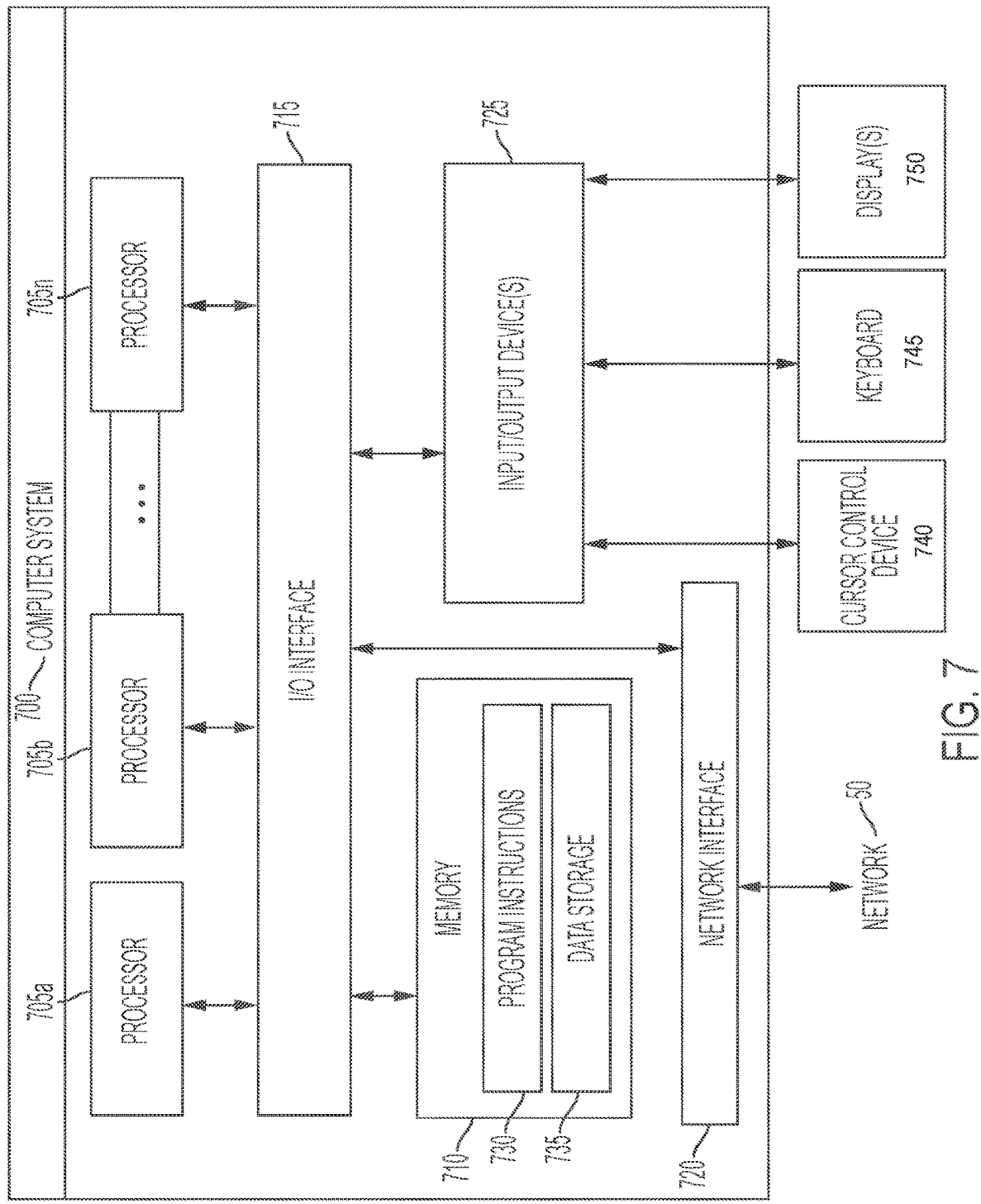
FIG. 7 is a schematic representation of a computer system usable for performing asynchronous correlation of data entries in spatially separated instances of heterogeneous databases according to another embodiment of the disclosure.

As shown in FIG. 7, the memory 710 may include program instructions 730, which may be processor-executable to implement any element or action, as described herein. In one embodiment, the program instructions may implement at least a portion of methods described herein, such as the methods illustrated by FIGS. 3-11. In other embodiments, different elements and data may be included. Note that the data storage 735 may include any data or information, as described herein.

Those skilled in the art will appreciate that the computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer accessible medium separate from the computer system 700 may be transmitted to the computer system 700 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

Various features and advantages of the disclosure are set forth in the following claims.

SECTION II. METHOD, APPARATUS, AND SYSTEM FOR RECEIVING AND WEIGHTING NON-SCHEMA DATA ENTRIES IN SPATIAL INSTANCES OF HETEROGENEOUS

Databases Technical Field for Section II

The present disclosure relates to receiving and weighting non-schema data for data aggregation and correlation.

Additional Background for Section II

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY FOR SECTION II

This disclosure provides systems and methods for receiving and weighting non-schema data.

In a first embodiment, the disclosure provides an apparatus including a computing system that is communicatively linked to one or more servers. The computing system includes at least one memory and at least one processor. The computing system is configured to receive a first set of non-schema data including one or more electronic identifications and one or more attributes that are associated with each electronic identification of the one or more electronic identifications from the first set of non-schema data. The computing system is also configured to receive a second set of non-schema data including one or more electronic identifications and one or more attributes that are associated with each electronic identification of the one or more electronic identifications from the second set of non-schema data. The computing system is further configured to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the computing system is configured to assign an independent score to each attribute to the one or more attributes from the third set of non-schema data. The computing system is also configured to identify a common attribute of the one or more attributes that is associated with at least two electronic identifications of the plurality of electronic identifications. The computing system is further configured to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

In a second embodiment, the disclosure provides a method implemented by a computing system. The method includes receiving, by the computing system, a first set of non-schema data including one or more electronic identifications and one or more attributes that are associated with each electronic identification of the one or more electronic identifications from the first set of non-schema data. The method also includes receiving, by the computing system, a second set of non-schema data including one or more electronic identifications and one or more attributes that are associated with each electronic identification of the one or more electronic identifications from the second set of non-schema data. The method further includes combining, by the computing system, the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the method includes assigning, by the computing system, an independent score to each attribute of the one or more attributes from the third set of non-schema data. The method also includes identifying, by the computing system, a common attribute of the one or more attributes that is associated with at least two electronic identifications of the plurality of electronic identifications. The method further includes, based on the independent scores assigned to each common attribute of the one or more attributes that are associated with the at least two electronic identifications of the plurality of electronic identifications, determining, by the computing system, whether to select at least one electronic identification of the at least two electronic identifications of the plurality of electronic identifications.

In a third embodiment, the disclosure provides a non-transitory, computer-readable storage medium. The non-transitory, computer-readable storage medium stores one or more executable instructions that, when executed by at least one processor, cause the at least one processor to receive a first set of non-schema data including one or more electronic identifications and one or more attributes that are associated with each electronic identification of the one or more electronic identifications from the first set of non-schema data. The one or more executable instructions that, when executed by at least one processor, also cause the at least one processor to receive a second set of non-schema data including one or more electronic identifications and one or more attributes that are associated with each electronic identification of the one or more electronic identifications from the second set of non-schema data. The one or more executable instructions that, when executed by at least one processor, further cause the at least one processor to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the non-transitory, computer-readable storage medium stores one or more executable instructions that, when executed by at least one processor, cause the at least one processor to assign an independent score to each attribute of the one or more attributes from the third set of non-schema data. The one or more executable instructions that, when executed by at least one processor, also cause the at least one processor to identify a common attribute of the one or more attributes that is associated with at least two electronic identifications of the plurality of electronic identifications. The one or more executable instructions that, when executed by at least one processor, further cause the at least one processor to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION FOR SECTION II

FIGS. 8 through 15, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 8:
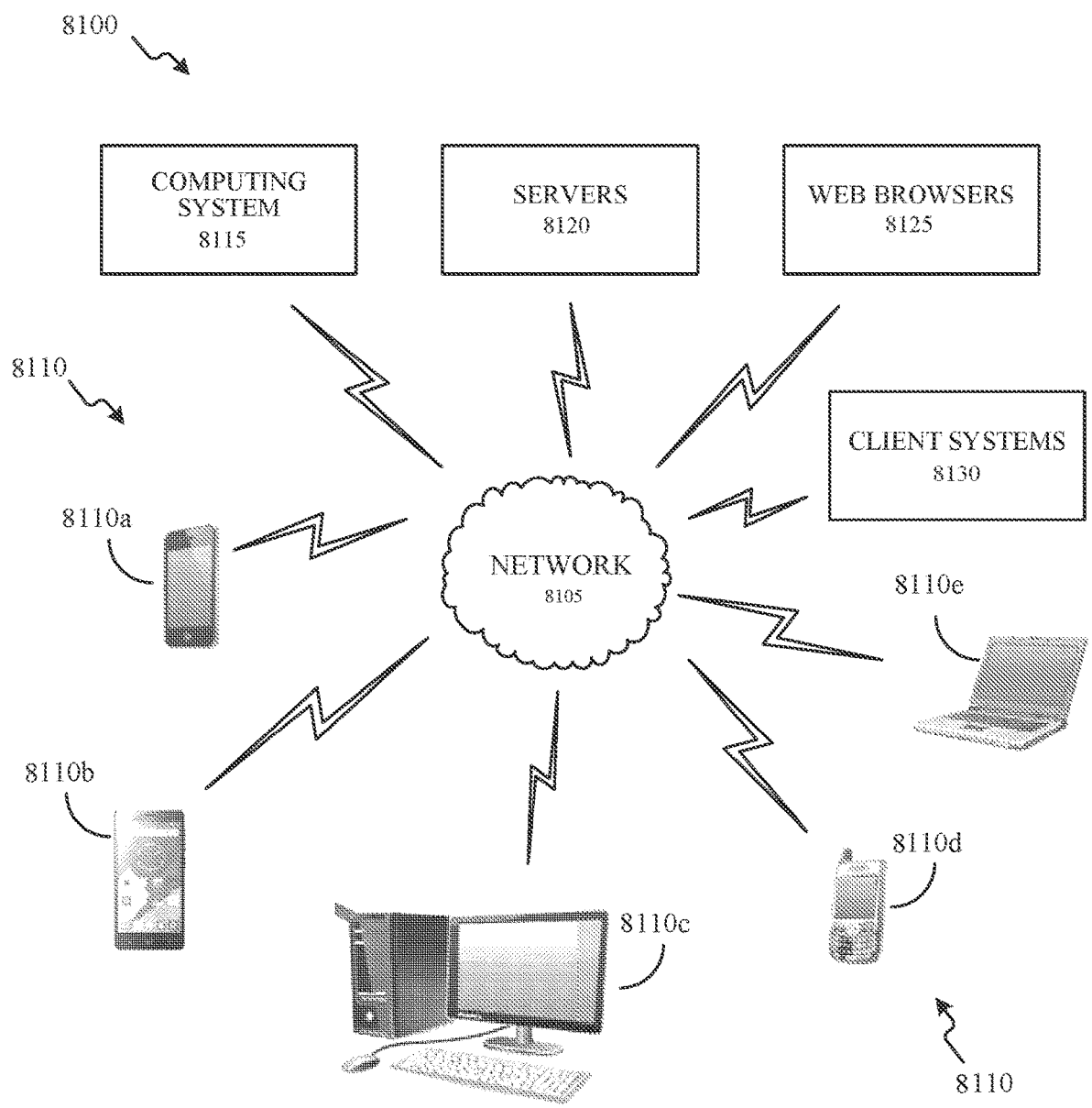
FIG. 8 illustrates a non-limiting, example network context for operating a computing system according to certain embodiments of this disclosure.

FIG. 8 illustrates a non-limiting, example network context 8100 for operating computing system 8115 according to certain embodiments of this disclosure. One or more components of the network context 8100 may operate as separate components linked by one or more constituent networks of the network 8105. In some embodiments, one or more constituent networks of the network 8105 may include the internet, which can be accessed over both wired connections (e.g., an Ethernet connection) or over a wireless connection (e.g., a wireless local area network "WLAN" connection, a cellular network connection). Additionally, or alternatively, one or more constituent networks of the network 8105 may include a combination of private networks (e.g., a local wireless mesh network) and public networks (e.g., a telephone (POTS) network). In certain embodiments, one or more constituent networks of the network 8105 may support multiple communication protocols, including both wireless protocols (e.g., BLUETOOTH™, circuit-switched cellular, 3G, LTE, WiBro) and internet protocols (e.g., HTTP).

The one or more constituent networks of the network 8105 provide two-way electronic connectivity and electronic communication between each of the electronic devices 8110 and the one or more servers 8120. In certain embodiments, the one or more constituent networks of the network 8105 provide two-way electronic connectivity and electronic communication between each of the electronic devices 8110 and the one or more servers 8120 using one or more same or different channels, protocols, or networks of network 8105. For example, a circuit-switched cellular protocol wireless network of the network 8105 provides electronic connectivity and electronic communication between the first electronic device 8110a and the one or more servers 8120 while a POTS wireless network of the network 8105 provides electronic connectivity and electronic communication between the third electronic device 8110c and the one or more servers 8120.

In certain embodiments, the network context 158100 includes one or more electronic devices 8110. The one or more electronic devices 8110 may include an iPhone™ 8110a, a tablet 8110b, a desktop computer 8110c, a smartphone 8110d, a laptop computer 8110e, or the like In certain embodiments, each of the one or more electronic devices 8110 is configured to initiate a web browser session with a web browser 8125 or access and display the one or more web browsers 8125 through the network 8105 for viewing by a user and for interaction between the user and the one or more web browsers 8125. Additionally, or alternatively, each of the one or more electronic devices 8110 is configured to transmit one or more items of anonymous personal identification information to a web browser 8125 during a web browser session.

In certain embodiments, each of the one or more electronic devices 8110 may be configured to store data pieces received from a web browser 8125 during a web browser session. Each data piece may contain at least one of an electronic address or one or more items of anonymous personal identification information that were transmitted by the electronic device 8110 to the web browser 8125 during the web browser session. The electronic address may provide an anonymous indication of an electronic communication reception or transmission location of the electronic device 8110 so that one or more other electronic devices 8110, one or more servers 8120, or one or more web browsers 8125 may electronically communicate with that electronic device 8110. For example, an electronic address may include at least one of a MAC address, an IMEI number, an electronic device serial number, a pointer associated with a data port of the electronic device, or the like. An item of anonymous personal identification information may include information associated with a user of an electronic device such as at least one of an email address, a name, a postal address, a phone number, a geographic area, a gender, a heritage, an age group, an economic status, a social status, a group association, an interest, or a preference of the user of the electronic device. In certain embodiments, the electronic device 8110 includes an electronic device display screen, an electronic device memory, and at least one electronic device processor. The electronic device may be configured to access and display content from one or more web browsers 8125 on the electronic device display screen.

In certain embodiments, electronic addresses and items of anonymous personal identification information may be used as electronic identifications and attributes described herein. An electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number, a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g., a behavior performed by a user), a preference of the user of the electronic device, or the like. In certain embodiments, an attribute may be extracted from at least one of an item of anonymous personal identification information or an electronic address (e.g., when an IMEI number indicates a particular brand of electronic device used by an individual).

The network context 8100 may, according to certain embodiments, include one or more servers 8120. In certain embodiments, the one or more servers 8120 store electronic identifications and associated attributes. As described herein, the computing system 8115 may receive and weight data pieces in the server 8120 that are generated during a browser session initiated through an electronic device 8110 with a web browser 8125. The data pieces may include at least one of an electronic identification or one or more attributes associated with the electronic identification. In certain embodiments, the data pieces may be received by the computing system 8115 in a schema form (e.g., a schema format) and may be stored in the server 8120 according to the schema form. In certain embodiments, the data pieces may be received by the computing system 8115 in a non-schema form (e.g., a non-schema format) and may be stored in the server 8120 simply as the data pieces are received by the computing system 8115 (e.g., stored in the non-schema form).

In some embodiments, one or more servers 8120 may store user profiles containing electronic identifications and associated attributes in a key value data store. Thus, by knowing an electronic identification that is indicative of a key value of a user profile, all items of electronic identifications and associated attributes stored in the user profile may be identified and viewed via display screen.

It should be understood that the term "schema" may refer to the organization of data as a blueprint of how the database is constructed (e.g., divided into database tables in the case of relational databases). Thus, electronic identifications and associated attributes in each of the data pieces may have a schema form that has categorized or characterize each of the electronic identifications and each of the associated attributes into specific categories. Conversely, non-schema data may be raw data or data that is not been categorized or characterized. Thus, electronic identifications and associated attributes in each of the data pieces may be raw data or data that is not been categorized or characterized into a specific category.

In certain embodiments, the network context 8100 includes one or more web browsers 8125. The one or more web browsers 8125 may be configured to contain display content for viewing by an electronic device 8110 when the electronic device 8110 is engaged in a web browser session with the web browser 8125. In certain embodiments, the one or more web browsers are configured to transmit data pieces to the electronic device 8110 for storage in a memory of the electronic device 8110 when the electronic device 8110 is engaged in a web browser session with the web browser 8125. The one or more web browsers 8125 may also be configured to receive data pieces including at least one of one or more electronic identification or one or more associated attributes transmitted from an electronic device 8110 when the electronic device 8110 is engage in a web browser session with the one or more web browsers 8125. The electronic device 8110 may store the data pieces including the electronic identifications and the associate attributes transmitted to the web browser and in some embodiments, an electronic device address associated with the electronic device 8110 in the data piece received from the web browser 8125 located in the memory of the electronic device 8110. The computing system 8115, described herein, may receive or retrieve, from at least one of the electronic device 8110 or the web browser 8125, the data pieces including at least one of one or more electronic identification or one or more associated attributes transmitted from an electronic device 8110.

Additionally, or alternatively, the network context 8110 8100 may include one or more client systems 8130. A client system 8130 may be a system operated by an independent entity (e.g., separate from the computing system 8115 and the one or more servers 8120) that transmits, to the computing system 8115, one or more data pieces including at least one of one or more electronic identifications and one or more associated attributes. For example, the client system 8130 may transmit, to the computing system 8115, a first set of non-schema data pieces each containing at least one of one or more electronic identifications or one or more associated attributes. Subsequently, the client system 8130 may transmit, to the computing system 8115, a second set of non-schema data pieces each containing at least one of one or more electronic identifications or one or more associated attributes. Each of the non-schema data pieces transmitted from the client system 8130 may contain at least one of one or more electronic identifications or one or more associated attributes that may be associated with users of interest to the independent entity utilizing the client system 8130. In certain embodiments, each of the one or more associated attributes may include a time indicating when the associated attribute was recorded or took place.

In certain embodiments, the network context 8100 includes one or more computing systems 8115. The computing system 8115, utilizing one or more processors, is configured to perform one or more non-schema data reception and weighting operations as described herein. For example, the computing system 8115, utilizing one or more processors, may be configured to receive a first set of non-schema data including one or more electronic identifications and one or more attributes that are associated with each electronic identification of the one or more electronic identifications from the first set of non-schema data. The computing system 8115, utilizing the one or more processors, may also be configured to receive a second set of non-schema data including one or more electronic identifications and one or more attributes that are associated with each electronic identification of the one or more electronic identifications from the second set of non-schema data.

The computing system, utilizing the one or more processors, may be further configured to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the computing system, utilizing the one or more processors, may be configured to assign an independent score to each attribute of the one or more attributes from the third set of non-schema data. The computing system, utilizing the one or more processors, may also be configured to identify a common attribute of the one or more attributes that is associated with at least two electronic identifications of the plurality of electronic identifications. The computing system, utilizing the one or more processors, may be further configured to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

Figure 9:
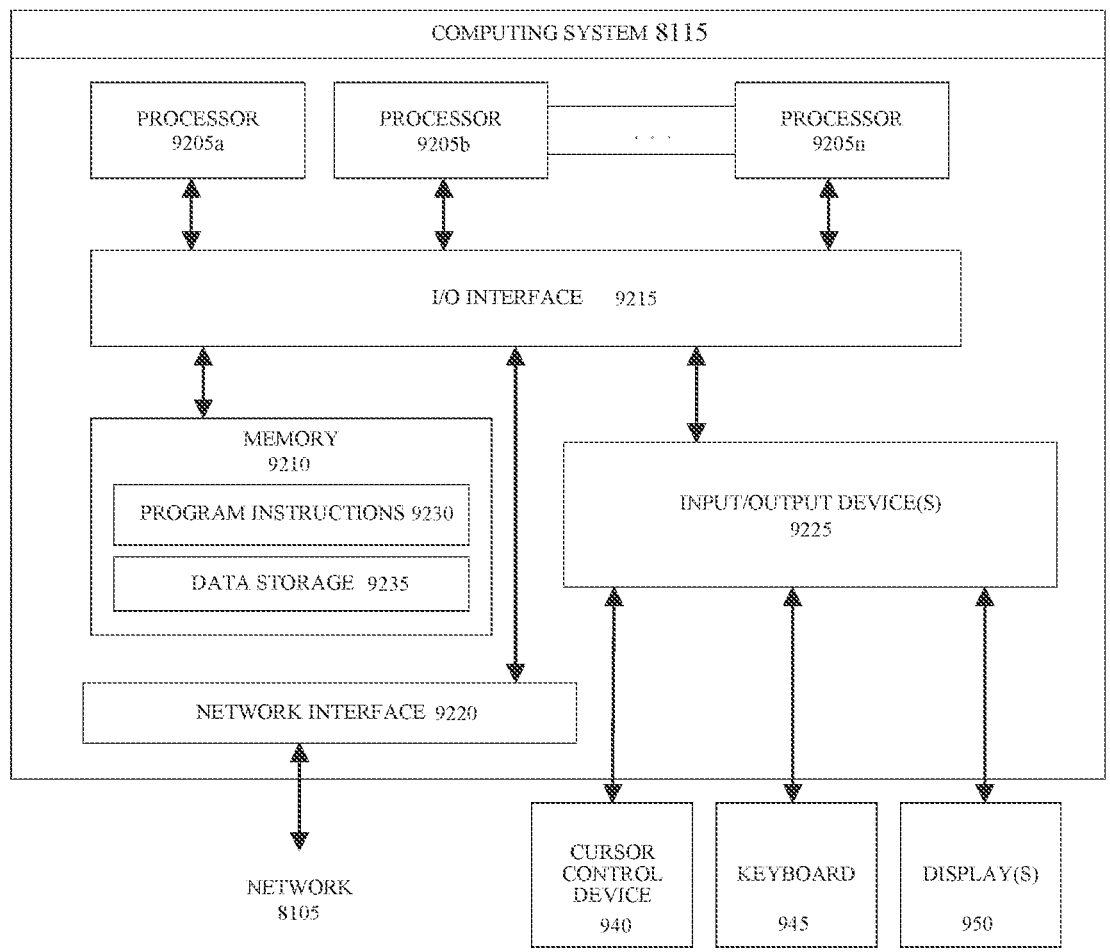
FIG. 9 illustrates a non-limiting, example computing system configured for performing one or more non-schema data reception and weighting operations according to certain embodiments of this disclosure.

FIG. 9 illustrates a non-limiting, example of the computing system 8115 illustrated in FIG. 8 The computing system 8115 is configured to execute any and all of the embodiments and operations described herein including embodiments for performing one or more non-schema data reception and weighting operations. In certain embodiments, the computing system 8115 may perform one or more non-schema data reception and weighting operations using the network 8105 to receive one or more sets of non-schema data pieces, combine each of the one or more sets of non-schema data pieces into a plurality of non-schema data pieces, assign an independent score to each attribute from the plurality of non-schema data pieces, identify a common attribute of the one or more attributes that are associated with the at least two electronic identifications of the plurality of electronic identifications, determine whether to select at least one electronic identification of the at least two electronic identifications of the plurality of electronic identifications. In different embodiments, the computing system 8115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing one or more non-schema data reception and weighting operations, as described herein, may be executed on one or more computing systems 8115, which may interact with various other devices. In the illustrated embodiment, the computing system 8115 may include one or more processors 9205a, 9205b, . . . , and 9205n (hereinafter "one or more processors 9205," "processors 9205," or "processor 9205") coupled to a memory 9210 via an input/output (I/O) interface 9215. The computing system 8115 may further include a network interface 9220 coupled to I/O interface 9215, and one or more input/output devices 9225, such as cursor control device 940 of the electronic device 8110, a keyboard 945 of the electronic device 8110, and one or more displays 950 of the electronic device 8110. In some cases, it is contemplated that embodiments may be implemented using a single instance of computing system 8115, while in other embodiments multiple such systems, or multiple nodes making up the computing system 8115, may be configured to host different portions or instances of embodiments. For example, in one embodiment some elements may be implemented via one or more nodes of computing system 8115 that are distinct from those nodes implementing other elements.

In various embodiments, the computing system 8115 may be a uniprocessor system including one processor 9205a, or a multiprocessor system including several processors 9205a-9205n (e.g., two, four, eight, or another suitable number). The processor 9205 may be any suitable processor capable of executing instructions including instructions or operations for performing non-schema data reception and data weighting as described herein. For example, in various embodiments the processor 9205 may be general-purpose or embedded processors implementing any of a variety of instruction set architectures (ISAs), such as the x86, PowerPC, SPARC, or MIPS ISAs, or any other suitable ISA. In multiprocessor systems, each of processors 9205 may commonly, but not necessarily, implement the same ISA.

The memory 9210 may be configured to store the executable instructions or program instructions 9230 in the data storage 9235 accessible by the processor 9205. In various embodiments, the memory 9210 may be implemented using any suitable memory technology, such as static random access memory (SRAM), synchronous dynamic RAM (SDRAM), nonvolatile/Flash-type memory, or any other type of memory. In the illustrated embodiment, the program instructions 9230 may be configured to implement a system for performing one or more non-schema data reception and weighting operations incorporating any of the functionality, as described herein. In some embodiments, program instructions 9230 or data may be received, sent, or stored upon different types of computer-accessible media or on similar media separate from the memory 9210 or the computing system 8115. The computing system 8115 is described as implementing at least some of the functionality of functional blocks in the figures described herein.

In certain embodiments, the I/O interface 9215 may be configured to coordinate I/O traffic between the processor 9205, the memory 9210, and any peripheral devices in the computing system 8115, including the network interface 9220 or other peripheral interfaces, such as the input/output devices 9225. In some embodiments, the I/O interface 9215 may perform any necessary protocol, timing or other data transformations to convert data signals from one component (e.g., the memory 9210) into a format suitable for use by another component (e.g., the processor 9205). In some embodiments, the I/O interface 9215 may include support for devices attached through various types of peripheral buses, such as a variant of the Peripheral Component Interconnect (PCI) bus standard or the Universal Serial Bus (USB) standard, for example. In some embodiments, the function of the I/O interface 9215 may be split into two or more separate components, such as a north bridge and a south bridge, for example. Also, in some embodiments some or all of the functionality of the I/O interface 9215, such as an interface to the memory 9210, may be incorporated directly into the processor 9205.

The network interface 9220 may be configured to allow data to be exchanged between the computing system 8115 and other devices attached to the network 8105 (e.g., one or more servers 8120) or between nodes of the computing system 8115. The network 8105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 9220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 9225 may, in some embodiments, include one or more display terminals, keyboards, keypads, touchpads, scanning devices, voice, or optical recognition devices, or any other devices suitable for entering or accessing data by one or more computing systems 8115. Further, various other sensors may be included in the I/O devices 9225, such as imaging sensors, barometers, altimeters, LIDAR, or any suitable environmental sensor. Multiple input/output devices 9225 may be present in the computing system 8115 or may be distributed on various nodes of the computing system 8115. In some embodiments, similar input/output devices may be separate from the computing system 8115 and may interact with one or more nodes of the computing system 8115 through a wired or wireless connection, such as over the network interface 9220.

As shown in FIG. 9, the memory 9210 may include program instructions 9230, which may be processor-executable to implement any element, action, or operation including non-schema data reception and weighting operations, as described herein. In certain embodiment, the program instructions may implement at least a portion of methods described herein, such as the methods illustrated by FIGS. 10-14 In other embodiments, different elements and data may be included. Note that the data storage 9235 may include any data or information, as described herein.

Those skilled in the art will appreciate that the computing system 8115 is merely illustrative and is not intended to limit the scope of embodiments. In particular, the computing system 8115 and devices may include any combination of hardware or software that can perform the indicated functions, including computers, network devices, Internet appliances, PDAs, wireless phones, pagers, GPUs, specialized computer systems, information handling apparatuses, or the like. The computing system 8115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 8115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 8115 may be transmitted to the computing system 8115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Figure 10:
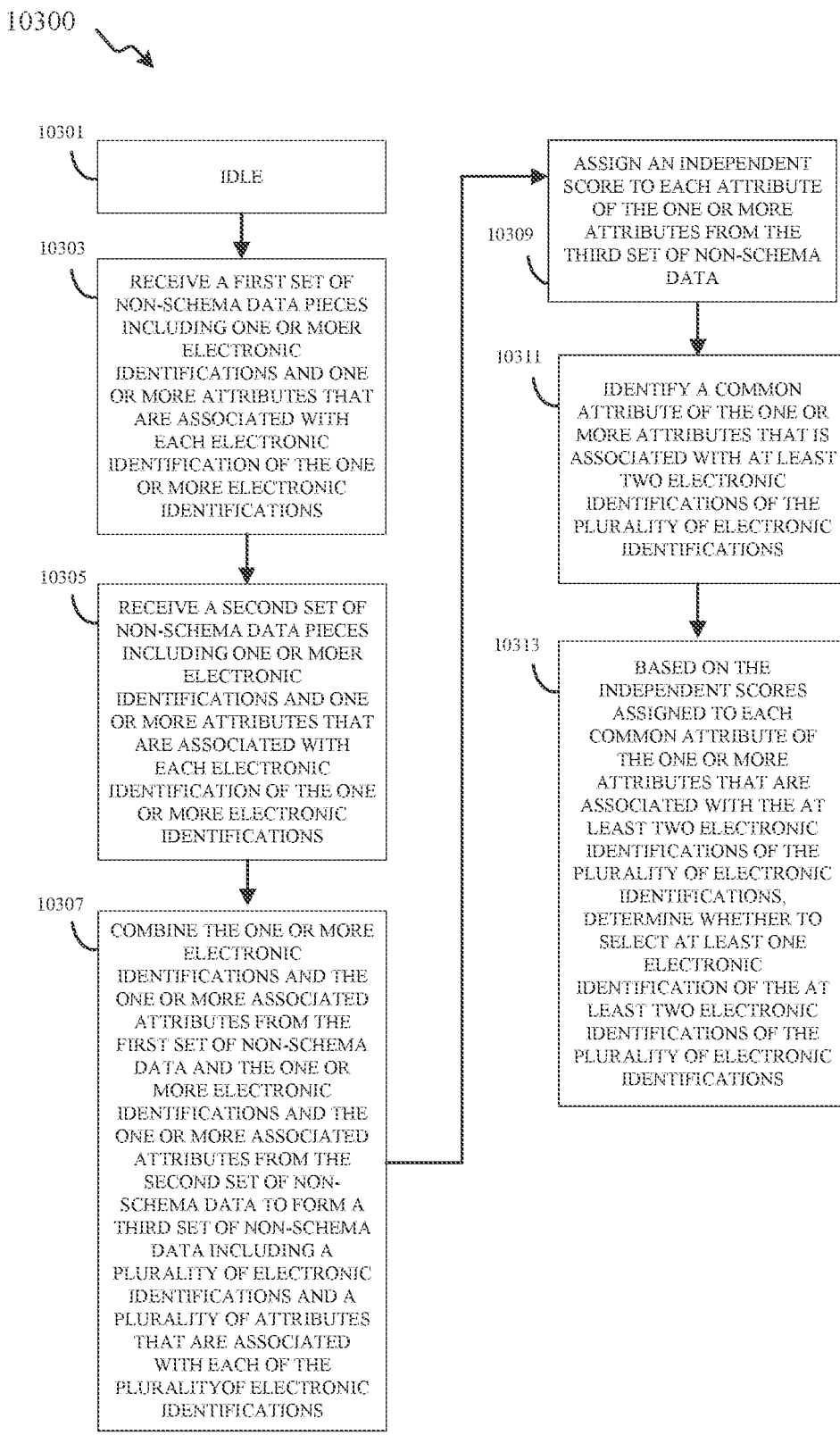
FIGS. 10-14 illustrate flow diagrams of methods for one or more non-schema data reception and weighting operations according to certain embodiments of the disclosure.

As described herein, the computing system 8115, utilizing the at least one processor 9205, is configured to execute one or more non-schema data reception and weighting operations. The functions performed by the computing system 8115 are described herein with respect to methods illustrated in FIGS. 10-14. FIG. 10 illustrates a method 10300 implemented by the computing system 8115, utilizing the at least one processor 9205, for performing one or more non-schema data reception and weighting operations according to certain embodiments of this disclosure. Although certain details will be provided with reference to the method 10300 of FIG. 10 it should be understood that other embodiments may include more, less, or different method steps.

At step 10301, the computing system 8115 is in an idle state at least with respect to performing one or more non-schema data reception and weighting operations. At step 10303, the computing system 8115 receives a first set of non-schema data including one or more electronic identifications and one or more attributes that are associated with each electronic identification of the one or more electronic identifications from the first set of non-schema data.

For example, the computing system 8115, utilizing the at least one processor 9205, may have received the first set of non-schema data pieces from the client system 8130 or the one or more servers 8120. The first set of non-schema data pieces may include a first electronic identification in the form of an electronic device serial number and an associated attribute in the form of an indication that a user associated with the first electronic identification is a member of an amateur curling team. As described herein, an electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number, a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g., a behavior performed by a user, a click on a particular link displayed by a web browser), a preference of the user of the electronic device, or the like. In certain embodiments, an attribute may be extracted from at least one of an item of anonymous personal identification information or an electronic address (e.g., when an IMEI number indicates a particular brand of electronic device used by an individual).

At step 10305, the computing system 8115 receives a second set of non-schema data including one or more electronic identifications and one or more attributes that are associated with each electronic identification of the one or more electronic identifications from the second set of non-schema data. Step 10305 may be the same as or at least similar to step 10303 described herein. For example, the computing system 8115, utilizing the at least one processor 9205, may have received the second set of non-schema data pieces from the client system 8130 or from the one or more servers 8120. The second set of non-schema data pieces may include a second electronic identification in the form of an email address and an associated attribute in the form of an indication that a user associated with the second electronic identification is a member of a professional chess team.

In certain embodiments, the computing system 8115 may receive one or more set of non-schema data (e.g., the first set of non-schema data, the second set of non-schema data) from the one or more client servers systems 8130. In certain embodiments, the computing system 8115 may receive non-schema data (e.g., the first set of non-schema data, the second set of non-schema data) from the one or more servers 8120. As described herein, the computing system 8115, through the one or more web browsers 8125 or through one or more electronic devices 8110 electronically communicating with the one or more web browsers 8125 during web browser sessions, may have received a plurality or a multitude of electronic identifications each having one or more associated attributes. The computing system 8115 may have stored each of the electronic identifications and the one or more attributes associated with each of the electronic identifications in a data store (e.g., the one or more servers 8120). The computing system 8115 may have placed each of the electronic identifications and each of the one or more attributes associated with each of the electronic identifications in one or more user profiles. In certain embodiments, at least one user profile of the one or more user profiles may contain only one electronic identification having one or more associated attributes. In certain embodiments, at least one user profile of the one or more user profiles may contain two or more electronic identifications with each electronic identification having one or more associated attributes. The computing system 8115 may copy the contents of each user profile in the data store (e.g., the one or more servers 8120) or at least one user profile in the data store (e.g., the one or more servers 8120) and subsequently combine them with one or more other received sets of non-schema data to form the third set of non-schema data described herein.

At step 10307, the computing system 8115 combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. For example, the computing system 8115 may receive the first set of non-schema data including the first electronic identification in the form of the electronic device serial number and the associated attribute indicating that the user associated with the first electronic identification is a member of an amateur curling team. The computing system 8115 may also receive the second set of non-schema data including the second electronic identification in the form of the email address and the associated attribute indicating that the user associated with the second electronic identification is a member of a professional chess team.

After receiving the first set of non-schema data and the second set of non-schema data, the computing system 8115 may combine the first set of non-schema data with the second set of non-schema data to form a third set of non-schema data. For example, the computing system 8115 may form the third set of non-schema data so that the third set of non-schema data includes one or more electronic identifications and one or more associated attributes from the first set of non-schema data including the first electronic identification in the form of the electronic device serial number and the associated attribute indicating that the user associated with the first electronic identification is a member of an amateur curling team. The computing system 8115 may also form the third set of non-schema data so that the third set of non-schema data includes one or more electronic identifications and one or more associated attributes from the second set of non-schema data including the second electronic identification in the form of the email address and the associated attribute indicating that the user associated with the second electronic identification is a member of a professional chess team. In certain embodiments, the computer system 8115 may store the third set of non-schema data in the one or more servers 8120.

At step 10309, the computing system 8115 assigns an independent score to each attribute of the one or more attributes from the third set of non-schema data. For example, after the computing system 8115 forms the third set of non-schema data, the computing system 8115 may assign an independent score to each attribute in the third set of non-schema data. In certain embodiments, an independent score may be a score assigned to an attribute indicating a level of truthfulness of the attribute. An independent score may be based on at least one of a quantity of same attributes associated with a particular electronic identification, a time when an attribute manifested, or a quantity of same attributes associated with a first electronic identification and a second electronic identification that is linked to the first electronic identification, or the like.

In certain embodiments, an independent score may be a score that is assigned to an attribute that indicates a degree of likelihood that the information purported by the attribute is true. For example, the computing system 8115 may assign an independent score to the attribute associated with the first electronic identification indicating a higher likelihood of truth if the associated attribute was recorded or received a week before being assigned an independent score compared to if the associated attribute was recorded or received five years before being assigned an independent score. In this case, a higher degree of truthfulness may be associated with information provided by attributes that have more recently manifested compared to information provided by attributes that manifested much earlier in time.

In certain embodiments, an independent score may be a score that is assigned to an attribute that indicates a degree of likelihood that the information purported by the attribute is true and that indicates a degree of likelihood that such an attribute would be associated with the electronic identification. For example, the computing system 8115 may have received at least two different data pieces each including the same second electronic identification but having different associated attributes in each of the different data pieces. A first data piece of the at least two different data pieces may contain the second electronic identification and the associated attribute indicating that the user associated with the second electronic identification is a member of a professional chess team. A second data piece of the at least two different data pieces may contain the same second electronic identification and an associated attribute indicating that the user associated with the second electronic identification recently purchased a book on how to play chess for beginners. The computing system 8115, examining only the first data piece, may assign an independent score to the attribute contained in the first data piece that indicates a first degree of likelihood (e.g., a higher degree of likelihood) that the user associated with the first electronic identification is a member of the professional chess team. However, the computing system 8115, examining both the first data piece and the second data piece, may assign an independent score to the attribute contained in the first data piece that indicates a second degree of likelihood (e.g., a lower degree of likelihood) that the user associated with the first electronic identification is a member of the professional chess team because it may be less likely that an individual person who is a member of a professional chess team would also purchase a book on how to play chess for beginners.

In certain embodiments, an independent score may be a score that is assigned to an attribute that indicates a degree of likelihood that the information purported by the attribute is true and that indicates a degree of likelihood that such an attribute would be associated with a user associated with the electronic identification. For example, the computing system 8115 may have received at least two different data pieces each including different electronic identifications but each sharing the same associated attribute. A first data piece of the at least two different data pieces may contain the first electronic identification in the form of the electronic device serial number and the associated attribute indicating that the user associated with the first electronic identification is a member of a professional chess team. A second data piece of the at least two different data pieces may contain another electronic identification in the form of an email address and the associated attribute indicating that the user associated with the other electronic identification is a member of a professional chess team.

In addition, the computing system 8115 may also identify, for example, in the one or more servers 8120, another data piece or a user profile that indicates that the electronic serial number, provided as the first electronic identification, is associated with the same user that uses the email address, provided as the other electronic identification. The computing system 8115, examining only the first data piece, may assign an independent score to the attribute contained in the first data piece that indicates a first degree of likelihood (e.g., a lower degree of likelihood) that the user associated with the first electronic identification is a member of the professional chess team. However, the computing system 8115, examining both the first data piece and the other data piece, may assign an independent score to the attribute contained in the first data piece that indicates a second degree of likelihood (e.g., a higher degree of likelihood) that the user associated with the first electronic identification is a member of a professional chess team because it may be more likely that a user, linked to or associated with at least two different electronic identifications that have each been associated with the same attribute indicating that a user associated with the attribute is a member of a professional chess team, is actually a member of a profession chess team than a user linked to or associated with only one that has been associated with the attribute indicating that a user associated with the attribute is a member of a professional chess team.

At step 10311, the computing system 8115 identifies a common attribute of the one or more attributes that is associated with at least two electronic identifications of the plurality of electronic identifications. For example, after the computing system 8115 forms the third set of non-schema data, the computing system 8115 may search through all of the received attributes associated with each electronic identification from the third set of non-schema data. The computing system 8115 may identify two or more electronic identifications from the third set of non-schema data that share a common attribute. For example, the computing system 8115 may have identified a first electronic identification that is associated with a first attribute indicating that the user associated with the first electronic identification is a high-wealth individual, a second attribute indicating that the user associated with the first electronic identification enjoys maintaining his or her yard, and a third attribute indicating that the user associated with the first electronic identification drinks beer. The computing system 8115 may have also identified a second electronic identification that is associated with a first attribute indicating that the user associated with the second electronic identification plays golf, a second attribute indicating that the user associated with the second electronic identification has young children, a third attribute indicating the user associated with the second electronic identification enjoys vacationing in the Caribbean, and a fourth attribute indicating that the user associated with the second electronic identification is a high wealth individual. Based on the attributes of the first electronic identification and the second electronic identification, the computing system 8115 may determine that a common attribute is that a user associated with the first electronic identification and a user associated with the second electronic identification are both high wealth individuals.

In certain embodiments, the computing system 8115 may identify one or more attributes as a common attribute based on a relative quantity of electronic identifications from the third set of non-schema data that share different common attributes. For example, the computing system 8115 may identify an attribute as a common attribute because the identified common attribute is associated with more electronic identifications of the third set of non-schema data than any other associated attribute. As another example, the computing system 8115 may identify an attribute as a common attribute because the identified common attribute is associated with less electronic identifications of the third set of non-schema data than any other associated attribute.

In certain embodiments, the computing system 8115 may identify one or more attributes as a common attribute based on a quantity of electronic identifications from the third set of non-schema data and that share different attributes relative to a threshold quantity. For example, the computing system 8115 may identify an attribute as a common attribute because the identified common attribute is associated with a quantity of electronic identifications of the third set of non-schema data that exceeds a threshold quantity. As another example, the computing system 8115 may identify an attribute as a common attribute because the identified common attribute is associated with a quantity of electronic identifications of the third set of non-schema data that is below a threshold quantity.

In certain embodiments, the computing system 8115 may identify one or more attributes as a common attribute based on a relative quantity of each different attribute from the third set of non-schema data. For example, the computing system 8115 may identify an attribute as a common attribute because the identified common attribute is present in the third set of non-schema data in a greater quantity than any other associated attribute. As another example, the computing system 8115 may identify an attribute as a common attribute because the identified common attribute is presented in the third set of non-schema data in a lesser quantity than any other associated attribute.

In certain embodiments, the computing system 8115 may identify one or more attributes as a common attribute based on quantities of different attributes that are present in the third set of non-schema data relative to a threshold quantity. For example, the computing system 8115 may identify an attribute as a common attribute because the identified common attribute occurs or is present within the third set of non-schema data in a quantity that exceeds a threshold quantity. As another example, the computing system 8115 may identify an attribute as a common attribute because the identified common attribute occurs or is present within the third set of non-schema data in a quantity that is below a threshold quantity.

In certain embodiments, the computing system 8115 may identify the common attribute based on independent scores of different attributes that are shared by at least two electronic identifications from the third set of non-schema data. For example, the computing system 8115 may identify an attribute as the common attribute because the selected common attribute is associated with a higher or greater average independent score than any other attributes that are associated with any electronic identification of the third set of non-schema data. As another example, the computing system 8115 may select an attribute as the common attribute because the selected common attribute is associated with a lower or lesser average independent score than any other attributes that are associated with any electronic identification of the third set of non-schema data. As yet another example, the computing system 8115 may select an attribute as the common attribute because the selected common attribute is associated with a higher or greater total cumulative independent score than any other attributes that are associated with any electronic identification of the third set of non-schema data. As another example, the computing system 8115 may select an attribute as the common attribute because the selected common attribute is associated with a lower or lesser total cumulative independent score than any other attributes that are associated with any electronic identification of the third set of non-schema data.

As another example, the computing system 8115 may select an attribute as the common attribute because the selected common attribute is associated with an average independent score that is greater than a threshold independent score. As another example, the computing system 8115 may select an attribute as the common attribute because the selected common attribute is associated with an average independent score that is less than a threshold independent score. As yet another example, the computing system 8115 may select an attribute as the common attribute because the selected common attribute is associated with a total cumulative independent score that is greater than a threshold independent score. As another example, the computing system 8115 may select an attribute as the common attribute because the selected common attribute is associated with a total cumulative independent score that is less than a threshold independent score. In certain embodiments, the computing system 8115 may select an absence of a particular attribute as the common attribute. For example, the computing system 8115 may select at least one electronic identification from the third set of non-schema data that is not associated with a particular attribute. In this case, the computing system 8115 may create or add a fictitious attribute that is associated with each electronic identification of the third set of non-schema data that does not include the particular associated attribute.

In response to identifying all of the attributes associated with each of the electronic identifications from the third set of non-schema data, the computing system 8115 may identify a common attribute from all of the attributes associated with each of electronic identifications from the third set of non-schema data. For example, the computing system 8115 may determine that the first electronic identification and the second electronic identification share a common attribute indicating that the user associated with the first electronic identification and the user associated with the second electronic identification are both high wealth individuals. In certain embodiments, the computing system 8115 may identify only two electronic identifications from the third set of non-schema data that share the common attribute. In certain embodiments, the computing system 8115 may identify that more than two electronic identifications from the third set of non-schema data share the common attribute. In certain embodiments, the computing system 8115 may identify that all electronic identifications from the third set of non-schema data share the second common attribute.

At step 10313, the computing system 8115, determines whether to select at least one electronic identification of the at least two electronic identifications of the plurality of electronic identifications for storage m a data store (e.g., the one or more servers 8120). In certain embodiments, the computing system 8115 may determine to select one or more electronic identifications that are each associated with a common attribute that is present within the third set of non-schema data in a quantity relative to a threshold quantity. For example, the computing system 8115 may determine to select one or more electronic identifications that are each associated with a common attribute that is present within the third set of non-schema data in a quantity greater than a threshold quantity. As another example, the computing system 8115 may determine to select one or more electronic identifications that are each associated with a common attribute that is present within the third set of non-schema data in a quantity less than a threshold quantity.

In certain embodiments, the computing system 8115 may determine to select one or more electronic identifications that are each associated with a common attribute that is present within the third set of non-schema data in a quantity relative to one or more other attributes or other common attributes. For example, the computing system 8115 may determine to select one or more electronic identifications that are each associated with a common attribute that is present within the third set of non-schema data that most frequently occurs or is present or that is one of several that most frequently occurs or is present. As another example, the computing system 8115 may determine to select one or more electronic identifications that are each associated with a common attribute that is present within the third set of non-schema data that frequently occurs the least or is present the least or that is one of several that least occurring or the least present.

In certain embodiments, the computing system 8115 may determine to select at least one electronic identification from the third set of non-schema data, based on independent scores of different attributes that are associated with and shared by at least two electronic identifications from the third set of non-schema data.

For example, the computing system 8115 may select at least one electronic identification associated with a common attribute because the common attribute is associated with a higher or greater average independent score than any other attributes that are associated with any electronic identification of the third set of non-schema data. As another example, the computing system 8115 may select at least one electronic identification associated with a common attribute because the common attribute is associated with a lower or lesser average independent score than any other attributes that are associated with any electronic identification of the third set of non-schema data. As yet another example, the computing system 8115 may select at least one electronic identification associated with a common attribute because the common attribute is associated with a higher or greater total cumulative independent score than any other attributes that are associated with any electronic identification of the third set of non-schema data. As another example, the computing system 8115 may select at least one electronic identification associated with a common attribute because the common attribute is associated with a lower or lesser total cumulative independent score than any other attributes that are associated with any electronic identification of the third set of non-schema data.

As another example, the computing system 8115 may select at least one electronic identification associated with a common attribute because the common attribute is associated with an average independent score that is greater than a threshold independent score. As another example, the computing system 8115 may select at least one electronic identification associated with a common attribute because the common attribute is associated with an average independent score that is less than a threshold independent score. As yet another example, the computing system 8115 may select at least one electronic identification associated with a common attribute because the common attribute is associated with a total cumulative independent score that is greater than a threshold independent score. As another example, the computing system 8115 may select at least one electronic identification associated with a common attribute because the common attribute is associated with a total cumulative independent score that is less than a threshold independent score.

In certain embodiments, the computing system 8115 may determine whether to select at least one electronic identification of the at least two electronic identifications of the plurality of electronic identifications for storage in a set of non-schema data in a data store (e.g., the one or more servers 8120) based on the independent scores assigned to each common attribute of the one or more attributes that are associated with the at least two electronic identifications of the plurality of electronic identifications. For example, after determining to select at least one electronic identification of the at least two electronic identifications from the third set of non-schema data, the computing system 8115 may select the at least one electronic identification of the at least two electronic identifications from the third set of non-schema data and generate a fourth set of data that includes the at least one electronic identification of the at least two electronic identifications from the third set of non-schema data. The computing system 8115 may store the fourth set of data in a data store (e.g., the one or more servers 8120).

In certain embodiments, the common attribute may be one common attribute of a plurality of common attributes. For example, the common attribute may be a first common attribute. The computing system 8115 may determine whether to select the at least one electronic identification of the at least two electronic identifications of the plurality of electronic identifications for storage in a set of non-schema data in a data store (e.g., the one or more servers 8120) based on, for example, the independent scores assigned to each first common attribute of the one or more attributes that are associated with the at least two electronic identifications of the plurality of electronic identifications. The computing system 8115 may also identify a second common attribute of the one or more attributes that is associated with at least two electronic identifications of the plurality of electronic identifications. The computing system 8115 may identify the second common attribute in one or more ways as described with respect to the first common attribute. In certain embodiments, the computing system 8115 may determine whether to select at least one electronic identification of the at least two electronic identifications of the plurality of electronic identifications for storage in another set of non-schema data in a data store (e.g., the one or more servers 8120). The computing system 8115 may determine whether to select at least one electronic identification of the at least two electronic identifications of the plurality of electronic identifications for storage in another set of non-schema data in a data store in one or more ways as described herein.

In certain embodiments, the computing system 8115 may determine whether to select at least one electronic identification of the at least two electronic identifications of the plurality of electronic identifications for storage in another set of non-schema data in a data store (e.g., the one or more servers 8120) based on, for example, the independent scores assigned to each second common attribute of the one or more attributes that are associated with the at least two electronic identifications of the plurality of electronic identifications. The computing system 8115 may determine whether to select at least one electronic identification of the at least two electronic identifications of the plurality of electronic identifications for storage in another set of non-schema data in a data store (e.g., the one or more servers 8120) based on, for example, the independent scores assigned to each second common attribute of the one or more attributes that are associated with the at least two electronic identifications of the plurality of electronic identifications in one or more ways as described with respect to the first common attribute.

It should be understood that the computing system 8115 may identify the second common attribute at the same time that the computing system 8115 identifies the first common attribute. In this embodiments, the computing system 8115 may determine to select at least one electronic identification of the at least two electronic identifications of the plurality of electronic identifications based on the independent scores assigned to each second common attribute of the one or more attributes that are associated with the at least two electronic identifications of the plurality of electronic identifications while the computing system 8115 determines to select at least one electronic identification of the at least two electronic identifications of the plurality of electronic identifications based on the independent scores assigned to each first common attribute of the one or more attributes that are associated with the at least two electronic identifications of the plurality of electronic identifications as described herein.

In certain embodiments, the computing system 8115 may identify the second common attribute a duration of time after that the computing system 8115 identifies the first common attribute. In this embodiments, the computing system 8115 may determine to select at least one electronic identification of the at least two electronic identifications of the plurality of electronic identifications based on the independent scores assigned to each second common attribute of the one or more attributes that are associated with the at least two electronic identifications of the plurality of electronic identifications some time after the computing system 8115 determines to select at least one electronic identification of the at least two electronic identifications of the plurality of electronic identifications based on the independent scores assigned to each first common attribute of the one or more attributes that are associated with the at least two electronic identifications of the plurality of electronic identifications as described herein.

Figure 11:
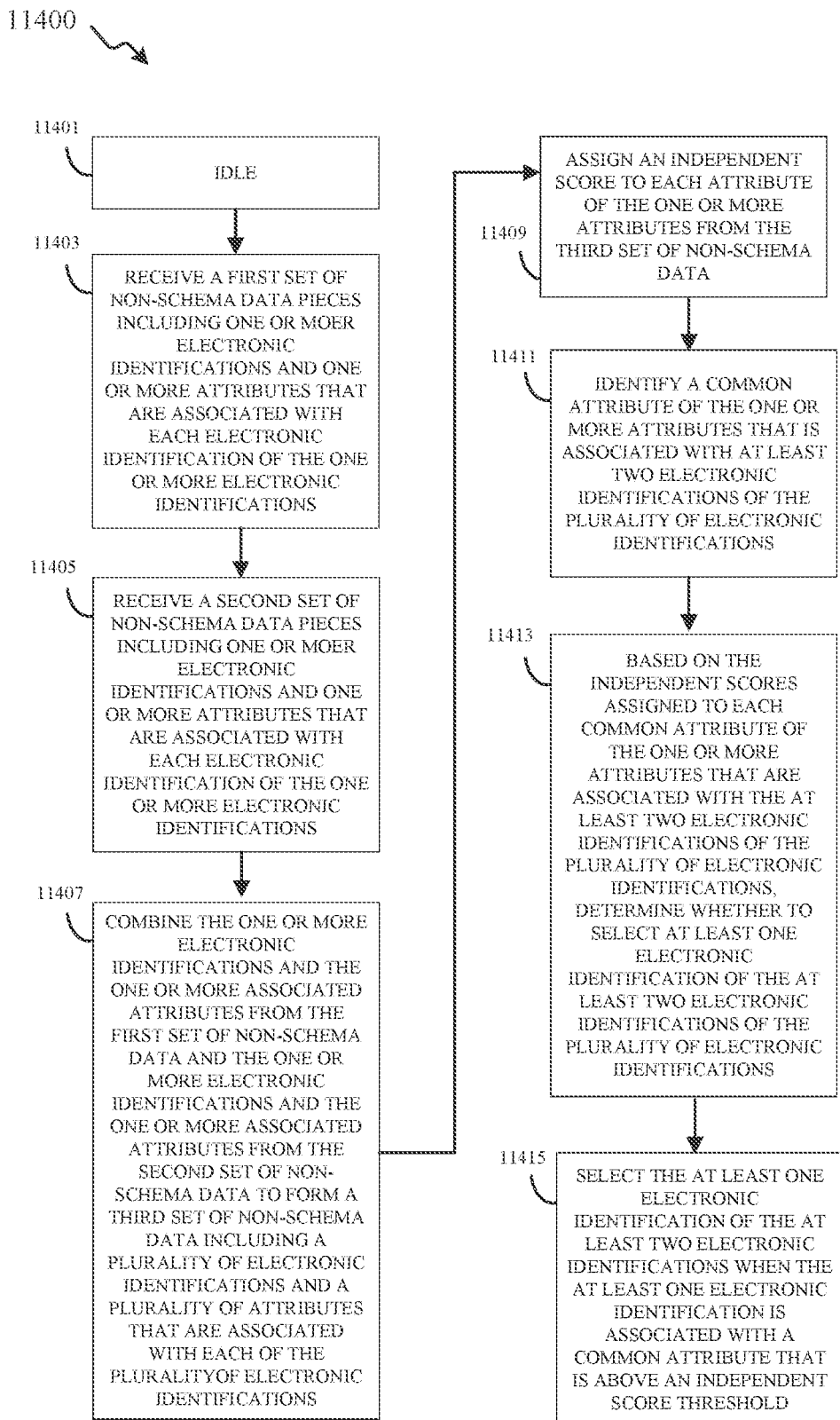

By identifying a first common attribute and determining to select an electronic identification based on an independent score of a first common attribute associated with the electronic identification, the computing system 8115 may provide accurate and up-to-date information based on the time the first common attribute was identified and the electronic identification was determined for selection. In addition, the computing system 8115 may maintain accurate and up-to-date information based on the subsequent time the second common attribute was identified and the electronic identification was determined for selection again. The computing system 8115 may perform this process at many subsequent times to provide continuous accurate and up-to-date information. FIG. 11 illustrates a method 11400 implemented by the computing system 8115, utilizing the at least one processor 9205, for performing one or more non-schema data reception and weighting operations according to certain embodiments of this disclosure. Although certain details will be provided with reference to the method 11400 of FIG. 11 it should be understood that other embodiments may include more, less, or different method steps. At step 11401, the computing system 8115 is in an idle state at least with respect to performing one or more non-schema data reception and weighting operations. Step 11401 is at least similar to step 10301 of method 10300 illustrated in FIG. 10. At step 11403, the computing system 8115 receives a first set of non-schema data including one or more electronic identifications and one or more attributes that are associated with each electronic identification of the one or more electronic identifications from the first set of non-schema data. Step 11403 is at least similar to step 10303 of method 10300 illustrated in FIG. 10. At step 11405, the computing system 8115 receives a second set of non-schema data including one or more electronic identifications and one or more attributes that are associated with each electronic identification of the one or more electronic identifications from the second set of non-schema data. Step 11405 is at least similar to step 10305 of method 10300 illustrated in FIG. 10 At step 11407, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 11407 is at least similar to step 10307 of method 10300 illustrated in FIG. 10.

At step 11409, the computing system 8115 assigns an independent score to each attribute of the one or more attributes from the third set of non-schema data. Step 11409 is at least similar to step 10309 of method 10300 illustrated in FIG. 10 At step 11411, the computing system 8115, identifies a common attribute of the one or more attributes that is associated with at least two electronic identifications of the plurality of electronic identifications. Step 11411 is at least similar to step 10311 of method 10300 illustrated in FIG. 10 At step 11413, the computing system 8115, determines whether to select at least one electronic identification of the at least two electronic identifications of the plurality of electronic identifications. In certain embodiments, the computing system 8115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 11413 is at least similar to step 10313 of method 10300 illustrated in FIG. 10.

At step 11415, the computing system 8115 selects the at least one electronic identification of the at least two electronic identifications of the plurality of electronic identifications when the at least one electronic identification is associated with a common attribute that is above an independent score threshold. For example, a first electronic identification of the at least one electronic identifications may be associated with a common attribute. The common attribute associated with the first electronic identification may have been assigned a first value. When the first value is above an independent score threshold value, the computing system 8115 may select the first electronic identification. Similarly, a second electronic identification of the at least one electronic identifications may be associated with the same common attribute. The common attribute associated with the second electronic identification may have been assigned a second value. When the second value is above an independent score threshold value, the computing system 8115 may select the second electronic identification. In certain embodiments, at least one of the first value or the second value may be below an independent score threshold value. When the first value is below an independent score threshold value, the computing system 8115 may not select the first electronic identification. Similarly, when the second value is below an independent score threshold value, the computing system 8115 may not select the second electronic identification.

Figure 12:
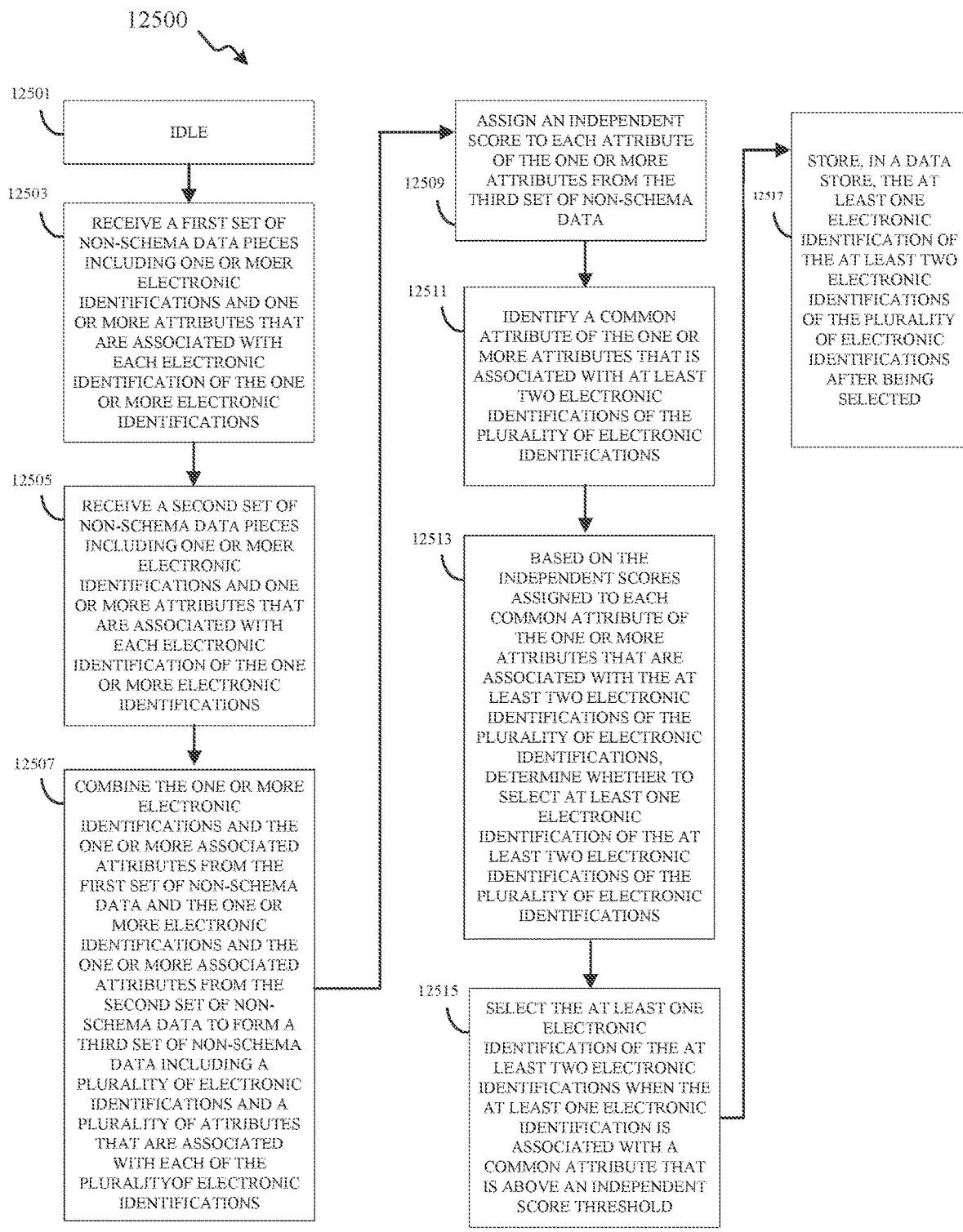

FIG. 12 illustrates a method 12500 implemented by the computing system 8115, utilizing the at least one processor 9205, for performing one or more non-schema data reception and weighting operations according to certain embodiments of this disclosure. Although certain details will be provided with reference to the method 12500 of FIG. 12, it should be understood that other embodiments may include more, less, or different method steps.

At step 12501, the computing system 8115 is in an idle state at least with respect to performing one or more non-schema data reception and weighting operations. Step 12501 is at least similar to step 10301 of method 10300 illustrated in FIG. 10. At step 12503, the computing system 8115 receives a first set of non-schema data including one or more electronic identifications and one or more attributes that are associated with each electronic identification of the one or more electronic identifications from the first set of non-schema data. Step 12503 is at least similar to step 10303 of method 10300 illustrated in FIG. 10. At step 12505, the computing system 8115 receives a second set of non-schema data including one or more electronic identifications and one or more attributes that are associated with each electronic identification of the one or more electronic identifications from the second set of non-schema data. Step 12505 is at least similar to step 10305 of method 10300 illustrated in FIG. 10. At step 12507, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 12507 is at least similar to step 10307 of method 10300 illustrated in FIG. 10.

At step 12509, the computing system 8115 assigns an independent score to each attribute of the one or more attributes from the third set of non-schema data. Step 12509 is at least similar to step 10309 of method 10300 illustrated in FIG. 10. At step 12511, the computing system 8115, identifies a common attribute of the one or more attributes that is associated with at least two electronic identifications of the plurality of electronic identifications. Step 12511 is at least similar to step 10311 of method 10300 illustrated in FIG. 10. At step 12513, the computing system 8115, determines whether to select at least one electronic identification of the at least two electronic identifications of the plurality of electronic identifications. In certain embodiments, the computing system 8115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 12513 is at least similar to step 10313 of method 10300 illustrated in FIG. 10. At step 12515, the computing system 8115 selects the at least one electronic identification of the at least two electronic identifications of the plurality of electronic identifications when the at least one electronic identification is associated with a common attribute that is above an independent score threshold. Step 12515 is at least similar to step 11415 of method 11400 illustrated in FIG. 11.

At step 12517, the computing system 8115 stores, in a data store, the at least one electronic identification of the at least two electronic identifications of the plurality of electronic identifications after being selected. For example, after determining to select at least one electronic identification of the at least two electronic identifications from the third set of non-schema data, the computing system 8115 may select the at least one electronic identification of the at least two electronic identifications from the third set of non-schema data and generate a fourth set of data that includes the at least one electronic identification of the at least two electronic identifications from the third set of non-schema data. The computing system 8115 may store the fourth set of data in a data store (e.g., the one or more servers 8120).

Figure 13:
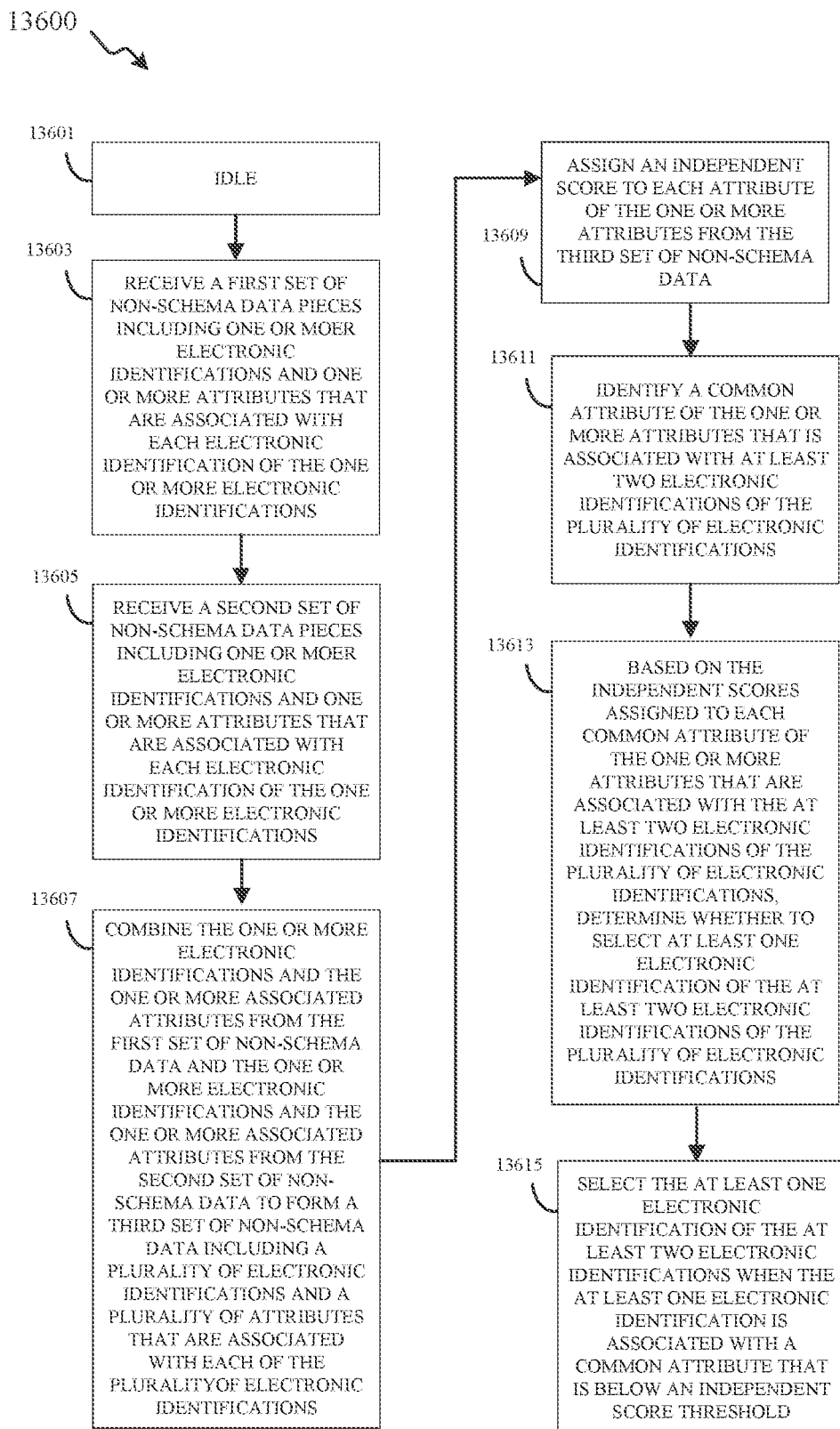

FIG. 13 illustrates a method 13600 implemented by the computing system 8115, utilizing the at least one processor 9205, for performing one or more non-schema data reception and weighting operations according to certain embodiments of this disclosure. Although certain details will be provided with reference to the method 13600 of FIG. 13, it should be understood that other embodiments may include more, less, or different method steps.

At step 13601, the computing system 8115 is in an idle state at least with respect to performing one or more non-schema data reception and weighting operations. Step 13601 is at least similar to step 10301 of method 10300 illustrated in FIG. 10. At step 13603, the computing system 8115 receives a first set of non-schema data including one or more electronic identifications and one or more attributes that are associated with each electronic identification of the one or more electronic identifications from the first set of non-schema data. Step 13603 is at least similar to step 10303 of method 10300 illustrated in FIG. 10. At step 13605, the computing system 8115 receives a second set of non-schema data including one or more electronic identifications and one or more attributes that are associated with each electronic identification of the one or more electronic identifications from the second set of non-schema data. Step 13605 is at least similar to step 10305 of method 10300 illustrated in FIG. 10. At step 13607, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 13607 is at least similar to step 10307 of method 10300 illustrated in FIG. 10.

At step 13609, the computing system 8115 assigns an independent score to each attribute of the one or more attributes from the third set of non-schema data. Step 13609 is at least similar to step 10309 of method 10300 illustrated in FIG. 10. At step 13611, the computing system 8115, identifies a common attribute of the one or more attributes that is associated with at least two electronic identifications of the plurality of electronic identifications. Step 13611 is at least similar to step 10311 of method 10300 illustrated in FIG. 10. At step 13613, the computing system 8115, determines whether to select at least one electronic identification of the at least two electronic identifications of the plurality of electronic identifications. In certain embodiments, the computing system 8115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 13613 is at least similar to step 10313 of method 10300 illustrated in FIG. 10.

At step 13615, the computing system 8115 selects the at least one electronic identification of the at least two electronic identifications of the plurality of electronic identifications when the at least one electronic identification is associated with a common attribute that is below an independent score threshold. For example, a first electronic identification of the at least one electronic identifications may be associated with a common attribute. The common attribute associated with the first electronic identification may have been assigned a first value. When the first value is below an independent score threshold value, the computing system 8115 may select the first electronic identification. Similarly, a second electronic identification of the at least one electronic identifications may be associated with the same common attribute. The common attribute associated with the second electronic identification may have been assigned a second value. When the second value is below an independent score threshold value, the computing system 8115 may select the second electronic identification. In certain embodiments, at least one of the first value or the second value may be above an independent score threshold value. When the first value is above an independent score threshold value, the computing system 8115 may not select the first electronic identification. Similarly, when the second value is above an independent score threshold value, the computing system 8115 may not select the second electronic identification.

Figure 14:
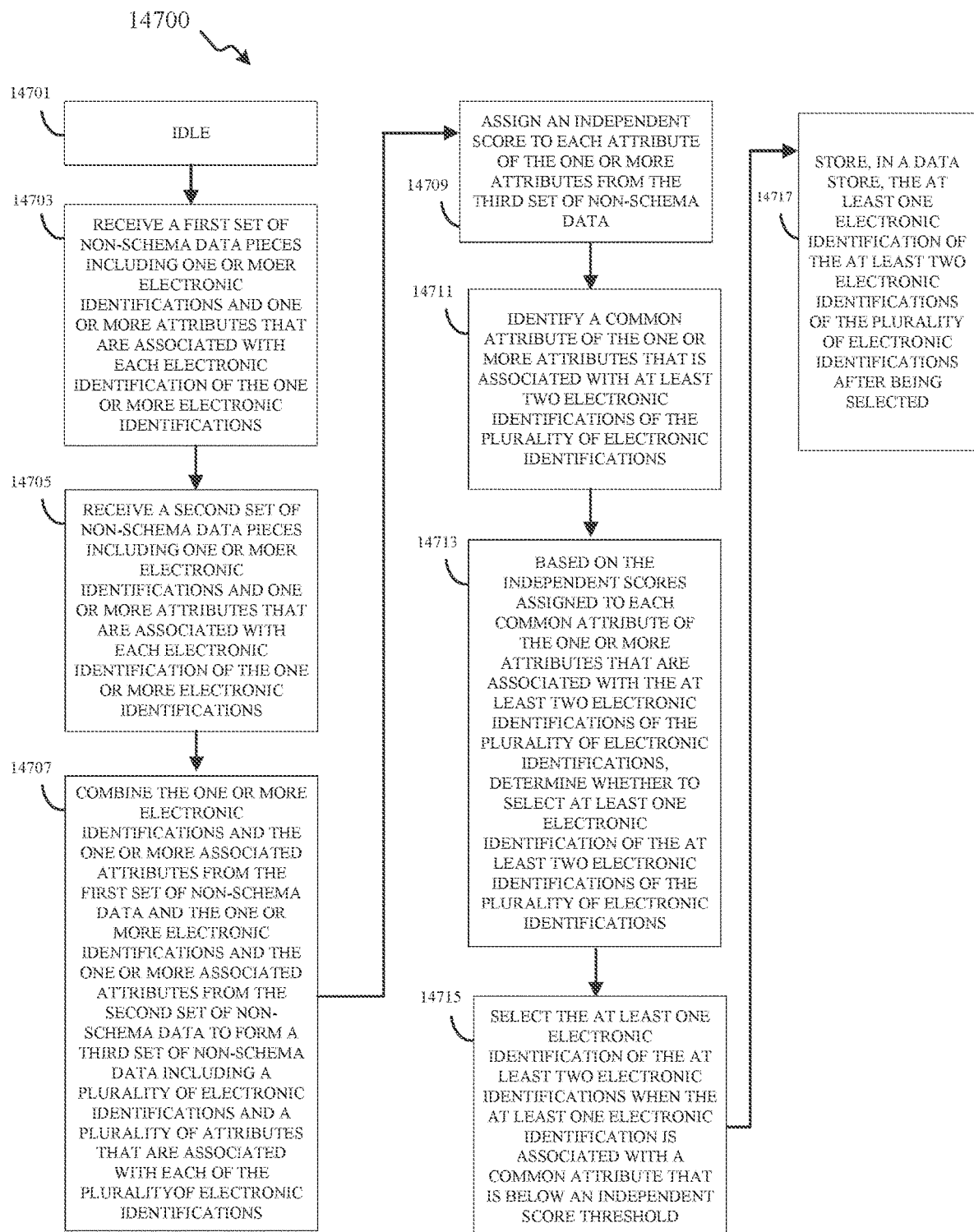

FIG. 14 illustrates a method 14700 implemented by the computing system 8115, utilizing the at least one processor 9205, for performing one or more non-schema data reception and weighting operations according to certain embodiments of this disclosure. Although certain details will be provided with reference to the method 14700 of FIG. 14, it should be understood that other embodiments may include more, less, or different method steps.

At step 14701, the computing system 8115 is in an idle state at least with respect to performing one or more non-schema data reception and weighting operations. Step 14701 is at least similar to step 10301 of method 10300 illustrated in FIG. 10. At step 14703, the computing system 8115 receives a first set of non-schema data including one or more electronic identifications and one or more attributes that are associated with each electronic identification of the one or more electronic identifications from the first set of non-schema data. Step 14703 is at least similar to step 10303 of method 10300 illustrated in FIG. 10. At step 14705, the computing system 8115 receives a second set of non-schema data including one or more electronic identifications and one or more attributes that are associated with each electronic identification of the one or more electronic identifications from the second set of non-schema data. Step 14705 is at least similar to step 10305 of method 10300 illustrated in FIG. 10. At step 14707, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 14707 is at least similar to step 10307 of method 10300 illustrated in FIG. 10.

At step 14709, the computing system 8115 assigns an independent score to each attribute of the one or more attributes from the third set of non-schema data. Step 14709 is at least similar to step 10309 of method 10300 illustrated in FIG. 10. At step 14711, the computing system 8115, identifies a common attribute of the one or more attributes that is associated with at least two electronic identifications of the plurality of electronic identifications. Step 14711 is at least similar to step 10311 of method 10300 illustrated in FIG. 10. At step 14713, the computing system 8115, determines whether to select at least one electronic identification of the at least two electronic identifications of the plurality of system 8115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 14713 is at least similar to step 10313 of method 10300 illustrated in FIG. 10. At step 14715, the computing system 8115 selects the at least one electronic identification of the at least two electronic identifications of the plurality of electronic identifications when the at least one electronic identification is associated with a common attribute that is below an independent score threshold. Step 14715 is at least similar to step 13615 of method 13600 illustrated in FIG. 13.

At step 14717, the computing system 8115 stores, in a data store, the at least one electronic identification of the at least two electronic identifications of the plurality of electronic identifications after being selected. For example, after determining to select at least one electronic identification of the at least two electronic identifications from the third set of non-schema data, the computing system 8115 may select the at least one electronic identification of the at least two electronic identifications from the third set of non-schema data and generate a fourth set of data that includes the at least one electronic identification of the at least two electronic identifications from the third set of non-schema data. The computing system 8115 may store the fourth set of data in a data store (e.g., the one or more servers 8120). Step 14717 is at least similar to step 12517 of method 12500 illustrated in FIG. 12.

Figure 15:
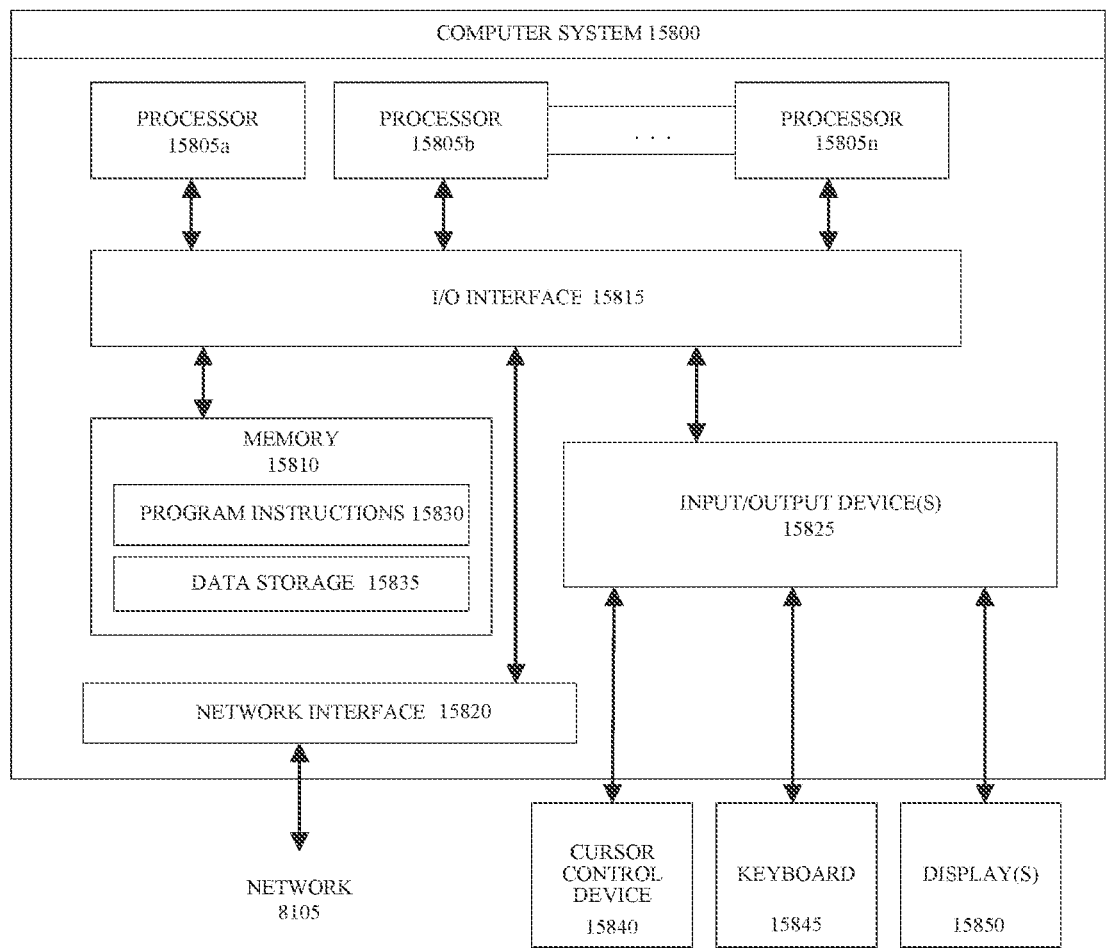
FIG. 15 illustrates a non-limiting, example computer system configured to implement aspects of apparatuses, systems, and methods according to certain embodiments of this disclosure.

FIG. 15 illustrates a non-limiting, example computer system 15800 configured to implement systems and methods for performing one or more interactive gaming operations according to certain embodiments of this disclosure. FIG. 15 illustrates a computer system 15800 that is configured to execute any and all of the embodiments described herein. In certain embodiments, the computer system 15800 describes at least some of the components of the one or more electronic devices 8110, the computing system 8115, the one or more servers 8120, the one or more web browsers 8125, or the one or more client systems 8130 illustrated in FIGS. 8 and 9. In different embodiments, the computer system 15800 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 10301 of a handset), an application server, a storage device, a television, a peripheral device such as a switch, modem, router, or in general any type of computing or electronic device.

Various embodiments of a system and method for receiving and weighting non-schema data pieces, as described herein, may be executed on one or more computer systems 15800, which may interact with various other devices. In the illustrated embodiment, the computer system 15800 includes one or more processors 15805 coupled to a system memory 15810 via an input/output (8110) interface 15815. The computer system 15800 further includes a network interface 15820 coupled to 8110 input/output interface 15815, and one or more input/output devices 15825, such as cursor control device 15840, keyboard 15845, and display(s) 15850. In some cases, it is contemplated that embodiments may be implemented using a single instance of computer system 15800, while in other embodiments multiple such systems, or multiple nodes making up computer system 15800, may be configured to host different portions or instances of embodiments. For example, in one embodiment some elements may be implemented via one or more nodes of computer system 15800 that are distinct from those nodes implementing other elements.

In various embodiments, computer system 15800 may be a uniprocessor system including one processor 15805$a$, or a multiprocessor system including several processors 15805$a$-15805$n$ (e.g., two, four, eight, or another suitable number). The processors 15805 may be any suitable processor capable of executing instructions. For example, in various embodiments the processors 15805 may be general-purpose or embedded processors implementing any of a variety of instruction set architectures (ISAs), such as the x86, PowerPC, SPARC, or MIPS ISAs, or any other suitable ISA. In multiprocessor systems, each of processors 15805 may commonly, but not necessarily, implement the same ISA.

The system memory 15810 may be configured to store the program instructions 15830 and/or existing state information and ownership transition condition data in the data storage 15835 accessible by the processor 15805. In various embodiments, the system memory 15810 may be implemented using any suitable memory technology, such as static random access memory (SRAM), synchronous dynamic RAM (SDRAM), nonvolatile/Flash-type memory, or any other type of memory. In the illustrated embodiment, the program instructions 15830 may be configured to implement a system for performing one or more non-schema data reception and weighting operations incorporating any of the functionality, as described herein. In some embodiments, program instructions and/or data may be received, sent, or stored upon different types of computer-accessible media or on similar media separate from the system memory 15810 or the computer system 15800. The computer system 15800 is described as implementing at least some of the functionality of functional blocks of previous Figures.

In one embodiment, the I/O interface 15815 may be configured to coordinate I/O traffic between the processor 15805, the system memory 15810, and any peripheral devices in the device, including the network interface 15820 or other peripheral interfaces, such as the input/output devices 15825. In some embodiments, the I/O interface 15815 may perform any necessary protocol, timing or other data transformations to convert data signals from one component (e.g., the system memory 15810) into a format suitable for use by another component (e.g., the processor 15805). In some embodiments, the I/O interface 15815 may include support for devices attached through various types of peripheral buses, such as a variant of the Peripheral Component Interconnect (PCI) bus standard or the Universal Serial Bus (USB) standard, for example. In some embodiments, the function of the I/O interface 15815 may be split into two or more separate components, such as a north bridge and a south bridge, for example. Also, in some embodiments some or all of the functionality of the I/O interface 15815, such as an interface to the system memory 15810, may be incorporated directly into the processor 15805.

The network interface 15820 may be configured to allow data to be exchanged between the computer system 15800 and other devices attached to the network 8105 or between nodes of the computer system 15800. The network 8105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 15820 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 15825 may, in some embodiments, include one or more display terminals, keyboards, keypads, touchpads, scanning devices, voice, or optical recognition devices, or any other devices suitable for entering or accessing data by one or more the computer systems 15800. Further, various other sensors may be included in the 8110 input/output devices 15825, such as imaging sensors, barometers, altimeters, LIDAR, or any suitable environmental sensor. Multiple input/output devices 15825 may be present in the computer system 15800 or may be distributed on various nodes of the computer system 15800. In some embodiments, similar input/output devices may be separate from the computer system 15800 and may interact with one or more nodes of the computer system 15800 through a wired or wireless connection, such as over the network interface 15820.

As shown in FIG. 15, the memory 15810 may include program instructions 15830, which may be processor-executable to implement any element or action, as described herein. In one embodiment, the program instructions may implement at least a portion of methods described herein, such as the methods illustrated by FIGS. 10-14. In other embodiments, different elements and data may be included. Note that the data storage 15835 may include any data or information, as described herein.

Those skilled in the art will appreciate that the computer system 15800 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 15800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 15800 may be transmitted to the computer system 15800 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some In some embodiments, a computer-accessible medium may include transmission media or signals such as electrical, electromagnetic, or digital signals, conveyed via a communication medium such as network and/or a wireless link.

Thus, the disclosure provides, among other things, a system for performing one or more non-schema data reception and weighting operations, including a computing system. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

This disclosure provides systems and methods for receiving and storing non-schema data.

In a first embodiment, the disclosure provides an apparatus including a computing system that is communicatively linked to one or more servers. The computing system includes at least one memory and at least one processor. The computing system and configured to receive a first set of non-schema data pieces including a first electronic identification and one or more attributes that are associated with the first electronic identification. The one or more attributes that are associated with the first electronic identification form a first set of one or more attributes. The one or more attributes of the first set of one or more attributes have a first quantity. The computing system is also configured to receive a second set of non-schema data pieces including a second electronic identification and one or more attributes that are associated with the second electronic identification. The one or more attributes that are associated with the second electronic identification form a second set of one or more attributes. The one or more attributes of the second set of one or more attributes have a second quantity. The computing system is further configured to generate, in a data store, a first set of one or more data fields to store the first electronic identification and the one more attributes of the first set of one or more attributes. A quantity of the first set of one or more data fields is equal to one more than the first quantity. In addition, the computing system is configured to generate, in the data store, a second set of one or more data fields to store the second electronic identification and the one or more attributes of the second set of one or more attributes. A quantity of the second set of one or more data fields is equal to one more than the second quantity. The computing system is also configured to store the first electronic identification and each of the one or more attributes of the first set of one or more attributes in a different data field of the first set of one or more data fields. The computing system is further configured to store the second electronic identification and each of the one or more attributes of the second set of one or more attributes in a different data field of the second set of one or more data fields.

In a second embodiment, the disclosure provides a method implemented by a computing system. The method includes receiving, by the computing system, a first set of non-schema data pieces including a first electronic identification and one or more attributes that are associated with the first electronic identification. The one or more attributes that are associated with the first electronic identification form a first set of one or more attributes. The one or more attributes of the first set of one or more attributes have a first quantity. The method also includes receiving, by the computing system, a second set of non-schema data pieces including a second electronic identification and one or more attributes that are associated with the second electronic identification. The one or more attributes that re associated with the second electronic identification form a second set of one or more attributes. The one or more attributes of the second set of one or more attributes have a second quantity. The method further includes generating, by the computing system and in a data store, a first set of one or more data fields to store the first electronic identification and the one or more attributes of the first set of one or more attributes. A quantity of the first set of one or more data fields is equal to one more than the first quantity. In addition, the method includes generating, by the computer system and in a data store, a second set of one or more data fields to store the second electronic identification and the one or more attributes of the second set of one or more attributes. The method also includes storing, by the computing system, the first electronic identification and each of the one or more attributes of the first set of one or more attributes in a different data field of the first set of one or more data fields. The method further includes storing, by the computing system, the second electronic identification and each of the one or more attributes of the second set of one or more attributes in a different data field of the second set of one or more data fields.

In a third embodiment, the disclosure provides a non-transitory, computer-readable storage medium. The non-transitory, computer-readable storage medium stores one or more executable instructions that, when executed by at least one processor, cause the at least one processor to receive a first set of non-schema data pieces including a first electronic identification and one or more attributes that are associated with the first electronic identification. The one or more attributes that associated with the first electronic identification form a first set of one or more attributes. The one or more attributes of the first set of one or more attributes have a first quantity. The one or more executable instructions that, when executed by at least one processor, also cause the at least one processor to receive a second set of non-schema data pieces including a second electronic identification and one or more attributes that are associated with the second electronic identification. The one or more attributes that are associated with the second electronic identification form a second set of one or more attributes. The one or more attributes of the second set of one or more attributes have a second quantity. The one or more executable instructions that, when executed by at least one processor, further cause the at least one processor to generate, in a data store, a first set of one or more data fields to store the first electronic identification and the one or more attributes of the first set of one or more attributes. A quantity of the first set of one or more data fields is equal to one more than the first quantity. In addition, the non-transitory, computer-readable storage medium stores one or more executable instructions that, when executed by at least one processor, cause the at least one processor to generate, in the data store, a second set of one or more data fields to store the second electronic identification and the one or more attributes of the second set of one or more attributes. A quantity of the second set of one or more data fields is equal to one more than the second quantity. The one or more executable instructions that, when executed by at least one processor, also cause the at least one processor to store the first electronic identification and each of the one or more attributes of the first set of one or more attributes in a different data field of the first set of one or more data fields. The one or more executable instructions that, when executed by at least one processor, further cause the at least one processor to store the second attributes in a different data field of the second set of the one or more data fields.

SECTION III. METHOD APPARATUS AND SYSTEM FOR RECEIVING AND WEIGHTING NONSCHEMA DATA ENTRIES IN SPATIAL INSTANCES OF HETEROGENEOUS DATABASES

Detailed Description for Section III

Figures discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 16:
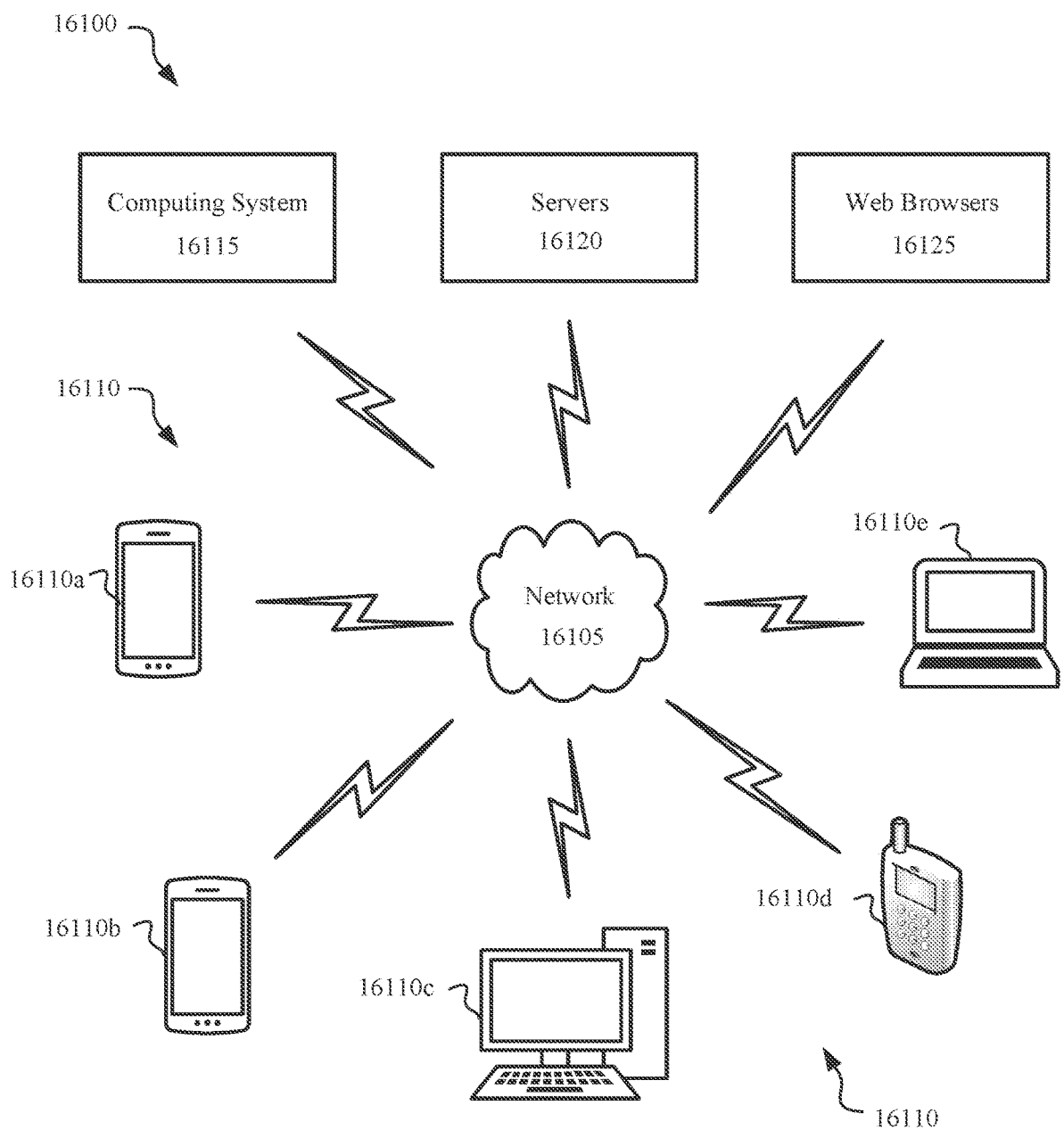
FIG. 16 illustrates a non-limiting, example network context for operating a computing system according to certain embodiments of this disclosure.
Figure 17C:
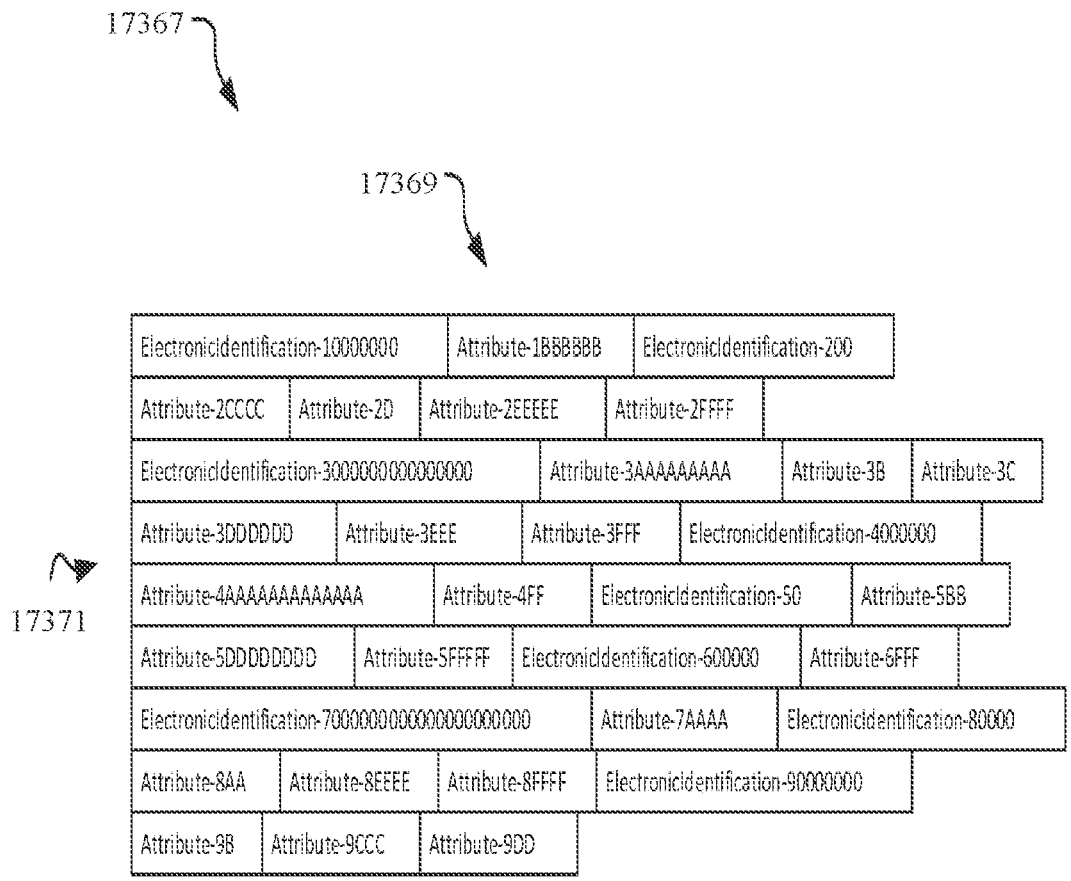

FIG. 16 illustrates a non-limiting, example network context 16100 for operating computer system 16115 according to certain embodiments of this disclosure. One or more components of the network context 16100 may operate as separate components linked by one or more constituent networks of the network 16105. In some embodiments, one or more constituent networks of the network 16105 may include the internet, which can be accessed over both wired connections (e.g. an Ethernet connection) or over a wireless connection (e.g. a wireless local area network "WLAN" connection, a cellular network connection). Additionally, or alternatively, one or more constituent networks of the network 16105 may include a combination of private networks (e.g. a local wireless mesh network) and public networks (e.g. a telephone POTS network). In certain embodiments, one or more constituent networks of the network 105 may support multiple communication protocols, including both wireless protocols (e.g. BLUETOOTH™, circuit-switched cellular, 3G, LTE, WiBro) and internet protocols (e.g. HTTP).

The one or more constituent networks of the network 16105 provide two-way electronic connectivity and electronic communication between each of the electronic devices 16110 and the one or more servers 16120. In certain embodiments, the one or more constituent networks of the network 16105 provide two-way electronic connectivity and electronic communication between each of the electronic devices 16110 and the one or more servers 16120 using one or more same or different channels, protocols, or networks of network 16105. For example, a circuit-switched cellular protocol wireless network of the network 105 provides electronic connectivity and electronic communication between the first electronic device 110a and the one or more servers 16120 while a POTS wireless network of the network 16105 provides electronic connectivity and electronic communication between the third electronic device 16110c and the one or more servers 120.

In certain embodiments, the network context 16100 includes one or more electronic devices 16110. The one or more electronic devices 16100 may include an iPhone™ 16110a, a table 16100b, a desktop computer 16100c, a smartphone 16110d, a laptop computer 16100e or the like. In certain embodiments, each of the one or more electronic devices 16110 is configured to initiate a web browser session with a web browser 16125 or access and display the one or more web browsers 16125 through the network 16105 for viewing by a user and for interaction between the user and the one or more web browsers 16125. Additionally, or alternatively, each of the one or more electronic devices 16110 is configured to transmit one or more items of anonymous personal identification information to a web browser 16125 during a web browser session.

In certain embodiments, each of the one or more electronic devices 16110 may be configured to store data pieces received from a web browser 16125 during a web browser session. Each data piece may contain at least one or an electronic address or one or more items of anonymous personal identification information that were transmitted by the electronic device 16110 to the web browser 16125 during the web browser session. The electronic address may provide an anonymous indication of an electronic communication reception or transmission location of the electronic device 16110 so that one or more other electronic devices 16110, one or more servers 16120, or one or more web browsers 16125 may electronically communicate with that electronic device 16110. For example, an electronic address may include at least one of a MAC address, an IMEI number, an electronic device, or the like. An item of anonymous personal identification information may include information associated with a user of an electronic device such as at least one of an email address, a name, a postal address, a phone number, a geographic area, a gender, a heritage, an age group, an economic status, a social status, a group associate, an interest, or a preference of the user of the electronic device. In certain embodiments, the electronic device 16110 includes an electronic device display screen, an electronic device memory, and at least one electronic device processor. The electronic device may be configured to access and display content from one or more web browsers 16125 on the electronic device display screen.

In certain embodiments, electronic addresses and items of anonymous personal identification information may be used as electronic identifications and attributes described herein. An electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g. a behavior performed by a user), a preference of the user of the electronic device, or the like. In certain embodiments, an attribute may be extracted from at least one of an item of anonymous personal identification information or an electronic address (e.g. when an IMEI number indicates a particular brand of electronic device used by an individual).

The network context 16100 may, according to certain embodiments, include one or more servers 16120. In certain embodiments, the one or more servers 16120 store electronic identifications and associated attributes. As described herein, the computing system 115 may receive and store data pieces in the server 16120 that are generated during a browser session initiated through an electronic device 16110 with a web browser 16125. The data pieces may include at least one of an electronic identification or one or more attributes associated with the electronic identification. In certain embodiments, the data pieces may be received by the computing system 16115 in a schema form (e.g. a schema format) and may be stored in the server 16120 according to the schema form. In certain embodiments, the data pieces may be received by the computing system 16115 in a non-schema form (e.g. a non-schema format) and may be stored in the server 16120 simply as the data pieces are received by the computing system 16115 (e.g. stored in the non-schema form).

In some embodiments, one or more servers 16120 may store user profiles containing electronic identifications and associated attributes in a key value data store. Thus by knowing an electronic identification that is indicative of a key value of a user profile, all items of electronic identification and associated attributes stored in the user profile may be identified and viewed via display screen.

It should be understood that the term "schema" may refer to the organization of data as a blueprint of how the database is contrasted (e.g. divided into database tables in the case of relational databases). Thus, electronic identifications and associated attributes in each of the data pieces may have a schema form that has categorized or characterized each of the electronic identifications and each of the associated attributes into specific categories. Conversely, non-schema data may be raw data or data that has not been categorized or characterized. Thus, electronic identifications and associated attributes in each of the data pieces may be raw data or data that is not been categorized or characterized into a specific category.

In certain embodiments, the network context 16100 includes one or more web browsers 16125. The one or more web browsers 16125 may be configured to contain display content for viewing by an electronic device 16110 when the electronic device 16110 is engaged in a web browser session with the web browser 16125. In certain embodiments, the one or more web browsers are configured to transmit data pieces to the electronic device 16110 for storage in a memory of the electronic device 16110 when the electronic device 16110 is engaged in a web browser session with the web browser 16125. The one or more web browsers 16125 may also be configured to receive data pieces including at least one of one or more electronic identification or one or more associated attributes transmitted from an electronic device 16110 when the electronic device 16110 is engaged in a web browser session with one or more web browsers 16125. The electronic device 16110 may store the data pieces including the electronic identifications and the associate attributes transmitted to the web browser and in some embodiments, an electronic device address associated with the electronic device 16110 in the data piece received from the web browser 16125 located in the memory of the electronic device 16110.

Additionally, or alternatively, the network context 16110, may include one or more client systems 16130. A client system 16130 may be a system operated by an independent entity (e.g. separate from the computing system 16115 and the one or more servers 16120) that transmits, to the computing system 16115, one or more data pieces including at least one of one or more electronic identifications and one or more associated attributes. For example, the client system 16130 may transmit, to the computer system 16115, a first set of non-schema data pieces each containing at least one of one or more electronic identifications or one or more associated attributes. Subsequently, the client system 16130 may transmit, to the computer system, a second set of non-schema data pieces each containing at least one or one or more electronic identifications or one or more associated attributes. Each of the non-schema data pieces transmitted from the client system 16130 may contain at least one of one or more electronic identifications or one or more associated attributes that may be associated with users of interest to the independent entity utilizing the client system 16130.

In certain embodiments, the network context 16100 includes one or more computing systems 16115. The computing system 16115, utilizing one or more processors, is configured to perform one or more non-schema data reception and storage operations as described herein. For example, the computing system 16115, utilizing one or more processors, may be configured to receive a first set of non-schema data pieces including a first electronic identification and one or more attributes that are associated with the first electronic identification. The one or more attributes that are associated with the first electronic identification form a first set of one or more attributes. The one or more attributes of the first set of one or more attributes have a first quantity. The computing system 16115, utilizing the one or more processors, may also be configured to receive a second set of non-schema data pieces including a second electronic identification and one or more attributes that are associated with the second electronic identification. The one or more attributes that are associated with the second electronic identification form a second set of one or more attributes. The one or more attributes of the second set of one or more attributes have a second quantity.

The computing system, utilizing the one or more processors, may be further configured to generate, in a data store, a first set of one or more data fields to store the first electronic identification and the one or more attributes of the first set of one or more attributes. A quantity of the first set of one or more data fields is equal to one more than the first quantity. In addition, the computing system, utilizing the one or more processors, may be configured to generate, in the data store, a second set of one or more data fields to store the second electronic identification and the one or more attributes of the second set of one or more attributes. A quantity of the second set of one or more data fields is equal to one or more than the second quantity. The computing system, utilizing the one or more processors, may also be configured to store the first electronic identification and each of the one or more attributes of the first set of one or more attributes in a different data field of the first set of one or more data files. The computing system, utilizing the one or more processors, may be further configured to store the second electronic identification and each of the one or more attributes of the second set of one or more attributes in a different data field of the second set of one or more data fields.

FIG. 215 illustrates a non-limiting, example of the computing system 16115 illustrated in FIG. 16. The computing system 11515800 is configured to execute any and all of the embodiments and operations described herein including embodiments for performing one or more non-schema data reception and storage operations. In certain embodiments, computing system 11515800 may perform one or more non-schema data reception and storage operations using the network 8105 to receive one or more sets of non-schema data pieces, generate one or more sets of data fields in the server 16120 to store data in each of the data field, and store the data from a received data piece and thus, no generated data field remains or is left unoccupied. In different embodiments, the computing system 15800115 may be any of various types of devices, including but not limited to, a computer embedded in an appliance, a personal computer system, a desktop computer, a handset, a laptop computer, a notebook computer, a tablet, a slate, a netbook computer, a handset, a laptop computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing one or more non-schema data reception and storage operations, as described herein, may be executed on one or more computing systems 15800115, which may interact with various other devices. In the illustrated embodiment, the computing system 15800115 may include one or more processors 215805a, 2015805b . . . and 20515805n (hereinafter "one or more processors 215805" "processors 215805" or "processor 215805") coupled to a memory 215810 via on input/output interface 215815. The computing system 115 may further include a network interface 215820 coupled to I/O interface 215815, and one or more input/output devices 215825, such as cursor control device 915840 of the electronic device 16110, a keyboard 915845 of the electronic device 16110, and one or more displays 915850 of the electronic device 16110. In some cases, it is contemplated that embodiments may be implemented using a single instance of computing system 11515800, while in other embodiments, multiple such systems, or multiple notes making up computing system 11515800 may be configured to host different portions or instances of embodiments. For example, in one embodiment some elements may be implemented via one or more nodes of computing system 16115 that are distinct from those nodes implementing other elements.

In various embodiments, the computing system 11515800 may be a uniprocessor system including one processor 215805a or a multiprocessor system including several processors 215805a-215805n (e.g. two, four, eight or another suitable number). The processor 215805 may be any suitable processor capable of executing instructions including instructions or operations for performing non-schema data reception and no-schema data storage as described herein. For example, in various embodiments the processor 205 may be general-purpose or embedded processors implementing any of a variety of instruction set architectures (ISAs) such as the x86, PowerPC, SPARC, or MIPS ISAs, or any other suitable ISA. IN multiprocessor systems, each of processors 205 may commonly, but not necessarily, implement the same ISA.

The memory 215810 may be configured to store the executable instructions or program instructions 215830 in the data storage 215835 accessible by the processor 215805. In various embodiments, the memory 215810 may be implemented using any suitable memory technology, such as static random access memory (SRAM), synchronous dynamic RAM (SDRAM), nonvolatile/Flash-type memory, or any other type of memory. In the illustrated embodiment, the program instructions 215830 may be configured to implement a system for performing one or more non-schema data reception and storage operations incorporating any of the functionality, as described herein. In some embodiments, program instructions 215830 or data may be received, sent or stored upon different types of computer-accessible media or on similar media separate from the memory 2115810 or the computing system 11515800. The computing system 11515800 is described as implementing at least some of the functionality of functional blocks in the figures described herein.

In certain embodiments, the I/O interface 215815 may be configured to coordinate the I/O traffic between the processor 215805, the memory 215810, and any peripheral devices in the computing system 11515800, including the network interface 215820 or other peripheral interfaces, such as the input/output devices 215825. In some embodiments, the I/O interface 215815 may perform any necessary protocol, timing or other data transformations to convert data signals from one component (e.g. the memory 215810) into a format suitable for use by another component (e.g. the processor 215805). In some embodiments, the I/O interface 215815 may include support for devices attached through various types of peripheral buses, such as a variant of the Peripheral Component Interconnect (PCI) bus standard or the Universal Serial Bus (USB) standard, for example. In some embodiments, the function of the I/O interface 215815 may be split into two or more separate components, such as a north bridge and a south bridge, for example. Also, in some embodiments some or all of the functionality of the I/O interface 215815, such as an interface to the memory 215810, may be incorporated directly into the processor 215805.

The network interface 215820 may be configured to allow data to be exchanged between the computing system 11515800 and other devices attached to the network 8105 (e.g. one or more servers 16120) or between nodes of the computing system 11515800. The network 8105 may in various embodiments include one or more networks including but not limited to Local Area Networks (LANs) (e.g. an Ethernet or corporate network), Wide Area Networks (WANs) (e.g. the Internet), wireless data networks, some other electronic data network, a combination thereof, or the like. In various embodiments, the network interface 215820 may support communication via wired or wireless general data networks, such as any suitable type of Ethernet network, for example; via telecommunications/telephony networks such as analog voice networks or digital fiber communications networks, via storage area networks such as Fiber Channel SANs or via any other suitable type of network protocol.

The input/output devices 215825 may, in some embodiments, include one or more display terminals, keyboards, keypads, touchpads, scanning devices, voice, or optical recognition devices, or any other devices suitable for entering or accessing data by one or more computing systems 11515800. Further, various other sensors may be included in the I/O devices 215825, such as imaging sensors, barometers, altimeters, LIDAR, or any suitable environmental sensor. Multiple input/output devices 215825 may be present in the computing system 11515800 or may be distributed on various nodes of the computing system 11515800. In some embodiments, similar input/output devices may be separate from the computing system 11515800 and may interact with one or more nodes of the computing system 11515800 through a wired or wireless connection, such as over the network interface 215820.

As shown in FIG. 215, the memory 215810 may include program instructions 215830, which may be processor-executable to implement any element, action, or operation including non-schema data reception and storage operations, as described herein. In certain embodiment, the program instructions may implement at least a portion of methods described herein, such as the methods illustrated by FIGS. 18-214-7. In other embodiments, different elements and data may be included. Note that the data storage 235 may include any data or information, as described herein.

Those skilled in the art will appreciate that the computing system 11515800 is merely illustrative and is not intended to limit the scope of embodiments. In particular, the computing system 11515800 and devices may include any combination of hardware or software that can perform the indicated functions, including computers, network devices, Internet appliances, PDAs, wireless phones, pages, GPUs, specialized computer systems, information handling apparatuses, or the like. The computing system 11515800 may also be connected to other devices that are not illustrated, or instead may operate as a stand-alone system. In addition, the functionality provided by the illustrated components may in some embodiments by combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 11515800 via inter-computer communication. Some or all of the system components or data structures may also be stored (e.g. as instructions or structured data) on a computer-accessible medium or a portable article to be read by an appropriate drive, various examples of which are described here. In some embodiments, instructions stored on a computer-accessible medium separate from the computing system 11515800 may be transmitted to the computing system 11515800 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer readable storage medium or memory medium such as magnetic or optical media, e.g. disk or DVD/CD-ROM, volatile or non-volatile media such as RAM (e.g. SDRAM, DDR, RDRAM, SRAM, or the like), ROM, or the like. In some embodiments, a computer-accessible medium may include transmission media or signals such as electrical, electromagnetic, or digital signals conveyed via a communication medium such as network and/or a wireless link.

As described herein, the computing system 11515800, utilizing the at least one processor 215805, is configured to execute one or more non-schema data reception and storage operations. The computing system 11515800, utilizing one or more processors 215805, receives a first set of non-schema data pieces. Each data piece from the first set of non-schema data pieces may include a first electronic identification and one or more attributes that are associated with the first electronic identification. In certain embodiments, the one or more attributes that are associated with the first electronic identification form a first set of one or more attributes. In certain embodiments, the one or more attributes of the first set of one or more attributes have a first quantity. For example, the computing system 11515800, utilizing the at least one processor 215805, may have received the first set of non-schema data pieces and determined that the first set of non-schema data pieces include an electronic identification in the form of an electronic device serial number and an associated attribute in the form of an indication that a user associated with the electronic identification is a member of an ornithological society. In this case, the first quantity of attributes associated the first electronic identification is one.

As described herein, an electronic identification may be a unique identification associated with an electronic device or a user of an electronic device (e.g., associated with a user profile). An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number a username or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g. a behavior performed by a user, a click on a particular link displayed by a web browser), a preference of the user of the electronic device, or the like. In certain embodiments, an attribute may be extracted from at least one of an item of anonymous personal identification information or an electronic address (e.g. when an IMEI number indicates a particular brand of electronic device used by an individual).

The computing system 11515800, utilizing one or more processors 215805, receives a second set of non-schema data pieces. Each data piece from the second set of non-schema data pieces may include a second electronic identification and one or more attributes that are associated with the second electronic identification. In certain embodiments, the one or more attributes that are associated with the second electronic identification form a second set of one or more attributes. In certain embodiments, the one or more attributes of the second set of one or more attributes have a second quantity. For example, the computing system 11515800, utilizing the at least one processor 215805, may have received the second set of non-schema data pieces and determined that the second set of non-schema data pieces include an electronic identification in the form of a phone number, a first associated attribute in the form of an indication that a user associated with the electronic identification is a member of a running club, a second associated attribute in the form of an indication that a user associated with the electronic identification is of an age between 25 and 30 years old, and a third associated attribute in the form of an indication that a user associated with the electronic identification is a female. In this case, the second quantity of attributes associated with the first identification is three.

The computing system 11515800, utilizing one or more processors 215805, generates, in a data store (e.g. the one or more servers 16120), a first set of one or more data fields to store the first electronic identification and the one or more attributes of the first set of one or more attributes. In certain embodiments, a quantity of the first set of one or more data fields is equal to one more than the first quantity (e.g. the quantity of one or more attributes associated with the first electronic identification). A data field may be a section of a data store (e.g. one or more servers 16120) that is designated to store on item of data (e.g. an electronic identification from a data piece, an attribute associated with an electronic identification from a data piece). Thus in certain embodiments, generating a data field or a set of data fields may include identifying one or more sections of a data store to store one or more items of data.

The first electronic identification and each of the one or more attributes of the first set of one or more attributes (e.g. associated with the first electronic identification) may be of non-schema data pieces or non-schema form data pieces. The term "schema" may refer to the organization of data as a blueprint of how the database is constructed (e.g. divided into database tables in the case of relational databases). Thus, electronic identifications and associated attributes in each of the schema form data pieces have categorized or characters each of the electronic identifications and each of the associated attributes into specific categories. Compared to receiving non-schema data pieces, receiving schema form data pieces may require substantially more processing power by both the transmitted of the schema data pieces (e.g. the computing system 11515800). For example, with schema form data pieces, the client system 16130 may utilize substantial processing power to categorize or characterize each of the electronic identifications and each of the associated attributes into specific categories. In addition, the computing system 11515800, when receiving the schema form data pieces may also utilize substantial processing power to organize the server 16120 in accordance with the schema and positioned the schema form data pieces in the server in accordance with that schema. Further, the computing system 11515800, when receiving the schema form data pieces may utilize substantial processing power to reorganize the schema from data pieces into the categories or characterizations that fit the needs of the computing system 11515800.

FIG. 317A illustrates a non-limiting, example data piece storage reception structure 17300 according to certain embodiments of this disclosure. The data piece storage and reception structure 17300 illustrated in FIG. 317A may be a structure to receive schema form data pieces. As shown in FIG. 317A, the structure 17300 includes a plurality of data fields 17301. The plurality of data fields 17301 may be arranged into one or more rows 17303 and one or more columns 17305. Each row of the one or more rows 17303 may be designated for a specific electronic identification. Each data field in the first column 17307 may be occupied with an electronic identification. Each data field in subsequent columns to the right of the first column 17307 may be designated to receive an attribute associated with the electronic identification in the first column 17307 sharing the row. Each column 17305 may be designated to store attributes of a particular characteristic or category designated by the schema so that a received attribute having a particular designated characteristic or category may be stored, by the computing system 16115, in a data field of a column associated with the particular characteristic or category that also shares (e.g. is contained in) the row with the associated electronic identification.

For example, the computing system 16115 receiving the schema form data pieces may receive an electronic identification and a first associated attribute. The computing system 16115 may generate a new row and store the received electronic identification in the data field of the first column 17307 in the new row 17303. The computing system 16115 may also determine a category for the first attribute based on the schema. In response to determining the category for the first attribute, the computing system 16115 search for and identify a column 17305 that is associated with the category of the first attribute. If the computing system 16115 identifies a column 17305 that associated with the category of the first attribute, the computing system 16115 may store the first attribute in a data field within the identified column 17305 that shares the row 17303 with the associated electronic identification. If the computing system 16115 does not identify a column 17305 that is associated with the category of the first attribute, the computing system 16115 may generate an additional column 17305 that is associated with the category of the first attribute and store the first attribute in the data field within the newly generated column that shares the row with the associated electronic identification.

The client system 8130 may utilize substantial processing power to categorize or characterize data from data pieces as electronic identifications and associated attributes. In addition, the client system 8130 may utilize substantial processing power to categorize or characterize each attribute associated with the electronic identification. In certain embodiments, the client system 8130 may utilize substantial processing power to eliminate or disregard electronic identifications that have no associated attributes, electronic identification that have weak associated attributes, attributes that are not associated with electronic identifications or attributes that are weakly associated with electronic identifications. In these cases, the client system 8130 may not transmit these aforementioned electronic identifications and attributes, which otherwise may still be useful to the computing system 16115 for extracting meaningful information.

The computing system 16115 may utilize substantial processing power to search for and identify data fields associated with the category or characterization attributed to a received attribute. In addition, the computing system 16115 may also utilize substantial processing power to generate additional columns 17305 when the computing system 16115 is unable to identify a column associated with a category or a characterization attributed to a received attribute. Further, after receiving and storing electronic identifications and associated attributes from schema form data pieces, the computing system 16115 may also utilize substantial processing power to reorganize or restructure the electronic identifications and the associated attributes from the schema form data pieces into an arrangement that is more suitable for extracting meaningful information from the received data.

In addition to the substantial amount of processing power utilized by the client system 8130 to generate schema form data pieces and the substantial amount of processing power utilized by the computing system 16115 to receive and store the schema form data pieces, the computing system 16115 may also underutilize or waste storage space in the server 16120 storing electronic identifications and associated attributes from schema form data pieces. For example, because the computing system 16115 may store a multitude of electronic identifications each having a quantity of associated attributes that are less than the total number of columns designated for attributes, the computing system 16115 may leave one or more data fields in one or more rows 17303 unoccupied (e.g. without a stored attribute). Thus, a substantial amount of storage space designated for attributes may be left blank or empty and may never be filled with data. Accordingly, the computing system 16115 receiving schema form data pieces may underutilize storage space in the server 16120 when storing electronic identifications and associated attributes from schema form data pieces.

Conversely, non-schema data or non-schema data pieces may be raw data or data that has not been categorized or characterized. Thus, electronic identifications and associated attributes in each of the non-schema data pieces may be raw data or data that has not been categorized or characterized into a specific category. Accordingly, a computing system 16115 receiving non-schema data pieces may store the data from the non-schema data pieces merely by storing the non-schema data pieces as the non-schema data pieces are received by the computing system 16115 substantially reducing the processing power as compared to receiving schema form data pieces.

FIG. 317B illustrates a non-limiting, example data piece storage reception structure 17333 according to certain embodiments of this disclosure. The data piece storage and reception structure 17333 illustrated in FIG. 317B may be a structure to receive non-schema form data pieces. As shown in FIG. 317B, the structure 17333 includes a plurality of data fields 17335. The plurality of data fields 17335 may be arranged into one or more rows 17337. Each row 17337 of the one or more rows 17337 may be designated for a specific electronic identification. The first data field in each row 17337 may be designated for a specific electronic identification. Each subsequent data field to the right of the first data field in each row 17337 may be generated and designated to receive an attribute associated with the electronic identification in the first column 17307 sharing the row. None of the subsequent data fields designated to store attributes associated with an electronic identification sharing the row may be associated with a category or a characterization or may be in a column associated with a category or a characterization. Accordingly, after the computing system 16115 receives a non-schema data piece, the computing system 16115 may determine the quantity of attributes associated with the electronic identification and generate a plurality of data fields that is equal to one or more than the quantity of attributes. Subsequently, the computing system 16115 may store the electronic identification in the first data field and each of the one or more attributes associated with the electronic identification in the remaining data fields of a row. In certain embodiments, because the computing system 16115 generates a quantity of data fields that is equal to one more than the quantity of attributes the computing system 16115 may generate a quantity of data fields so that each of the electronic identification and the one or more associated attributes man be stored in different data fields in the same row without any data fields remaining unoccupied.

For example, the computing system 16115 may receive a first non-schema form data piece having an electronic identification and a first associated attribute. The computing system 161145 may generate a new row having only two data fields: one data field for storing the electronic identification and one data field for storing the first associated attribute. In at least this embodiment, the computing system 16115 may not need to determine a category for the first attribute based on a schema as no schema exists for the first attribute. Subsequently, the computing system 16115 may receive a second non-schema form data piece having an electronic identification and two associated attributes. The computing system 16115 may generate a new row having only three data fields: one data field for storing the electronic identification, one data field for storing one associated attribute of the two associated attributes, and another data field for storing the other associated attribute of the two associated attributes. In at least this embodiment, the computing system 16115 may not need to determine a category for either of the two associated attributes based on a schema as no schema exists for either of the two associated attributes.

In certain embodiments, the computer system 16115 may receive a non-schema form data piece having three items of data including an electronic identification and two associated attributes. Upon receiving the three items of data, the computing system 16115 may not have enough information to determine which of the three items of data is the electronic identification and each of the two associated attributes. However, the computing system may have enough information to determine that the three items of data are associated with each other or with an electronic identification amongst the three items of data. Accordingly, the computing system 16115 may generate a row having three data fields and randomly or in the order that each of the three data items were received store each of the data items in different data fields of the three data fields. Subsequently, the computing system 16115 may perform one or more operations to determine which of the three data items is the electronic identification in which of the other two data items are the associated attributes. In at least this case, however, regardless of which data field of the row that each of the data items is stored in, the computing system 16115 may determine based on each of the three data items being in the same row, that each of the data items are associated to each other or an electronic identification that exists in the row but it is to be later identified.

As described at least with respect to the data piece storage reception structure 17333 illustrated in FIG. 317B, the client system 8130 may utilize substantially less processing power transmitting non-schema data pieces because the client system 8130 may not need to categorizes or characterize at least the associated attributes. In certain embodiments, the client system 130 may utilize substantially less processing power transmitting non-schema data pieces because the client system 8130 may not need to categorize or character any items of data into electronic identifications or associated attributes. In certain embodiments, the client system 8130 may utilize substantially less processing power transmitting non-schema data pieces because the client system 8130 may not need to categorize or characterize any items of data into electronic identifications or associated attributes. In certain embodiments, the client system 8130 may utilize substantially less processing power by foregoing the need to eliminate or disregard electronic identifications that have no associated attributes, electronic identifications that have weak associated attributes, attributes that are not associated with electronic identifications, or attributes that are weakly associated with electronic identifications. In these cases, the client system 8130 may simply transmit these aforementioned electronic identifications and attributes to the computing system 16115. The computing system 16115 may utilize electronic identifications that have no associated attributes, electronic identifications that have weak associated attributes, attributes that are not associated with electronic identifications, or attributes that are weakly associated with electronic identifications to better understand on its own and under its own parameters which items of data are to be disregarded and which items of data may be useful.

As described at least with respect to the data piece storage reception structure 17333 illustrated in FIG. 317B, the computing system 16115 may utilize substantially less processing power by eliminating or at least reduce an amount of searching for an identifying data fields associated with the category or characterization attributed to a received attribute. In addition, the computing system 16115 may also utilize substantially less processing power by eliminating or at least reducing the amount of fields generated that are never occupied with an item of data when generating an additional columns 17305. Further, after receiving and storing electronic identifications and associated attributes from non-schema form data pieces, the computing system 16115 may also utilize substantially less processing power to organize or structure the electronic identifications and the associated attributes from the non-schema form data pieces into an arrangement that is suitable for extracting meaningful information from the received data when compared to the amount of processing power that may be used to reorganize or restructure a data structure dictated by schema form data pieces.

In addition to the substantially less amount of processing power utilized by the client system 8130 to generate non-schema form data pieces and the substantially less amount of processing power utilized by the computing system 16115 to receive and store the non-schema form data pieces, the computing system 16115 may also better utilize storage space in the sever 16120 storing electronic identifications and associated attributes from schema form data pieces. For example, because the computing system 16115 may store a multitude of electronic identifications each having a quantity of associated attributes that are less than the total number of columns designated for attributes, instead of leaving one or more data fields in one or more rows 17337 unoccupied (e.g. without a stored attribute), the computing system 16115 generates data fields in an amount that satisfies no more than the total quantity of the electronic identification and the one or more associated attributes. Thus, a substantial amount of storage space may for utilization by other data pieces. Accordingly, the computing system 16115 receiving non-schema form data pieces may more efficiently utilize storage space in the server 16120 when storing electronic identifications and associated attributes from non-schema form data pieces.

FIG. 317C illustrates a non-limiting, example data piece storage reception structure 17367 according to certain embodiments of this disclosure. The data piece storage and reception structure 17367 illustrated in FIG. 317C may be a structure to receive non-schema form data pieces. As shown in FIG. 317C, the structure 17367 includes a plurality of data fields 17369. The plurality of data fields 17369 may be arranged into one or more rows 17371. Each row 17371 of the one or more rows 17371 may contain as many data fields as possible or as permitted. Each data field may be generated by the computing system 16115 as the computing system 16115 receives an item of data from a non-schema form data piece. Each of the data fields may be undesignated, uncategorized, or uncharacterized and thus, may store an electronic identification of any category, an electronic identification of any characteristic, or an electronic identification that has not been designated, categorized, or characterized. Similarly, each of the data fields may be undesignated, uncategorized, or uncharacterized, and thus, may store an attribute or any category, an attribute of any characteristic, or an attribute that has not been designated, categorized, or characterized.

For example, the computing system 16115 may generate a first set of data fields having a quantity equal to a receive first electronic identification and one or more received attributes associated with the first electronic identification and designate the first set of data fields to store each of the first electronic identification and each one or more attributes associated with the first electronic identification. In at least this embodiment, the computing system 16115 may not need to determine a category for received attributes based on a schema as no schema exists for the first electronic identification and each one or more attributes associated with the first electronic identification.

In certain embodiments, the first set of data fields may occupy the entire first row and at least a portion of one or more additional rows. In certain embodiments, the first set of data fields may occupy a space that is less than the entire first row so that a second set of data fields may occupy at least the remaining portion of the first row. In certain embodiments, the first set of data fields may occupy only the entire first row so that a second set of data fields may not occupy the first row but may occupy at least a portion of at least the second row or one or more additional row. After designating the first set of the data fields to store each of the first electronic identification and each of the one or more attributes associated with the first electronic identification, the computing system 16115 may store the first electronic identification and each of the one or more attributes associated with the first electronic identification indifferent data fields of the first set of data fields.

Subsequently, the computing system 16115 may generate a second set of data fields having a quantity equal to a second electronic identification and one or more attributes associated with the second electronic identification and designate the second set of data fields to store each of the second electronic identification and each one or more attributes associated with the second electronic identification. The second set of data fields maty be generated directly next to the first set of data fields or in the next available section of the data store (e.g. the server 8120). After designating the second set of the data fields to store each of the second electronic identification and each of the one or more attributes associated with the second electronic identification, the computing system 16115 may store the second electronic identification and each of the one or more attributes associated with the second electronic identification in different data fields of the second set of data fields. This configuration may increase the storage efficiency of the data store when receiving non-schema data pieces.

As described at least with respect to the data piece storage reception structure 17367 illustrated in FIG. 317C, the client system 8130 may utilize substantially less processing power transmitting non-schema data pieces because the client system 8130 may not need to categorize or characterize at least the associated attributes. In certain embodiments, the client system 8130 may utilize substantially less processing power transmitting non-schema data pieces because the client system 8130 may not need to categorize or characterize any items of data into electronic identifications or associated attributes. In certain embodiments, the client system 8130 may utilize substantially less processing power by foregoing the need to eliminate or disregard electronic identifications that have no associated attributes, electronic identifications that have weak associated attributes, attributed that are not associated with electronic identifications, or attributes that are weakly associated with electronic identifications. In these cases, the client system 8130 may simply transmit these aforementioned electronic identifications and attributes to the computing system 16115. The computing system 16115 may utilize electronic identifications that have no associated attributes, electronic identifications that have no associated attributes, electronic identifications that have weak associated attributes, attributes that are not associated with electronic identifications or attributes that are weakly associated with electronic identifications to better understand on its own and under its own parameters which items of data are to be disregarded and which items of data may be useful.

As described at least with respect the data piece storage reception structure 17367 illustrated in FG. 317C, the computing system 16115 may also utilize substantially less processing power by eliminating or at least reduce an amount of searching for and identifying data fields associated with the category or characterization attributed to a received attribute. In addition, the computing system 16115 may also utilize substantially less processing power by eliminating or at least reducing the amount of fields generated that are never occupied with an item of data when generating an additional columns 17305. Further, after receiving and storing electronic identifications and associated attributes from non-schema form data pieces, the computing system 16115 may also utilize substantially less processing power to organize or structure the electronic identifications and the associated attributes from the non-schema form data pieces into an arrangement that is suitable for extracting meaningful information from the received data when compared to the amount of processing power that may be used to reorganize or restructure a data structure dictated by schema form data pieces.

In certain embodiments, as shown in FIG. 317C, each of the data fields 17369 may be sized by the computing system 16115 to receive an item of data from a non-schema form data piece. For example, the computing system 16115 may receive a first set of one or more non-schema form data pieces containing a first electronic identification, the first associated attribute, and a second associated attribute. The computing system 16115 may determine that the first electronic identification has a first size. The computing system 16115 may also determine that the first associated attribute has a second size. The computing system 16115 may further determine that the first associated attribute has a second size. In response to determining the sizes of each of the first electronic identification, the first associated attribute, and the second associated attribute, the computing system 16115 may generate a first set of data fields having a first data field configured to a data piece having a size no larger than the first size, a second data field configured to a data piece having a size no larger than the second size, a third data field configured to a data piece having a size no larger than the third size. After generating each of the first data field, the second data field, and the third data field of the first set of data fields, the computing system 16115 may store the electronic identification in the first data field, the first associated attribute to the second data field, and the second associated attribute in the third data field. This configuration may further increase the storage efficiency of the data store when receiving non-schema data pieces.

The computing system 16115, utilizing one or more processors 9205, generates, in a data store (e.g. the one or more servers 16120), a second set of one or more data fields to store the first electronic identification and the one or more attributes of the second set of one or more attributes. In certain embodiments, a quantity of the second set of one or more data fields is equal to one more than the second quantity (e.g. the quantity of one or more attributes associated with the second electronic identification). A data field may be a section of a data store (e.g. an electronic identification from a data piece, an attribute associated with an electronic identification from a data piece). Thus, in certain embodiments, generating a data field or a set of data fields may include identifying one or more sections of a data store to store one or more items of data. In certain embodiments, as described herein, the second electronic identification and each of the one or more attributes of the second set of one or more attributes (e.g. associated with the second electronic identification) may be of non-schema data pieces or non-schema form data pieces.

The computing system 16115, utilizing one or more processing processors 9205, stores the first electronic identification and each of the one or more attributes of the first set of one or more attributes (e.g. the one or more attributes associated with the first electronic identification) in a different data field of the first set of one or more data fields. The computing system 115 may store the first electronic identification and each of the one or more attribute of the first set of data fields in the data piece storage reception structure 17333 illustrated in FIG. 317B or the data piece storage reception structure 17367 illustrated FIG. 317C.

For example, computing system 16115 may receive the first electronic identification and each of the one or more attributes the first of one or more attributes (e.g. the one or more attributes associated with the first electronic identification). The computing system 16115 may determine the quantity of one or more attributes and generate a first set of one or more data fields have a quantity that is one more than the quantity of the one or more attributes. Subsequently, the computing system 16115 may store the first electronic identification and each of the one or more attributes associated with the first electronic identification in different data fields of the first set of one or more data fields. In certain embodiments, when the computing system 16115 is able to identify the first electronic identification as an electronic identification and distinguish the first electronic identification from the one or more associated attributes, the computing system 16115 may store the first electronic identification in the first data field of the first set of one or more data fields and store the one or more associated attributes in the remaining data fields of the first set of one or more data fields. In certain embodiments, regardless of whether the computing system is able to identify the first electronic identification as an electronic identification and distinguish the first electronic identification from the one or more associated attributes, the computing system 16115 may store each of the first electronic identification and each of the one or more attributes associated with the first electronic identification in each of the data stores of the first set of one or more data stores as the computing system 16115 receives each of the first electronic identification and each of the one or more attributes associated with the first electronic identification. In certain embodiments, the computing system 16115 may determine a data size of each of the first electronic identification and each of the one or more attributes associated with the first electronic identification and generate each of the data fields of the first of the data fields to accommodate an item of data no larger than the data size of each of the first electronic identification and each of the one or more attributes associated with the first electronic identification so when the first electronic identification and the one or more attributes associated with the first electronic identification are stored in different data fields of the first set of one or more data fields, each of the different data fields have reached their maximum storage capacity.

The computing system 16115, utilizing one or more processors 9205, stores the second electronic identification and each of the one or more attributes of the second set of one or more attributes (e.g. the one or more attributes associated with the second electronic identification) in a different data field of the second set of one or more data fields. The computing system 16115 may store the second electronic identification and each of the one or more attribute of the second set of data fields in the data piece storage reception structure 17333 illustrated in FIG. 3176 or the data piece storage reception structure 17367 illustrated in FIG. 317C.

For example, computing system 16115 may receive the second electronic identification and each of the one or more attributes the second of one or more attributes (e.g. the one or more attributes associated with the second electronic identification). The computing system 16115 may determine the quantity of one or more attributes and generate a second set of one or more data fields having a quantity that is one more than the quantity of the one or more attributes. Subsequently, the computing system 16115 may store the second electronic identification and each of the one or more attributes associated with the second electronic identification in different data fields of the second set of one or more data fields. In certain embodiments, when the computing system 16115 is able to identify the second electronic identification as an electronic identification and distinguish the second electronic identification from the one or more associated attributes, the computing system 16115 may store the second electronic identification in the second data field of the second set of one or more data fields and store the one or more associated attributes in the remaining data fields of the second set of one or more data fields. In certain embodiments, regardless of whether the computing system is able to identify the second electronic identification as an electronic identification and distinguish the second electronic identification from the one or more associated attributes, the computing system 16115 may store each of the second electronic identification and each of the one or more attributes associated with the second electronic identification in each of the data stores of the second set of one or more data stores as the computing system 16115 receives each of the second electronic identification and each of the one or more attributes associated with the second electronic identification. In certain embodiments, the computing system 16115 may determine a data size of each of the second electronic identification and each of the one or more attributes associated with the second electronic identification and generate each of the data fields of the second of the data fields to accommodate an item of data no larger than the data size of each of the second electronic identification and each of the one or more attributes associated with the second electronic identification so when the second electronic identification and the one or more attributes associated with the second electronic identification are stored in different data fields of the second set of one or more data fields, each of the different data fields have reached their maximum storage capacity.

In certain embodiments, the computing system 16115, utilizing one or more processors 9205, search through the one or more attributes of the first set of one or more attributes and the one or more attributes of the second set of one or more attributes and select at least one of the first electronic identification or the second electronic identification based on whether an identified attribute is contained in at least one of the one or more attributes of the first set of one or more attributes or the one or more attributes of the second set of one or more attributes. For example, after storing the first electronic identification and the one or more attributes associated with the first electronic identification in the first set of one or more data fields and after storing the second electronic identification and the one or more attributes associated with the second electronic identification in the second set of one or more data fields, the computing system 16115 may receive an indication of a first attribute to be identification in the one or more servers 16120 that is associated with one or more electronic identifications stored in the one or more servers 16120 that is associated with one or more electronic identifications stored in the one or more servers 16120. The computing system may search through the one or more attributes associated with the first electronic identification and the one or more attributes associated with the second electronic identification and determine whether the first attribute is present in at least one or more attributes associated with the first electronic identification or the one or more attributes associated with the second electronic identification. Selecting one or more electronic identifications based on whether associated attributes contain a particular attribute may be used by the computing system 16115 for data aggregating processes.

In certain embodiments, when the first attribute is contained in the one or more attributes associated with the first electronic identification, the computing system 16115 may select the first electronic identification. Conversely, when the first attribute is contained in the one or more attributes associated with the first electronic identification, the computing system may not select the first electronic identification. In other embodiments, when the first attribute is not contained in the one or more attributes associated with the first electronic identification, the computing system 16115 may select the first electronic identification. Conversely, when the first attribute is not contained in the one or more attributes associated with the first electronic identification, the computing system may not select the first electronic identification. Similarly, in certain embodiments, when the second attribute is contained in the one or more attributes associated with the second electronic identification, the computing system 16115 may select the second electronic identification. Conversely, when the second attribute is contained in the one or more attributes associated with the second electronic identification, the computing system may not select the second electronic identification. In other embodiments, when the second attribute is not contained in the one or more attributes associated with the second electronic identification, the computing system 16115 may select the second electronic identification. Conversely, when the second attribute is not contained in the one or more attributes associated with the second electronic identification, the computing system may not select the second electronic identification.

In certain embodiments, the computing system 16115 may select at least one of the first electronic identification or the second electronic identification based on the quantity of first attributes contained within the one or more attributes associated with the first electronic identification or the one or more attributes associated with the second electronic identification. For example, when the first attribute is contained in the one or more attributes associated with the first electronic identification in a quantity above a threshold, the computing system 16115 may selected the first electronic identification. Conversely, when the first attribute is contacted in the one or more attributes associated with the first electronic identification in a quantity above a threshold, the computing system 16115 may not select the first electronic identification. In other embodiments, when the first attribute is contained in the one or more attributes associated with the first electronic identification in a quantity below a threshold, the computing system 16115 may select the first electronic identification. Conversely, when the first attribute is contained in the one or more attributes associated with the first electronic identification in a quantity below a threshold, the computing system 16115 may not select the first electronic identification. Similarly, when the first attribute is contained in the one or more attributes associated with the second electronic identification in a quantity above a threshold, the computing system 16115 may select the second electronic identification. Conversely, when the first attribute is contained in the one or more attributes associated with the second electronic identification in a quantity above a threshold, the computing system 16115 may not select the second electronic identification. In other embodiments, when the first attribute is contained in the one or more attributes associated with the second electronic identification in a quantity below a threshold, the computing system 16115 may select the second electronic identification. Conversely, when the first attribute is contained in the one or more attributes associated with the second electronic identification in a quantity below a threshold, the computing system 16115 may not select the second electronic identification.

In certain embodiments, the computing system 16115 may perform one or more non-schema data reception and storage operations for a plurality of sets of non-schema data pieces. For example, the computing system 16115 may receive a third set of non-schema data pieces containing a third electronic identification. The computing system 16115 may generate a third set of one or more data fields to store the third electronic identification and the one or more attributes associated with the third electronic identification as described herein. Subsequently, the computing system 16115 may store the third electronic identification and the one or more attributes associated with the third electronic identification in different data fields of the third set of one or more data fields as described herein. As another example, the computing system 16115 may receive a fourth set of non-schema data pieces containing a fourth electronic identification and one or more attributes associated with the fourth electronic identification. The computing system 16115 may generate a fourth set of one or more data fields to store the fourth electronic identification and the one or more attributes associated with the fourth electronic identification as described herein. Subsequently the computing system 16115 may store the fourth electronic identification in different data fields of the fourth set of one or more data fields as described herein. Subsequently, the computing system 16115 may store the fourth electronic identification and the one or more attributes associated with the fourth electronic identification in different data fields of the fourth set of one or more data fields as described herein.

FIG. 418 illustrates a method 18400 implemented by the computing system 16115, utilizing the at least one processor 9205, for performing one or more non-schema data reception and storage operations according to certain embodiments of this disclosure. Although certain details with be provided with reference to the method 18400 of FIG. 418, it should be understood that other embodiments may include more, less or different method steps. At step 18401, the computing system 16115 is in an idle state at least with respect to performing one or more non-schema data reception and storage operations. At step 18403, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity.

For example, the computing system 16115, utilizing the at least one processor 9205, may have received the first set of non-schema data pieces and determined that the first set of non-schema data pieces include an electronic identification in the form of an electronic device serial number and an associated attribute in the form of an indication that a user associated with the electronic identification is a member of an ornithological society. In this case, the first quantity of attributes associated with the first electronic identification is one.

As described herein, an electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address a name, a postal address, a phone number, a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a group association, an interest, a behavior (e.g. a behavior performed by a user, a click on a particular link displayed by a web browser), a preference of the user of the electronic device or the like. In certain embodiments, an attribute may be extracted from at least one of an item of anonymous personal identification information or an electronic address (e.g. when an IMEI number indicates a particular brand of electronic device used by an individual).

At step 18405, the computing system 16115 receives a second set of non-schema data pieces including a second electronic identification and one or more attributes that are associated with the second electronic identification. The one or more attributes associated with the second electronic identification may form a second set of one or more attributes. The one or more attributes of the second set of one or more attributes may have a second quantity. Step 18405 may be the same as or at least similar to step 18403 described herein.

At step 18407, the computing system 16115 generates, in a data store, a first set of one or more data fields to store the first electronic identification and the one or more attributes of the first set of one or more attributes. A data field may be a section of a data store (e.g. one or more servers 16120) that is designated to store an item of data (e.g. an electronic identification from a data piece, an attribute associated with an electronic identification from a data piece). Thus, in certain embodiments, generating a data field or a set of data fields may include identifying one or more sections of a data store to store one or more items of data. For example, the computing system 16115 may generate the first set of one or more data fields in the data piece storage reception structure 17333 illustrated in FIG. 317B or the data piece storage reception structure 17367 illustrated in FIG. 317C. The data piece storage reception structure may be used to generate a plurality of data fields. The plurality of data fields may be arranged into one or more rows. In certain embodiments, each row of the one or more rows may be designated for a specific electronic identification. In other embodiments, each row of the one or more rows may contain as many generated data fields as possible or as permitted.

In certain embodiments, a quantity of the first set of one or more data fields may be equal to one or more than the first quantity (e.g. the quantity of one or more attributes associated with the first electronic identification). For example, after the computing system 16115 receives the first electronic identification, the computing system 16115 may determine the quantity of attributes associated with the first electronic identification and generate a first set of one or more data fields that are equal to one more than the quantity of attributes. Subsequently, the computing system 16115 may store the first electronic identification and the one or more attributes associated with the first electronic identification in different data fields of the first set of one or more data fields. In certain embodiments, because the computing system 16115 generates a quantity of data fields that is equal to one more than the quantity of attributes, the computing system 16115 may generate a quantity of data fields so that each of the electronic identification and the one or more associated attributes may be stored in different data fields without any data fields remaining unoccupied.

As described as least with respect to the data piece storage reception structures 17333 and 17367 illustrated in FIGS. 317B and 317C, respectively, the client system 8130 may utilize substantially less processing power transmitting non-schema data pieces because the client system 8130 may not need to categorize or characterize at least the associated attributes. In certain embodiments, the client system 8130 may utilize substantially less processing power transmitting non-schema data pieces because the client system 8130 may not need to categorize or characterize any items of data into electronic identifications or associated attributes. In certain embodiments, the client system 8130 may utilize substantially less processing power by foregoing the need to eliminate or disregard electronic identifications that have no associated attributes, electronic identifications that have weak associated attributes, attributes that are not associated with electronic identifications or attributes that are weakly associated electronic identifications. In these cases, the client system 8130 may simply transmit these aforementioned electronic identifications and attributes to the computing system 16115. The computing system 16115 may utilize electronic identifications that have no associated attributes, electronic identifications that have weak associated attributes, attributes that are not associated with electronic identifications, or attributes that are weakly associated with electronic identifications to better understand on its own and under its own parameters which items of data are to be disregarded and which items of data may be useful.

As described at least with respect to the data piece storage reception structures 17333 and 17367 illustrated in FIGS. 317B and 317C, respectively, the computing system 16115 may utilize substantially less processing power by eliminating or at least reducing an amount of searching for and identifying data fields associated with the category or characterization attributed to a received attribute. In addition, the computing system 16115 may also utilize substantially less processing power by eliminating or at least reducing the amount of fields generated that are never occupied with an item of data when generating any additional columns 17305. Further, after receiving and storing electronic identifications and associated attributes from non-schema form data pieces, the computing system 16115 may also utilize substantially less processing power to organize or structure the electronic identifications and the associated attributes from the non-schema form data pieces into an arrangement that is suitable for extracting meaningful information from the received data when compared to the amount of processing power that may be used to reorganize or restructure a data structure dictated by schema form data pieces. In addition to the substantially less amount of processing power utilized by the client system 8130 to generate non-schema form data pieces and the substantially less amount of processing power utilized by the computing system 16115 to receive and store the non-schema form data pieces, the computing system 16115 may also better utilize storage space in the server 16120 storing electronic identifications and associated attributes from schema form data pieces as described herein.

At step 18409, the computing system 16115 generates, in the data store, a second set of one or more data fields to store the second electronic identification and the one or more attributes of the second set of one or more attributes. In certain embodiments, a quantity of the second set of one or more data fields may be equal to one more than the second quantity (e.g. the quantity of one or more attributes associated with the second electronic identification). Step 18409 may be the same as or at least similar to step 18407 described herein.

At step 18411, the computing system 16115, stores the first electronic identification and each of the one or more attributes of the first set of one or more attributes in a different data field of the first set of one or more data fields. The computing system 16115 may store the first electronic identification and each of the one or more attributes of the first set of data fields in the data piece storage reception structure 17333 illustrated in FIG. 317B or the data piece storage reception structure 17367 illustrated in FIG. 317C.

For example, computing system 16115 may receive the first electronic identification and each of the one or more attributes the first of one or more attributes (e.g. the one or more attributes associated with the first electronic identification). The computing system 16115 may determine the quantity of one or more attributes and generate a first set of one or more data fields having a quantity that is one more than the quantity of the one or more attributes. Subsequently, the computing system 16115 may store the first electronic identification and each of the one or more attributes associated with the first electronic identification and each of the one or more attributes associated with the first electronic identification in different data fields of the first set of one or more data fields. In certain embodiments, when the computing system 16115 is able to identify the first electronic identification as an electronic identification and distinguish the first electronic identification from the one or more associated attributes, the computing system 16115 may store the first electronic identification in the first data field of the first set of one or more data fields and store the one or more associated attributes in the remaining data fields of the first set of one or more data fields. In certain embodiments, regardless of whether the computing system is able to identify the first electronic identification as an electronic identification and distinguish the first electronic identification from the one or more associated attributes, the computing system 16115 may store each of the first electronic identification and each of the one or more attributes associated with the first electronic identification in each of the data stores of the first set of one or more data stores as the computing system 16115 receives each of the first electronic identification and each of the one or more attributes associated with the first electronic identification. In certain embodiments, the computing system 16115 may determine a data size of each of the first electronic identification and each of the one or more attributes associated with the first electronic identification and generate each of the data fields of the first of the data fields to accommodate an item of data no larger than the data size of each of the first electronic identification and each of the one or more attributes associated with the first electronic identification so when the first electronic identification and the one or more attributes associated with the first electronic identification are stored in different data fields of the first set of one or more data fields, each of the different data fields have reached their maximum storage capacity.

At step 18413, the computing system 16115, stores the second electronic identification and each of the one or more attributes of the second set of one or more attributes in a different data field of the second set of one or more data fields. The computer system 16115 may store the second electronic identification and each of the one or more attribute of the second set of data fields in the data piece storage reception structure 17333 illustrated in FIG. 317B or the data piece storage reception structure 17367 illustrated in FIG. 317C. Step 18413 may be the same as or at least similar to step 18411 described herein.

FIG. 519 illustrates a method 19500 implemented by the computing system 16115, utilizing the at least one processor 9205, for performing one or more non-schema data reception and storage operations according to certain embodiments of this disclose. Although certain details will be provided with reference to the method 19500 of FIG. 195, it should be understood that other embodiments may include more, less, or different method steps. At step 19501, the computing system 16115 is in an idle state at least with respect to performing one or more non-schema data reception and storage operations. Step 19501 is at least similar to step 18401 of method 18400 illustrated in FIG. 184. At step 19503, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 19503 is at least similar to step 18403 of method 18400 illustrated in FIG. 184. At step 19505, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 19505 is at least similar to step 18405 of method 18400 illustrated in FIG. 184.

At step 19507, the computing system 16115 generates, in the data store, a first set of one or more data fields to store the first electronic identification and the one or more attributes of the first set of one or more attributes. In certain embodiments, a quantity of the first set of one or more data fields may be equal to one more than the first quantity (e.g. the quantity of one or more attributes associated with the first electronic identification). Step 19507 is at least similar to step 18407 of method 18400 illustrated in FIG. 184. At step 19509, the computing system 16115 generates, in the data store, a second set of one or more data fields to store the second electronic identification and the one or more attributes of the second set of one or more attributes. In certain embodiments, a quantity of the second set of one or more data fields may be equal to one more than the second quantity (e.g. the quantity of one or more attributes associated with the second electronic identification). Step 19509 is at least similar to step 18409 of method 18400 illustrated in FIG. 184.

At step 19511, the computing system 16115 generates a field size for each data field of the first set of one or more data fields to store data that is no larger than a selected non-schema data piece from the first set of non-schema data pieces for storage. As shown in FIG. 173C, each of the data fields 17369 may be sized by the computing system 16115 to receive an item of data from a non-schema form data piece. For example, the computing system 16115 may receive a first set of one or more non-schema form data pieces containing a first electronic identification, the first associated attribute, and a second associated attribute. The computing system 16115 may determine that the first electronic identification has a first size. The computing system 16115 may also determine that the first associated attribute has a second size. The computing system 16115 may also determine that the first associated attribute has a second size. The computing system 16115 may further determine that the first associated attribute has a second size. In response to determining the sizes of each of the first electronic identification, the first associated attribute, and the second associated attribute, the computing system 16115 may generate a first set of data fields having a first data field configured to a data piece having a size no larger than the first size, a second data field configured to a data piece having a size no larger than the second size, a third data field configured to a data piece having a size no larger than the third size. After generating each of the first data field, the second data field, and the third data field of the first set of data fields, the computing system 16115 may store the electronic identification in the first data field, the first associated attribute to the second data field, and the second associated attribute in the third data field. This configuration may further increase the storage efficiency of the data store when receiving non-schema data pieces.

At step 19513, the computing system 16115 generates a field size for each data field of the second set of one or more data fields to store data that is no larger than a selected non-schema data piece from the second set of non-schema data pieces for storage. Step 19513 is at least similar to step 19511 described herein.

At step 19515, the computing system 16115, stores the first electronic identification and each of the one or more attributes of the first set of one or more attributes in a different data field of the first set of one or more attributes in a different data field of the first set of one or more data fields. The computing system 16115 may store the first electronic identification and each of the one or more attributes of the first set of data fields in the data piece storage reception structure 17333 illustrated in FIG. 173B or the data piece storage reception structure 17367 illustrated in FIG. 173C. Step 19515 is at least similar to step 18411 of method 18400 illustrated in FIG. 184.

At step 19515, the computing system 16115, stores the first electronic identification and each of the one or more attributes of the first set of one or more attributes in a different data field of the first set of one or more data fields. The computing system 16115 may store the first electronic identification and each of the one or more attributes of the first set of data fields in the data piece storage reception structure 17333 illustrated in FIG. 317B or the data piece storage reception structure 17367 illustrated in FIG. 317C. Step 19515 is at least similar to step 18411 of method 18400 illustrated in FIG. 418.

At step 19517, the computing system 16115, stores the second electronic identification and each of the one or more attributes of the second set of one or more attributes in a different data field of the second set of one or more data fields. The computing system 16115 may store the second electronic identification and each of the one or more attributes of the second set of data fields in the data piece storage receptions structure 17333 illustrated in FIG. 3176 or the data piece storage reception structure 17367 illustrated in FIG. 317C. Step 19517 is at least similar to step 18413 of method 18400 illustrated in FIG. 184.

FIG. 620 illustrates a method 20600 implemented by the computing system 16115, utilizing the at least one processor 9205, for performing one or more non-schema data reception and storage operations according to certain embodiments of this disclosure. Although certain details will be provided with reference to the method 20600 of FIG. 206, it should be understood that other embodiments may include more, less, or different method steps. At step 20601, the computing system 16115 is in an idle states at least with respect to performing one or more schema data reception and storage operations. Step 20601 is at least similar to step 18401 of method 18400 illustrated in FIG. 184. At step 20603, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 20603 is at least similar to step 18403 of method 18400 illustrated in FIG. 184. At step 20605, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 20605 is at least similar to step 18405 of method 18400 illustrated in FIG. 184.

At step 20607, the computing system 16115 generates, in the data store, a first set of one or more data fields to store the first electronic identification and the one or more attributes of the first set of one or more attributes. In certain embodiments, a quantity of the first set of one or more data fields may be equal to one more than the first quantity (e.g. the quantity of one or more attributes associated with the first electronic identification). Step 20607 is at least similar to step 18407 of method 18400 illustrated in FIG. 184. At step 20609, the computing system 16115 generates, in the data store, a second set of one or more data fields to store the second electronic identification and the one or more attributes of the second set of one or more attributes. In certain embodiments, a quantity of the second set of one or more data fields may be equal to one more than the second quantity (e.g. the quantity of one or more attributes associated with the second electronic identification). Step 20609 is at least similar to step 18409 of method 18400 illustrated in FIG. 184. At step 20611, the computing system 16115, stores the first electronic identification and each of the one or more attributes of the first set of one or more attributes in a different data field of the first set of one or more data fields. The computing system 16115 may store the first electronic identification and each of the one or more attribute of the first set of data fields in the data piece storage reception structure 17333 illustrated in FIG. 317B or the data piece storage reception structure 17367 illustrated in FIG. 317C. Step 20611 is at least similar to step 18411 of method 18400 illustrated in FIG. 418. At step 20613, the computing system 16115, stores the second electronic identification and each of the one or more attributes in a different data field of the second set of one or more data fields. The computing system 16115 may store the second electronic identification and each of the one or more attribute of the second set of data fields in the data piece storage reception structure 17333 illustrated in FIG. 317B or the data piece storage reception structure 17367 illustrated in FIG. 317C. Step 20613 is at least similar to step 18413 of method 18400 illustrated in FIG. 184.

At step 20615, the computing system 16115 searches through the one or more attributes of the first set of one or more attributes and the one or more attributes of the second set of one or more attributes. For example, after storing the first electronic identification and the one or more attributes associated with the first electronic identification in the first set of one or more data fields and after storing the second electronic identification and the one or more attributes associated with the second electronic identification in the second set of one or more data fields, the computer system 16115 may receive an indication of a first attribute to be identified in the one or more servers 16120 that is associated with one or more electronic identifications stored in the one or more servers 16120. The computing system may search through the one or more attributes associated with the first electronic identification and the one or more attributes associated with the second electronic identification and determine whether the first attribute is present in at least one of the one or more attributes associated with the first electronic identification or the one or more attributes associated with the second electronic identification.

At step 20617, the computing system 16115 selects at least one of the first electronic identification or the second electronic identification based on whether an identified attribute is contained in at least one of the one or more attributes of the first set of one or more attributes or the one or more attributes of the second set of one or more attributes. For example, after the computing system 16115 searches through the one or more attributes associated with the first electronic identification and the one or more attributes associated with the second electronic identification and determines whether the first attribute is present in at least one of the one or more attributes associated with the first electronic identification or the one or more attributes associated with the second electronic identification, the computing system 16115 may select at least one of the first electronic identification or the second electronic identifications for data aggregation processing based whether an identified attribute is contained in at least one of the one or more attributes associated with the first electronic identification or the one or more attributes associated with the second electronic identification.

In certain embodiments, when the first attribute is contained in the one or more attributes associated with the first electronic identification, the computing system 16115 may select the first electronic identification. Conversely, when the first attribute is contained in the one or more attributes associated with the first electronic identification, the computing system may not select the first electronic identification. In other embodiments, when the first attribute is not contained in the one or more attributes associated with the first electronic identification, the computing system 16115 may select the first electronic identification. Conversely, when the first attribute is not contained in the one or more attributes associated with the first electronic identification, the computing system may not select the first electronic identification. Similarly, in certain embodiments, when the second attribute is contained in the one or more attributes associated with the second electronic identification, the computing system 16115 may select the second electronic identification. Conversely, when the second attribute is contained in the one or more attributes associated with the second electronic identification, the computing system may not select the second electronic identification. In other embodiment, when the second attribute is not contained in the one or more attributes associated with the second electronic identification the computing system may not select the second electronic identification. In other embodiments, when the second attribute is not contained in the one or more attributes associated with the second electronic identification, the computing system 16115 may select the second electronic identification. Conversely, when the second attribute is not contained in the one or more attributes associated with the second electronic identification, the computing system may not select the second electronic identification.

In certain embodiments, the computing system 16115 may select at least one of the first electronic identification or the second electronic identification based on the quantity of first attributes contained within the one or more attributes associated with the first electronic identification or the one or more attributes associated with the second electronic identification. For example, when the first attribute is contained in the one or more attributes associated with the first electronic identification in a quantity above a threshold, the computing system 16115 may select the first electronic identification. Conversely, when the first attribute is contained in the one or more attributes associated with the first electronic identification in a quantity above a threshold, the computing system 16115 may not select the first electronic identification. In other embodiments, when the first attribute is contained in the one or more attributes associated with the first electronic identification in a quantity below a threshold, the computing system 16115 may select the first electronic identification. Conversely, when the first attribute is contained in the one or more attributes associated with the first electronic identification in a quantity below a threshold, the computing system 16115 may not select the first electronic identification. Similarly when the first attribute is contained in the one or more attributes associated with the second electronic identification in a quantity above a threshold, the computing system 16115 may select the second electronic identification. Conversely, when the first attribute is contained in the one or more attributes associated with the second electronic identification in a quantity above a threshold, the computing system 16115 may not select the second electronic identification. In other embodiments, when the first attribute is contained in the one or more attributes associated with the second electronic identification in a quantity below a threshold, the computing system 16115 may select the second electronic identification. Conversely, when the first attribute is contained in the one or more attributes associated with the second electronic identification in a quantity below a threshold, the computing system 16115 may not select the second electronic identification.

FIG. 721 illustrates a method 21700 implemented by the computing system 16115, utilizing the at least one processor 9205, for performing one or more no-schema data reception and storage operations according to certain embodiments of this disclosure. Although certain details will be provided with reference to the method 21700 of FIG. 721, it should be understood that other embodiments may include more, less, or different method steps. At step 21701, the computing system 16115 is in an idle state at least with respect to performing one or more non-schema data reception and storage operations. Step 21701 is at least similar to step 18401 of method 18400 illustrated in FIG. 184. At step 21703, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 21703 is at least similar to step 18403 of method 18400 illustrated in FIG. 418. At step 21705, the computing system 16115 receives a first set of non-schema data pieces including a first electronic identification and one or more attributes that are associated with the first electronic identification. The one or more attributes associated with the first electronic identification may form a first set of one or more attributes. The one or more attributes of the first set of one or more attributes may have a first quantity. Step 21705 is at least similar to step 18405 of method 18400 illustrated in FIG. 184. At step 21707, the computing system 16115 receives a third set of non-schema data pieces including a third electronic identification and one or more attributes that are associated with the third electronic identification. The one or more attributes associated with the third electronic identification may form a first set of one or more attributes. The one or more attributes of the third set of one or more attributes may have a third quantity. Step 21707 is at least similar to step 18403 or step 18405 of method 18400 illustrated in FIG. 184.

At step 21709, the computing system 16115 generates, in the data store, a first set of one or more data fields to store the first electronic identification and the one or more attributes of the first set of one or more attributes. In certain embodiments, a quantity of the first set of one or more data fields may be equal to one more than the first quantity (e.g. the quantity of one or more attributes associated with the first electronic identification). Step 21709 is at least similar to step 18407 of method 18400 illustrated in FIG. 418. At step 21711, the computing system 16115 generates, in the data store, a second set of one or more data fields to store the second electronic identification and the one or more attributes of the second set of one or more attributes. In certain embodiments, a quantity of the second set of one or more data fields may be equal to one more that the second quantity (e.g. the quantity of one or more attributes associated with the second electronic identification). Step 21711 is at least similar to step 18409 of method 18400 illustrated in FIG. 418. At step 21713, the computing system 16115 generates, in the data store, a third set of one or more data fields to store the third electronic identification and the one or more attributes of the third set of one or more attributes. In certain embodiments, a quantity of the third set of one or more data fields may be equal to one more than the third quantity (e.g. the quantity of one or more attributes associated with the third electronic identification). Step 21713 is at least similar to step 18407 and step 18409 of method 18400 illustrated in FIG. 418.

At step 21715, the computing system 16115, stores the first electronic identification and each of the one or more attributes of the first set of one or more attributes in a different data field of the first set of one or more data fields. The computing system 16115 may store the first electronic identification and each of the one or more attribute of the first set of data fields in the data piece storage reception structure 17333 illustrated in FIG. 317B or the data piece storage reception structure 17367 illustrated in FIG. 317C. Step 21715 is at least similar to step 18411 of method 18400 illustrated in FIG. 184. AT step 21717, the computing system 16115, stores the second electronic identification and each of the one or more attributes of the second set of one or more attributes in a different data field of the second set of one or more data fields. The computing system 16115 may store the second electronic identification and each of the one or more attributes of the second set of data fields in the data piece storage reception structure 17333 illustrated in FIG. 1736 or the data piece storage reception structure 17367 illustrated in FIG. 173C. Step 21717 is at least similar to step 18413 of method 18400 illustrated in FIG. 184. At step 21719, the computing system 16115, stores the third electronic identification and each of the one or more attributes of the third set of one or more attributes in a different data field of the third set of one or more data fields. The computing system 16115 may store the third electronic identification and each of the one or more attributes of the third set of data fields in the data piece storage reception structure 17333 illustrated in FIG. 317B or the data piece storage reception structure 17367 illustrated in FIG. 317C. Step 21719 is at least similar to step 18411 and step 18413 of method 18400 illustrated in FIG. 184.

FIG. 8 illustrates a non-limiting, example computing system 800 configured to implement systems and methods for performing one or more interactive gaming operations according to certain embodiments of this disclosure. FIG. 8 illustrates a computer system 800 that is configured to execute any and all of the embodiments described herein. In certain embodiments, the computer system 800 describes at least some of the components of the one or more electronic devices 110, the computing system 115, the one or more servers 120, the one or more web browsers 125, or the one or more client systems 130 illustrated in FIGS. 1 and 2. In different embodiments, the computer system 800 may be any of various types of devices, including, but not limited to, a computer embedded in a vehicle, a computer bedded in an appliance, a personal computer system, a desktop computer, a handset (e.g. a laptop computer, a notebook computer, a tablet, a slate, a netbook computer, a camera, a handled video game device, a handheld computer, a video recording device, a consumer device, a portable storage device, or the like), a mainframe computer system, a workstation, network computer, a set top box, a video game console, a mobile device (e.g. electronic controller 301 of a handset), an application server, a storage device, a television, a peripheral device such as a switch, modem, router, or in general any type of computing or electronic device.

Various embodiments of a system and method for receiving and storing non-schema data pieces, as described herein, may be executed on one or more computer system 800, which may interact with various other devices. In the illustrated embodiment, the computer system 800 includes one or more processors 805 coupled to a system memory 810 via an input/output (I/O) interface 815. The computer system 800 further includes a network interface 820 coupled to I/O interface 815, and one or more input/output devices 825, such as cursor control device 940, keyboard 945, and display(s) 950. In some cases, it is contemplated that embodiments may be implemented using a single instance of computer system 800, while in other embodiments multiple such systems, or multiple nodes making up computer system 800 may be configured to host different portions or instances of embodiments. For example, in one embodiment some elements may be implemented via one or more nodes of computer system 800 that are distinct from those nodes implementing other elements.

In various embodiments, computer systems 800 may be a uniprocessor system including one processor 805*a*, or a multiprocessor system including several processors 805*a*-805*n* (e.g. two, four, eight or another suitable number). The processors 805 may be any suitable processor capable of executing instructions. For example, in various embodiments the processors 805 may be general-purpose or embedded processors implementing any of a variety of instruction set architectures (ISAs), such as the x86, PowerPC, SPARC, or MIPS ISAs or any other suitable ISA. In multiprocessor systems, each of processors 805 may commonly, but not necessarily implement the same ISA.

The system memory 810 may be configured to store the program instructions 830 and/or existing state information and ownership transition condition data in the data storage 835 accessible by the processor 805. In various embodiments, the system memory 810 may be implemented using any suitable memory technology, such as static random access memory (SRAM), synchronous dynamic RAM (SDRAM), nonvolatile/Flash-type memory, or any other type of memory. In the illustrated embodiment, the program instructions 830 may be configured to implement a system for performing one or more non-schema data reception and storage operations incorporating any of the functionality, as described herein. In some embodiments, program instructions and/or data may be received, sent, or stored upon different types of computer-accessible media or on similar media separate from the system memory 810 or the computer system 800. The computer system 800 is described as implementing at least some of the functionality of functional blocks of previous Figures.

In one embodiment, the I/O interface 815 may be configured to coordinate I/O traffic between the processor 805, the system memory 810, and any peripheral devices in the device, including the network interface 820 or other peripheral interfaces, such as the input/output devices 825. In some embodiments, the I/O interface 815 may perform any necessary protocol, timing or other data transformations to convert data signals from one component (e.g. the system memory 810) into a format suitable for use by another component (e.g. the processors 805). In some embodiments, the I/O interface 815 may include support for devices attached through various types of peripheral buses, such as a variant of the Peripheral Component Interconnect (PCT) bus standard or the Universal Serial Bus (USB) standard, for example. In some embodiments, the function of the I/O interface 815 may be split into two or more separate components, such as a north bridge and a south bridge, for example. Also in some embodiments some or all of the functionality of the I/O interface 815, such as an interface to the system memory, 810, may be incorporated directly into the processor 805.

The network interface 820 may be configured to allow data to be exchanged between the computer system 800 and other devices attached to the network 105 or between the nodes of the computer system 800. The network 105 may in various embodiments include one or more networks including but not limited to Local Area Networks (LANs) (e.g. an Ethernet or corporate network). Wide Area Networks (WANs) (e.g. the Internet), wireless data networks, some other electronic data network, a combination thereof, or the like. In various embodiments, the network interface 820 may support communication via wired or wireless general data networks such as any suitable type of Ethernet network, for example, via telecommunications/telephony networks such as analog voice networks or digital fiber communications networks; via storage area networks such as Fiber Channel SANs, or via any other suitable type of network and/or protocol.

The input/output devices 825 may, in some embodiments, include one or more display terminals, keyboards, keypads, touchpads, scanning devices, voice or optical recognition devices, or any other devices suitable for entering or accessing data by one or more of the computer systems 800. Further, various other sensors may be included in the I/O devices 825, such as imaging sensors, barometers, altimeters, LIDAR, or any suitable environmental senor. Multiple I/O devices 825 may be present in the computer system 800 or may be distributed on various nodes of the computer system 800. In some embodiments, similar I/O devices may be separate from the computer system 800 and may interact with one or more nodes of the computer system 800 through a wired or wireless connection such as over the network interface 820.

As shown in FIG. 8, the memory 810 may include program instructions 830, which may be processors-executable to implement any element or action, as described herein. In one embodiment, the program instructions may implement at least a portion of methods described herein, such as the methods illustrated by FIGS. 4-7. In other embodiments, different elements and data may be included. Note that the data storage 835 may include any data or information, as described herein.

Those skilled in the art will appreciate that the computer system 800 is merely illustrative and is not intended to limit the score of embodiments. In particular the computer system and devices may include any combination of hardware or software that can perform the indicated function including computers network internet appliances PDAs, wireless phones, pagers, GPUs, specialized computer systems, information handling apparatuses, or the like. The computer system 800 may also be connected to other devices that are not illustrated, or instead may operate as a stand-alone system. In addition, the functionality provided by the illustrated components may be in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in merry on another device and communicate with the illustrated computer system via inter-computer communication. Some or all of the system components or data structures may also be stored (e.g. as instructions, structured data) on a computer-accessible medium or a portable article to be read by an appropriate drive, various examples of which are described here. In some embodiments instructions stored on a computer accessible medium separate from the computer system 800 may be transmitted to the computer system 800 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, or the like), ROM or the like. In some embodiments, a computer-accessible medium may include transmission media or signals such as electrical, electromagnetic, or digital signals, conveyed via a communication medium such as a network and/or a wireless link.

Thus the disclosure provides, among other things, a system for performing one or more non-schema data reception and storage operations, including a computing system. None of the description in this application should be read as implying that a particular element step or function is an essential element that must be included in the claim scope. The scope of patented subject matter is defined only by the claims. Moreover, none of the claims is intended to invoke 35 U.S.C. § 112(f) unless the exact words "means for" are followed by a participle.

SECTION IV. METHOD AND SYSTEM FOR DETERMINING TRANSFER OF ASYNCHRONOUS CORRELATION OF DATA ENTRIES IN SPATIAL INSTANCES OF HETEROGENEOUS DATABASES

Technical Field of Section IV

The present disclosure relates to storing user data from web browsing sessions in a user profile and retrieving a specific subset of the stored user data.

Additional Background for Section IV

Web sites are capable of tracking users who visit and interact with the web sites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SECTION IV. SUMMARY

This disclosure provides systems and methods for transferring data pieces containing personal identification information (P II) provided during a web browser session.

In a first embodiment, the disclosure provides an apparatus including a computing system that is communicatively linked to one or more servers. The computing system includes at least one memory and at least one processor. The computing system is configured to receive a data piece from an electronic device. The data piece includes one or more items of anonymous personal identification information. The computing system is also configured to identify an electronic address associated with the data piece. The computing system is further configured to access the one or more servers to identify one or more client systems permitted to transmit data to the electronic device based on the electronic address. In addition, the computing system is configured to transmit the data piece to the one or more client systems permitted to transmit data to the electronic device.

In a second embodiment, the disclosure provides a method implemented by a computing system. The method includes receiving, by the computing system, a data piece from an electronic device. The data piece includes one or more items of anonymous personal identification information. The method also includes identifying, by the computing system, an electronic address associated with the data piece. The method further includes accessing, by the computing system, one or more servers to identify one or more client systems permitted to transmit data to the electronic device based on the electronic address. In addition, the method includes transmitting, by the computing system, the data piece to the one or more client systems permitted to transmit data to the electronic device.

In a third embodiment, the disclosure provides a non-transitory, computer-readable storage medium. The non-transitory, computer-readable storage medium stores one or more executable instructions that, when executed by at least one processor, causes the at least one processor to receive a data piece from an electronic device. The data piece comprises one or more items of anonymous personal identification information. The one or more executable instructions that, when executed by at least one processor, also causes the at least one processor to identify an electronic address associated with the data piece. The one or more executable instructions that, when executed by at least one processor, further causes the at least one processor to access the one or more servers to identify one or more client systems permitted to transmit data to the electronic device based on the electronic address. In addition, the non-transitory, computer-readable storage medium stores one or more executable instructions that, when executed by at least one processor, causes the at least one processor to transmit the data piece to the one or more client systems permitted to transmit data to the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, Band C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a non-limiting, example network context 100 for operating a computing system 115 according to certain embodiments of this disclosure;

FIG. 2 illustrates a non-limiting, example computing system configured to perform data piece transfer operations according to certain embodiments of the disclosure;

FIGS. 3-6 illustrate flow diagrams of methods for performing data piece transfer operations according to certain embodiments of the disclosure; and FIG. 7 illustrates a non-limiting, example computer system configured to implement aspects of systems and methods according to certain embodiments of this disclosure.

DETAILED DESCRIPTION FOR SECTION IV

FIGS. 1 through 7, The figures discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates a non-limiting, example network context 100 for operating a computing system 115 according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., an Ethernet connection) or over a wireless connection (e.g., a wireless local area network "WLAN" connection or a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit switched cellular, 3G, LTE, WiBro) and internet protocols (e.g., HTTP).

The one or more constituent networks of the network 8105 provide two-way connectivity between each of the electronic devices 8110, the computing system 8115, the one or more servers 8120, the one or more web browsers 8125, and the one or more client systems 8130. In certain embodiments, the one or more constituent networks of the network 8105 provide two-way connectivity between each of the electronic device 8110, the computing system 8115, the one or more servers 8120, the one or more web browsers 8125, and the one or more client systems 8130 using one or more same or different channels, protocols, or networks of network 8105. For example, a circuit-switched cellular protocol wireless network of the network 8105 provides connectivity between the iPhone™ 8110a and one or more of the web browsers 8125 while a POTS wireless network of the network 8105 provides connectivity between the smartphone 8110c and at least one of the one or more web browsers 8125.

In certain embodiments, the network context 8100 includes one or more electronic devices 8110. The one or more electronic devices 8110 may include an iPhone™ 8110a, a tablet 8110b, a desktop computer 8110c, a smartphone 8110d, a laptop computer 8110e, or the like. In certain embodiments, each of the one or more electronic devices 8110 is configured to initiate a web browser session with a web browser 8125 or access and display the one or more web browsers 8125 through the network 8105 for viewing by a user and for interaction between the user and the one or more web browsers 8125. Additionally, or alternatively, each of the one or more electronic devices 8110 is configured to transmit one or more items of anonymous personal identification information to a web browser 8125 during a web browser session.

In certain embodiments, each of the one or more electronic devices 8110 may be configured to store data pieces received from a web browser 8125 during a web browser session. Each data piece may contain at least one of an electronic address or one or more items of anonymous personal identification information that were transmit by the electronic device 8110 to the web browser 8125 during the web browser session. The electronic address may provide an anonymous indication of an electronic communication reception or transmission location of the electronic device 8110 so that one or more other electronic devices 8110, one or more servers 8120, one or more web browsers 8125, or one or more client systems 8130 may electronically communicate with that electronic device 8110. For example, an electronic address may include at least one of a MAC address, an IMEI number, an electronic device serial number, an email address, a pointer associated with a data port of the electronic device, or the like. An item of anonymous personal identification information may include information associated with a user of an electronic device and identifies characteristics, preferences, interests, or associations of the user of the electronic device. For example, an item of anonymous personal identification information may include at least one of an email address, a postal address, a user ID, a gender, an age group, a user interest, or the like. In certain embodiments, the electronic device 8110 includes an electronic device display screen, an electronic device memory, and at least one electronic device processor. The electronic device may be configured to access and display content from one or more web browsers 8125 on the electronic device display screen.

In certain embodiments, the network context 8100 includes one or more web browsers 8125. As described herein, the one or more web browsers 8125 are configured to contain display content for viewing by an electronic device 8110 when the electronic device 8110 is engaged in a web browser session with the web browser 8125. In certain embodiments, the one or more web browsers 8125 are configured to transmit data pieces to the electronic device 8110 for storage in a memory of the electronic device 8110 when the electronic device 8110 is engaged in a web browser session with the web browser 8125. The one or more web browsers 8125 may also be configured to receive items of anonymous personal identification information transmitted from an electronic device 8110 when the electronic device 8110 is engage in a web browser session with the one or more web browsers 8125. The electronic device 8110 may store the items of the anonymous personal identification information transmitted to the web browser as well as an electronic device address associated with the electronic device 8110 in a data piece received from the web browser 8125 located in the memory of the electronic device 8110.

Additionally, or alternatively, the network context 8110 may include one or more client systems 8130. A client system 8130 may be a system operated by an independent entity (e.g., separate from the computing system 8115 and the one or more servers 8120) that receives, from the computing system 8115, one or more items of anonymous personal identification information and at least one electronic address associated with the one or more items of anonymous personal identification information. For example, the client system 8130 may receive, from the computing system 8115, a first set of one or more items of anonymous personal identification information coupled with a first electronic address that is associated with the first electronic device 8110a a second set of one or more items of anonymous personal identification information coupled with a second electronic address that is associated with the second electronic device 8110b.

In certain embodiments, the client system 8130 may receive, from the computing system 8115, a first data piece containing at least the first set of one or more items of anonymous personal identification information. Additionally, or alternatively, the first data piece may contain the first electronic address that is associated with the first electronic device 8110a. Similarly, the client system 8130 may receive, from the computing system 8115, a second data piece containing at least the second set of one or more items of anonymous personal identification information. Additionally, or alternatively, the second data piece may contain the second electronic address that is associated with the second electronic device 8110b. Subsequently, for example when the first data piece includes the first electronic address, the client system 8130 may provide content to the first electronic device 8110a using the first electronic address and based on the first set of one or more items of anonymous personal identification information. The client system 8130 may also provide, for example when the second data piece includes the second electronic address, content to the second electronic device 8110 busing the second electronic address and based on the second set of one or more items of anonymous personal identification information.

In some embodiments, each client system 8130 of the one or more client systems 8130 may not be contractually prohibited from transmitting or may be contractually permitted to transmit content to every electronic device 8110 of the one or more electronic devices 8110. For example, each client system 8130 of the one or more client systems 8130 may not be contractually prohibited from receiving or may be contractually permitted to receive (e.g., a data piece containing) an electronic address and one or more items of anonymous personal identification information from every profile within the possession of the computing system 8115 (e.g., stored in the one or more servers 8120) and may subsequently transmit content to each of those electronic addresses based on the respective received one or more items of anonymous personal identification information.

In certain embodiments, at least one client system 8130 of the one or more client systems 8130 may be contractually prohibited from transmitting or may not be contractually permitted to transmit content to at least one electronic device 8110 of the one or more electronic devices 8110. For example, a first client system 8130 of the one or more client systems 8130 may not be contractually prohibited from transmitting or may be contractually permitted to transmit content to the first electronic device 8110a or to a first electronic address associated with the first electronic device 8110a but may be contractually prohibited from transmitting or may not be contractually permitted to transmit content to the second electronic device 8110b or to a second electronic address associated with the second electronic device 8110b. The first client system 8130 may receive the first electronic address and one or more items of anonymous personal identification information from a first user profile associated with the first electronic device 8110a but may not receive the second electronic address and one or more items of anonymous personal identification information from a second user profile associated with the second electronic device 8110b.

Accordingly, the first client system 8130 may transmit content to the first electronic device 110a using the received first electronic address from the first user profile. The transmitted content may be based on the one or more items of anonymous personal identification information from the first user profile. In addition, the first client system 8130 may not transmit content to the second electronic device 8110b because the client system 8130 does not receive the second electronic address that is associated with the second electronic device 8110b and because the first client system 8130 does not receive one or more items of anonymous personal identification information from the second user profile.

As another example, a second client system 8130 of the one or more client systems 8130 may not be contractually prohibited from transmitting or may be contractually permitted to transmit content to the second electronic device 8110b or to the second electronic address associated with the second electronic device 8110b but may be contractually prohibited from transmitting or may not be contractually permitted to transmit content to the first electronic device 8110a or to the first electronic address associated with the first electronic device 8110a. The second client system 8130 may receive the second electronic address and one or more items of anonymous personal identification information from the second user profile associated with the second electronic device 8110b but may not receive the first electronic device address and one or more items of anonymous personal identification information from the first user profile associated with the first electronic device 8110a.

Accordingly, the second client system 8130 may transmit content to the second electronic device 8110b using the received second electronic address from the second user profile. The transmitted content may be based on the one or more items of anonymous personal identification information from the second user profile. In addition, the second client system 8130 may not transmit content to the first electronic device 8110a because the second client system 8130 does not receive the first electronic address that is associated with the first electronic device 8110a and because the second client system 8130 does not receive one or more items of anonymous personal identification information from the first user profile.

In certain embodiments, each of the one or more client systems 8130 may not be contractually prohibited from receiving or may be contractually permitted to receive an electronic address and one or more items of anonymous personal identification information from one or more electronic devices based on which domains the computing system 8130 received the electronic address and the one or more items of anonymous personal identification information through. For example, an electronic device 8110 may provide an electronic permission to a first domain to store an electronic address of the electronic device 8110 and one or more items anonymous personal identification information in a data piece associated with the first domain and stored in the memory of the electronic device 8110 for subsequent access by the first domain. The computing system 8115 may also be linked or associated with the first domain and may access the electronic address and the one or more items of anonymous personal identification information stored in the data piece on the electronic device 8110 from the first domain. The computing system 8110 may determine that a first client system 8130 is not contractually prohibited from receiving or is contractually permitted to receive electronic addresses and items of anonymous personal identification information stored in a data piece on an electronic device 8110 from the first domain. Thus, upon receiving an electronic address and one or more items of anonymous personal identification information stored in a data piece on an electronic device 8110 from the first domain, the computing system 8110 may not be contractually prohibited from transmitting or may be contractually permitted to transmit the electronic address and the one or more items of anonymous personal identification information stored in the data piece on the electronic device 8110 from the first domain to the first client system 8130.

In certain embodiments, at least one client system 8130 of the one or more client systems 8130 may be contractually prohibited from receiving or may not be contractually permitted to receive an electronic address and one or more items of anonymous personal identification information from one or more electronic devices 8110 that received the electronic address and the one or more items of anonymous personal identification information through at least one domain. For example, an electronic device 8110 may have provided an electronic permission to a second domain to store an electronic address of the electronic device 8110 and one or more items anonymous personal identification information in a data piece associated with the second domain and stored in the memory of the electronic device 8110 for subsequent access by the second domain. The computing system 8115 may also be linked or associated with the second domain and may access the electronic address and the one or more items of anonymous personal identification information stored in the data piece on the electronic device 8110 from the second domain. The computing system 8110 may, however, determine that the first client system 8130 is contractually prohibited from receiving or is not contractually permitted to receive electronic addresses and items of anonymous personal identification information stored in a data piece on the electronic device 8110 from the second domain. Thus, upon receiving an electronic address and one or more items of anonymous personal identification information stored in a data piece on an electronic device 8110 from the second domain, the computing system 8110 may be contractually prohibited from transmitting or may not be contractually permitted to transmit the electronic address and the one or more items of anonymous personal identification information stored in the data piece on the electronic device 8110 from the second domain to the first client system 8130.

In some embodiments, the network context 8100 may include one or more servers 8120. In certain embodiments, the one or more servers 8120 stores user profiles that each include at least one electronic address and one or more items of anonymous personal identification information. As described herein, the computing system 8115 may store at least one electronic address and one or more items of anonymous personal identification information that are associated with the at least one electronic device address in individual user profiles stored in the one or more servers 8120.

In certain embodiments, the one or more servers 8120 may also contain a list of each of the one or more client systems 8130 and one or more contractual permissions or contractual prohibitions for each of the one or more client system 8130 with one or more other client systems 8130. For example, the one or more servers 8120 may include a list of a plurality of client systems 8130 including a first client system, a second client system, and a third client system. In the list of the plurality of client systems 8130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 8110. Conversely, in the list of the plurality of client systems 8130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 8110.

In certain embodiments, the one or more servers 8120 may also contain a list of each of the one or more client systems 8130 and one or more contractual permissions or contractual prohibitions for each of the one or more client system 8130 with one or more domains. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from data pieces stored on an electronic device 8110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 8110.

Conversely, in the list of the plurality of client systems 8130, the first client system may have contractual permission to receive or may not have contractual prohibition from receiving electronic addresses and items of anonymous personal identification information from data pieces stored on an electronic device 8110 from a second domain. However, the second client system may not have contractual permission to receive or may have contractual prohibition from receiving electronic addresses and items of anonymous personal identification information from data pieces stored on an electronic device 8110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 110 while the second client system may not be contractually permitted to use or may be contractually prohibited from using the received electronic addresses and items of anonymous personal identification information from the second domain or contained in data pieces from the second domain to transmit content to electronic devices 8110.

In certain embodiments, the one or more servers 8120 may also contain a list of each of the one or more client systems 8130 that indicates one or more electronic device 8110 that have given electronic permission to receive content from that client system 8130. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from a first electronic device 8110. Accordingly, both the first client system and the second client system may each be contractually permitted to use or may each not be contractually prohibited from using the received electronic addresses and items of anonymous personal identification information from the first electronic device to transmit content to electronic devices 8110 (e.g., the first electronic device). Conversely, in the list of the plurality of client systems 8130, the first client system may have contractual permission to receive or may not have contractual prohibition from receiving electronic addresses and items of anonymous personal identification information from a second electronic device 8110. However, the second client system may not have contractual permission to receive or may have contractual prohibition from receiving electronic addresses and items of anonymous personal identification information from the second electronic device 8110. Accordingly, the first client system may be contractually permitted to use or may not be contractually prohibited from using the received electronic addresses and items of anonymous personal identification information from the second electronic device 8110 to transmit content to electronic devices 8110 while the second client system may not be contractually permitted to use or may be contractually prohibited from using the received electronic addresses and items of anonymous personal identification information from the second electronic device 8110 to transmit content to electronic devices 8110.

Figure 29:
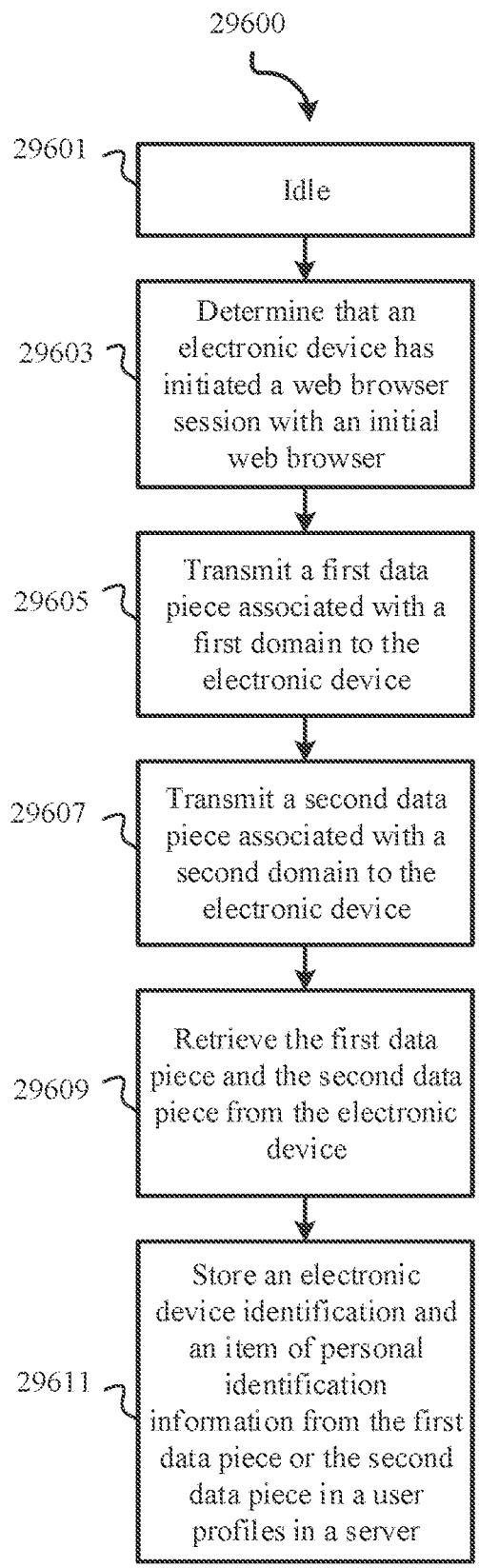
Figure 30:
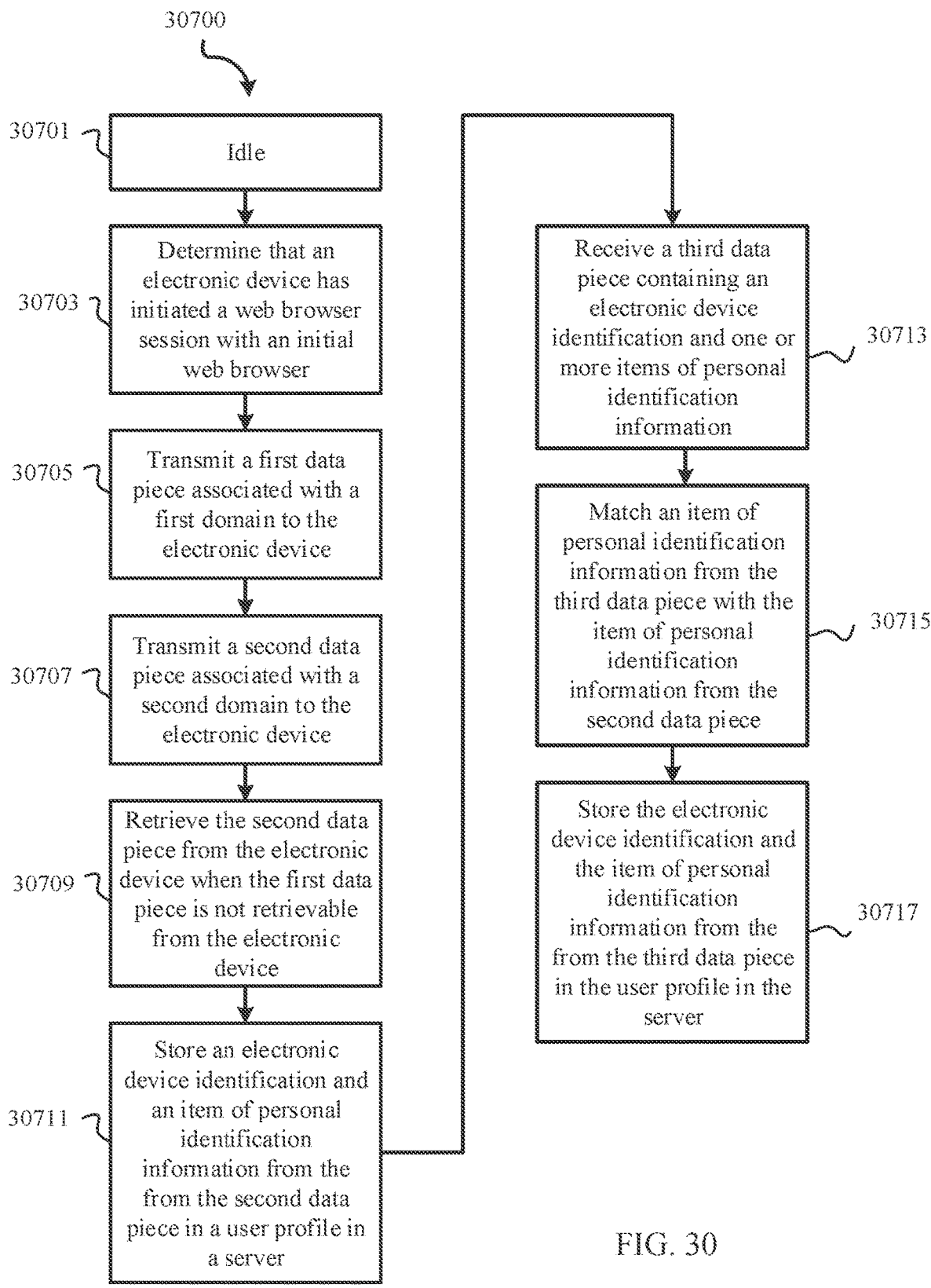
Figure 31:
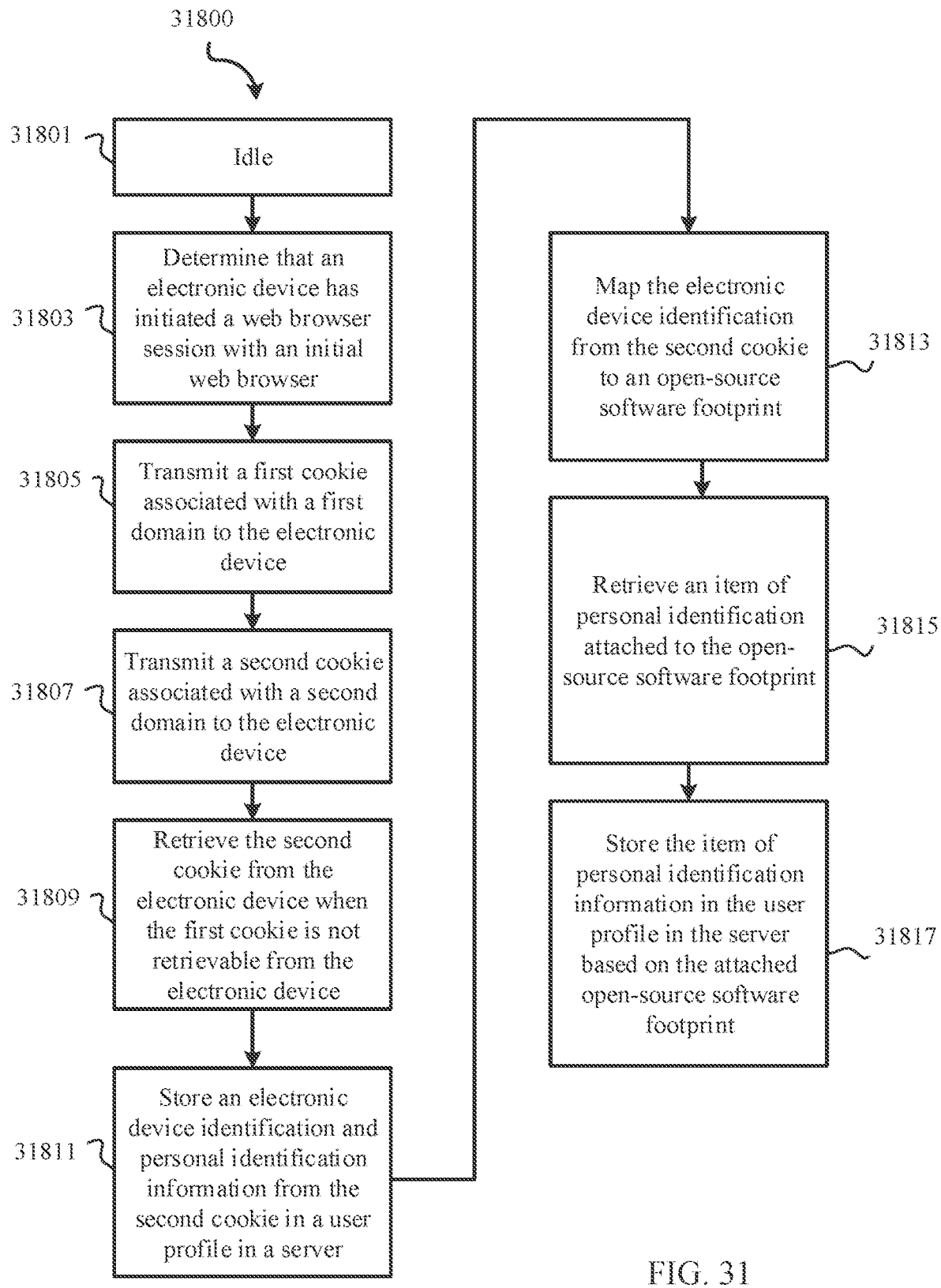
Figure 32:
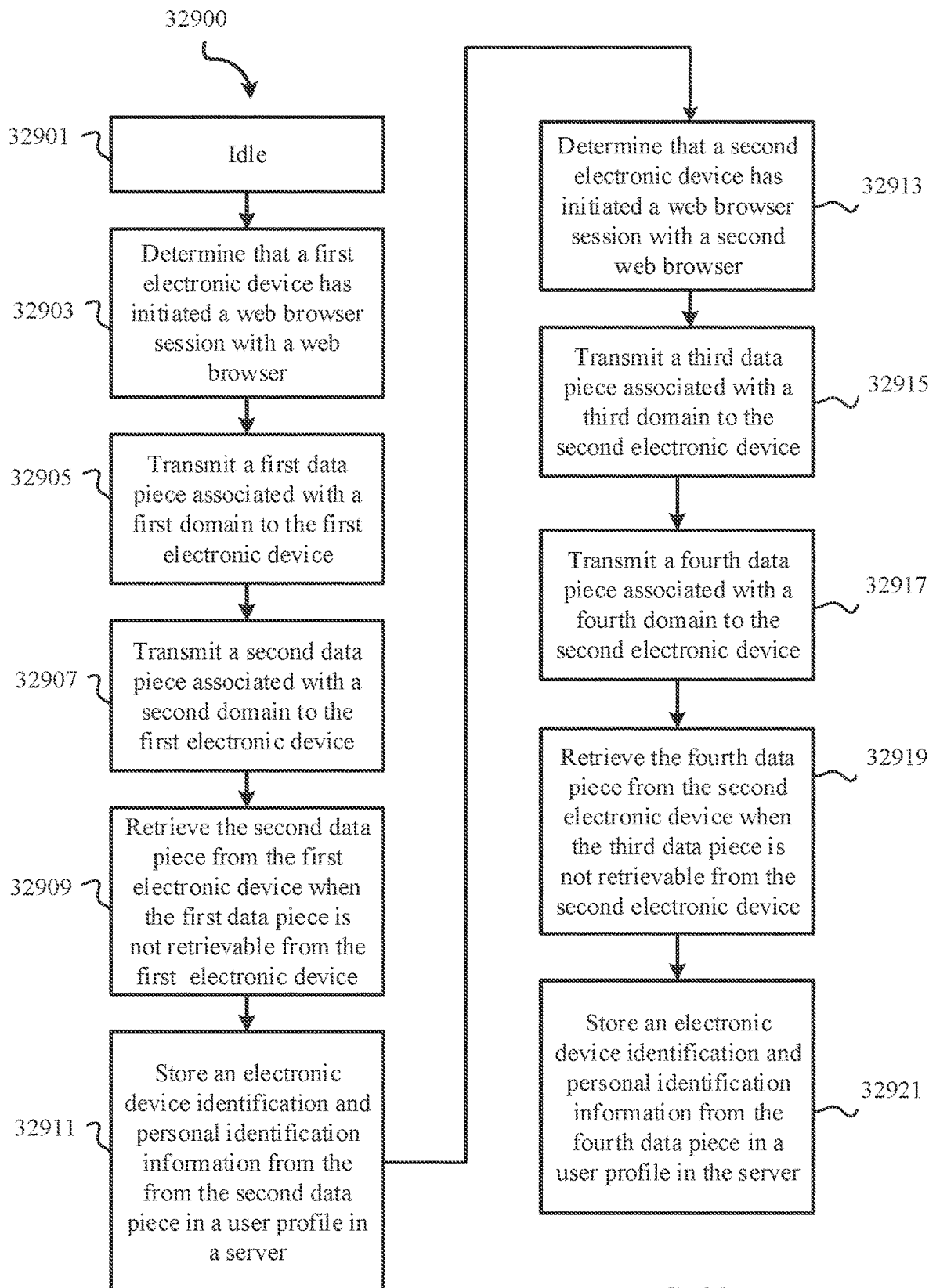

In certain embodiments, the network context 8100 includes one or more computing systems 8115. FIG. 29 illustrates a non-limiting, example of the computing system 8115 illustrated in FIG. 18. The computing system 8115 is configured to execute any and all of the embodiments and operations described herein including embodiments for performing data piece transfer operations. In certain embodiments, the computing system 8115 may perform data piece transfer operations for transferring data pieces containing anonymous personal identification information provided during a web browser session. In different embodiments, the computing system 8115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing data piece transfer operations, as described herein, may be executed on one or more computing systems 8115, which may interact with various other devices. In the illustrated embodiment, the computing system 8115 includes one or more processors 9205*a*, 9205*b*, . . . , and 9205*n* (hereinafter "one or more processors 9205," "processor 9205," or "processors 9205") coupled to a memory 9210 via an input/output (1/0I/O) interface 9215. The computing system 8115 further includes a network interface 9220 coupled to 1/0I/O interface 9215, and one or more input/output devices 9225, such as cursor control device 940, keyboard 945, and display(s) 950. In some cases, it is contemplated that embodiments may be implemented using a single instance of the computing system 8115, while in other embodiments multiple such systems, or multiple nodes making up the computing system 8115, may be configured to host different portions or instances of embodiments. For example, in one embodiment, some elements may be implemented via one or more nodes of the computing system 8115 that are distinct from those nodes implementing other elements.

In various embodiments, the computing system 8115 may be a uniprocessor system including one processor 9205*a*, or a multiprocessor system including several processors 9205*a*-9205*n* (e.g., two, four, eight, or another suitable number). The processor 9205 may be any suitable processor capable of executing instructions or operations including data piece transfer operations as described herein. For example, in various embodiments the processor 9205 may be general purpose or embedded processors implementing any of a variety of instruction set architectures (IS As), such as the x86, PowerPC, SPARC, or MIPS ISAs, or any other suitable ISA. In multiprocessor systems, each of processors 9205 may commonly, but not necessarily, implement the same ISA.

The memory 9210 may be configured to store the executable instructions or program instructions 9230 for data piece transfer operations in the data storage 9235 accessible by the processor 9205. In various embodiments, the memory 9210 may be implemented using any suitable memory technology, such as static random access memory (SRAM), synchronous dynamic RAM (SDRAM), nonvolatile/Flash-type memory, or any other type of memory. In the illustrated embodiment, the program instructions 9230 may be configured to implement a system for transferring data pieces incorporating any of the functionality, as described herein. In some embodiments, program instructions 9230 or data may be received, sent, or stored upon different types of computer-accessible media or on similar media separate from the memory 9210 or the computing system 8115. The computing system 8115 is described as implementing at least some of the functionality of functional blocks in the figures described herein.

In certain embodiments, the data storage 9235 of the memory 9210 stores a plurality of domains associated with one or more web browsers 8125. For example, the data storage 9235 of the memory 9210 stores one or more matrices that each contain a plurality of domains that are associated with one or more web browsers 8125. Each of the matrices may have a plurality of rows and a plurality of columns forming a plurality of fields each containing a domain. Each of the plurality of rows may be assigned an order that the at least one processor 9205 uses for directing an electronic device 8110 to transmit anonymous personal identification information to domains and for domains to transmit data pieces containing the transmitted anonymous personal identification information for storage in a memory of the electronic device 8110, as described herein.

It should be understood that each of the matrices can include a plurality of columns (e.g., hundreds of columns, thousands of columns, millions of columns) and a plurality of rows (e.g., hundreds of rows, thousands of rows, millions of rows) and thus, a plurality of domains (e.g., hundreds of domains, thousands of domains, millions of domains) may be stored in each of the matrices. In addition, the data storage 9235 of the memory 9210 may store a plurality of matrices (e.g., hundreds of matrices, thousands of matrices, millions of matrices) each of which is associated with a different web browser 8125. Additionally, or alternatively, the data storage 9235 of the memory 9210 may store one or more matrices that are each associated with two or more different web browsers 8125. A matrix provides the at least one processor 9205 with a road map having alternative pathways through the domain orders for directing an electronic device 8110 to communicate items of anonymous personal identification information to domains in each of the domain orders. The electronic device 8110 may then receive and store data pieces from those domains on the electronic device 8110 when the electronic device 8110 is engaged in browser sessions on web browsers 8125. The data pieces stored on the electronic device 8110 may contain the transmitted items of personal identification information and an electronic address. The data pieces can subsequently be retrieved by the at least one processor 9205 so that the at least one processor 9205 may store electronic addresses and items of anonymous personal identification information from the retrieved data pieces in user profiles in one or more servers 8120.

In certain embodiments, the 1/0I/O interface 9215 may be configured to coordinate 1/0I/O traffic between the processor 9205, the memory 9210, and any peripheral devices in the computing system 8115, including the network interface 9220 or other peripheral interfaces, such as the input/output devices 9225. In some embodiments, the I/O0 interface 9215 may perform any necessary protocol, timing or other data transformations to convert data signals from one component (e.g., the memory 9210) into a format suitable for use by another component (e.g., the processor 9205). In some embodiments, the I/O0 interface 9215 may include support for devices attached through various types of peripheral buses, such as a variant of the Peripheral Component Interconnect (PCI) bus standard or the Universal Serial Bus (USB) standard, for example. In some embodiments, the function of the I/O0 interface 9215 may be split into two or more separate components, such as a north bridge and a south bridge, for example. Also, in some embodiments some or all of the functionality of the 1/0I/O interface 9215, such as an interface to the memory 9210, may be incorporated directly into the processor 9205.

The network interface 9220 may be configured to allow data to be exchanged between the computing system 8115 and other devices attached to the network 8105 (e.g., one or more electronic devices 8110, one or more servers 8120, one or more web browsers 8125, one or more client systems 8130) or between nodes of the computing system 8115. The network 8105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 9220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 9225 may, in some embodiments, include one or more display terminals, keyboards, keypads, touchpads, scanning devices, voice, or optical recognition devices, or any other devices suitable for entering or accessing data by one or more the computing system 8115. Further, various other sensors may be included in the I/0O devices 9225, such as imaging sensors, barometers, altimeters, LIDAR, or any suitable environmental sensor. Multiple input/output devices 9225 may be present in the computing system 8115 or may be distributed on various nodes of the computing system 8115. In some embodiments, similar input/output devices may be separate from the computing system 8115 and may interact with one or more nodes of the computing system 8115 through a wired or wireless connection, such as over the network interface 9220.

Figure 22:
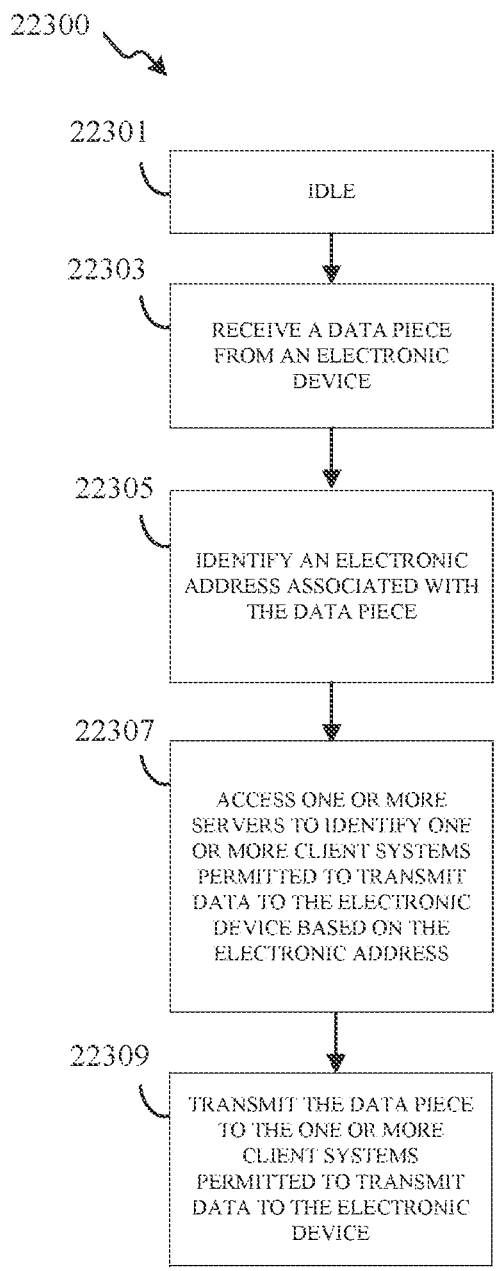
Figure 23:
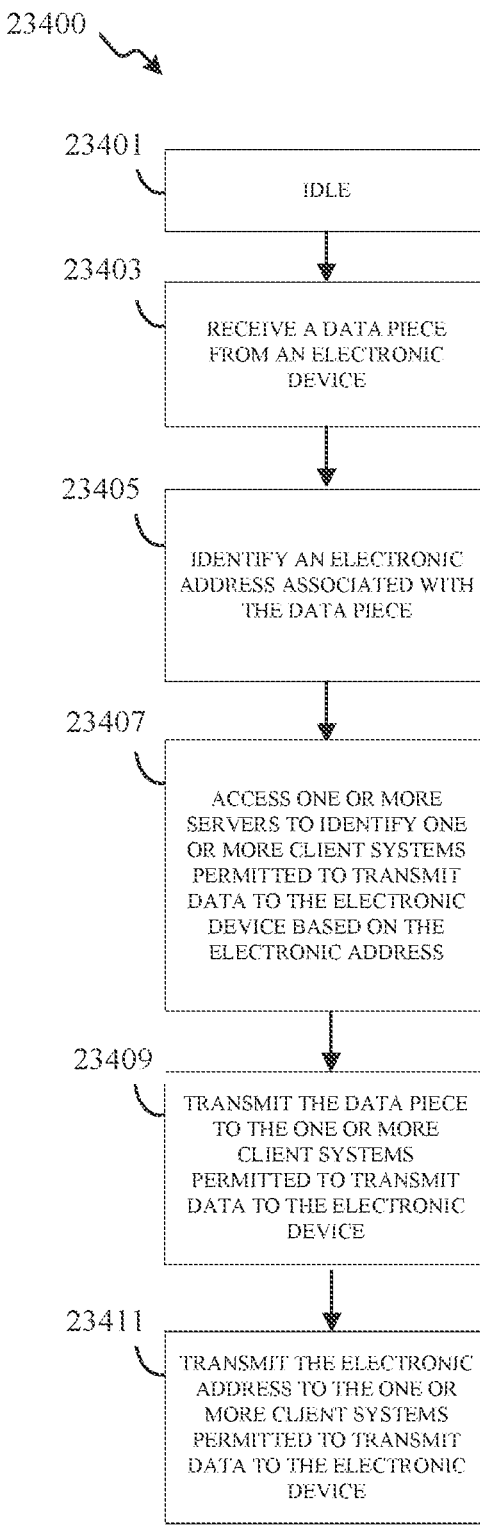
Figure 24:
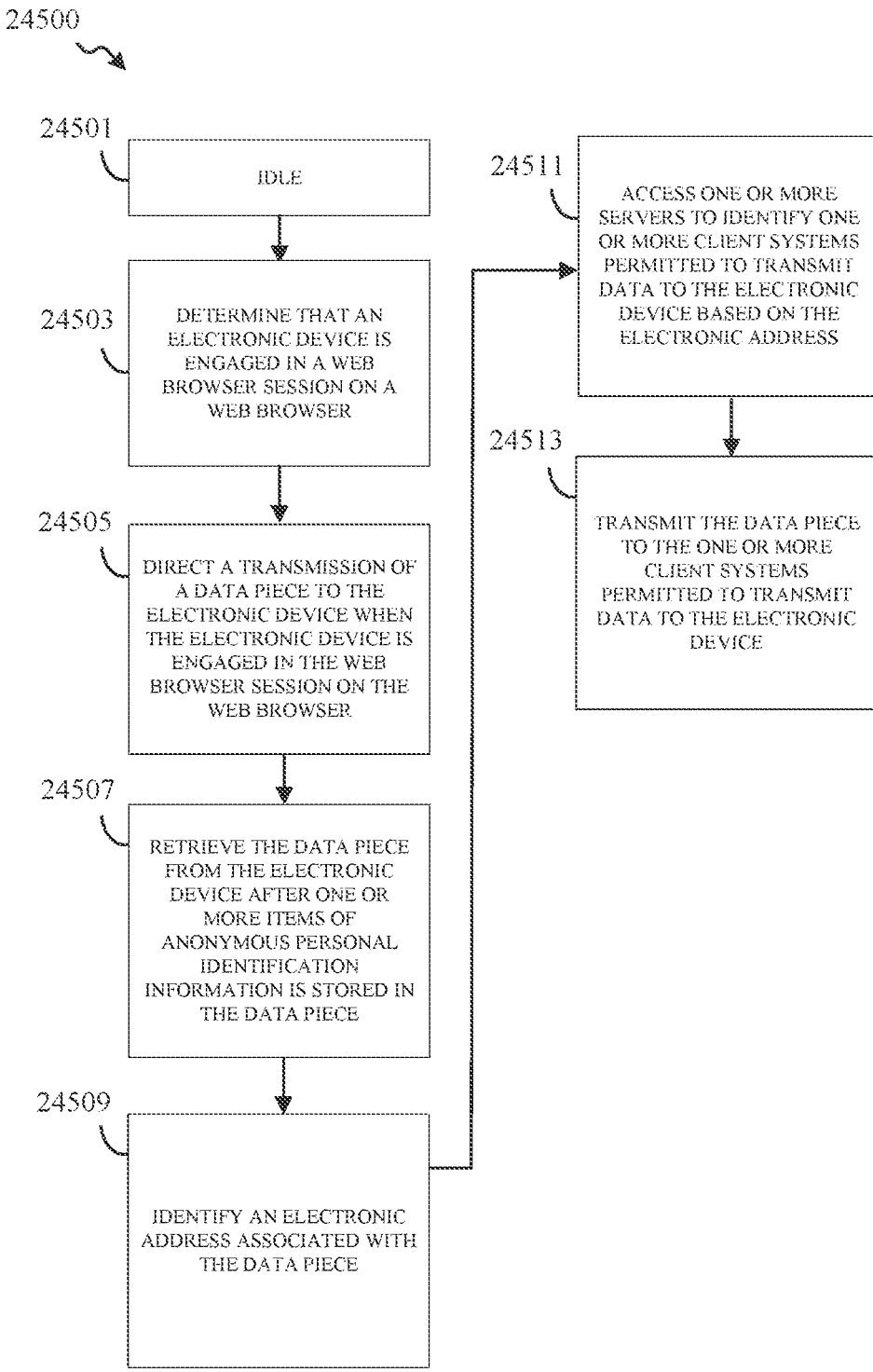
Figure 25:
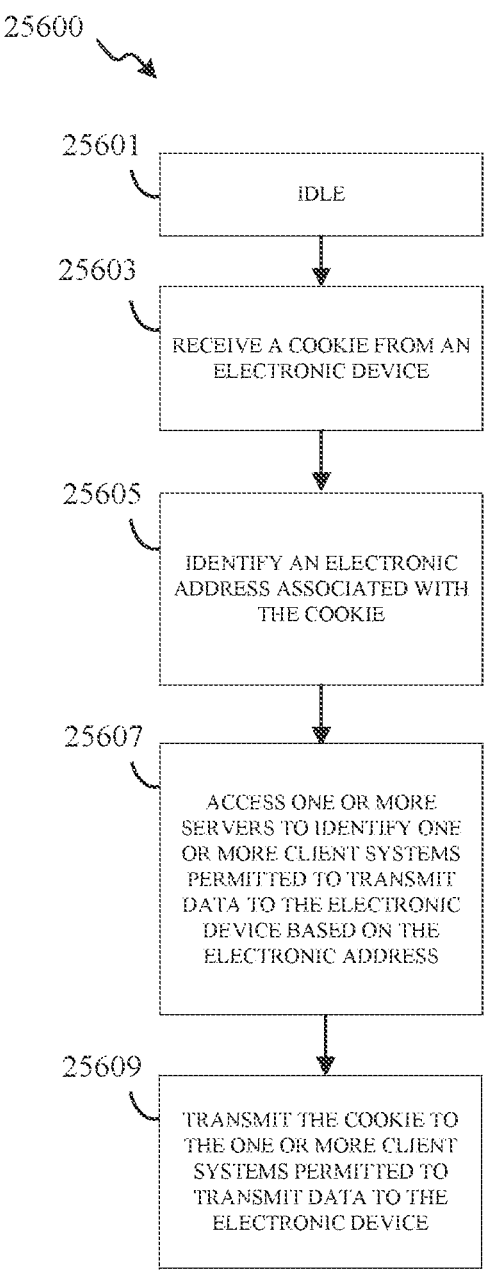

As shown in FIG. 29, the memory 9210 may include program instructions 9230, which may be processor-executable to implement any element, action, or operation including data piece transfer operations, as described herein. In certain embodiment, the program instructions may implement at least a portion of methods described herein, such as the methods illustrated by FIGS. 22-253-6. In other embodiments, different elements and data may be included. Note that the data storage 9235 may include any data or information, as described herein.

Those skilled in the art will appreciate that the computing system 8115 is merely illustrative and is not intended to limit the scope of embodiments. In particular, the computing system and devices may include any combination of hardware or software that can perform the indicated functions, including computers, network devices, Internet appliances, PDAs, wireless phones, pagers, GPUs, specialized computer systems, information handling apparatuses, or the like. The computing system 8115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 8115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 8115 may be transmitted to the computing system 8115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

As described herein, the computing system 8115, utilizing the at least one processor 9205, is configured to perform one or more data piece transfer operations. In certain embodiments, the computing system 8115, utilizing one or more processors 9205 determines that an electronic device 8110 has initiated an engagement in a web browser session with the web browser 8125 or that an electronic device 8110 has requested content from the web browser 8125. For example, the electronic device 8110 may be used to initiate a web browser session with a web browser 8125 and display content from the web browser 8125 on a display screen. The computing system 8115 utilizing the one or more processors 8125 may be configured to detect or determine that the electronic device 8110 has initiated an engagement into a web browser session with a web browser 8125, that the electronic device 8110 is engaged in a web browser session with a web browser 8125, or that an electronic device 8110 has requested content from the web browser 8125 while the electronic device 8110 is engaged in a web browser session with the web browser 8125. Upon engaging in the web browser session with the web browser 8125, the electronic device 8110 receives a data piece associated with the web browser 8125 and stores the data piece in a memory of electronic device 8110. The data piece received from the web browser 8125 and stored in the memory of electronic device 8110 includes an electronic address that is unique to the electronic device 8110. As described herein, an electronic address may include at least one of a MAC address, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email address, a postal address, a user ID, a gender, an age group, a user interest, or the like. In certain embodiments, each of the one or more items of anonymous personal identification information may include a hash value.

Subsequently, the computing system 8115 accesses one or more matrices stored in the data storage 9235 of the memory 9210. At least one matrix of the one or more matrices may be associated with one or more types of data piece blocking software that may be stored on the electronic device 8110. Additionally, or alternatively, at least one matrix of the one or more matrices may be associated with the web browser 8125 that the electronic device 8110 is engaged with. The computing system 8115 may identify a plurality of domains from a matrix that are associated with the web browser 8125 and determine which of those domains can transmit data pieces to the electronic device 8110 that are retrievable by the computing system 8115 during or after the web browser session between the electronic device 8110 and the web browser 8125.

In certain embodiments, the one or more electronic devices 8110 may store and execute data piece blocking software (e.g., anti-identification software, pop-up blocker software, advertisement (ad) blocker software). The data piece blocking software may flag or block specific strings of HTML code contained in certain data pieces or may flag or block data pieces associated with entire domains. The data piece blocking software may flag or block a data piece due to a specific string of HTML code contained in the data piece. Additionally, or alternatively, the data piece blocking software may block access to all data pieces from particular domains which are residing in the electronic device memory. In certain embodiments, the data piece blocking software may not flag or block particular data pieces due to a lack of a specific string of HTML code contained in the particular data pieces that would cause the data piece blocking software to block the particular data pieces. Additionally, or alternatively, the data piece blocking software may not block access to data pieces from particular domains which are residing in the electronic device memory.

When the computing system 8115 accesses the one or more matrices stored in the data storage 9235 of the memory 9210, the computing system 8115 or the web browser 8125 generates a data piece to be transmitted by the web browser 8125. The data piece is configured for storage in the memory of the electronic device 8110 and includes an electronic address and one or more items of anonymous personal identification information transmitted by the electronic device 8110 to the web browser 8125. Subsequently, the computing system 8115 may retrieve or receive the electronic address and the one or more items of anonymous personal identification information contained in the data piece stored in the memory of the electronic device 8110.

In certain embodiments, the computing system 8115, utilizing one or more processors 205 directs a transmission of a data piece to an electronic device 8110, when the electronic device 8110 is engaged in a web browser session on a web browser 8125, for storage in an electronic device memory. The data piece may be associated with a domain that is linked to or associated with the web browser 8125. In certain embodiments, a data piece may contain a first instruction to the electronic device 8110. The first instruction may identify one or more domains in a first domain order identified in the matrix and instruct the electronic device 8110 to initiate communication with those one or more domains. For example, after receiving the first instruction, the electronic device 8110 may initiate communication with or transmit one or more items of anonymous personal identification information to a first domain of the one or more domains in first domain order indicated in the first instruction. After initiating communication with or transmitting the one or more items of anonymous personal identification information to the first domain of the one or more domains from the first domain order, the data piece blocking software executed by the electronic device 8110 may block the reception of a data piece from the first domain of the one or more domains in the first domain order identified in the first instruction.

While the electronic device 8110 initiates communication with or transmits one or more items of anonymous personal identification information to the first domain of the first domain order or during or after (e.g., in response to) the data piece blocking software on the electronic device 8110 blocks the data piece from the first domain of the first domain order, the first instruction may instruct the electronic device 8110 to initiate communication with or transmit one or more items of anonymous personal identification information to a second domain of the one or more domains in the first domain order indicated in the first instruction. After initiating communication with or transmitting the one or more items of anonymous personal identification information to the second domain of the one or more domains from the first domain order, a data piece (e.g., generated by the computing system 8115, generated by the second domain) may be transmitted to the electronic device 8110 from the second domain and stored in a memory of the electronic device 8110. Subsequently, the computing system 8115 may attempt to retrieve (e.g., through the second domain) an electronic address and one or more item of anonymous personal identification information contained in the data piece from the second domain. During or after the computing system 8115 attempts to retrieve the electronic address and the one or more item of anonymous personal identification information stored in the data piece from the second domain, the data piece blocking software may block the retrieval of the electronic address and the one or more item of anonymous personal identification information stored in the data piece from the second domain.

While the electronic device 8110 initiates communication with or transmits one or more items of anonymous personal identification information to the second domain of the first domain order or during or after (e.g., in response to) the data piece blocking software on the electronic device 8110 blocks access to the data piece from the second domain of the first domain order, the first instruction may instruct the electronic device 8110 to initiate communication with or transmit one or more items of anonymous personal identification information to a third domain of the one or more domains in the first domain order indicated in the first instruction. After initiating communication with or transmitting the one or more items of anonymous personal identification information to the third domain of the one or more domains from the first domain order, a data piece (e.g., generated by the computing system 8115, generated by the third domain) may be transmitted to the electronic device 8110 from the third domain and stored in a memory of the electronic device 8110. Subsequently, the computing system 8115 may successfully retrieve (e.g., through the third domain) an electronic address and one or more item of anonymous personal identification information stored in the data piece from the third domain.

In certain embodiments, after the computing system 8115 successfully receives the electronic address and the one or more item of anonymous personal identification information stored in the data piece from a domain from the first domain order, the first instruction may instruct the electronic device 8110 to not transmit one or more item of anonymous personal identification information to another domain of the first domain order. In this case, a second instruction included in a data piece that was successfully received by computing system 8115 from the electronic device 8110 may instruct the electronic device 8110 to initiate communication with or transmit one or more item of anonymous personal identification information to one or more domains in a second domain order indicated in the second instruction, described herein.

Alternatively, the first instruction may instruct the electronic device 8110 to initiate communication with or transmit one or more item of anonymous personal identification information to all of the domains of the first domain order indicated by the first instruction before initiating instructions contained in a data piece from a domain of the first domain order. For example, while the electronic device 8110 communicates with or transmits one or more item of anonymous personal identification information to the third domain of the first domain order or during or after (e.g., in response to) the computing system 8115 receives a data piece from the third domain of the first domain order, the first instruction may instruct the electronic device 8110 to initiate communication with or transmit one or more items of anonymous personal identification information to a fourth domain of the one or more domains in the first domain order indicated in the first instruction. After initiating communication with or transmitting the one or more items of anonymous personal identification information to the fourth domain of the one or more domains from the first domain order, a data piece (e.g., generated by the computing system 8115, generated by the fourth domain) may be transmitted to the electronic device 8110 from the fourth domain and stored in a memory of the electronic device 8110. Subsequently, the computing system 8115 may successfully retrieve (e.g., through the fourth domain) an electronic address and one or more item of anonymous personal identification information stored in the data piece from the fourth domain.

The first instruction may cause the electronic device 8110 to initiate communication with or transmit one or more items of anonymous personal identification information to each domain of the one or more domains from the first domain order identified in the first instruction. Thus, the computing system 8115 may be able to retrieve, from an electronic device 8110, an electronic address and one or more items of anonymous personal identification information stored in data pieces from one or more domains of the first domain order that are not blocked from storing data pieces in the memory of the electronic device 8110 by data piece blocking software. Additionally, or alternatively, the computing system 8115 may be able to retrieve, from an electronic device 8110, an electronic address and one or more items of anonymous personal identification information stored in data pieces from one or more domains of the first domain order that are not blocked by data piece blocking software from being access from the memory of the electronic device 8110. In certain embodiments, upon receiving an electronic address and one or more items of anonymous personal identification information from at least one domain of the one or more domains from the first domain order identified by the first instruction, the computing system 8115 may determine which domains provided data pieces that are blocked and that are not blocked by data piece blocking software on the electronic device 8110. The computing system 8115 may designate a matrix for the data piece blocking software or the electronic device 8115 and indicate (e.g., record a notation in the matrix) which domains are blocked and not blocked by the electronic device 8110 or the data piece blocking software executed on the electronic device 8110.

In certain embodiments, a data piece transmitted to an electronic device 8110 through a domain of the one or more domains in the first order domain and stored in a memory of the electronic device 8110 may contain a second instruction. The second instruction may identify one or more domains in a second order domain and instruct the electronic device 8110 to initiate communication with those one or more domains. For example, a data piece from a domain of the first order domain may not have been blocked by data piece blocking software and thus may be stored in a memory of an electronic device 8110. In certain embodiments, access to the data piece, after the data piece is stored in the memory of the electronic device 8110, may not be blocked by data piece blocking software and thus may be accessible by a processor of the electronic device 8110 or the computing system 8115. The data piece from the domain of the first domain order may contain a second instruction.

After receiving the second instruction, the electronic device 8110 may process the second instruction and initiate communication with or transmit one or more items of anonymous personal identification information to a first domain of one or more domains in the second domain order indicated in the second instruction. After initiating communication with or transmitting the one or more items of anonymous personal identification information to the first domain of the one or more domains from the second domain order, the data piece blocking software executed by the electronic device 8110 may block the reception of a data piece from the first domain of the second domain order identified in the second instruction.

While the electronic device 8110 communicates with or transmits one or more items of anonymous personal identification information to the first domain of the second domain order or during or after (e.g., in response to) the data piece blocking software on the electronic device 8110 blocks the data piece from the first domain of the second domain order, the second instruction may instruct the electronic device 8110 to initiate communication with or transmit one or more items of anonymous personal identification information to a second domain of the one or more domains in the second domain order indicated in the second instruction. After initiating communication with or transmitting the one or more items of anonymous personal identification information to the second domain of the one or more domains from the second domain order, a data piece (e.g., generated by the computing system 8115, generated by the second domain) may be transmitted to the electronic device 8110 from the second domain and stored in a memory of the electronic device 8110. Subsequently, the computing system 8115 may attempt to retrieve (e.g., through the second domain) an electronic address and one or more item of anonymous personal identification information contained in the data piece from the second domain. During or after the computing system 8115 attempts to retrieve the electronic address and the one or more item of anonymous personal identification information stored in the data piece from the second domain, the data piece blocking software may block the retrieval of the electronic address and the one or more item of anonymous personal identification information stored in the data piece from the second domain.

While the electronic device 8110 communicates with or transmits one or more items of anonymous personal identification information to the second domain of the second domain order or during or after (e.g., in response to) the data piece blocking software on the electronic device 8110 blocks access to the data piece from the second domain of the second domain order, the second instruction may instruct the electronic device 8110 to initiate communication with or transmit one or more items of anonymous personal identification information to a third domain of the one or more domains in the second domain order indicated in the second instruction. After initiating communication with or transmitting the one or more items of anonymous personal identification information to the third domain of the one or more domains from the second domain order, a data piece (e.g., generated by the computing system 8115, generated by the third domain) may be transmitted to the electronic device 8110 from the third domain and stored in a memory of the electronic device 8110. Subsequently, the computing system 8115 may successfully retrieve (e.g., through the third domain) an electronic address and one or more item of anonymous personal identification information stored in the data piece from the third domain.

In certain embodiments, after the computing system 8115 successfully receives the electronic address and the one or more item of anonymous personal identification information stored in the data piece from a domain from the second domain order, the second instruction may instruct the electronic device 8110 to not initiate communication with or not transmit one or more item of anonymous personal identification information to another domain of the second domain order. In this case, a third instruction included in a data piece that was successfully received by computing system 8115 may instruct the electronic device to initiate communication with or transmit one or more item of anonymous personal identification information to one or more domains in a third domain order indicated in the third instruction.

Alternatively, the second instruction may instruct the electronic device 8110 to initiate communication with or transmit one or more item of anonymous personal identification information to all of the domains of the second domain order indicated by the second instruction before initiating the instructions contained in a data piece from a domain of the second domain order. For example, while the electronic device 8110 communicates with or transmits one or more items of anonymous personal identification information to the third domain of the second domain order or during or after (e.g., in response to) the computing system 8115 receives the data piece from the third domain of the second domain order, the second instruction may instruct the electronic device 8110 to initiate communication with or transmit one or more items of anonymous personal identification information to a fourth domain of the one or more domains in the second domain order indicated in the second instruction. After initiating communication with or transmitting the one or more items of anonymous personal identification information to the fourth domain of the one or more domains from the second domain order, a data piece (e.g., generated by the computing system 8115, generated by the fourth domain) may be transmitted to the electronic device 8110 from the fourth domain and stored in a memory of the electronic device 8110. Subsequently, the computing system 8115 may successfully retrieve (e.g., through the fourth domain) the electronic address and the one or more item of anonymous personal identification information stored in the data piece from the fourth domain.

As described herein, the second instruction may cause the electronic device 8110 to initiate communication with or transmit one or more items of anonymous personal identification information to each domain of the one or more domains from the second domain order identified in the second instruction. Thus, the computing system 8115 may be able to retrieve, from an electronic device 8110, an electronic address and one or more items of anonymous personal identification information stored in data pieces from one or more domains of the second domain order that are not blocked from storing data pieces in the memory of the electronic device 8110 by data piece blocking software. Additionally, or alternatively, the computing system 8115 may be able to retrieve, from an electronic device 8110, an electronic address and one or more items of anonymous personal identification information stored in data pieces from one or more domains of the second domain order that are not blocked by data piece blocking software from being access from the memory of the electronic device 8110.

In certain embodiments, upon receiving an electronic address and one or more items of anonymous personal identification information from at least one domain of the one or more domains from the second domain order identified by the first instruction, the computing system 8115 may determine which domains provided data pieces that are blocked and that are not blocked by data piece blocking software on the electronic device 8110. The computing system 8115 may use the designated matrix for the data piece blocking software or the electronic device 8115 and indicate (e.g., record a notation in the matrix) which domains are blocked and not blocked by the electronic device 8110 or the data piece blocking software executed on the electronic device 8110. The electronic device 8110 may receive data pieces from a plurality of domains in a plurality of domain orders from a third domain order, to a fourth domain order, to an Nth domain order.

The computing system 8115, utilizing one or more processors 205, is configured to receive a data piece containing one or more items of anonymous personal identification information from an electronic device 8110. In certain embodiments, after the data pieces are transmitted to the electronic device 8110 and stored in the memory of electronic device 8110, the computing system 8115 attempts to retrieve or receive each of the data pieces stored in the memory of electronic device 8110 (e.g., through each of the domains). In certain embodiments, the computing system 8115 attempts to retrieve or receive each of the data pieces stored in the memory electronic device 8110 regardless of whether the electronic device 8110 has transmitted one or more items of anonymous personal identification information to the web browser 8125. For example, after the computing system 8115 has transmitted each of the data pieces through the domains to the electronic device 8110 for storage in the memory of electronic device 8110, the computing system 8115 initiates a retrieval test to determine which, if any, data pieces the computing system 8110 is able to retrieve. The retrieval test may allow the computing system 8115 to determine which data pieces are not retrievable from the memory of electronic device 8110 due to data piece blocking software and what data pieces are retrievable from the memory of the device 8110. The retrieval test may be performed by attempting to retrieve an electronic address contained in each of the data pieces. Thus, the computing system 8115 may determine which data pieces can be retrieved from the memory of electronic device 8110 and which data pieces cannot be retrieved from the memory of the electronic device 8110 regardless of whether the electronic device 8110 has transmitted one or more items of anonymous personal identification information to the web browser 8125. Subsequently, the computing system 8115 may seek to retrieve or receive from the memory of electronic device 8110 only those data pieces determined to be retrievable by the retrieval test for storage of an electronic address and one or more items of anonymous personal identification information for storage in the server 8120.

In certain embodiments, the computing system 8115 attempts to retrieve each of the data pieces stored in the memory of electronic device 8110 after the electronic device 8110 has transmitted one or more items of anonymous personal identification information to the web browser 8125 (e.g., through each of the domains). For example, after the computing system 8115 has transmitted each of the data pieces to the electronic device 8110 for storage in the memory of electronic device 8110 and after the electronic device 8110 has transmitted one or more items of anonymous personal identification information to the web browser 8125 during the web browser session, the computing system 8115 initiates data piece retrieval to retrieve the data pieces associated with the each of the domains from a matrix and stored in the memory of electronic device 8110. In response to initiating the data piece retrieval, the computing system 8115 retrieves only some of the data pieces previously stored in the memory of electronic device 8110. Based on determining which data pieces have been retrieved and which data pieces have not been retrieved, the computing system 8115 determines which, if any, data pieces the computing system 8110 is able to retrieve. Subsequently, the computing system 8115 may seek to retrieve from the memory of the electronic device 8110 only those data pieces determined to be retrievable and containing subsequently transmitted electronic addresses and items of anonymous personal identification information for storage in the server 8120.

After (e.g., in response to) determining which data pieces can be retrieved from the memory of the electronic device 8110 and which data pieces cannot be retrieved from the memory of the electronic device 8110, the computing system 8115 marks each of the domains in the matrix that are associated with data pieces that cannot be retrieved and links each of the domains in the matrix into one or more chains of data pieces that can provide retrievable data pieces from the memory of electronic device 8110 by the computing system 8115.

In certain embodiments, domains that are linked to the web browser 8125 and thus the computing system 8115 may be domains that transmit data pieces containing instructions that direct an electronic device 8110 to initiate communication with or transmit one or more items of anonymous personal identification information to a domain in an order domain. In certain embodiments, domains that are linked to the web browser 8125 and thus the computing system 8115 may be domains that provide data pieces that are retrievable by the computing system 8115 when those data pieces are stored in a memory of the electronic device 8110. In certain embodiments, domains and a web browser 8125 that are linked to the computing system 8115 may be domains and a web browser that each transmits data pieces generated by the computing system 8115 including instructions as described herein.

In certain embodiments, the computing system 8115, utilizing one or more processors 9205 retrieves the data pieces determined to be retrievable by the computing system 8115 from the memory of the electronic device 8110. The data pieces retrieved by the computing system 8115 include an electronic address and one or more items of anonymous personal identification information provided by the electronic device 8110 during the web browser session with the web browser 8115. Thus, upon receiving a data piece, the computing system 8115 may identify an electronic address contained in the data piece and associate that electronic address with the received data piece.

In some embodiments, the electronic device 8110 will not be storing data piece blocking software and thus all data pieces stored on the memory of the electronic device 8110 by the computing system 8115 are retrievable and thus retrieved by the computing system 8115. In some embodiments, some data pieces generated by the computing system 8115 and stored in the memory of electronic device 8110 may not be retrievable by the computing system 8115 from the memory of electronic device 8110 due to data piece blocking software stored and executed on electronic device 8110. In some embodiments, all data pieces generated by the computing system 8115 and stored in the memory of the electronic device 8110 may not be retrieval by the computing system 8115 from the memory of electronic device 8110 due to data piece blocking software stored in the memory of the electronic device 8110.

In certain embodiments, the computing system 8115, utilizing the at least one processor 9205, stores the electronic address and the one or more items of anonymous personal identification information from the retrieved data pieces in user profiles on the one or more servers 8120. In certain embodiments, the computing system 8115 stores the electronic address and the one or more items of anonymous personal identification information from the retrieved data pieces in one or more user profile previously created and stored on the one or more servers 8120.

For example, the computing system 8115 may have previously generated one or more user profiles each containing at least one of an electronic address or one or more items of anonymous personal identification information provided in a previously obtained data piece. When the computing system 8115 receives the retrieved data pieces each containing an electronic address and one or more items of anonymous personal identification information, the computing system 8115 may match at least one of the electronic address or at least one of the one or more items of anonymous personal identification information from a retrieved data piece with at least one of the electronic address or at least one of the one or more items of anonymous personal identification information stored in a user profile. When the computing system 8115 identifies a match, the computing system 8115 may store the electronic address and the one or more items anonymous personal identification information from the retrieved data piece in the user profile in the servers 8120. In certain embodiments, when the computing system 8115 matches an item of anonymous personal identification information from a received data piece with an item of anonymous personal identification information stored in a user profile, the computing system 8115 may associate an electronic address stored in the user profile with the received data piece.

In certain embodiments, the computing system 8115, utilizing the at least one processor 9205, stores electronic device identification and the one or more items of anonymous personal identity information from the received data pieces in newly created user profiles stored in the one or more servers 8120. For example, the computing system 8115 may search through the server 8120 to identify (e.g., find, locate) user profiles containing at least one of an electronic address or one of one or more items of anonymous personal identification information that matches at least one of the electronic address or one of the one or more items of anonymous personal identification information contained in a retrieved data piece. After searching through the server 8120, the computing system 8115 may determine that no match exists between at least one of the electronic address or one of the one or more items of anonymous personal identification information contained in the retrieved data piece and at least one of an electronic address or one of one or more items of anonymous personal identification information contained in a user profile of the one or more servers 8120. In response, the computing system 8115 may create a new user profile in the server 8120 and store the electronic address and the one or more items of anonymous personal identification information from the retrieved data piece in the newly created user profile.

In certain embodiments, the computing system 8115, utilizing the at least one processor 9205, stores an additional data piece in the user profile in the server 8120 after the computing system 8110 has stored retrieved data piece in the same user profile. For example, in response to matching at least one item of the one or more items of anonymous personal identification information from the retrieved data piece with one or more items of anonymous personal identification information from an additional data piece, the computing system 8115 may store the additional data piece in the user profile in the server 8120. The additional data piece may have been obtained from one or more other servers (e.g., not the one or more servers 8120) or from another data piece retrieved from another electronic device 8110.

In certain embodiments, the data pieces generated by the computing system 8115 and retrieved from the electronic device 8110 may include a cookie. A cookie (e.g., an HTTP cookie, a web cookie, an Internet cookie, a browser cookie) is a piece of data sent from a website and stored on a memory of an electronic device 8110 by a web browser of the electronic device 8110 while the electronic device is engaged in a browser session. In certain embodiments, the computing system 8115, utilizing the at least one processor 9205, maps or associates electronic addresses from a cookie to an open-source software footprint. An open-source software footprint may be a unique set of traceable digital activities, actions, contributions, or communications that are manifested in open-source code on the internet or on electronic devices. The electronic device 8110 may transmit one or more items of anonymous personal identification information to the web browser 8125 during a browser session. The one or more items of anonymous personal identification information transmitted from the electronic device 8110 includes an open-source software footprint that is unique to the electronic device 8110 or that provides the computing system 8115 with an acceptable level of certainty that the specific electronic device 8110 is transmitting the one or more items of anonymous personal identification information.

When the electronic device 8110 transmits the one or more items of anonymous personal identification information to the web browser 8125, the one or more items of anonymous personal identification information may also be stored in each of the cookies stored in the memory of the electronic device 8110 and associated with domains from a matrix. While the transmitted one or more items of anonymous personal identification information may not include an electronic address, each of the cookies associated with the domains from the matrix includes the electronic address. In addition, the one or more items of anonymous personal identification information stored in each of the cookies associated with the domains in the matrix may also include the open-source software footprint. Thus, when the computing system 8115 retrieves a cookie associated with a domain in the matrix from the memory of the electronic device 8110, the computing system 8115 maps or associates the open-source software footprint from the retrieved cookie to the electronic address from the retrieved cookie. Accordingly, the computing system 8115 maps or associates the open-source software footprint with the specific electronic device 8110.

In certain embodiments, the computing system 8115, utilizing the at least one processor 9205, retrieves an item of personal identification information that is attached to the open-source software footprint. For example, after the computing system 8115 has mapped or associated the open-source software footprint from the retrieved cookie to the electronic address from the retrieved cookie and the computing system 8115 has stored the electronic address and the one or more items of anonymous personal identification information from the retrieved cookie in the user profile in the server 8120, the electronic device 8110 may engage in a subsequent web browser session with a web browser 8125 (e.g., the same web browser, another web browser). During the subsequent web browser session, the electronic device 8110 may transmit one or more items of anonymous personal identification information to the web browser 8125. The one or more items of anonymous personal notification information transmitted to the web browser 8125 during the subsequent web browser session may be different items of anonymous personal identification information from the one or more items of anonymous personal identification information transmitted the web browser during the initial web browser session.

The one or more items of anonymous personal identification information transmitted from the electronic device 8110 during the subsequent web browser session may include the opensource software footprint. The computing system 8115 may intercept, receive, or retrieve the transmitted one or more items of anonymous personal identification information transmitted from the electronic device 8110 during the subsequent web browser session and identify that the one or more items of anonymous personal identification information includes the open-source software footprint. The computing system 8115 may then map or associate the one or more items of anonymous personal identification information transmitted by the electronic device 8110 during the subsequent web browser session with the previously provided electronic address from the retrieved cookie based on the open-source software footprint. Based on mapping the electronic address with the open-source software footprint during the initial web browser session, the computing system 8115 may identify that the electronic device 8110 is the source of the one or more items of anonymous personal identification information transmitted during the subsequent web browser session without relying on a cookie.

In certain embodiments, the computing system 8115, utilizing the at least one processor 9205, stores the one or more items of anonymous personal identification information in the user profile in the server 8120 based on the attached open-source software footprint. In certain embodiments, the computing system 8115 stores the one or more items of anonymous personal identification information transmitted during the subsequent browser session in the user profile in the server 120 based on the attached open-source software footprint. For example, the computing system 115 may have determined that the one or more items of anonymous personal identification information transmitted during the subsequent web browser session is associated with the electronic device 8110 that stored the retrieved cookie from the initial web browser session. The computing system 8115 may store the one or more items of anonymous personal identification information in the same user profile that contains the electronic address and the one or more items of anonymous personal identification information contained in the retrieved cookie from the initial web browser session based on mapping or associating the open-source software footprint attached to the one or more items of anonymous personal identification information obtained during the subsequent web browser session with the electronic address stored in the user profile in the server 8120. Accordingly, the computing system 8115 may store items of anonymous personal identification information in user profiles associated with specific electronic devices 8110 without relying on the ability of the computing system to retrieve cookies stored in the memories of the electronic devices 8110.

In certain embodiments, the computing system 8115, utilizing the at least one processor 9205, accesses one or more servers to identify one or more client systems permitted to transmit data to the electronic device based on the electronic address. In certain embodiments, the one or more servers 8120 may store a list of each of the one or more client systems 8130 and one or more contractual permissions or contractual prohibitions for each of the one or more client system 8130 with one or more other client systems 8130. For example, the one or more servers 8120 may include a list of a plurality of client systems 8130 including a first client system, a second client system, and a third client system. In the list of the plurality of client systems 8130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 8110. Conversely, in the list of the plurality of client systems 8130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece from the first electronic address or a data piece received through the first domain. Additionally, or alternatively, using the one or more servers 8120, the computing system 8115 may determine, based on the first electronic address or receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece from the first electronic address or a data piece received through the first domain. Additionally, or alternatively, using the one or more servers 8120, the computing system 8115 may determine, based on the first electronic address or receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 8115 may transmit a received data piece containing the first electronic address or a received data piece that was received through the first domain to the first client system because the first client is contractually permitted to receive or is not contractually prohibited from receiving the data piece.

In certain embodiments, the computing system 8115, using the one or more servers 8120, may also determine that the third client system is not contractually permitted to receive or is contractually prohibited from receiving a data piece from the first electronic address or a data piece received through the first domain. Additionally, or alternatively, using the one or more servers 8120, the computing system 8115 may determine, based on the first electronic address or the first domain, that the third client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 8115 may transmit a received data piece containing the first electronic address or a received data piece that was received through the first domain to the first client system because the first client system is contractually permitted to receive or is not contractually prohibited from receiving the data piece.

In certain embodiments, the one or more servers 8120 may also contain a list of each of the one or more client systems 8130 and one or more contractual permissions or contractual prohibitions for each of the one or more client system 8130 with one or more domains. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from data pieces stored on an electronic device 8110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 8110.

Conversely, in the list of the plurality of client systems 8130, the first client system may have contractual permission to receive or may not have contractual prohibition from receiving electronic addresses and items of anonymous personal identification information from data pieces stored on an electronic device 8110 from a second domain. However, the second client system may not have contractual permission to receive or may have contractual prohibition from receiving electronic addresses and items of anonymous personal identification information from data pieces stored on an electronic device 8110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 8110 while the second client system may not be contractually permitted to use or may be contractually prohibited from using the received electronic addresses and items of anonymous personal identification information from the second domain or contained in data pieces from the second domain to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece through the first domain. Additionally, or alternatively, using the one or more servers 8120, the computing system 8115 may determine, based on receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece received through the first domain. Additionally, or alternatively, using the one or more servers 8120, the computing system 8115 may determine, based on receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece that was received through the first domain to the second client system because the first client system and the second client system are contractually permitted to share or are not contractually prohibited from sharing data pieces received by the other. In certain embodiments, the computing system 8115 may transmit a received data piece that was received through the first domain to the first client system because the first client system is contractually permitted to receive or is not contractually prohibited from receiving the data piece.

In certain embodiments, the computing system 8115, using the one or more servers 8120, may also determine that the third client system is not contractually permitted to receive or is contractually prohibited from receiving a data piece from received through the first domain. Additionally, or alternatively, using the one or more servers 8120, the computing system 8115 may determine, based on receiving the data piece through the first domain, that the third client system is not contractually permitted to transmit or is contractually prohibited from transmitting content to an electronic device associated with the first electronic address and that is based on the received one or more items of anonymous personal identification information contained in the data piece. In certain embodiments, the computing system 8115 may transmit a received data piece that was received through the first domain to the first client system because the first client system is contractually permitted to receive or is not contractually prohibited from receiving the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece that was received through the first domain to the second client system because the first client system and the third client system are not contractually permitted to share or are contractually prohibited from sharing data pieces received by the other.

In certain embodiments, the one or more servers 8120 may also contain a list of each of the one or more client systems 8130 that indicates one or more electronic device 8110 that have given electronic permission to receive content from that client system 8130. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from a first electronic device 8110. Accordingly, both the first client system and the second client system may each be contractually permitted to use or may each not be contractually prohibited from using the received electronic addresses and items of anonymous personal identification information from the first electronic device to transmit content to electronic devices 8110 (e.g., the first electronic device). Conversely, in the list of the plurality of client systems 8130, the first client system may have contractual permission to receive or may not have contractual prohibition from receiving electronic addresses and items of anonymous personal identification information from a second electronic device 8110. However, the second client system may not have contractual permission to receive or may have contractual prohibition from receiving electronic addresses and items of anonymous personal identification information from the second electronic device 8110. Accordingly, the first client system may be contractually permitted to use or may not be contractually prohibited from using the received electronic addresses and items of anonymous personal identification information from the second electronic device 8110 to transmit content to electronic devices 8110 while the second client system may not be contractually permitted to use or may be contractually prohibited from using the received electronic addresses and items of anonymous personal identification information from the second electronic device 8110 to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece from the first electronic address. Additionally, or alternatively, using the one or more servers 8120, the computing system 8115 may determine, based on the first electronic address, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece from the first electronic address. Additionally, or alternatively, using the one or more servers 8120, the computing system 8115 may determine, based on the first electronic address, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 8115 may transmit a received data piece containing the first electronic address or a received data piece that was received through the first domain to the first client system because the first client system is contractually permitted or is not contractually prohibited from receiving the data piece.

In certain embodiments, the computing system 8115, using the one or more servers 8120, may also determine that the third client system is not contractually permitted to receive or is contractually prohibited from receiving a data piece from the first electronic address. Additionally, or alternatively, using the one or more servers 8120, the computing system 8115 may determine, based on the first electronic address, that the third client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 8115 may transmit a received data piece containing the first electronic address to the first client system because the first client system is contractually permitted to receive or is not contractually prohibited from receiving the data piece.

It should be understood that the computing system 8115, utilizing the at least one processor 9205, is configured to contemporaneously and continuously receive millions or billions of data pieces from millions of electronic device 8110. Each data piece may contain a plurality of items of anonymous personal identification information. The computing system 8115, utilizing the at least one processor 9205, is also configured to contemporaneously and continuously identify electronic addresses associated with each of the millions or billions of data pieces. The computing system 8115, utilizing the at least one processor 9205, is further configured to contemporaneously and continuously access one or more servers 8120 to identify one or more client system 8130 of a plurality of client systems 8130 permitted to transmit data to the electronic device based on the electronic address. In addition, the computing system, utilizing the at least one processor 9205, is configured to contemporaneously and continuously transmit the data piece to the one or more client systems 8130 permitted to transmit data to the electronic device 8110. Thus, the computing system 8115, utilizing the at least one processor 8205, gathers electronic addresses and items of anonymous personal identification information continuously and contemporaneously in real time determines which client systems are permitted to receive the electronic addresses and items of anonymous personal identification information, and transmit the most up-to-date information to the client systems and accordingly cannot be performed by human interaction.

FIG. 322 illustrates a method 22300 implemented by the computing system 8115, utilizing the at least one processor 9205, for performing data piece transfer operations according to certain embodiments of this disclosure. Although certain details will be provided with reference to the method 22300 of FIG. 322, it should be understood that other embodiments may include more, less, or different method steps. At step 22301, the computing system 8115 is in an idle state at least with respect to performing data piece transfer operations. At step 22303, the computing system 8115 receives a data piece from an electronic device 8110. The data piece may include one or more items of anonymous personal identification information. In certain embodiments, the one or more items of anonymous personal identification information may include at least one of an email address, a postal address, a user ID, a gender, an age group, a user interest, or the like.

In certain embodiments, after the data pieces are transmitted to the electronic device 8110 and stored in the memory of electronic device 8110, the computing system 8115 attempts to retrieve or receive each of the data pieces stored in the memory of electronic device 8110 (e.g., through each of the domains). In certain embodiments, the computing system 8115 attempts to retrieve or receive each of the data pieces stored in the memory electronic device 8110 regardless of whether the electronic device 8110 has transmitted one or more items of anonymous personal identification information to the web browser 8125. For example, after the computing system 8115 has transmitted each of the data pieces through the domains to the electronic device 8110 for storage in the memory of electronic device 8110, the computing system 8115 initiates a retrieval test to determine which, if any, data pieces the computing system 8110 is able to retrieve. The retrieval test may allow the computing system 8115 to determine which data pieces are not retrievable from the memory of electronic device 8110 due to data piece blocking software and what data pieces are retrievable from the memory of the device 8110. The retrieval test may be performed by attempting to retrieve an electronic address contained in each of the data pieces. Thus, the computing system 8115 may determine which data pieces can be retrieved from the memory of electronic device 8110 and which data pieces cannot be retrieved from the memory of the electronic device 8110 regardless of whether the electronic device 8110 has transmitted one or more items of anonymous personal identification information to the web browser 8125. Subsequently, the computing system 8115 may seek to retrieve or receive from the memory of electronic device 8110 only those data pieces determined to be retrievable by the retrieval test for storage of an electronic address and one or more items of anonymous personal identification information for storage in the server 8120.

In certain embodiments, the computing system 8115 attempts to retrieve each of the data pieces stored in the memory of electronic device 8110 after the electronic device 8110 has transmitted one or more items of anonymous personal identification information to the web browser 8125 (e.g., through each of the domains). For example, after the computing system 8115 has transmitted each of the data pieces to the electronic device 8110 for storage in the memory of electronic device 8110 and after the electronic device 8110 has transmitted one or more items of anonymous personal identification information to the web browser 8125 during the web browser session, the computing system 8115 initiates data piece retrieval to retrieve the data pieces associated with the each of the domains from a matrix and stored in the memory of electronic device 8110. In response to initiating the data piece retrieval, the computing system 8115 retrieves only some of the data pieces previously stored in the memory of electronic device 8110. Based on determining which data pieces have been retrieved and which data pieces have not been retrieved, the computing system 8115 determines which, if any, data pieces the computing system 8110 is able to retrieve. Subsequently, the computing system 8115 may seek to retrieve from the memory of the electronic device 8110 only those data pieces determined to be retrievable and containing subsequently transmitted electronic addresses and items of anonymous personal identification information for storage in the server 8120.

At step 22305, the computing system 8115 identifies an electronic address associated with the data piece. The electronic address may be contained in the received data piece. Additionally, or alternatively, the electronic address may contain in a user profile that has an item of anonymous personal identification information that matches an item of anonymous personal identification information contained in a received data piece. In certain embodiments, the electronic address includes at least one of a MAC address, an IMEI number, an electronic device serial number, a pointer associated with a data port of the electronic device, a combination thereof, or the like.

At step 22307, the computing system 8115 accesses one or more servers to identify one or more client systems permitted to transmit data to the electronic device based on the electronic address. In certain embodiments, the one or more servers 8120 may store a list of each of the one or more client systems 8130 and one or more contractual permissions or contractual prohibitions for each of the one or more client system 8130 with one or more other client systems 8130. For example, the one or more servers 8120 may include a list of a plurality of client systems 8130 including a first client system, a second client system, and a third client system. In the list of the plurality of client systems 8130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 8110. Conversely, in the list of the plurality of client systems 8130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece from the first electronic address or a data piece received through the first domain. Additionally, or alternatively, using the one or more servers 8120, the computing system 8115 may determine, based on the first electronic address or receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece from the first electronic address or a data piece received through the first domain. Additionally, or alternatively, using the one or more servers 8120, the computing system 8115 may determine, based on the first electronic address or receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 8115 may transmit a received data piece containing the first electronic address or a received data piece that was received through the first domain to the first client system because the first client is contractually permitted to receive or is not contractually prohibited from receiving the data piece.

In certain embodiments, the computing system 8115, using the one or more servers 8120, may also determine that the third client system is not contractually permitted to receive or is contractually prohibited from receiving a data piece from the first electronic address or a data piece received through the first domain. Additionally, or alternatively, using the one or more servers 8120, the computing system 8115 may determine, based on the first electronic address or the first domain, that the third client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 8115 may transmit a received data piece containing the first electronic address or a received data piece that was received through the first domain to the first client system because the first client system is contractually permitted to receive or is not contractually prohibited from receiving the data piece.

In certain embodiments, the one or more servers 8120 may also contain a list of each of the one or more client systems 8130 and one or more contractual permissions or contractual prohibitions for each of the one or more client system 8130 with one or more domains. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from data pieces stored on an electronic device 8110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 8110.

Conversely, in the list of the plurality of client systems 8130, the first client system may have contractual permission to receive or may not have contractual prohibition from receiving electronic addresses and items of anonymous personal identification information from data pieces stored on an electronic device 8110 from a second domain. However, the second client system may not have contractual permission to receive or may have contractual prohibition from receiving electronic addresses and items of anonymous personal identification information from data pieces stored on an electronic device 8110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 8110 while the second client system may not be contractually permitted to use or may be contractually prohibited from using the received electronic addresses and items of anonymous personal identification information from the second domain or contained in data pieces from the second domain to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece through the first domain. Additionally, or alternatively, using the one or more servers 8120, the computing system 8115 may determine, based on receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece received through the first domain. Additionally, or alternatively, using the one or more servers 8120, the computing system 8115 may determine, based on receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece that was received through the first domain to the second client system because the first client system and the second client system are contractually permitted to share or are not contractually prohibited from sharing data pieces received by the other. In certain embodiments, the computing system 8115 may transmit a received data piece that was received through the first domain to the first client system because the first client system is contractually permitted to receive or is not contractually prohibited from receiving the data piece.

In certain embodiments, the computing system 8115, using the one or more servers 8120, may also determine that the third client system is not contractually permitted to receive or is contractually prohibited from receiving a data piece from received through the first domain. Additionally, or alternatively, using the one or more servers 8120, the computing system 8115 may determine, based on receiving the data piece through the first domain, that the third client system is not contractually permitted to transmit or is contractually prohibited from transmitting content to an electronic device associated with the first electronic address and that is based on the received one or more items of anonymous personal identification information contained in the data piece. In certain embodiments, the computing system 8115 may transmit a received data piece that was received through the first domain to the first client system because the first client system is contractually permitted to receive or is not contractually prohibited from receiving the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece that was received through the first domain to the second client system because the first client system and the third client system are not contractually permitted to share or are contractually prohibited from sharing data pieces received by the other.

In certain embodiments, the one or more servers 8120 may also contain a list of each of the one or more client systems 8130 that indicates one or more electronic device 8110 that have given electronic permission to receive content from that client system 8130. For example, the one or more servers 8120 may include a list of a plurality of client systems 8130 including a first client system and a second client system. In the list of the plurality of client systems 8130, the first client system and the second client system may each have contractual permission to receive or may each not have contractual prohibition from receiving electronic addresses and items of anonymous personal identification information from a first electronic device 8110. Accordingly, both the first client system and the second client system may each be contractually permitted to use or may each not be contractually prohibited from using the received electronic addresses and items of anonymous personal identification information from the first electronic device to transmit content to electronic devices 8110 (e.g., the first electronic device). Conversely, in the list of the plurality of client systems 8130, the first client system may have contractual permission to receive or may not have contractual prohibition from receiving electronic addresses and items of anonymous personal identification information from a second electronic device 8110. However, the second client system may not have contractual permission to receive or may have contractual prohibition from receiving electronic addresses and items of anonymous personal identification information from the second electronic device 8110. Accordingly, the first client system may be contractually permitted to use or may not be contractually prohibited from using the received electronic addresses and items of anonymous personal identification information from the second electronic device 8110 to transmit content to electronic devices 8110 while the second client system may not be contractually permitted to use or may be contractually prohibited from using the received electronic addresses and items of anonymous personal identification information from the second electronic device 8110 to transmit content to electronic devices 8110.

The computing system 8115, utilizing one or more processors 9205 to perform one or more data transfer operations, may receive a data piece containing a first electronic address and one or more items of anonymous personal identification information. The computing system 8115 may identify the first electronic address contained within the data piece. The computing system 8115 may also identify that the data piece was received through a first domain. Subsequently, using the one or more servers 8120, the computing system 8115 may determine that the first client system is contractually permitted to receive or is not contractually prohibited from receiving a data piece from the first electronic address. Additionally, or alternatively, using the one or more servers 8120, the computing system 8115 may determine, based on the first electronic address, that the first client system is contractually permitted to transmit or is not contractually prohibited from transmitting content to an electronic device associated with the first electronic address and that is based on the received one or more items of anonymous personal identification information contained in the data piece. The computing system 8115, using the one or more servers 8120, may also determine that the second client system is not contractually permitted to receive or is contractually prohibited from receiving a data piece from the first electronic address. Additionally, or alternatively, using the one or more servers 8120, the computing system 8115 may determine, based on the first electronic address, that the second client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the second client system are contractually permitted to share or are not contractually prohibited from sharing data pieces received by the other. Additionally, or alternatively, the computing system 8115, utilizing one or more processors 9205 to perform one or more data transfer operations, may access the one or more servers 8120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 8115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 8115 may transmit a received data piece containing the first electronic address or a received data piece that was received through the first domain to the first client system because the first client system is contractually permitted or is not contractually prohibited from receiving the data piece.

In certain embodiments, the computing system 8115, using the one or more servers 8120, may also determine that the third client system is not contractually permitted to receive or is contractually prohibited from receiving a data piece from the first electronic address. Additionally, or alternatively, using the one or more servers 8120, the computing system 8115 may determine, based on the first electronic address, that the third client system is not contractually permitted to transmit or is contractually prohibited from transmitting content to an electronic device associated with the first electronic address and that is based on the received one or more items of anonymous personal identification information contained in the data piece.

The computing system 8115, utilizing one or more processors 9205 to perform one or more data transfer operations, may access the one or more servers 8120 and determine that the first client system and the third client system are not contractually permitted to share or are contractually prohibited from sharing data pieces received by the other. Additionally, or alternatively, the computing system 8115, utilizing one or more processors 9205 to perform one or more data transfer operations, may access the one or more servers 8120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 8115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 8115 may transmit a received data piece containing the first electronic address to the first client system because the first client system is contractually permitted to receive or is not contractually prohibited from receiving the data piece.

At step 22309, the computing system 8115 transmits the data piece to the one or more client systems permitted to transmit data to the electronic device. The data piece may contain one or more items of anonymous personal identification information. Each of the client systems may use the received one or more items of anonymous personal identification information to generate content or for statistical analysis.

FIG. 423 illustrates a method 23400 implemented by a computing system 8115 for performing data piece transfer operations according to certain embodiments of this disclosure. Although certain details will be provided with reference to the method 23400 of FIG. 423, it should be understood that other embodiments may include more, less, or different method steps. At step 23401, the computing system 8115 is in an idle state at least with respect to performing data piece transfer operations. Step 23401 is at least similar to step 22301 of method 22300 illustrated in FIG. 322. At step 23403, the computing system 8115 receives a data piece from an electronic device. The data piece includes one or more items of anonymous personal identification information. Step 23403 is at least similar to step 22303 of method 22300 illustrated in FIG. 322. At step 23405, the computing system 8115 identifies an electronic address associated with the data piece. Step 23405 is at least similar to step 22305 of method 22300 illustrated in FIG. 322. At step 23407, the computing system 8115 accesses the one or more servers to identify one or more client systems permitted to transmit data to the electronic device based on the electronic address. Step 23407 is at least similar to step 22307 of method 22300 illustrated in FIG. 322. At step 23409, the computing system 8115 transmits the data piece to the one or more client systems permitted to transmit data to the electronic device. Step 23409 is at least similar to step 22309 of method 22300 illustrated in FIG. 322.

At step 23411, the computing system 8115 transmits the electronic address to the one or more client systems permitted to transmit data to the electronic device. The data piece may contain at least one of one or more items of anonymous personal identification information or an electronic address. Each of the client systems may use the received one or more items of anonymous personal identification information to generate content. Each of the client systems may use the received the electronic address to transmit the generated content to an electronic device 8110 associated with the electronic address.

FIG. 524 illustrates a method 24500 implemented by a computing system 8115 for performing data piece transfer operations according to certain embodiments of this disclosure. Although certain details will be provided with reference to the method 24500 of FIG. 524, it should be understood that other embodiments may include more, less, or different method steps. At step 24501, the computing system 8115 is in an idle state at least with respect to performing data piece transfer operations. Step 24501 is at least similar to step 22301 of method 22300 illustrated in FIG. 322.

At step 24503, the computing system 8115 determines that an electronic device 8110 is engaged in a web browser session on a web browser 8125. The computing system 8115 utilizing the one or more processors 8125 may be configured to detect or determine that the electronic device 8110 has initiated an engagement into a web browser session with a web browser 8125, that the electronic device 8110 is engaged in a web browser session with a web browser 8125, or that an electronic device 8110 has requested content from the web browser 8125 while the electronic device 8110 is engaged in a web browser session with the web browser 8125. Upon engaging in the web browser session with the web browser 8125, the electronic device 8110 receives a data piece associated with the web browser 8125 and stores the data piece in a memory of electronic device 8110. The data piece received from the web browser 8125 and stored in the memory of electronic device 8110 includes an electronic address that is unique to the electronic device 8110. As described herein, an electronic address may include at least one of a MAC address, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email address, a postal address, a user ID, a gender, an age group, a user interest, or the like. In certain embodiments, each of the one or more items of anonymous personal identification information may include a hash value.

At step 24505, the computing system 8115 directs a transmission of a data piece to the electronic device 8110 when the electronic device 8110 is engaged in the web browser session of the web browser. The data piece may be associated with a domain that is linked to or associated with the web browser 8125. In certain embodiments, a data piece may contain a first instruction to the electronic device 8110. The first instruction may identify one or more domains in a first domain order identified in the matrix and instruct the electronic device 8110 to initiate communication with those one or more domains. For example, after receiving the first instruction, the electronic device 8110 may initiate communication with or transmit one or more items of anonymous personal identification information to a first domain of the one or more domains in first domain order indicated in the first instruction. After the computing system 8115 successfully receives the electronic address and the one or more item of anonymous personal identification information stored in the data piece from a domain from the first domain order, a second instruction included in a data piece that was successfully received by computing system 8115 from the electronic device 8110 may instruct the electronic device 8110 to initiate communication with or transmit one or more item of anonymous personal identification information to one or more domains in a second domain order indicated in the second instruction.

At step 24507, the computing system 8115 retrieves the data piece from the electronic device 8110 after one or more items of anonymous personal identification information is stored in the data piece. For example, after the computing system 8115 has transmitted a data piece to the electronic device 8110 for storage in the memory of electronic device 8110 and after the electronic device 8110 has transmitted one or more items of anonymous personal identification information to the web browser 8125 during the web browser session, the computing system 8115 initiates data piece retrieval to retrieve the data pieces associated with the each of the domains from a matrix and stored in the memory of electronic device 8110. In response to initiating the data piece retrieval, the computing system 8115 retrieves at least some of the data pieces previously stored in the memory of electronic device 8110. Based on determining which data pieces have been retrieved and which data pieces have not been retrieved, the computing system 8115 determines which, if any, data pieces the computing system 8110 is able to retrieve. Subsequently, the computing system 8115 may seek to retrieve from the memory of the electronic device 8110 only those data pieces determined to be retrievable and containing subsequently transmitted electronic addresses and items of anonymous personal identification information for storage in the server 8120.

At step 24509, the computing system 8115 identifies an electronic address associated with the data piece. Step 24509 is at least similar to step 22305 of method 22300 illustrated in FIG. 322. At step 24511, the computing system 8115 accesses the one or more servers to identify one or more client systems permitted to transmit data to the electronic device 8110 based on the electronic address. Step 24511 is at least similar to step 22307 of method 22300 illustrated in FIG. 322. At step 24513, the computing system 8115 transmits the data piece to the one or more client systems permitted to transmit data to the electronic device 8110. Step 24513 is at least similar to step 22309 of method 22300 illustrated in FIG. 322.

FIG. 625 illustrates a method 25600 implemented by a computing system 8115 for performing data piece transfer operations according to certain embodiments of this disclosure. Although certain details will be provided with reference to the method 25600 of FIG. 625, it should be understood that other embodiments may include more, less, or different method steps. At step 25601, the computing system 8115 is in an idle state at least with respect to performing data piece transfer operations. Step 25601 is at least similar to step 22301 of method 22300 illustrated in FIG. 322. At step 25603, the computing system 8115 receives a cookie from an electronic device 8110. The cookie includes one or more items of anonymous personal identification information. Step 25603 is at least similar to step 22303 of method 22300 illustrated in FIG. 322. At step 25605, the computing system 8115 identifies an electronic address associated with the cookie. Step 25605 is at least similar to step 22305 of method 22300 illustrated in FIG. 322. At step 25607, the computing system 8115 accesses the one or more servers to identify one or more client systems permitted to transmit data to the electronic device 8110 based on the electronic address. Step 25607 is at least similar to step 22307 of method 22300 illustrated in FIG. 322. At step 25609, the computing system 8115 transmits the cookie to the one or more client systems permitted to transmit data to the electronic device 8110. Step 25609 is at least similar to step 22309 of method 22300 illustrated in FIG. 322.

FIG. 7 illustrates a non-limiting, example computer system 700 configured to implement systems and methods for performing data piece transfer operations according to certain embodiments of this disclosure. FIG. 7 illustrates a computer system 700 that is configured to execute any and all of the embodiments described herein. In certain embodiments, the computer system 700 describes at least some of the components of computing system 115 illustrated in FIGS. 18 and 29. In certain embodiments, the computer system 700 describes at least some of the components of the one or more electronic devices 110, the one or more servers 120, electronics that provide the one or more web browsers 125, or at least some of the components of the one or more client systems 130 illustrated in FIG. 18. In different embodiments, the computer system 700 may be any of various types of devices, including, but not limited to, a computer embedded in a vehicle, a computer embedded in an appliance, a personal computer system, a desktop computer, a handset, a laptop computer, a notebook computer, a tablet, a slate, a netbook computer, a camera, a handheld video game device, a handheld computer, a video recording device, a consumer device, a portable storage device, a mainframe computer system, a workstation, network computer, a set top box, a video game console, a mobile device, an application server, a storage device, a television, a peripheral device such as a switch, a modem, a router, or in general any type of computing or electronic device.

Various embodiments of a system and method for performing data piece transfer operations, as described herein, may be executed on one or more computer systems 700, which may interact with various other devices. In the illustrated embodiment, the computer system 700 includes one or more processors 705 coupled to a system memory 710 via an input/output (110) interface 715. The computer system 700 further includes a network interface 720 coupled to I/O interface 715, and one or more input/output devices 725, such as cursor control device 740, keyboard 745, and display(s) 750. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 705a, or a multiprocessor system including several processors 705a-705n (e.g., two, four, eight, or another suitable number). The processors 705 may be any suitable processor capable of executing instructions. For example, in various embodiments the processors 705 may be general-purpose or embedded processors implementing any of a variety of instruction set architectures (ISAs), such as the x86, PowerPC, SPARC, or MIPS ISAs, or any other suitable ISA. In multiprocessor systems, each of processors 705 may commonly, but not necessarily, implement the same ISA.

The system memory 710 may be configured to store the program instructions 730 and/or existing state information and ownership transition condition data in the data storage 735 accessible by the processor 705. In various embodiments, the system memory 710 may be implemented using any suitable memory technology, such as static random access memory (SRAM), synchronous dynamic RAM (SDRAM), nonvolatile/Flash-type memory, or any other type of memory. In the illustrated embodiment, the program instructions 730 may be configured to implement a system for performing data piece transfer operations incorporating any of the functionality, as described herein. In some embodiments, program instructions and/or data may be received, sent, or stored upon different types of computer-accessible media or on similar media separate from the system memory 710 or the computer system 700. The computer system 700 is described as implementing at least some of the functionality of functional blocks of previous Figures.

In one embodiment, the I/O interface 715 may be configured to coordinate I/O traffic between the processor 705, the system memory 710, and any peripheral devices in the device, including the network interface 720 or other peripheral interfaces, such as the input/output devices 725. In some embodiments, the I/O interface 715 may perform any necessary protocol, timing or other data transformations to convert data signals from one component (e.g., the system memory 710) into a format suitable for use by another component (e.g., the processor 705). In some embodiments, the 110 interface 715 may include support for devices attached through various types of peripheral buses, such as a variant of the Peripheral Component Interconnect (PCI) bus standard or the Universal Serial Bus (USB) standard, for example. In some embodiments, the function of the 110 interface 715 may be split into two or more separate components, such as a north bridge and a south bridge, for example. Also, in some embodiments some or all of the functionality of the I/O interface 715, such as an interface to the system memory 710, may be incorporated directly into the processor 705.

The network interface 720 may be configured to allow data to be exchanged between the computer system 700 and other devices attached to the network 105 or between nodes of the computer system 700. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 725 may, in some embodiments, include one or more display terminals, keyboards, keypads, touchpads, scanning devices, voice, or optical recognition devices, or any other devices suitable for entering or accessing data by one or more the computer systems 700. Further, various other sensors may be included in the I/O devices 725, such as imaging sensors, barometers, altimeters, LIDAR, or any suitable environmental sensor. Multiple input/output devices 725 may be present in the computer system 700 or may be distributed on various nodes of the computer system 700. In some embodiments, similar input/output devices may be separate from the computer system 700 and may interact with one or more nodes of the computer system 700 through a wired or wireless connection, such as over the network interface 720.

As shown in FIG. 7, the memory 710 may include program instructions 730, which may be processor-executable to implement any element or action, as described herein. In one embodiment, the program instructions may implement at least a portion of methods described herein, such as the methods illustrated by FIGS. 3-6. In other embodiments, different elements and data may be included. Note that the data storage 735 may include any data or information, as described herein.

Those skilled in the art will appreciate that the computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 700 may be transmitted to the computer system 700 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

SECTION V. METHOD AND SYSTEM FOR ASYNCHRONOUS CORRELATION OF DATA ENTRIES IN SPATIAL INSTANCES OF HETEROGENEOUS DATABASES

Background

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY OF SECTION V

This disclosure provides systems and methods for overcoming interruptions in network traffic to access personal identification information (PII) provided during a web browser session.

In a first embodiment, the disclosure provides an apparatus including a computing system that is communicatively linked to a server. The computing system includes a memory and at least one processer. The computing system is configured to transmit a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computing system is also configured to transmit a second data piece to the electronic device, when the electronic device is engages in the initial web browser session on the initial web browser, for storage in the electronic device memory. The second data piece is associated with a second domain that is linked to the initial web browser. The second data piece contains the electronic device identification. The computing system is further configured to retrieve the second data piece from the electronic device memory when the computing system is not able to retrieve the first data piece from the electronic device memory. The second data piece retrieved from the electronic device contains the electronic device identification and one or more items of anonymous personal identification information provided by the electronic device during the initial web browser session.

In a second embodiment, the disclosure provides a computer-implemented method performed by a computing system. The computer-implemented method includes transmitting, by the computing system, a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computer-implemented method also includes transmitting, by the computing system, a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The computer-implemented method further includes retrieving, by the computing system, the second data piece from the electronic device memory when the computing system is not able to retrieve the first data piece from the electronic device memory. The second data piece retrieved from the electronic device contains the electronic device identification and one or more items of anonymous personal identification provided by the electronic device during the initial web browser session.

In a third embodiment, the disclosure provides a non-transitory, computer-readable storage medium. The non-transitory, computer-readable storage medium stores one or more executable instructions that, when executed by at least one processor, causes the at least one processor to transmit a first data piece to an electronic device, when the electronic device is engaged in an initial web browser session on an initial web browser, for storage in an electronic device memory. The first data piece is associated with a first domain that is linked to the initial we browser. The first data piece contains an electronic device identification. The one or more executable instructions that, when executed by at least one processor, also causes the at least one processor to transmit a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The one or more executable instructions that, when executed by at least one processor, further causes the at least one processor to retrieve the second data piece from the electronic device memory when the at least one processor is not able to retrieve the first data piece from the electronic device memory. The second data piece retrieved from the electronic device contains the electronic device identification and one or more items of anonymous personal identification information provided by the electronic device during the initial web browser session.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with" as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one if: A, B, and C" includes any of the following combinations: A, B, C, A and B, A and C, B and C, and A and B and C.

Moreover, various functions described below can be implemented or supported by one or more computer programs, each of which is formed from computer program code and embodied in a computer readable storage medium. The terms "application" and "program" refer to one or more computer programs, software components, sets of instructions, procedures, functions, objects, classes, instances, related data, or a portion thereof adapted for implementation in a suitable computer-readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM) random access memory (RAM), a hard disk drive, a compact disc (CD), a digital video disc (DVD), or any other type of memory. A "non-transitory" computer-readable medium and "non-transitory" computer-readable storage medium excludes wired, wireless, optical, or other communication links that transport transitory electrical or other signals. A non-transitory, computer-readable medium and a non-transitory, computer-readable storage medium include media where data can be permanently stored in media where data can be stored and later overwritten, such as rewritable optical disk or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a non-limiting, example network context 100 for operating a computing system 115 according to certain embodiments of this disclosure;

FIG. 2 illustrates a non-limiting, example Computing system configured to perform network interruption remedy operations according to certain embodiments of the disclosure;

FIGS. 3A and 3B illustrates example matrices of domains linked with web browsers according to certain embodiments of this disclosure;

FIGS. 4-10 illustrate flow diagrams of methods for performing network interruption remedy operations according to certain embodiments of the disclosure; and FIG. 11 illustrates a non-limiting, example computer system configured to implement aspects of systems and methods according to certain embodiments of this disclosure.

DETAILED DESCRIPTION OF SECTION V

FIGS. 1 through 11 The figures, discussed below, in the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 18:
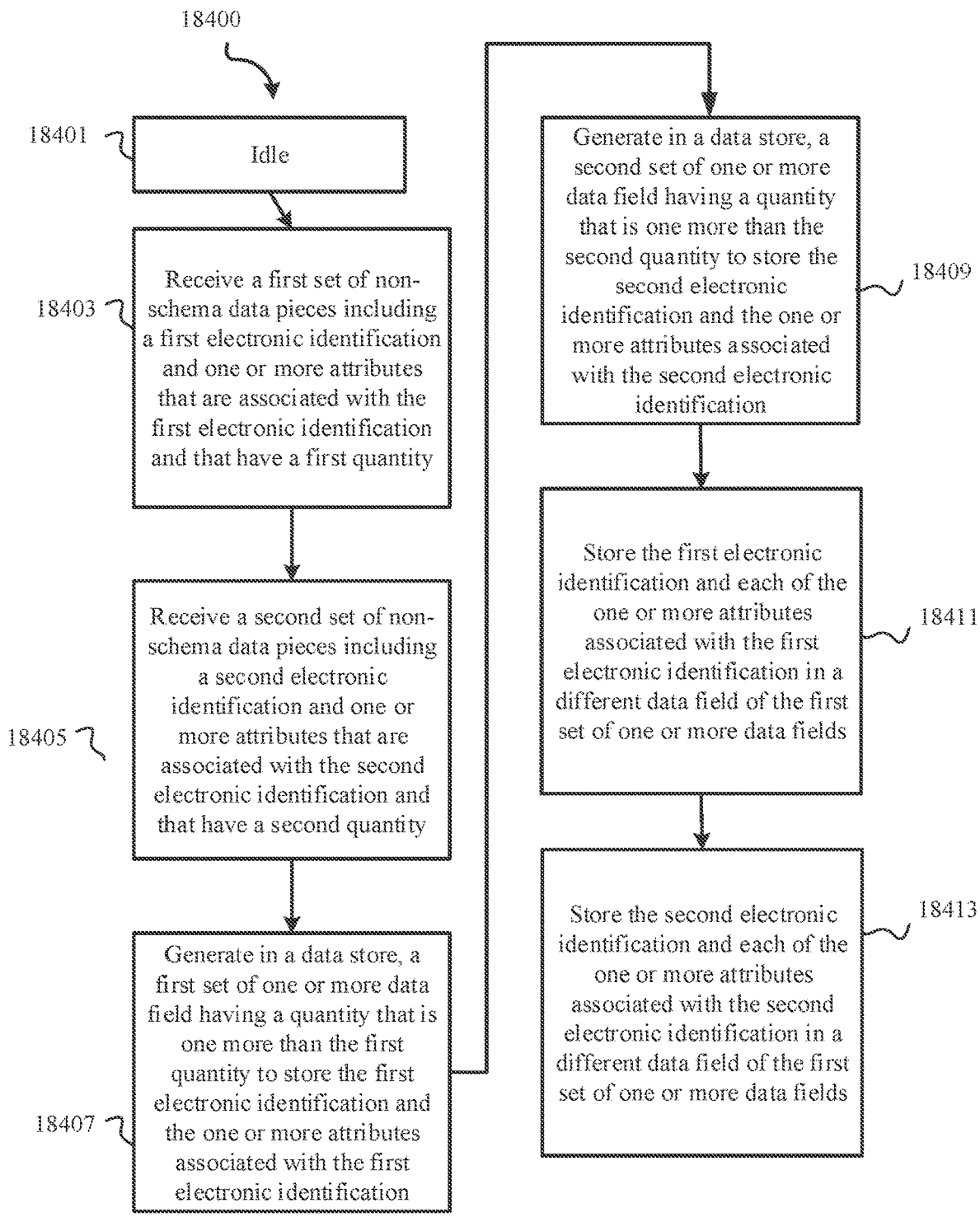
FIGS. 18-25 illustrate flow diagrams of methods for one or more non-schema data reception and storage operations according to certain embodiments of the disclosure.
Figure 19:
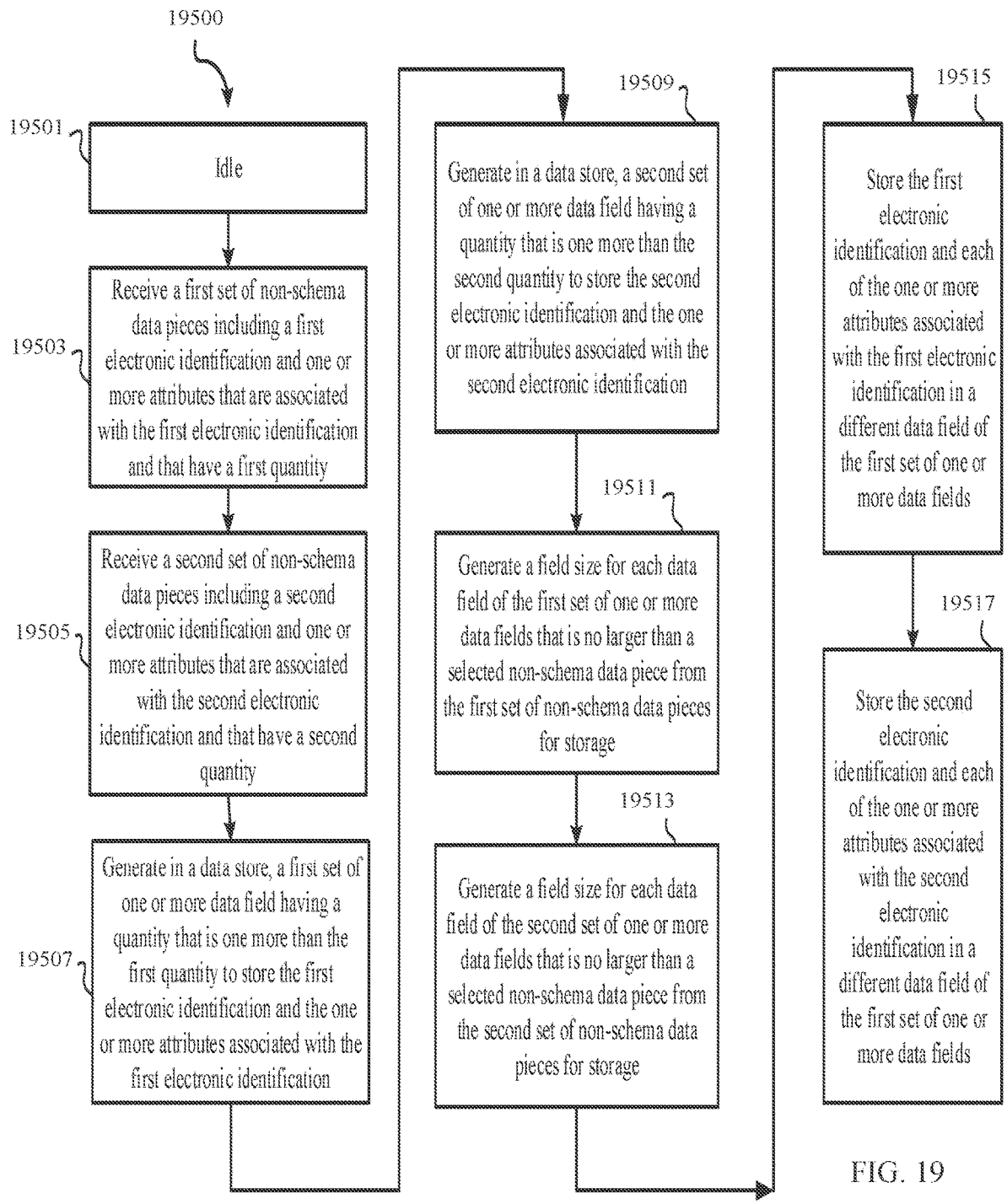
Figure 20:
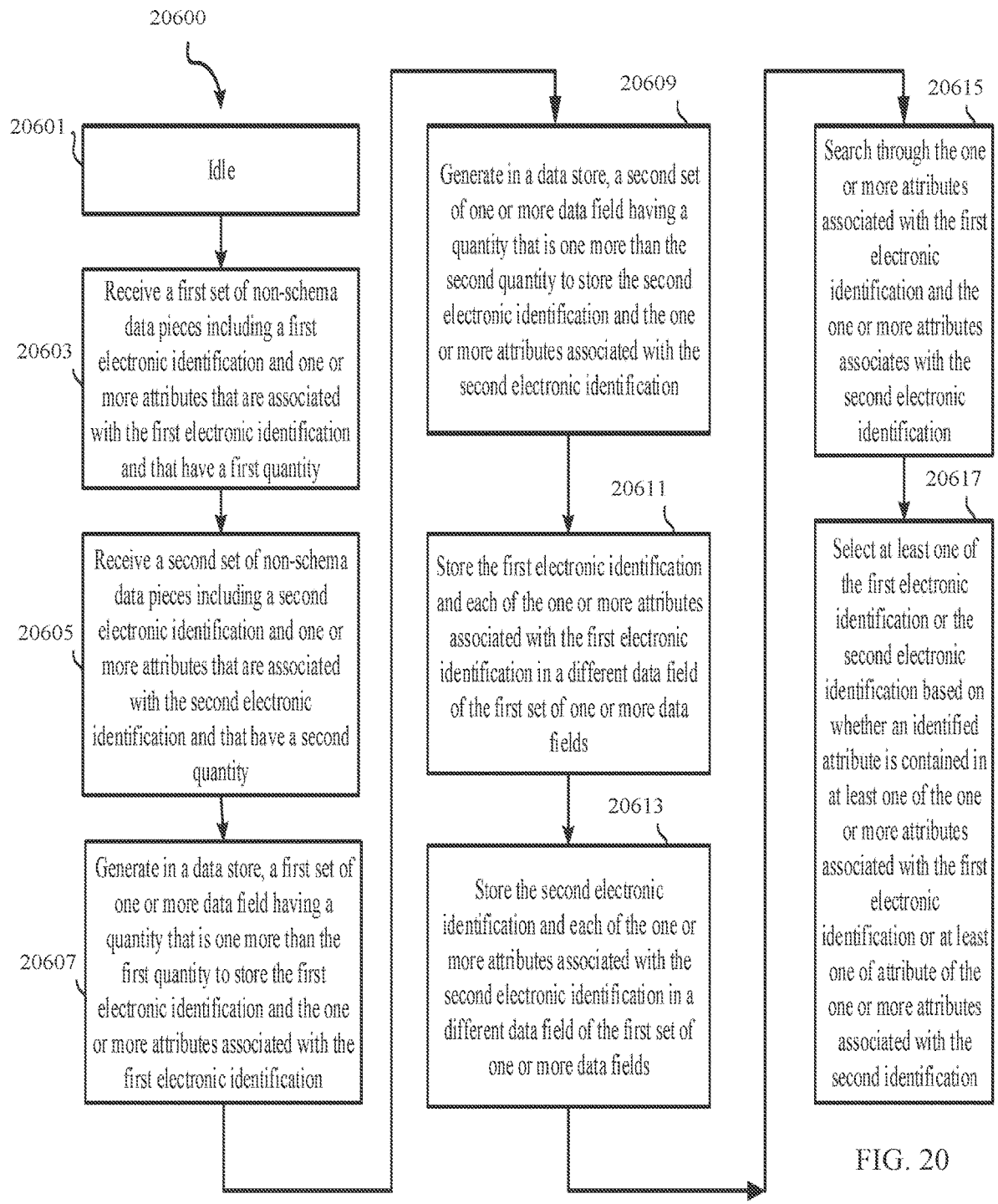
Figure 21:
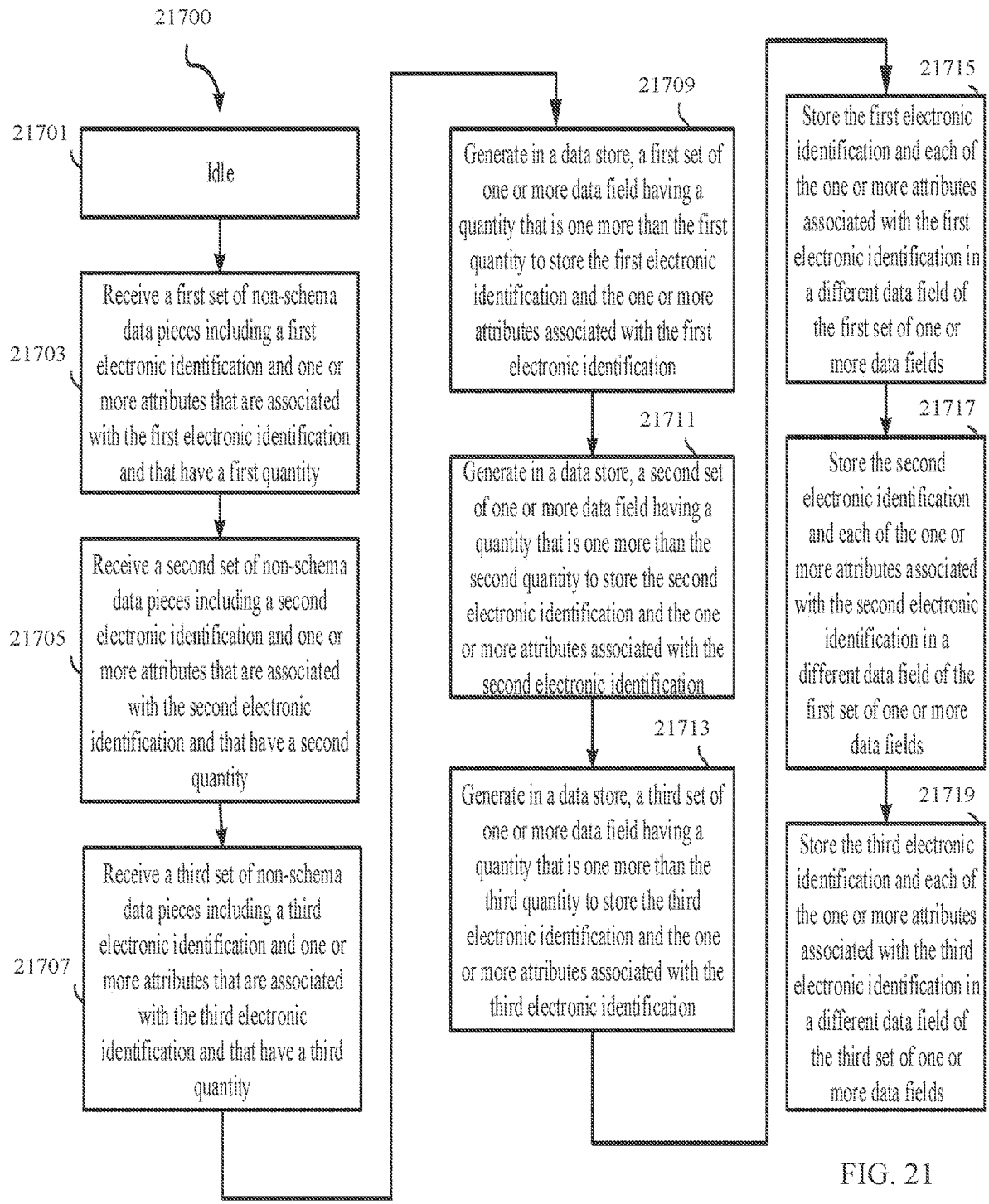

FIG. 18 illustrates a non-limiting example network context 8100 or operating a computing system 8115 according to certain embodiments of this disclosure. One or more components of the network context 8100 may operate as separate components linked by one or more constituent networks of the network 8105. In some embodiments, one or more constituent networks of the network 8105 may include the internet, which can be accessed over both wired connections (e.g., a wireless local area network "WLAN" connection or a cellular network connection). Additionally, or alternatively, one or more constituent networks of the network 8105 may include a combination of private Networks (e.g., a local wireless mesh network) and public networks (e.g., a telephone (POTS) network). In certain embodiments, one or more constituent networks of the network 8105 may support multiple communication protocols, including both wireless protocols (e.g., BLUETOOTH™, circuit-switched cellular, 3G, LTE, WiBro) and internet protocols (e.g., HTTP).

The one or more constituent networks of the network 8105 provide two-way connectivity between each of the electronic devices 8110, the computing system 8115, the one or more servers 8120, and the one or more web browsers 8125. In certain embodiments, the one or more constituent networks of the network 8105 provide two-way connectivity between each of the electronic device 8110, the computing system 8115, the one or more servers 8120, and the one or more web browsers 8125 using one or more same or different channels, protocols, or networks of network 8105. For example, a circuit-switched cellular protocol wireless network of the network 8105 provides connectivity between the iPhone™ 8110a and one or more of the web browsers 8125.

In certain embodiments, the network context 8100 includes one or more electronic devices 8110. the one or more electronic devices 8110 may include an iPhone™ 8110a, a tablet 8110b, a desktop computer 8110c, a smartphone 8110d, a laptop computer 8110e, or the like. In certain embodiments, each of the one or more electronic devices 8110 are configured to initiate a web browser session with a web browser 8125 or access and displayed the one or more web browsers 8125 through the network 8105 or viewing by a user and for interaction between the user and the one or more web browsers 8125. In certain embodiments, each of the one or more electronic devices 8110 are configured to store data pieces associated with the web browser 8125. The data piece may contain at least one of an electronic device identification or one or more items of anonymous personal identification information. Concern embodiments, the electronic device 8110 transmit anonymous personal identification information to the web browser 8125 during a web browser session where the anonymous personal identification information also includes an open source software footprint. In certain embodiments, the electronic device 8110 includes an electronic device display screen, and electronic device memory, and at least one electronic device processor. The electronic device may be configured to access and display content from one or more web browsers 8125 on the electronic device display screen.

In certain embodiments, the network context 8100 includes one or more web browsers 8125. As described herein, the one or more web browsers 8125 are configured to contain display content for viewing by an electronic device 8110 when the electronic device 8110 is engaged in a web browser session with the web browser 8125. In certain embodiments, the one or more web browsers are configured to transmit data pieces to the electronic device 8110 for storage in a memory electronic device 8110 when the electronic device 8110 is engaged in a web browser session with the web browser 8125. Be one or more web browsers 8125 may also be configured to receive anonymous personal identification information from an electronic device 8110 when the electronic device 8110 is engaged in a web browser session with the one or more web browsers 8125.

Additionally, the network context 8100 may, according to certain embodiments, include one or more servers 8120. In certain embodiments, the one or more servers 8120 stores user profiles that include electronic device identification and items of anonymous personal identification information. As described herein, the computing system 8115 may store electronic device identifications and item anonymous personal identification information in selected user profiles stored in the one or more servers 8120.

In certain embodiments, the network context 8100 includes one or more computing systems 8115. FIG. 29 illustrates a non-limiting, example of the computing system 8115 illustrated in FIG. 18. The computing system 8115 is configured to execute any and all of the embodiment and operations described herein including embodiments for performing network interruption remedy operations. In certain embodiments, the computing system 8115 made perform network interruption remedy operations for overcoming interruptions in network traffic to access anonymous personal identification information provided during a web browser session. In different embodiments, the computing system 8115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for network interruption remedy operations, as described herein, may be executed on one or more computing systems 8115, which may interact with various other devices. In the illustrated embodiment, the computing system 8115 includes one or more processors 9205a, 9205b, . . . , and 9205n (hereinafter "one or more processors 9205" or "processor 9205") coupled to a memory 9210 via an input/output (I/O) interface 9215. The computing system 8115 further includes a network interface 9220 coupled to I/O interface 9215, and one or more input/output devices 9225, such as a cursor control device, keyboard, and display(s). In some cases, it is contemplated that embodiments may be implemented using a single instance of computing system 8115, while in other embodiments multiple such systems, or multiple nodes making up computing system 8115, may be configured to host different portions or instances of embodiments. For example, in one embodiment some elements may be implemented via one or more notes of computing system 8115 that are distinct from those nodes implementing other elements.

In various embodiments, computing system 8115 may be a uniprocessor system including one processor 9205A, or a multiprocessor system including several processors 9205A-9205N (e.g., two, four, eight, or another suitable number). The processor 9205 may be any suitable processor capable of executing instructions including instructions or operations including networking interference remedy operations as described herein. For example, in various embodiments the processor 9205 may be general purpose or embedded processors implementing any of a variety instruction set architecture (ISAs), such as x86, PowerPC, SPARC, or MIPS ISAs, or any other suitable ISA. In multiprocessor systems, each of the processors 9205 may commonly, but not necessarily, implement the same ISA.

The memory 9210 may be configured to store the executable instructions or program instructions 9230 or existing state information and ownership transition condition data in the data storage 9235 accessible by the processor 9205. In various embodiments, the memory 9210 may be implemented using any suitable memory technology, such as static random-access memory (SRAM), synchronous dynamic RAM (SDRAM), nonvolatile/flash-type memory, or any other type of memory. In the illustrated embodiment, the program instructions 9230 may be configured to implement a system for package delivery incorporating any of the functionality, as described herein. In some embodiments, program instructions 9230 or data may be received, sent, or stored upon different types of computer accessible media or on similar media separate from the memory 9210 or the computing system 8115. The computing system 8115 is described as implementing at least some of the functionality of functional blocks in the figures described herein.

In certain embodiments, the data storage 9235 of the memory 9210 stores a plurality of domains that can be linked to one or more web browsers 8125. FIGS. 326A and 326B it was straight and example matrix 26305 of a plurality of domains 26310 stored in the data storage 9235 of the memory 9210 and capable of being linked with one or more web browsers 8125 according to certain embodiments of this disclosure. As shown in FIG. 326A, the matrix 26305 contains a plurality of rose and a plurality of columns forming a plurality of fields each containing a domain (e.g., "A.com," "G.com," "S.com"). Each of the plurality of rows are assigned in order that the at least one processor 9205 uses for transmitting data pieces to electronic devices 8110, as described herein. As shown in FIG. 326A, the web browser 8125 is positioned in the 0th order domain row 26315A, the domains "A.com," "B.com," "C.com," "D.com," and "E.com," our position in the 1st order domain row 26315B, the domains "F.com," "G.com," "H.com," "I.com," and "J.com," are positioned in the 2nd order domain row 26315C, the domains "K.com," "L.com," "M.com," "N.com," and "O.com," are positioned in the 3rd order domain row 226315D the domains "P.com," "Q.com," "R.com," "S.com," and "T.com," are positioned in the 4th order domain row 26315E and the domains "V.com," "W.com," "X.com," "Y.com," and "Z.com," are positioned in the Nth order domain row 26315N.

It should be understood that the matrix 26305 can include a plurality of columns (e.g., hundreds of columns, thousands of columns, millions of columns) and a plurality of rows (e.g., hundreds of rows, thousands of rows, millions of rows) and thus, a plurality of domains (e.g., hundreds of domains, thousands of domains, millions of domains) may be stored in the matrix 26305. In addition, the data storage 9235 of the memory 9210 may store a plurality of matrices (e.g., hundreds of matrices, thousands of matrices, millions of matrices) each of which having a different web browser 8125 in the 0th order domain and thus, each of which being associated with a different web browser 8125. Additionally, or alternatively, the data storage 9235 of the memory 9210 store one or more matrices 26305 that are each associated with two or more different web browsers 8125. The matrix 26305 provides at least one processor 9205 with a road map for transmitting data pieces two electronic devices 8110 when the electronic devices 8110 are engaged in browser sessions on web browsers 8125 that can subsequently be retrieved by the at least one processor 9205 so that the at least one processor 9205 may store electronic device identifications and items of anonymous personal identification information from the retrieved data pieces in user profiles in one or more servers 8120.

In certain embodiments, the I/O interface 9215 may be configured to coordinate I/O traffic between the processor 9205, the memory 9210, and any peripheral devices in the Computing system 8115, including the network interface 9210 or other peripheral interfaces, such as the input/output devices 9225. In some embodiments, the I/O interface 9215 may perform any necessary protocol, timing or other data transformations to convert data signals from one component (e.g., the memory 9210) into a format suitable for use by another component (e.g., the processor 9205). In some embodiments, the I/O interface 9215 may include support for devices attached through various types of peripheral buses, such as a variant of the peripheral component interconnect (PCI) bus standard or the universal serial bus (USB) standard, for example. In some embodiments, the function of the I/O interface 9215 may be split into two or more separate components, such as a north bridge and a south bridge, for example. Also, in some embodiments some or all of the functionality of the I/O interface 9215, such as an interface to the memory 9210, may be incorporated directly into the processor 9205.

The networks interface 9210 may be configured to allow data to be exchanged between the computing system 8115 and other devices attached to the network 8105 (e.g., one or more electronic devices 8110, one or more servers 8120, one or more web browsers 8125) or between nodes of the computing system 8115. The network 8105 may be in various embodiments include one or more networks including but not limited to Local Area Networks (LANs) (e.g. an Ethernet or corporate network), Wide Area Network (WANs) (e.g., the Internet), wireless data networks, some other electronic data network, a combination thereof, or the like. In various embodiments, the network interface 9220 may support communication via wired or wireless general data networks, such as any suitable type of ethernet network, for example; telecommunications/telephony networks such as analog voice networks or digital fiber communications networks; via storage area networks such as fiber channel sans, or via any other suitable type of network or protocol.

The input/output devices 9225 may, in some embodiments, include one or more display terminals, keyboards, keypads, touchpads, scanning devices, voice, or optical recognition devices, or any other devices suitable you're entering or accessing data by one or more the computing system 8115. Further, various other sensors may be included in the I/O devices 9225 such as imaging sensors, barometers, altimeters, LIDAR, or any suitable environmental sensor. Multiple input/output devices 9225 may be present in the computing system 8115 or may be distributed on various nodes of the computing system 8115. In some embodiments, similar input/output devices may be separate from the computing system 8115 and may interact with one or more nodes of the computing system 8115 through a wired or wireless connection, such as over the network interface 9220.

Figure 33:
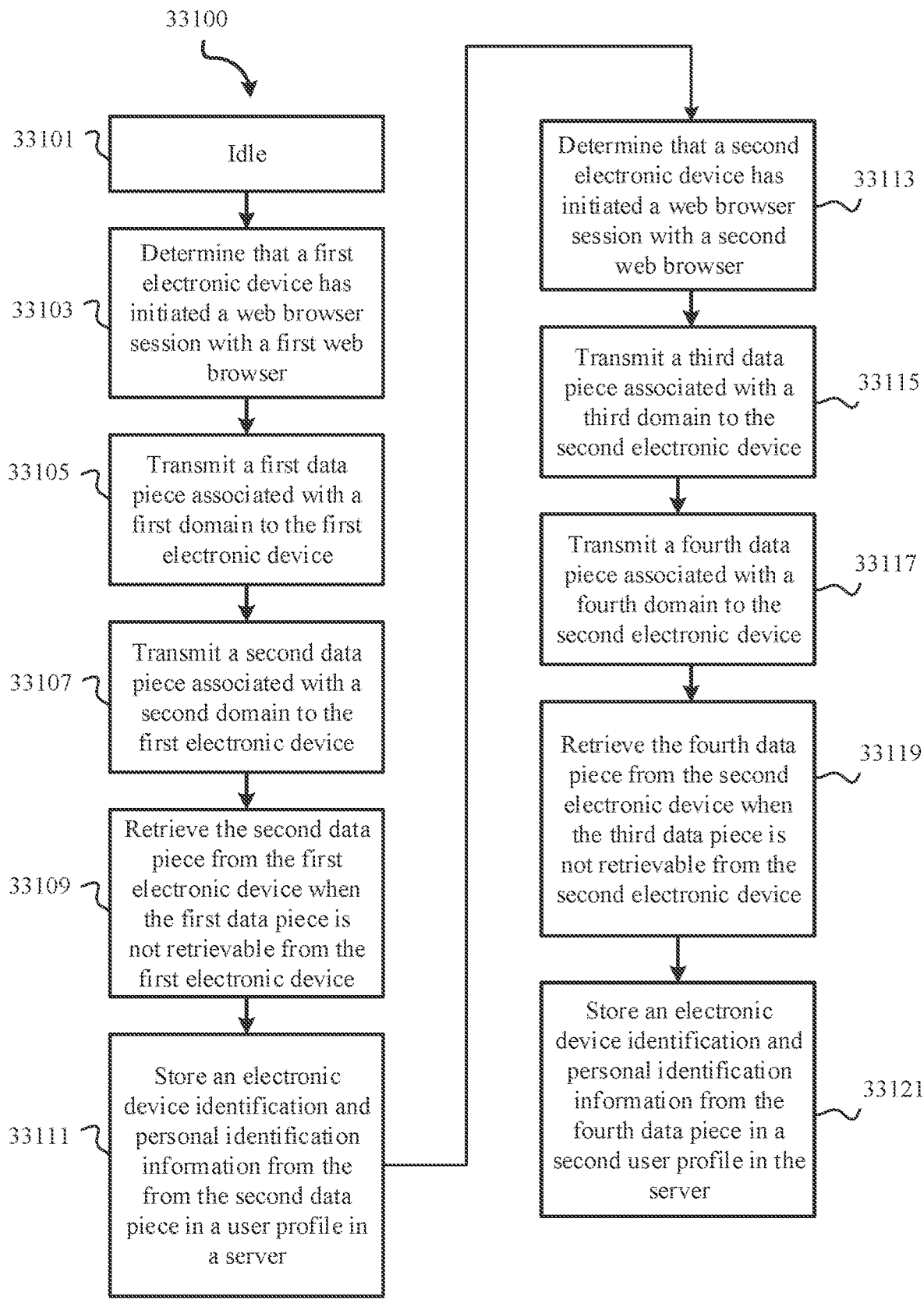

As shown in FIG. 29 the memory 9210 may include program instructions 9230, which may be processor-executable to implement any element, action, or operation including network interruption remedy operations, as described herein. In certain embodiment. The program instructions may implement at least a portion of methods described herein, such as the methods illustrated by FIGS. 4-1027-33. In other embodiments, different elements and data may be included. Note that the data storage 9235 may include any data or information, as described herein.

Those skilled in the art will appreciate that the computing system 8115 is merely illustrative is not intended to limit the scope of embodiments. In particular, the computing system and devices may include any combination of hardware or software that can perform the indicated functions, including computers, network devices, internet appliances, PDAs, wireless phones, pagers, GPUs, specialized computer systems, information handling apparatus, or the like. The computing system 8115 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in the memory or on storage while being used, these items or portions of them may be transferred between memory and other storage devices for purposes of memory management and data integrity. Alternatively, in other embodiments some or all of the software components may execute in memory on another device and communicate with the illustrated computing system 8115 via inter-computer communication. Some or all of these system components or data structures may also be stored (e.g., as instructions or structured data) on a computer accessible medium or a portable article to be read by an appropriate drive, various examples of which are described here. In some embodiments, instructions stored on a computer-accessible medium separate from the computing system 8115 may be transmitted to the computing system 8115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon on a computer accessible medium. Generally speaking, a computer accessible medium may include a non-transitory, computer readable storage medium or memory medium such as a magnetic or optical media, e.g., disc or DVD/CD-ROM, volatile or non-volatile media such as RAM (e.g., SDRAM, DDR, RDRAM, SRAM, or the like), ROM, or the like. In some embodiments, a computer accessible medium may include transmission media or signals such as electrical, electromagnetic, or digital signals, conveyed via a communication medium such as a network and/or a wireless link.

As described herein, the computing system 8115 utilizing the at least one processor 9205 is configured to perform one or more networking interruption remedy operations. In certain embodiments, the computing system 8115, utilizing one or more processors 9205 determines that an electronic device 8110 has initiated an engagement in a web browser session with the web browser 8125 or that an electronic device 8110 has requested content from the web browser 8125. For example, the electronic device 8110 may be used to initiate a web browser session with a web browser 8125 and display content from the web browser 8125 on a display screen. The computing system 8115 utilizing the one or more processors 8125 may be configured to detect or determine that the electronic device 8110 has initiated an engagement into a web browser session with a web browser 8125, or that an electronic device 8110 has requested content from the web browser 8125 while the electronic device 8110 is engaged in a web browser session with the web browser 8125. Upon engaging in the web browser session with the web browser 8125, the electronic device 8110 receives a data piece associated with the web browser 8125 and stores the data piece in a memory of electronic device 8110. the data piece received from the web browser 8125 and stored in the memory of electronic device 8110 includes an electronic device identification that is unique to the electronic device 8110. An electronic device identification may include at least one of a MAC address, an IMEI number, an electronic device serial number, a pointer associated with a data port of the electronic device, or the like.

Subsequently, a computing system 8115 access has one or more matrices 26305 stored in the data storage 9235 of the memory 9210. The one or more matrices 26305 may be associated with the web browser 8125 that the electronic device 8110 is engaged with. Turning to FIG. 326B, the computing system 8115 identifies a plurality of domains 26310 from the matrix 26305 that are associated with the web browser 8125 and determines which of those domains can transmit data pieces to the electronic device 8110 that are retrievable by the computing system 8115 during or after the web browser session between the electronic device 8110 and the web browser 8125.

It should be understood that the one or more electronic devices 8110 may store and execute data piece blocking software (e.g., anti-identification software, pop-up blocker software, advertisement (ad) blocker software). The data piece blocking software may flag or block specific strings of HTML code contained in certain data pieces or may flag or block data pieces associated with entire domains. The data piece blocking software made flag or block a data piece due to a specific string of HTML code contained in the data piece. additionally, or alternatively, the data piece blocking software made block access to all data pieces from particular domains which are residing in the electronic device memory. In certain embodiments, the data piece blocking software may not flag or block particular data pieces due to a lack of specific string of HTML code contained in the particular data pieces that would cause the data piece blocking software to block the particular data pieces. Additionally, or alternatively, the data piece blocking software may not block access to data pieces from particular domains which are residing in the electronic device memory.

When the computing system 8115 accesses the one or more matrices 26305 stored in the data storage 9235 of the memory 9210, the computing system 8115 generates data pieces associated with each of the domains in the matrix 26305 from the 1st order domain 26315*b* and transmits those data pieces to the electronic device 8110 or storage in the memory of electronic device 8110 while the electronic device 8110 is engaged in the browser session with the web browser 8125. Subsequently the computing system 8115 generates data pieces associated with each of the domains in the matrix 26305 from the 2nd order domain 26315*c* and transmits those data pieces to the electronic device 8110 for storage in the memory of the electronic device 8110 while the electronic device 8110 is engaged in the browser session of the web browser 8125. Further, the computing system 8115 generate data pieces associated with each of the domains in the matrix 26305 from each of the remaining order domains 26315*d* through 26315*n* and transmits those data pieces to the electronic device 8110 for storage in the memory of electronic device 8110 while the electronic device 8110 is engaged in the browser session the web browser 8125. Because each of the domains from the matrix 26305 is associated with the web browser 8125, each of the data pieces associated with the domains also include an electronic device identification that is unique to the electronic device 8110.

After the computing system 8115 has transmitted the data pieces from the domains of the plurality of order domains, the electronic device 8110 may transmit one or more items of anonymous personal identification information to the web browser 8125 during the web browser session. At the same time, the one or more items of anonymous personal identification information transmitted to the web browser 8125 are also stored in the data piece from the web browser 8125 residing in the memory of electronic device 8110. Because the domains from the matrix 26305 are associated with the web browser 8125, the data pieces associated with each of the domains residing in the memory of electronic device 8110 also received the one or more items of anonymous personal identification information transmitted to the web browser 8125. It should be understood that the one or more items of anonymous personal identification information may include one or more of an email addresses, a postal address, a user ID, a gender, an age group, a user interest, or the like. In certain embodiments, each of the one or more items of anonymous personal identification information may include a hash value.

After each of the data pieces are transmitted by the computing system 8115 to the electronic device 8110 in stored in the memory of electronic device 8110, the computing system 8115 attempts to retrieve each of the data pieces stored in the memory of electronic device 8110. In certain embodiments, the computing system 8115 attempts to retrieve each of the data pieces stored in the memory electronic device 8110 regardless of whether the electronic device 8110 has transmitted one or more items of anonymous personal identification information to the web browser 8125. For example, after the computing system 8125 has transmitted each of the data pieces to the electronic device 8110 for storage in the memory of electronic device 8110, the computing system 8115 initiates a retrieval test to determine which, if any, data pieces the computing system 8110 is able to retrieve. The retrieval test may allow the computing system 8115 to determine which data pieces are not retrievable from the memory of electronic device 8110 due to data piece blocking software and what data pieces are retrievable from the memory of the device 8110 due to data piece blocking. The retrieval test may be performed by attempting to retrieve the electronic device identification contained in each of the data pieces. Thus, the computing system 8115 can determine which data pieces can be retrieved from the memory of electronic device 8110 and which data pieces cannot be retrieved from the memory of electronic device 110 regardless of whether the electronic device 8110 has transmitted items of anonymous personal identification information to the web browser 8125. Subsequently, the computing system 8115 may seek to retrieve from the memory of electronic device 8110 only those data pieces determined to be retrievable by the retrieval test for storage of electronic device identifications and items of anonymous personal identification information for storage in the server 8120.

In certain embodiments, the computing system 8115 attempts to retrieve each of the data pieces stored in the memory of electronic device 8110 and after the electronic device 8110 has transmitted one or more items of anonymous personal identification information to the web browser 8125. For example, after the computing system 8115 has transmitted each of the data pieces to the electronic device 8110 or storage in the memory of electronic device 8110 and after the electronic device 8110 has transmitted one or more items of anonymous personal identification information to the web browser 8125 during the web browser session, the computing system 8115 initiates data piece retrieval to retrieve the data pieces associated with the each of the domains from the matrix 26305 and stored in the memory of electronic device 8110. In response to initiating the data piece retrieval, the computing system 8115 retrieves only some of the data pieces previously stored in the memory of electronic device 8110. Based on determining which data pieces has been retrieved and which data pieces have not been retrieved, the computing system 8115 determines which, if any, data pieces the computing system 8110 is able to retrieve. Subsequently, the computing system 8115 may seek to retrieve from the memory of electronic device 8110 only those data piece is determined to be retrievable and containing subsequently transmitted electronic device identifications and items of anonymous personal information for storage in the server 8120.

In response to determining which data pieces can be retrieved from the memory of electronic device 8110 and which data pieces cannot be retrieved from the memory of electronic device 8110, the computing system 8115 marks each of the domains in the matrix 26305 that are associated with the data pieces that cannot be retrieved and links each of the domains in the matrix 26305 into one or more chains of data pieces that can provide retrievable data pieces from the memory of electronic device 8110 by the computing system 8115. For example, as shown in FIG. 326B, the computing system 8115 marks "B.com" and "D.com" from the 1st order domain 26315*b*, "K.com" from the 3rd order domain 26315*d*, "P.com" and "R.com" from the 4th order domain, and "Y.com" from the Nth order domain as domains that are associated with the data pieces that are not retrievable by the computing system 8115. The computing system 8115 also forms a first chain 26320*a* of domains ("A.com," "F.com," "L.com," "Q.com," and "V.com"), a second chain 26320*b* of domains ("C.com," "H.com," "M.com," "S.com," and "X.com"), and third chain 26320*c* of domains ("E.com," "J.com," "O.com," "T.com," and "Z.com") that are retrievable by the computing system 8115 from the memory of electronic device 8110. Each of the chains includes a domain from each of the ordered domains 26315*a* through 26315*n*. Thus, using the matrix 26305 stored in the data storage 9235, the computing system 8115 is able to determine which data pieces are retrievable to provide electronic device identification and one or more items of an anonymous personal identification information provided by the electronic device 8110 during a current web browser session in subsequent web browser sessions with the web browser 8125.

In certain embodiments, the computing system 8115, utilizing one or more processors 9205 retrieve the data pieces determined to be retrievable by the computing system 8115 from the memory of the electronic device 8110. The data pieces retrieved by the computing system 8115 include an electronic device identification and one or more items of anonymous personal identification information provided by the electronic device 8110 during the web browser session with the web browser 8115. In some embodiments, the electronic device 8110 will not be storing data piece blocking software and that's all data pieces stored on the memory of the electronic device 8110 by the computing system 8115 are retrievable and us retrieve by the computing system 8115. In some embodiments, some data pieces generated by the computing system 8115 and stored in the memory of electronic device 8110 may not be retrievable by the computing system 8115 from the memory of electronic device 8110 due to data piece blocking software stored and executed on electronic device 8110. In some embodiments all data pieces generated by the computing system 8115 and stored in the memory of the electronic device 8110 may not be retrieved by the computing system 8115 from the memory of electronic device 8110 due to data piece blocking software stored masculine electronic device 8110.

In certain embodiments, the computing system 8115 utilizing the at least one processor 9205, stores the electronic device identification and the one or more items of anonymous personal identification information from the retrieved data pieces in user profiles of the one or more servers 8120. In certain embodiments, the computing system 8115 stores the electronic device identification and the one or more items of anonymous personal identification information from the retrieve data pieces in one or more user profile previously created and stored on the one or more servers 8120. For example, the computing system 8115 may have previously generated one or more user profiles each containing at least one of electronic device identification or one or more items of anonymous personal identification information provided in a previously obtained data piece. When the computing system 8115 receives the retrieved data pieces each containing an electronic device identification and one or more items of anonymous personal identification information, the computing system 8115 may match at least one of the electronic device identification or at least one of the one or more items of anonymous personal identification information from a retrieved data piece with at least one of the electronic device identification or at least one of the one or more items of anonymous personal identification information stored in a user profile. When the computing system 8115 identifies a match, the computing system 8115 may store the electronic device identification any one or more items anonymous personal identification information from the retrieved data piece in the user profile in the servers 8120.

In certain embodiments, the computing system 8115 utilizing the at least one processor 9205, stores electronic device identification any one or more items of anonymous personal identity information from the received data pieces in newly-created user profiles stored in the one or more servers 8120. For example, the computing system 8115 may search through the server 8120 to identify (e.g., find, locate) user profiles containing at least one of electronic device identification or one of one or more items of anonymous personal identification information that matches at least one of the electronic device identification or one of the one or more items of anonymous personal identification information contained in a retrieve data piece. After searching through the server 8120, the computing system 8115 may determine that no match exists between at least one of the electronic device identification or one of the one or more items of anonymous personal identification information contained in the retrieved data piece and at least one of electronic device identification or one of one or more items of anonymous personal identification information contained in a user profile of the one or more servers 8120. In response, the computing system 8115 may create a new user profile in the server 8120 and store the electronic device identification and the one or more items of anonymous personal identification information from the retrieved data piece in the newly-created user profile.

In certain embodiments, the computing system 8115, utilizing the at least one processor 9205, stores an additional data piece in the user profile in the server 8120 after the computing system 8110 has stored retrieved data piece in the same user profile. For example, in response to matching at least one item of the one or more items of anonymous personal identification information from the retrieved data piece with one or more items of anonymous personal identification information from an additional data piece, the computing system 8115 may store the additional data piece in the user profile in the server 8120. The additional data piece may have obtained from one or more other servers (e.g., not the one or more servers 8120) or from another data piece retrieved from another electronic device 8110.

In certain embodiments, the data pieces generated by the computing system 8115 and retrieved from the electronic device 8110 may include a cookie. a cookie (e.g., an http cookie, a web cookie, an Internet cookie, a browser cookie) is a piece of ADA sent from a website and stored on a memory of an electronic device 8110 by a web browser of the electronic device 8110 while the electronic device is engaged in a browser session. In certain embodiments, the computing system 8115, utilizing the at least one processor 9205, maps or associate electronic device identification from a cookie to an open source software footprint. An open source software footprint may be a unique set of traceable digital activities, actions, contributions, or communications that are manifested in open source code on the internet or on electronic devices. The electronic device 8110 may transmit one or more items of anonymous personal identification information to the web browser 8125 during a browser session. The one or more items of anonymous personal identification information transmitted from the electronic device 8110 includes and open source software footprint that is unique to the electronic device 8110 or that provides the computing system 8115 with an acceptable level of certainty that the specific electronic device 8110 is transmitting the one or more items of anonymous personal identification information.

When the electronic device 8110 transmits the one or more items of anonymous personal identification information to the web browser 8125, the one or more items of anonymous personal identification information may also be stored in each of the cookies stored in the memory of the electronic device 8110 and associated with domains from the matrix 26305. While the transmitted one or more items of anonymous personal identification information may not include the electronic device identification, each of the cookies associated with the domains from the matrix 26305 includes the electronic device identification. In addition, the one or more items of anonymous personal identification information stored in each of the cookies associated with the domain in the matrix may also include the open-source software footprint. Thus, when the computing system 8115 retrieves a cookie associated with a domain in the matrix from the memory of the electronic device 8110, a computing system 8115 maps or associates the open source software footprint from the retrieved cookie to the electronic device identification from the retrieved cookie. Accordingly, the computing system 8115 maps or associates the open-source software footprint with the specific electronic device 8110.

In certain embodiments, the computing system 8115 utilizing the at least one processor 9205, retrieves an item of personal identification information that is attached to the open-source software footprint. For example, after the computing system 8115 has mapped or associated the open-source software footprint from the retrieve cookie to the electronic device identification from the retrieve cookie and the computing system 8115 has stored the electronic device identification and the one or more items of anonymous personal identification information from the retrieved cookie in the user profile in the server 8120, the electronic device 8110 may engage in a subsequent web browser session with a web browser 8125 (e.g., the same web browser, another web browser). During the subsequent web browser session, the electronic device 8110 may transmit one or more items of anonymous personal identification information to the web browser 8125. The one or more items of anonymous personal notification information transmitted to the web browser 8125 during the subsequent web browser session may be different items of anonymous personal identification information from the one or more items of anonymous personal identification information transmitted the web browser during the initial web browser session.

The one or more items of anonymous personal identification information transmitted from the electronic device 8110 during the subsequent web browser session may include the open-source software footprint. The computing system 8115 may intercept, receive, or retrieve the transmitter one or more items of anonymous personal identification information transmitted from the electronic device 8110 during the subsequent web browser session and identify that the one or more items of anonymous personal identification information includes the open-source software footprint. The computing system 8115 may then math or associate the one or more items of anonymous personal identification information transmitted by the electronic device 8110 during the subsequent web browser session with the previously provided electronic device identification from the retrieved cookie based on the open source software footprint. Based on mapping the electronic device identification with the open-source software footprint during the initial web browser session, the computing system 8115 may identify that the electronic device 8110 is the source of the one or more items of anonymous personal identification information transmitted during the subsequent web browser session without relying on a cookie.

In certain embodiments, the computing system 8115, utilizing the at least one processor 9205, stores the one or more items of anonymous personal identification information in the user profile in the server 8120 based on the attached open source software footprint. In certain embodiments, the computing system 8115 store see one or more items of anonymous personal identification information transmitted during the subsequent browser session in the user profile in the server 8120 based on the attached open source software footprint. For example, the computing system 8150 may have determined that the one or more items of anonymous personal identification information transmitted during the subsequent web browser session is associated with the electronic device 8110 that stored be retrieved cookie from the initial web browser session. The computing system 8115 may store the one or more items of anonymous personal identification information in the same user profile that contains the electronic device identification and to the one or more items up anonymous personal identification information contained in the retrieve cookie from the initial web browser session based on mapping or associated with the open-source software footprint attached to the one or more items of anonymous personal identification information obtained during the subsequent web browser session with the electronic device identification stored in the user profile in the server 8120. Accordingly, the computing system 8115 may store items of anonymous personal identification information in the user profiles associated with specific electronic devices 8110 without relying on the ability of the computing system to retrieve cookies stored in the memories of the electronic devices 8110.

It should be understood that the computing system 8115, utilizing the at least one processor 9205, is configured to contemporaneously and continuously transmit data pieces to millions of electronic devices 8110 located and mobile around the world and engaged in web browser sessions on millions of different web browsers. The computing system 8115, utilizing the at least one processor 9205, is also configured to contemporaneously and continuously retrieve data pieces from the millions of electronic devices located and mobile around the world and engaged in web browser sessions on millions of different web browsers. The computing system 8115 utilizing the at least one processor 9205, is further configured to contemporaneously and continuously story retrieve data pieces from the millions of electronic device located and mobile around the world and engaged and web browser sessions on millions of different web browsers and select user profiles stored in a plurality of servers 8120. In addition, the computing system, utilizing the at least one processor 9205 is configured to contemporaneously and continuously match electronic device in identification and items of anonymous personal identification information provided in each of the millions of data pieces with electronic device identifications and items of anonymous personal identification information in the millions of user profiles stored in the plurality of servers 8120 to select the appropriate user profile(s) for storing electronic device identification and items of anonymous personal identification information provided in each of the millions of data pieces and cookies. Thus, the computing system 8115, utilizing the at least one processor 9205, gathers electronic device identification and items of anonymous personal identification information continuously and contemporaneously in real time and provide and sort the most up-to-date information and accordingly cannot be performed by human interaction.

FIG. 427 illustrates a method 27400 implemented by the computing system 8115, utilizing the at least one processor 9205, for performing network interruption remedy operations according to certain embodiments of this disclosure. Although certain details will be provided with reference to the method 27400 of FIG. 427, it should be understood that other embodiments may include more, less, or different method steps. At step 27401, the computing system 8115 is in an idle state at least with respect to performing network interruption remedy operations. At step 27403, the computing system 8115 determines that an electronic device 8110 has initiated an engagement in a web browser session with the web browser 8125 (e.g. An initial web browser) or that an electronic device 8110 has requested content from the web browser 8125.

At step 27405, the computing system 8115 transmits a first data piece associated with a first domain to the electronic device 8110. In certain embodiments, the computing system 8115 transmits the first data piece to the electronic device 8110, when the electronic device 8110 is engaged in an initial web browser session on the web browser 8125, more storage in an electronic device memory. The first data piece may be associated with a first domain that is linked to the web browser 8125 (e.g., the web browser domain). The first data piece may also contain an electronic device identification. The electronic device identification may be a unique identification that identifies a specific electronic device among all electronic devices. For example, the electronic device identification may be an identification that is unique to the electronic device 8110. In certain embodiments, the electronic device identification includes at least one of a MAC address, an MEIE number, an electronic device serial number, a pointer associated with a data port of the electronic device, a combination thereof, or the like.

At step 27407, the computing system 8115 transmits a second data piece associated with a second domain to the electronic device 8110. In certain embodiments, the computing system 8115 transmits a second data piece to the electronic device 8110 electronic device 8110 is engaged in the initial web browser session on the web browser 8125, for storage in the electronic device memory. The second data piece may be associated with a second domain that is linked to the web browser 8125 (e.g., the web browser domain). The second data piece may also contain an electronic device identification. The electronic device identification contained in the second data piece may be a same electronic device identification as the electronic device identification contained in the first data piece.

At step 27409, the computing system 8115 retrieves the second data piece from the electronic device 8110 when the first data piece is not retrievable from the electronic device 8110. In certain embodiments, the computing system 8115 retrieves the second data piece from the electronic device memory when the computing system 8115 is not able to retrieve the first data piece from the electronic device memory. The electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory. In certain embodiments, the data piece blocking software may not have flagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory.

The data piece blocking software stored and executed on the electronic device 8110 may have prevented the computing system 8115 from retrieving the first data piece from the memory of the electronic device 8110. For example, the data piece blocking software may have blocked data pieces from being stored on a memory of electronic device 8110 when the electronic device 8110 is engaged in a web browser session on a web browser. Additionally, or alternatively, the data piece blocking software may have flagged data pieces that are stored in the memory of the electronic device 8110 to prevent access to those flagged data pieces stored in the memory of the electronic device 8110 when or after the electronic device 8110 is engaged in the web browser session on the web browser.

In certain embodiments, the second data piece retrieved from the electronic device 8110 contains the electronic device identification and one or more items of anonymous personal identification information provided by the electronic device 8110 during the web browser session. For example, when the electronic device 8110 initiates the web browser session with the web browser 8125, the web browser 8125 transmits a data piece to the memory of electronic device 8110. Similarly, the computing system 8115 transmits the first data piece associated with the first domain and the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece, in the second data piece are stored in the memory of the electronic device is 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, and age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the database from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of the electronic device 8110. Thus, when the computing system 8115 retrieves the second data piece from the memory of the electronic device 8110, the second data piece includes the electronic device identification and the one or more items anonymous personal identification information provided by the electronic device 8110 during the web browser session.

At step 27411, the computing system 8115 stores the electronic device identification and the one or more items of anonymous personal identification information from the second data piece in a user profile of a server 8120. In certain embodiments, the computing system 8115 stores the electronic device identification and the one or more items of anonymous personal identification information from the second data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the second data piece in the user profile in the server 8120.

In certain embodiments, the computing system 8115 stores electronic device identification and the one or more items of anonymous personal identity information from the second data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the second data piece. After searching through the server 8120, the computing system 8115 may determine that no match exists between at least one of the electronic device identification or one of the one or more items of anonymous person identification information contained in the second data piece and at least one of electronic device identification or one of one or more items of anonymous personal identification information contained in a user profile of the server 8120. In response, the computing system 8115 may create a new user profile in the server 8120 and stored the electronic device identification and the one or more items of anonymous personal identification information from the second data piece in the newly created user profile.

FIG. 528 illustrates a method 28500502 lamented by a computing system 8115 for performing network interruption remedy operation according to certain embodiments of this disclosure. Although certain details will be provided with reference to the method 28500 of FIG. 528, it should be understood that other embodiments may include more, less, or different method steps. At step 28501, the computing system 8115 is in an idle state at least with respect to performing network interruption remedy operations. Step 28501 is at least similar to step 27401 of method 27400 illustrated in FIG. 427. at step 28503, the computing system 8115 determines that an electronic device 8110 has initiated an engagement in a web browser session with a web browser 8125 (e.g., an initial web browser) or that an electronic device 8110 has requested content from the web browser 125. Step 503 is at least similar to step 27403 of method 27400 illustrated in FIG. 427. At step 505, the computing system 8115 transmits a first data piece associated with a first domain to the electronic device 8110. Step 28505 is at least similar to step 27405 of method 27400 illustrated in FIG. 427. At step 28507, the computing system 8115 transmits a second data piece associated with a second domain to the electronic device 8110. Step 28507 is at least similar to step 27407 of method 27400 illustrated in FIG. 427.

At step 28509, the computing system 8115 retrieves the first data piece from the electronic device 8110 when the second data piece is not retrievable from the electronic device 8110. In certain embodiments, the computing system 8115 retrieves the first data piece from the electronic device memory when the computing system 8115 is not able to retrieve the second data piece from the electronic device memory. The electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the second data piece due to a specific string of HTML code contained in the second data piece. Additionally, or alternatively, the data piece blocking software may have blocked access to all data pieces from the second domain including data piece residing in the electronic device memory.

The data piece blocking software stored and executed on the electronic device 8110 may have prevented the computing system 8115 from retrieving the second data piece from the memory of the electronic device 8110. For example, the data piece blocking software may have blocked data pieces from being stored on a memory of electronic device 8110 when the electronic device 8110 is engaged in a web browser session on a web browser. Additionally, or alternatively, the data piece blocking software may have flagged data pieces that are stored in the memory of the electronic device 8110 to prevent access to those flag data pieces stored in the memory of the electronic device 8110 when or after the electronic device 8110 is engaged in the web browser session on the web browser. In certain embodiments, the data piece blocking software may not have flagged or blocked the first data piece due to a lack of a specific string of HTML code contained in the first data piece that would cause the data piece blocking software to block the first data piece. Additionally, or alternatively, the data piece blocking software may not have blocked access to data pieces from the first domain including the first data piece residing in the electronic device memory.

In certain embodiments, the first data piece retrieved from the electronic device 8110 contains the electronic device identification and one or more items of anonymous personal identification information provided by the electronic device 8110 during the web browser session. For example, when the electronic device 8110 initiates the web browser session with the web browser 8125, the web browser 8125 transmits a data piece to the memory of the electronic device 8110. Similarly, the computing system 8115 transmits the first data piece associated with the first domain and the second data piece associated with the second domain. Before the data piece from the web browser 8125, the first data piece, and the second data, are stored in the memory of the electronic device 8110, each of the data piece from the web browser 8125, the first data piece, and the second data piece, include the electronic device identification. After the data piece from the web browser 8125, the first data piece, and the second data piece are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group, user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the data piece from the web browser 8125 residing in the memory of the electronic device 8110 so that the electronic device 8110 or the web browser 8125 may quickly and easily access the anonymous personal identification information during a subsequent web browser session between the electronic device 8110 and a web browser 8125. In addition, because the first data piece and the second data piece are linked to the web browser 8125 via the first domain and the second domain, respectively, the anonymous personal identification information may also be stored in the first data piece and the second data piece residing in the memory of electronic device 8110. Thus, when the computing system 8115 retrieves the first data piece from the memory of electronic device 8110, the first data piece includes the electronic device identification and the one or more items of anonymous personal identification information provided by the electronic device 8110 during the web browser session.

At step 28511, the computing system 8115 stores the electronic device identification and the one or more items of anonymous personal identification information from the first data piece in a user profile of a server 8120. In certain embodiments, the computing system 8115 stores the electronic device identification and the one or more items anonymous personal identification information from the first data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the first data peas containing the electronic device identification and the one or more items of anonymous personal identification information, the computing system 8115 may match at least one of the electronic device identification or at least one of the one or more items of anonymous personal identification information from the first data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the first data piece in the user profile in the server 8120.

In certain embodiments, the computing system 8115 stores electronic device identification and the one or more items anonymous personal identity information from the first data piece in a newly created user profile stored in the server 8120. For example, the computing system 8115 may search through the server 8122 identify (e.g., find, locate) a user profile containing at least one of electronic device identification or one of one or more items of anonymous personal identification information that matches at least one of the electronic device identification or one of the one or more items of anonymous personal identification information contained in the first data piece. After searching through the server 8120, the computing system 8115 may determine that no match exists between at least one of the electronic device identification or one of the one or more items of anonymous personal identification information contained in the first data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the first data piece in the newly-created user profile.

FIG. 629 illustrates a method 29600604 implemented by a computing system 8115 for performing network interruption remedy operations according to certain embodiments of this disclosure. Although certain details will be provided with reference to the method 29600 of FIG. 629, it should be understood that other embodiments may include more, less, or different method steps. At step 29601, the computing system 8115 is in an idle state at least with respect to performing network interruption remedy operations. Step 29601 is at least similar to step 27401 of method 27400 illustrated in FIG. 427. At step 29603, the computing system 8115 determines that an electronic device 8110 has initiated an engagement in a web browser session with a web browser 8125 (e.g., an initial web browser) or that an electronic device 8110 as requested content from the web browser 8125. Step 29603 is at least similar to step 27403 of method 27400 illustrated in FIG. 427. At step 29605, the computing system 8115 transmits a first data piece associated with a first domain to the electronic device 8110. Step 29605 is at least similar to step 27405 of method 27400 illustrated in FIG. 427. At step 29607, the computing system 8115 transmits a second data piece associated with a second domain to the electronic device 8110. Step 29607 is at least similar to step 27407 of method 27400 illustrated in FIG. 427.

At step 29609, the computing system 8115 retrieves the first data piece and the second data piece from the electronic device 8110. In certain embodiments, the computing system 8115 retrieves the first data piece and the second data piece from the electronic device memory when the first data piece and the second data piece are retrievable from the electronic device 8110. The electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may not have flagged or blocked the first data piece and the second that appease due to a lack of specific string of HTML code contained in the first data piece or the second data piece that would cause the data piece blocking software to block the first data piece and the second data piece. Additionally, or alternatively, the data piece blocking software may not have blocked access to data pieces from the first domain and the second domain including the first data piece and the second data piece residing in the electronic device memory.

The data piece blocking software stored and executed on the electronic device 8110 may not have prevented the computing system 8115 from retrieving the first data piece and the second data piece from the memory of the electronic device 8110. For example, the data piece blocking software may not have blocked some data pieces from being stored on a memory of electronic device 8110 when the electronic device 8110 is engaged in a web browser session on a web browser. Additionally, or alternatively, the data piece blocking software may not have flagged some data pieces that are stored in the memory of the electronic device 8110 to permit access to those flagged data pieces stored in the memory of the electronic device 8110 when or after the electronic device 8110 is engaged in the web browser session on the web browser.

In certain embodiments, the first data piece and the second data piece retrieved from the electronic device 8110 contains the electronic device identification and one or more items of anonymous personal identification information provided by the electronic device 8110 during the web browser session. For example, when the electronic device 8110 initiates a web browser session with the web browser 8125, the web browser 8125 transmits a data piece to the memory of electronic device 8110. Similarly, the computing system 8115 transmits the first data piece associated with the first domain and the second data piece associated with the second domain. Before the data piece from the web browser 8125, the first data pieces, and the second data piece are stored in the memory of the electronic device 8110, each of the data piece from the web browser 8125, the first data piece, and the second data piece include the electronic device identification. After the data piece from the web browser 8125, the first data piece, and the second data piece are stored in the memory of the electronic device 8110, the electronic device 8110 may transmit one or more items of anonymous personal identification information to the web browser 8125 during the web browser session. In certain embodiments the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the database from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first data piece in the second data piece are linked to the web browser 8125 via the first domain and the second domain, respectively, the anonymous personal identification information may also be stored in the first data piece and the second data piece residing in the memory of electronic device 8110. Thus, when the computing system 8115 receives the first data piece and the second data piece from the memory of electronic device 8110, the first data piece and the second data piece each includes the electronic device information and the one or more items of anonymous personal identification information provided by the electronic device 8110 during the web browser session.

At step 29611, the computing system 8115 stores the electronic device and identification and the one or more items of anonymous personal identification information from the first data piece or the second data piece in a user profile of a server 8120. In certain embodiments, the computing system 8115 stores the electronic device identification and the one or more items of anonymous personal identification information from the first data piece or the second data piece in a user profile previously created and stored on the server 8120. For example, the computing system 8115 may have previously generated a user profile containing at least one of an electronic device identification or one or more items of anonymous personal identification information provided any previously obtained data piece. When the computing system 8115 receives the first data piece and the second data piece each containing the electronic device identification and me one or more items of anonymous personal identification information, the computing system 8115 may match at least one of the electronic device identification or at least one of the one or more items of anonymous personal identification information from the first data piece and the second data piece with at least one of the electronic device identification or at least one of the one or more items of anonymous personal identification information stored in the user profile. When the computing system 8115 identifies a match, the computing system 8115 may store the electronic device identification and see one or more items anonymous personal identification information from the first data piece or the second data piece in the user profile in the server 8120.

In certain embodiments, the computing system 8115 stores electronic device identification and the one or more items of anonymous personal identity information from the first data piece or the second data piece in a newly-created user profile stored in the server 8120. For example, the computer system 8115 may search through the server 8120 to identify a user profile containing at least one of electronic device identification or one of one or more items of anonymous personal identification information that matches at least one of the electronic device identification or one of the one or more items of anonymous personal identification information contained in the first data piece and the second data piece. After searching through the server 8120, the computing system 8115 may determine that no match exists between at least one of the electronic device identification or one of the one or more items of anonymous personal identification information contained in the first data piece and contained in the second data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the first data piece or the second atopy in the newly created user profile.

In certain embodiments, the computing system 8115 determines that the electronic device identification and the one or more items of anonymous personal identification information from the first data piece matches the electronic device identification and the one or more items of anonymous personal identification information from the second data piece. In response, the computing system 8115 may delete one of the first data piece or the second data piece and store the electronic device identification and one or more items of anonymous personal identification information from the remaining (e.g., not deleted) data piece in the user profile in the server 8120. Alternatively, in response, the computing system 8115 may store the electronic device identification and the one or more items of anonymous personal identification information from both the first data piece and the second data piece in the user profile in the server 8120.

FIG. 730 illustrates a method 30700704 implemented by a computing system 8115 for performing network interruption remedy operations according to certain embodiments of this disclosure. Although certain details will be provided with reference to the method 30700 of FIG. 730, it should be understood that other embodiments may include more, less, or different method steps. At step 30701, the computing system 8115 is in an idle state at least with respect to performing network interruption remedy operations. Step 30701 is at least similar to step 27401 of method 27400 illustrated in FIG. 427. At step 30703, the computing system 8115 determines that an electronic device 8110 has initiated an engagement in a web browser session with a web browser 8125 (e.g., an initial web browser) or that an electronic device 8110 has requested content from the web browser 8125. Step 30703 is at least similar to step 27403 of method 27400 illustrated in FIG. 274. At step 30705, the computing system 8115 transmits a first data piece associated with a first domain to the electronic device 8110. Step 30705 is at least similar to step 27405 of method 27400 illustrated in FIG. 274. At step 30707, the computing system 8115 transmits a second data piece associated with a second domain to the electronic device 8110. Step 30707 is at least similar to step 27407 of method 27400 illustrated in FIG. 427. At step 30709, the computing system 8115 retrieves the second data piece from the electronic device 8110 when the first data piece is not retrievable from the electronic device 8110. Step 30709 is at least similar to step 27409 of method 27400 illustrated in FIG. 274. At step 30711, the computing system 8115 stores the electronic device identification and the one or more items of anonymous personal identification information from the second data piece in a user profile of a server 8120. Step 30711 is at least similar to step 27411 of method 27400 illustrated in FIG. 427.

At step 30713, the computing system 8115 receives a third data piece containing at least one of an electronic device identification or one or more items anonymous personal identification information. In certain embodiments, the computing system 8115 may have received the third data piece in same or similar manner as described herein with respect to the first data piece or the second data piece. Alternatively, the computing system 8115 may have received the third data piece through a data transfers from one or more other servers. In response to receiving the third data piece, the computing system 8115 may search through the server 8120 to identify one or more user profiles containing electronic device identification and one or more items of anonymous personal identification information that match at least the electronic device identification or one of the one or more items anonymous personal identification information contained in the third data piece.

At step 30715, the computing system 8115 determines that at least one of the electronic device identification or one of the one or more items of anonymous personal identification information contained in the third data piece matches at least one of the electronic device identification or one of the one or more items of anonymous personal identification information stored in a user profile in the server 8120. For example, the computing system 8115 may search through the server 8120 and identify at least one user profile in the server 8120 that contains an electronic device identification that matches the electronic device identification contained in the third data piece. As another example, the computing system 8115 may search the server and identify at least one user profile in the server that contains a phone number that matches a phone number contained in the third data piece.

At step 30717, the computing system 8115 stores the electronic device identification and the one or more items of anonymous personal identification information in a user profile in the server 8120. For example, the third data piece may contain an electronic device identification that matches the electronic device identification stored in the user profile. In response, the computing system 8115 may store the electronic device identification and the one or more items of anonymous personal identification information from the third data piece in the user profile based on a match between the electronic device identification contained in the third data peas and the electronic device identification stored in the user profile. As another example, the third data piece may contain an email address that matches an email address stored in the user profile. In response, the computing system 8115 may store the electronic device identification and the one or more items of anonymous personal identification information from the third data piece in the user profile based on a match between the email address contained in the third data piece and an email address stored in the user profile. In certain embodiments, the computing system 8115 may store electronic device identification and the one or more items of anonymous personal identification information from the third data piece in a user profile that includes the electronic device identification and the one or more items of anonymous personal identification information from the first data piece or the second data piece. Additionally, or alternatively, the computing system 8115 may store the electronic device identification and the one or more items of anonymous personal identification information from the third data piece in a user profile that does not include the electronic device identification and the one or more items of anonymous personal identification information from the first data piece and the second data piece.

In certain embodiments, the computing system 8115 stores the electronic device identification and the one or more items of anonymous personal identity information from the third data piece in a newly created user profile stored in the server 8120. For example, the computing system 8115 may search through the server 8120 to identify a user profile containing at least on of electronic device identification or one of one or more items of anonymous personal identification information that matches at least one of the electronic device identification or one of the one or more items of anonymous personal identification information contained in the third data piece. After searching through the server 8120, the computing system 8115 may determine that no match exists between at least one of the electronic device identification or one of the one or more items of anonymous personal identification information contained in the third data piece and at least one of electronic device identification or one of one of more items of anonymous personal identification information stored in any user profile in the server 8120. In response, the computing system 8115 may create a new user profile in the server 8120 and store the electronic device identification and the one or more items of anonymous personal identification information from the third data piece in the newly created user profile.

FIG. 831 illustrates a method 31800 implemented by the computing system 8115 for performing network interruption remedy operations according to certain embodiments of this disclosure. Although certain details will be provided with reference to the method 31800 of FIG. 831, it should be understood that other embodiments may include more, less, or different method steps. In certain embodiments, a data pieces may include a cookie. A cookie (e.g., an HTTP cookie, a web cookie, an Internet cookie, a browser cookie) is a piece of data sent from a website and stored on a memory of an electronic device 8110 by a web browser of the electronic device 8110 while the electronic device is engaged in a browser session. At step 31801, the computing system 8115 is in an idle state at least with respect to performing network interruption remedy operations. Step 31801 is at least similar to step 27401 of method 27400 illustrated in FIG. 427. At step 31803, the computing system 8115 determines that an electronic device 8110 has initiated an engagement in a web browser session with the web browser 8125 (e.g., an initial web browser) or that an electronic device 8110 has requested content from the web browser 8125.

At step 31805, the computing system 8115 transmits a first cookie associated with a first domain to the electronic device 8110. In certain embodiments, the computing system 8115 transmits the first cookie to the electronic device 8110, when the electronic device 8110 is engaged in an initial web browser session on the web browser 8125 for storage in an electronic device memory. The cookie may be associated with a first domain that is linked to the web browser 8125 (e.g., the web browser domain). The first cookie may also contain an electronic device identification. The electronic device identification may be a unique identification that identifies a specific electronic device among all electronic devices. For example, the electronic device identification may be an identification that is unique to the electronic device 8110. In certain embodiments, the electronic device identification includes at least one of a MAC address, an IMEI number, an electronic device serial number, a pointer associated with a data port of the electronic device, a combination thereof, or the like.

At step 31807, the computing system 81145 transmits a second cookie associated with a second domain to the electronic device 8110. In certain embodiments, the computing system 8115 transmits a second cookie to the electronic device 8110, when the electronic device 8110 is engaged in the initial web browser session on the web browser 8125, for storage in the electronic device memory. The second cookie may be associated with a second domain that is linked to the web browser 8125 (e.g., the web browser domain). The second cookie may also contain an electronic device identification. The electronic device identification contained in the second cookie may be a same electronic device identification as the electronic device identification contained in the first cookie.

At step 31809, the computing system 8115 retrieves the second cookie from the electronic device 8110 when the first cookie is not retrievable from the electronic device 8110. In certain embodiments, the computing system 8115 retrieves the second cookie from the electronic device memory when the computing system 8115 is not able to retrieve the first cookie from the electronic device memory. The electronic device 110 may store and execute cookie blocking software (e.g., anti-identification software, pop-up blocker software, advertisement (ad) blocker software). For example, the cookie blocking software may flag or block specific strings of HTML code contained in certain cookies or may flag or block cookies associated with entire domains. The cookie blocking software may have flagged or blocked the first cookie due to a specific string of HTML code contained in the first cookie. Additionally, or alternatively, the cookie blocking software may have blocked access to all cookies from the first domain including the first cookie residing in the electronic memory. In certain embodiments, the cookie blocking software may not have flagged or blocked the second cookie due to a lack of specific string of HTML code contained in the second cookie that would cause the cookie blocking software to block the second cookie. Additionally, or alternatively, the cookie blocking software may not have blocked access to cookies from the second domain including the second cookie residing in the electronic device memory.

The data piece blocking software stored and executed on the electronic device 8110 may have prevented the computing system 8115 from retrieving the first data piece from the memory of the electronic device 8110. For example, the data piece blocking software may have blocked data pieces from being stored on a memory of electronic device 8110 when the electronic device 8110 is engaged in a web browser session on a web browser. Additionally, or alternatively, the data piece blocking software may have flagged data piece that are stored in the memory of the electronic device 8110 to prevent access to those flag data pieces stored in the memory of the electronic device 8110 when or after the electronic device 8110 is engaged in the web browser session on the web browser.

In certain embodiments, the second cookie retrieved from the electronic device 8110 contains the electronic device identification and one or more items of anonymous personal identification information provided by the electronic device 8110 during the web browser session. For example, when the electronic device 8110 initiates the web browser session with the web browser 8125, the web browser transmits a cookie to the memory of electronic device 8110. Similarly, the computing system 8115 transmits the first cookie associated with the first domain and the second cookie associated with the second domain. Before the cookie from the web browser 8125, the first cookie, and the second cookie, are stored in the memory of the electronic device 8110, each of the cookie from the web browser 8125, the first cookie, and the second cookie include the electronic device identification. After the cookie from the web browser 8125, the first cookie, and the second cookie are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the cookie from the web browser 8125 residing in the memory of the electronic device 8110. The one or more items of anonymous personal identification information may be stored in the cookie from the web browser 8125 residing in the memory of the electronic device 8110 so that the electronic device 8110 with a web browser 8125 met quickly and easily anonymous personal identification information during a subsequent web browser session between the electronic device 8110 and the web browser 8125. In addition, because the first cookie and the second cookie are linked to the web browser 8125 via the first domain and the second domain, respectively, the anonymous personal identification information may also be stored in the first cookie and the second cookie residing in the memory of electronic device 8110. Thus, when the computing system 8115 retrieves the second cookie from the memory of the electronic device 8110, the second cookie includes the electronic device identification and the one or more items of anonymous personal identification information provided by the electronic device 8110 during the web browser session.

At step 31811, the computing system 8115 stores the electronic device identification and the one or more items of anonymous personal identification information from the second cookie in a user profile of a server 8120. In certain embodiments, the computing system 8115 stores the electronic device identification and the one or more items of anonymous personal identification information from the second cookie in a user profile previously created and stored on the server 8120. For example, the computing system 8115 may have previously generated a user profile containing at least one of an electronic device identification or one or more items of anonymous personal identification information provided in a previously obtained. When the computing system 8115 received the second cookie containing the electronic device identification and the one or more items of anonymous personal identification information, the computing system 8115 may match at least one of the electronic device identification or at least one of the one or more items of anonymous personal identification information from the second cookie with at least one of the electronic device identification or at least one of the one or more items of anonymous personal identification information stored in the user profile. When the computing system 8115 identifies a match, the computing system 8115 may store the electronic device identification and the one or more items anonymous personal identification information from the second cookie in the user profile in the server 8120.

In certain embodiments, the computing system 8115 stores electronic device identification and the one or more items of anonymous personal identity information from the second cookie in a newly-created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identification or one of the one or more items of anonymous personal identification information contained in the second cookie. After searching through the server 8120, the computing system 8115 may determine that no match exists between at least one of the electronic device identification or one of the one or more items of anonymous personal identification information contained in the second cookie and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the second cookie in the newly created user profile.

At step 31813, the computing system 8115 maps or associates the electronic device identification from the second cookie to an open-source software footprint. An open-source software footprint may be a unique set of traceable digital activities, actions, contributions, or communications that are manifested in open source-code on the internet or on electronic devices. The electronic device 8110 may transmit one or more items of anonymous personal identification information to the web browser 8125 during a browser session (e.g., an initial browser session). The one or more items of anonymous personal identification information transmitted from the electronic device 8110 includes and open-source software footprint that is unique to the electronic device 8110 or that provides the computing system with an acceptable level of certainty that be specific electronic device 8110 is transmitting me one or more items of anonymous personal identification information.

As discussed herein, when the electronic device 8110 transmits the one or more items of anonymous personal identification information to the web browser 8125, the one or more items of anonymous personal identification information may also be stored in the cookie of the web browser 8125, the first cookie, and the second cookie each stored in the memory of the electronic device 8110. While the transmitted one or more items of anonymous personal identification information may not include the electronic device identification, the cookie of the web browser 8125, the first cookie, and the second cookie each includes the electronic device identification in addition the one or more items of anonymous personal identification information stored in each of the cookie of the web browser 8125, the first cookie, and the second cookie may also include the open-source software footprint. Thus, when the computing system 8115 retrieves the second cookie from the memory of the electronic device 8110, the computing system 8115 maps or associates the open-source software footprint from the second cookie to the electronic device identification from the second cookie. Accordingly, the computing system 8115 maps or associates the open-source software footprint from the specific electronic device 8110.

At step 31815, the computing system 8115 retrieves an item of personal identification information that is attached to the open-source software footprint. For example, after the computing system 8115 has mapped or associated the open-source software footprint from the second cookie to the electronic device identification from the second cookie and the computing system 8115 has stored the electronic device identification and the one or more items of anonymous personal identification information from the second cookie in the user profile in the server 8120, the electronic device 8110 may engage in a subsequent web browser session with web browser 8125 (e.g., the same web browser another web browser). During the subsequent web browser session, the electronic device 8110 may transmit one or more items of anonymous personal identification information to the web browser 8125. The one or more items of anonymous personal notification information transmitted to the web browser 8125 during the subsequent web browser session may be different items of anonymous personal identification information from the one or more items of anonymous personal identification information transmitted the web browser during the initial web browser session.

The one or more items of anonymous personal identification information transmitted from the electronic device 8110 during the subsequent web browser may include the open-source software footprint. The computing system 8115 may intercept, receive, or retrieve the transmitted one or more items anonymous personal identification information transmitted from the electronic device 8110 during the subsequent web browser session and identify that the one or more items of anonymous personal identification information includes the open-source software footprint. The computing system 8115 may then map or associate the one or more items of anonymous personal identification information transmitted by the electronic device 8110 during the subsequent web browser session with the previously provided electronic device identification from the second cookie based on the open source software footprint. Based on mapping the electronic device identification with the open-source software footprint during the initial web browser session, the computing system 8115 may identify that the electronic device 8110 is the source of the one or more items of anonymous personal identification information transmitted during the subsequent web browser session without relying on a cookie.

At step 31817, the computing system 8115 stores the one or more items of anonymous personal identification information in the user profile in the server 8120 based on the attached open-source software footprint. In certain embodiments, the computing system 8115 stores the one or more items of anonymous personal identification information transmitted during the subsequent browser session in the user profile in the server 8120 based on the attached open-source software footprint. For example, the computing system 8115 may have determined that the one or more items of anonymous personal identification information transmitted during the subsequent web browser session is associated with the electronic device 8110 that stored the second cookie from the initial web browser session. The computing system 8115 may store the one or more items of anonymous personal identification information in the same user profile that contains the electronic device identification and the one or more items of anonymous personal identification information contained in the second cookie from the initial web browser session based on mapping or associating the open-source software footprint attached to the one or more items of anonymous personal identification information obtained during the subsequent web browser session with the electronic device identification stored in the user profile in the server 8120. Accordingly, the computing system 8115 may store items of anonymous personal identification information in user profiles associated with specific electronic devices 8110 without relying on the ability of the computing system to retrieve cookies stored in the memories of the electronic device 8110.

FIG. 932 illustrates a method 32900 implemented by the computing system 8115 for performing network interruption remedy operations according to certain embodiments of this disclosure. Although certain details will be provided with reference to the method 32900 of FIG. 932, it should be understood that other embodiments may include more, less, or different method steps. At step 32901, the computing system 8115 is in an idle state at least with respect to performing network interruption remedy operations. At step 32903, the computing system 8115 determines that a first electronic device 8110 has initiated an engagement in a first web browser session with a web browser 8125 or that a first electronic device 8110 has requested content from a web browser 8125.

At step 32905, the computing system 8115 transmits a first data piece associated with a first domain to the first electronic device 8110. In certain embodiments, the computing system 8115 transmits the first data piece to the first electronic device 8110, when the first electronic device 8110 is engaged in the first web browser session on the web browser 8125, for storage in an electronic device memory of the first electronic device 8110. The first data piece may be associated with a first domain that is linked to the web browser 8125 (e.g., the web browser domain. The first data piece may also contain an electronic device identification. The electronic device identification may be a unique identification that identifies the first electronic device among all electronic devices. For example, the electronic device identification may be an identification that is unique to the first electronic device 8110. In certain embodiments, the electronic device identification includes at least one of a MAC address, an IMEI number, an electronic device serial number, a pointer associated with a data port of the electronic device, a combination thereof, or the like.

At step 32907, the computing system 8115 transmits a second data piece associated with a second domain to the first electronic device 8110. In certain embodiments, the computing system 8115 transmits a second data piece to the first electronic device 8110, when the first electronic device 8110 is engaged in the first web browser session on the web browser 8125, for storage in the electronic device memory of the first electronic device 8110. The second data piece may be associated with a second domain that is linked to the web browser 8125 (e.g., the web browser domain). The second data piece may also contain an electronic device identification. The electronic device identification contained in the second data piece may be a same electronic device identification as the electronic device identification contained in the first data piece.

At step 32909, the computing system 8115 retrieves the second data piece from the first electronic device 8110 when the first data piece is not retrievable from the first electronic device 8110. In certain embodiments, the computing system 8115 retrieves the second data piece from the electronic device memory of the first electronic device 8110 when the computing system 8115 is not able to retrieve the first data piece from the electronic device memory of the first electronic device 8110. The first electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to specific string of HTML code contained in the first data piece. Additionally, or alternatively the data piece blocking software may have blocked access to all data pieces from the first domain including the first data piece residing in the electronic device memory of the first electronic device 8110. In certain embodiments, the data piece blocking software may not have flagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory of the first electronic device 8110.

The data piece blocking software stored and executed on the first electronic device 8110 may have prevented the computing system 8115 from retreating the first data piece from the memory of the first electronic device 8110. For example, the data piece blocking software may have blocked the data pieces from being stored on a memory of first electronic device 8110 when the first electronic device 8110 is engaged in the first web browser session on the web browser. Additionally, or alternatively, the data piece blocking software may have flagged data pieces that are stored in the memory of the first electronic device 8110 to prevent access to those flag data pieces stored in the memory of the first electronic device 8110 when or after the first electronic device 8110 is engaged in the first web browser session on the web browser. In certain embodiments, the second data piece received from the first electronic device 8110 contains the electronic device identification and one or more items of anonymous personal identification information provided by the electronic device 8110 during the first web browser session. For example, when the first electronic device 8110 initiates the first web browser session with the web browser 8125, the web browser 8125 transmitted the first data piece associated with the first domain and the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece, and the second data piece are stored in the memory of the first electronic device 8110, the first electronic device 8110 may transmit one or more items of anonymous personal identification information to the web browser 8125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

In certain embodiments, the second data piece retrieved from the first electronic device 8110 contains the electronic device identification and one or more items of anonymous personal identification information provided by the second electronic device 8110 during the first web browser session. For example, when the first electronic device 8110 initiates the first web browser session with the web browser 8125, the web browser 8125 transmits a data piece to the memory of the first electronic device 8110. Similarly, the computing system 8115 transmits the first data piece associated with the first domain and the second data piece associated with the second domain. Before the data piece from the web browser 8125, the first data piece, and the second data piece are stored in the memory of the electronic device 8110, each of the data piece from the web browser 8125, the first data piece, and the second data piece includes the electronic device identification. After the data piece from the web browser 8125, the first data piece and the second data piece are stored in the memory of the first electronic device 8110, the first electronic device 8110 may transmit one or more items of anonymous personal identification information to the web browser 8125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the first electronic device the one or more items of anonymous personal identification information may be stored in a data piece from the web browser 8125 residing in the memory of the first electronic device 8110 so that the first electronic device 8110 or the web browser 8125 may quickly and easily access the anonymous personal identification information during a subsequent web browser session between the first electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of the first electronic device 8110. Thus, when the computing system 8115 retrieves the second data piece from the memory of the first electronic device 8110, the second data piece includes the electronic device identification and the one or more items of the anonymous personal identification information provided by the first electronic device 8110 during the first web browser session.

At step 32911, the computing system 8115 stores the electronic device identification and the one or more items of anonymous personal identification information from the second data piece in a user profile of a server 8120. In certain embodiments, the computing system 8115 stores the electronic device identification and the one or more items of anonymous personal identification information from the second data piece in a user profile previously created and stored on the server 8120. For example, the computing system 8115 may have previously generated a user profile containing at least one of an electronic device identification or more or more items of anonymous personal identification information provided in a previously obtained data piece. When the computing system 8115 receives the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the user profile. When the computing system 8115 identifies a match, the computing system 8115 may store for the electronic device identification and the one or more items anonymous personal identification information from the second data piece in the user profile in the server 8120.

In certain embodiments, the computing system 8115 stores electronic device identification and the one or more items of anonymous personal identity information from the second data piece in a newly created user profile in the server 8120. For example, the computing system 8115 may search through the server 8120 to identify (e.g., find, locate) a user profile containing at least one of electronic device identification or one of one or more items of anonymous personal identification information that matches at least one of the electronic device identification or one of the one or more items of anonymous personal identification information containing this second data piece. After searching through the server 8120, the computing system 8115 me determine that no match exists between at least one of the electronic device identification or one of the one or more items of anonymous personal identification information contained in the second data and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the second data piece in the newly-created user profile.

At step 32913, the computing system 8115 determines that a second electronic device 8110 has initiated an engagement in a second web browser session with the web browser 8125 or that a second electronic device 8110 has requested content from the web browser 8125. At step 32915, the computing system 8115 transmits a third data piece associated with a third domain to the second electronic device 8110. In certain embodiments, the computing system 8115 transmits the third data piece to the second electronic device 8110, when the second electronic device 8110 is engaged in a second web browser session on the web browser 8125, for storage in an electronic device memory of the second electronic device 8110. The third data piece may be associated with a third domain that is linked to the web browser 8125 (e.g., the web browser domain). The third data piece may also contain an electronic device identification. The electronic device identification may be a unique identification that identifies a specific electronic device among all electronic devices. For example, the electronic device identification may be and identification that is unique to the second electronic device 8110. In certain embodiments, the electronic device identification includes at least one of a MAC address, an IMEI number, an electronic device serial number, a pointer associated with a data port of the electronic device, a combination thereof, or the like.

At step 32917, the computing system 8115 transmits a fourth data piece associated with a fourth domain to the second electronic device 8110. In certain embodiments, the computing system 8115 transmits a fourth data piece to the second electronic device 8110, when the second electronic device 8110 is engaged in the second web browser session on the web browser 8125, or storage in the electronic device memory of the second electronic device 8110. The fourth data piece may be associated with a fourth domain that is linked to the web browser 8125 (e.g., the web browser domain). The fourth data piece may also contain an electronic device identification. The electronic device identification contained in the fourth data piece may be a same electronic device identification as the electronic device identification contained in the third data piece.

At step 32919, the computing system 8115 retrieves the fourth data piece from the second electronic device 8110 when the third data piece is not retrievable from the second electronic device 8110. In certain embodiments, the computing system 8115 retrieves the fourth data piece from the electronic device memory of the second electronic device 8110 when the computing system 8115 is not able to retrieve the third data piece from the electronic device memory of the second electronic device 8110. The second electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively the data piece blocking software may have blocked access to all data pieces from the third domain including the third data piece residing in the electronic device memory of the second electronic 8110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 8110.

The data piece blocking software stored and executed on the second electronic device 8110 may have prevented the computing system 8115 from retrieving the third data piece from the memory of the second electronic device 8110. For example, the data piece blocking software may have blocked data pieces from being stored on a memory of the second electronic device 8110 when the second electronic device 8110 is engaged in a second web browser session on the web browser. Additionally, or alternatively, the data piece blocking software may have flagged data pieces that are stored in the memory of the second electronic device 8110 to prevent access to those flagged data pieces stored in the memory of the second web browser session on the web browser.

In certain embodiments, the fourth data piece retrieved from the second electronic device 8110 contain is the electronic device identification and one or more items of anonymous personal identification information provided by the second electronic device 8110 during the second web browser session. For example, when the second electronic device 8110 initiates a second web browser session with the web browser 8125, the web browser 8125 transmits a data piece to the memory of the second electronic device 8110. Similarly, the computing system 8115 transmits the third data piece associated with the third domain and the fourth data piece associated with the fourth domain. Before the data piece from the web browser 8125, the third data piece, and the fourth data piece are stored in the memory of the second electronic device 8110, each of the data piece from the web browser 8125, the third data piece and the fourth data piece includes the electronic device identification. After the data piece from the web browser 8125, the third data piece and the fourth are stored in the memory of the second electronic device 8110, the second electronic device 8110 may transmit one or more items of anonymous personal identification information to the web browser 8125 during the second web browser session. In certain embodiments, the one or more items of anonymous personal identification information may include an email address, a postal address, a user identification (ID), a gender, an age group, a user interest, a combination thereof, or the like. In certain embodiments, be one or more items of anonymous personal identification information includes a hash value.

The transmitted one or more items of anonymous personal identification information may also be stored in the data piece from a web browser 8125 residing in the memory of the second electronic device 8110. The one or more items of anonymous personal identification information may be stored in the data piece from the web browser 8125 residing in the memory of the second electronic device 8110 so that the second electronic device 8110 or the web browser 8125 may quickly and easily access the anonymous personal identification information during a subsequent web browser session between the electronic device 8110 and the web browser 8125. In addition, because the third data piece and the fourth data piece are linked to the web browser 8125 via the third domain and the fourth domain, respectively, the anonymous personal identification information may also be stored in the third data piece and fourth data piece residing in the memory of the second electronic device 8110. Thus, when the computing system 8115 receives the fourth data piece from the memory of the chronic device 8110, the fourth data piece includes the electronic device identification and the one or more items of anonymous personal identification information provided by the second electronic device 8110 during the second web browser session.

At step 32921, the computing system 8115 stores the electronic device identification and the one or more items of anonymous personal identification information from the fourth data piece in a user profile of a server 8120. In certain embodiments, the computing system 8115 stores the electronic device identification and the one or more items of anonymous personal identification information from the fourth data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the fourth data piece containing the electronic device identification and the one or more items of anonymous personal identification information, the computing system 8115 may match at least one of the electronic device identification or at least one of the one or more items of anonymous personal identification information from the fourth data piece at least one of the electronic device identification or at least one of the one or more items of anonymous personal identification information stored in the user profile. When the computing system 8115 identifies a match, the computing system 8115 may store at the electronic device identification and the one or more items anonymous personal identification information from the fourth data piece in the user profile in the server 8120.

In certain embodiments, the computing system 8115 stores electronic device identification and the one or more items of anonymous personal identity information from the fourth data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identification or one of the one or more items of anonymous personal identification information contained in the fourth data piece. After searching through the server 8120, the computing system 8115 may determine that no match exists between at least one of the electronic device identification or one of the one or more items of anonymous personal identification information contained in the fourth data piece and at least one of electronic device identification or one of one or more items of anonymous personal identification information contained in a user profile of the server 8120. In response, the computing system 8115 may create a new user profile in the server 8120 and store the electronic device identification and see one or more items of anonymous personal identification information from the fourth data piece in the newly-created user profile.

FIG. 1033 illustrates a method 331000 implemented by the computing system 8115 for performing network interruption remedy operations according to certain embodiments of this disclosure. Although certain details will be provided with reference to the method 331000 of FIG. 1033, it should be understood that other embodiments may include more, less, or different method steps. At step 331011001 the computing system 8115 is in an idle state at least with respect to performing network interruption remedy operations. At step 331031003, the computing system 8115 determines that a first electronic device 110 has initiated and engagement in a web browser session with a first web browser 8125 or that a first electronic device 8110 has requested content from a first web browser 8125.

At step 331051005, the computing system 8115 transmits a first data piece associated with a first domain through the first electronic device 8110. In certain embodiments, the computing system 8115 transmits the first data piece to the first electronic device 8110, when the first electronic device 8110 is engaged in the web browser session on the first web browser 8125, for storage in an electronic device memory of the first electronic device 8110. The first data piece may be associated with a first domain that is linked to the first web browser 8125 (e.g., the web browser domain). The first data piece may also contain an electronic device identification. The electronic device identification may be a unique identification that identifies the first electronic device among all electronic devices. For example, the electronic device identification may be an identification that is unique to the first electronic device 8110. In certain embodiments, the electronic device identification includes at least one of a MAC address, an IMEI number, and electronic device serial number, a pointer associated with a data port of the electronic device, a combination thereof, or the like.

At step 100733107, the computing system 8115 transmits a second data piece associated with a second domain to the first electronic device 8110. In certain embodiments, the computing system 8115 transmits a second data piece to the first electronic device 8110, when the first electronic device 8110 is engaged in a web browser session on the first web browser 8125, for storage in the electronic device memory of the first electronic device 8110. The second data piece may be associated with a second domain that is linked to the first web browser 8125 (e.g., the first web browser domain. The second data piece may also contain an electronic device identification. The electronic device identification contained in the second data piece may be a same electronic device identification as the electronic device identification contained in the first data piece.

At step 100933109, the computing system 8115 retrieve the second data piece from the first electronic device 8110 when the first data piece is not retrievable from the first electronic device 8110. In certain embodiments, the computing system 8115 retrieves the second data piece from the electronic device memory of the first electronic device 8110 when the computing system 8115 is not able to retrieve the first data piece from the electronic device memory of the first electronic device 8110. The first electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively the data piece blocking software may have blocked access to all data pieces from the first domain including the first data piece residing in the electronic device memory of the first electronic device 8110. In certain embodiments, the data piece blocking software may not have flagged or blocked the fourth data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory of the first electronic device 8110.

The data piece blocking software stored and executed on the first electronic device 8110 may have prevented the computing system 8115 from retrieving the first data piece from the memory of the first electronic device 8110. For example, the data piece blocking software may have blocked data pieces from being stored on a memory of the first electronic device 8110 when the first electronic device 8110 is engaged in a web browser session on the first web browser. Additionally, or alternatively, the data piece blocking software may have flagged data pieces that are stored in the memory if the first electronic device 8110 to prevent access to those flagged data pieces stored in the memory of the first electronic device 8110 when or after the first electronic device 8110 is engaged in the web browser session on the first web browser.

In certain embodiments, the second data piece retrieved from the first electronic device 8110 contains the electronic device identification and one or more items of anonymous personal identification information provided by the first electronic device 8110 during the web browser session on the first web browser 8125. For example, when the first electronic device 8110 initiates the web browser session with the first web browser 8125, the first web browser 8125 transmits a data piece to the memory of first electronic device 8110. Similarly, the computing system 8115 transmits the first data piece associated with the first domain and the second data piece associated with the second domain. Before the data piece from the first web browser 8125, the first data piece, and the second data piece are stored in the memory of the first electronic device 8110, each of the data piece from the first web browser 8125, the first data piece, and the second data piece include the electronic device identification. After the data piece from the first web browser 8125, the first data piece, and the second data piece are stored in the memory of the first electronic device 8110, the first electronic device 8110 may transmit one or more items of anonymous personal identification information to the first web browser 8125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the first web browser 8125 residing in the memory of the first electronic device 8110. The one or more items of anonymous personal identification information may be stored in the data piece from the first web browser 8125 residing in the memory of the first electronic device 8110 so that the first electronic device 8110 or the first web browser 8125 may quickly and easily access the anonymous personal identification information during a subsequent web browser session between the first electronic device 8110 and the first web browser 8125. In addition, because the first data piece and the second data piece are linked to the first web browser 8125 via the first domain and the second domain, respectively, the anonymous personal identification information may also be stored in the first data piece and the second data piece residing in the memory of the first electronic device 8110. Thus, when the computing system 8115 retrieves the second data piece from the memory of the first electronic device 8110, the second data piece includes the electronic device identification and the one or more items of anonymous personal identification information provided by the first electronic device 8110 during the web browser session.

At step 101133111, the computing system 8115 stores the electronic device identification and the one or more items of anonymous personal identification information from the second data piece in a first user profile of a server 8120. In certain embodiments, the computing system 8115 stores the electronic device identification and the one or more items of anonymous personal identification information from the second data piece in a first user profile previously created and stored on the server 8120. For example, the computing system 8115 may have previously generated a first user profile containing at least one of an electronic device identification or one or more items of anonymous personal identification information provided in a previously obtained data piece. When the computing system 8115 received the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the first user profile. When the computing system 8115 identifies a match, the computing system 8115 may store the electronic device identification and the one or more items anonymous personal identification information from the second data piece in the first user profile in the server 8120.

In certain embodiments, the computing system 8115 stores electronic device identification and the one or more items of anonymous personal identity information from the second data piece in a newly created first user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identification or one of the one or more items of anonymous personal identification information contained in the second data piece. After searching through the server 8120, the computing system 8115 may determine that no match exists between at least one of the electronic device identification or one of the one or more items of anonymous personal identification information contained in the second data piece and at least one of electronic device identification or one of one or more items of anonymous personal identification information contained in a user profile of the server 8120. In response, the computing system 8115 may create a new first user profile in the server 8120 and store the electronic device identification and the one or more items of anonymous personal identification information from the second data piece in the newly-created user profile.

At step 331131013, the computing system 8115 determines that a second electronic device 8110 has initiated an engagement in a web browser session with the second web browser 8125 or that a second electronic device 8110 has requested content from a second web browser 8125. At step 101533115, the computing system 8115 transmits a third data piece associated with a third domain that is linked to the second web browser 8125 (e.g. the second web browser domain). The third data piece may also contain an electronic device identification. The electronic device identification may be a unique identification that identifies a specific electronic device among all electronic devices. For example, the electronic device identification may be an identification that is unique to the second electronic device 8110. In certain embodiments, the electronic device identification includes at least one of a MAC address, an IMEI number, and electronic device serial number, a pointer associated with a data port of the electronic device, a combination thereof, or the like.

At step 101733117, the computing system 8115 transmits the fourth data piece associated with a fourth domain to the second electronic device 8110. In certain embodiments, the computing system 8115 transmits of fourth data piece to the second electronic device 8110, when you the second electronic device 8110 is engaged in the web browser session on the second web browser 8125, four storage in the electronic device memory of the second electronic device 8110. The fourth data piece may be associated with a fourth domain that is linked to the second web browser 8125 (e.g., the second web browser domain). The fourth data piece may also contain an electronic device identification. The electronic device identification contained in the fourth data piece may be a same electronic device identification as the electronic device identification contained in the third data piece.

At step 101933119, the computing system 8115 retrieves the fourth data piece from the second electronic device 8110 when the third data piece is not retrievable from the second electronic device 8110. In certain embodiments, the computing system 8115 retrieves the fourth data piece from the electronic device memory of the second electronic device 8110 when the computing system 8115 is not able to retrieve the third data piece from the electronic device memory of the second electronic device 8110. The second electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively the data piece blocking software may have blocked access to all data pieces from the third domain including the third data piece residing in the electronic device memory of the second electronic device 8110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 8110.

The data piece blocking software stored and executed on the second electronic device 8110 may have prevented the computing system 8115 from retrieving the third data piece from the memory of the second electronic device 8110. For example, the data piece blocking software may have blocked the data pieces from being stored on a memory of the second electronic device 8110 when the second electronic device 8110 is engaged in the web browser session on the second web browser. Additionally, or alternatively, the data piece blocking software may have flagged data pieces that are stored in the memory of the second electronic device 8110 to prevent access to those flagged data pieces stored in the memory of the second electronic device 8110 when or after the second electronic device 8110 is engaged in the web browser session on the second web browser.

In certain embodiments, the fourth data piece received from the second electronic device 8110 contains the electronic device identification and one or more items of anonymous personal identification information provided by the second electronic device 8110 during the web browser session on the second web browser 8125. For example, when the second electronic device 8110 initiates the web browser session with the second web browser 8125, the second web browser 8125 transmits a data piece to the memory of the second electronic device 110. Similarly, the computing system 8115 transmits the third data piece associated with the third domain and the fourth data piece associated with the fourth domain. Before the data piece from the second web browser 8125, the third data piece, and the fourth data piece are stored in the memory of the second electronic device 8110, each of the data piece from the second web browser 8125, the third data piece and the fourth data piece includes the electronic device identification. After the data piece from the second web browser 8125, the third data piece and the fourth data piece are stored in the memory of the second electronic device 8110, the second electronic device 8110 may transmit one or more items of anonymous personal identification information to the second web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the second web browser 8125 residing in the memory of the second electronic device 8110. The one or more items of anonymous personal identification information may be stored in a data piece from the second web browser 8125 residing in the memory of the second electronic device 8110 so that the second electronic device 8110 or the second web browser 8125 may quickly and easily access the anonymous personal identification information during a subsequent web browser session between the electronic device 8110 and the subsequent web browser 8125. In addition, because the third data piece and the fourth data piece are linked to the second web browser 8125 via the third domain and the fourth domain, respectively, the anonymous personal identification information may also be stored in the third data piece and the fourth data piece residing in the memory of the second electronic device 8110. Thus, when the computing system 8115 retrieves the fourth data piece from the memory of the second electronic device 8110, the fourth data piece includes the electronic device identification and the one or more items of the anonymous personal identification information provided by the second electronic device 8110 during the web browser session on the second web browser.

At step 331211021, the computing system 8115 stores the electronic device identification and the one or more items of anonymous personal identification information from the fourth data piece in a second user profile of a server 8120. In certain embodiments, the computing system 8115 stores the electronic device identification and the one or more items of anonymous personal identification information from the fourth data piece in a second user profile previously created and stored on the server 8120. For example, the computing system 8115 may have previously generated a second user profile containing at least one of an electronic device identification or one or more items of anonymous personal identification information provided in a previously obtained data piece. When the computing system 8115 receives the fourth data piece containing the electronic device identification and the one or more items of anonymous personal identification information, the computing system 8115 may match at least one of the electronic device identification or at least one of the one or more items of anonymous personal identification information from the fourth data piece with at least one of the electronic device identification or at least one of the one or more items of anonymous personal identification information stored in the second user profile. When the computing system 8115 identifies a match, the computing system 8115 may store the electronic device identification and the one or more items anonymous personal identification information from the fourth data piece in the second user profile in the server 8120.

In certain embodiments, the computing system 8115 stores electronic device identification and the one or more items of anonymous personal identity information from the fourth data piece in a newly created second user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identification or one of the one or more items of anonymous personal identification information contained in the fourth data piece. After searching through the server 8120, the computing system 8115 may determine that no match exists between at least one of the electronic device identification or one of the one or more items of anonymous personal identification information contained in the fourth data piece and at least one of electronic device identification or one of one or more items of anonymous personal identification information contained in a user profile of the server 8120. In response, the computing system 8115 may create a new second user profile in the server 8120 and store the electronic device identification and the one or more items of anonymous personal identification information from the fourth data piece in the newly-created second user profile.

FIG. 11 illustrates a non-limiting, example computer system 1100 configured to implement systems and methods for performing network interruption remedy operations according to certain embodiments of this disclosure. FIG. 11 illustrates a computer system 1100 that is configured to execute any and all of the embodiments described herein. In certain embodiments, the computer system 1100 describes at least some of the components of computing system 115 illustrated in FIGS. 1 and 2. In certain embodiments, the computer system 1100 describes at least some of the components of the one or more electronic devices 1100, the one or more servers 120, or electronics that provide the one or more web browsers 125 illustrated in FIG. 1. In different embodiments, the computer system 11008115 may be any of various types of devices, including, but not limited to, a computer embedded in a vehicle, a computer embedded in an appliance, a personal computer system, a desktop computer, a handset, a laptop computer, a notebook computer, a tablet, a slate, a netbook computer, a camera, a handheld video game device, a handheld computer, a video recording device, a consumer device, a portable storage device, a mainframe computer system, a workstation, network computer, a set top box, a video game console, a mobile device, an application server, a storage device, a television, a peripheral device such as a switch, a modem, a router, or in general any type of computing or electronic device.

Various embodiments of a system and method for data collection and aggregation, as described herein, may be executed on one or more computer systems 11008115, which may interact with various other devices. In the illustrated embodiment, the computer system 11008115 includes one or more processors 11059205 couple to a system memory 11109210 via an input/output (I/O) interface 11159215. The computer system 11008115 further includes a network interface 1120920 coupled to I/O interface 11915, and one or more input/output devices 11925, such as cursor control device 940, keyboard 945 and displays(s) 950. In some cases, it is contemplated that embodiments may be implemented using a single instance of computer system 11008115, while in other embodiments multiple such systems, or multiple nodes making up computer system 11008115, may be configured to hos different portions or instances of embodiments. For example, in one embodiment some elements may be implemented via one or more nodes of computer system 11008115 that are distinct form those nodes implementing other elements.

In various embodiments, computer system 11008115 may be a uniprocessor system including one processor 119205a, or a multiprocessor system including several processors 119205a-119205n (e.g., two, four, eight, or another suitable number). The processors 119205 may be any suitable processor capable of executing instructions. For example, in various embodiments the processors 119205 may be general-purpose or embedded processors implementing any of a variety of instruction set architectures (ISAs), such as the x86, PowerPC, SPARC, or MIPS ISAs, or any other suitable ISA. In multiprocessor systems, each of processors 119205 may commonly, but not necessarily, implement the same ISA.

The system memory 119210 may be configured to store the program instructions 119230 and/or existing state information and ownership transition condition data in the data storage 119235 accessible by the processor 119205. In various embodiments, the system memory 119210 may be implemented using any suitable memory technology, such as static random access memory (SRAM), synchronous dynamic RAM (SDRAM), nonvolatile/flash-type memory, or any other type of memory. In the illustrated embodiment, the program instructions 119230 may be configured to implement a system for performing network interruption remedy operations incorporating any of the functionality, as described herein. In some embodiments, program instructions and/or data may be received, sent, or stored upon different types of computer-accessible media or on similar media separate from the system memory 119210. The computer system 11008115 is described as implementing at least some of the functionality of functional blocks of previous figures.

In one embodiment, the I/O interface 119215 may be configured to coordinate I/O traffic between the processor 119205, the system memory 119210, and any peripheral interfaces, such as the input/output devices 11925. In some embodiments, the I/O interface 119215 may perform any necessary protocol, timing or other data transformations to convert data signals from one component (e.g., the system memory 119210) into a format suitable for use by another component (e.g., the processor 119205). In some embodiments, the I/O interface 119215 may include support for devices attached through various types of peripheral buses, such as a variant of the Peripheral Component Interconnect (PCI) bus standard or the Universal Serial Bus (USB) standard, for example. In some embodiments, the function of the I/O interface 119215 may be split into two or more separate components, such as a north bridge and a south bridge, for example. Also, in some embodiments some or all of the functionality of the I/O interface 119215, such as an interface to the system memory 119210, may be incorporated directly into the processor 119205.

The network interface 119220 may be configured to allow data to be exchanged between the computer system 11008115 and other devices attached to the network 8105 or between nodes of the computer system 11008115. The network 8105 may be in various embodiments include one or more networks including but not limited to Local Area Networks (LANs) (e.g. an Ethernet or corporate network), Wide Area Networks (WANs) (e.g., the Internet), wireless data networks, some other electronic data network, a combination thereof, or the like. In various embodiments, the network interface 119220 may support communication via wired or wireless general data networks, such as any suitable type of Ethernet network, for example; via telecommunications/telephony networks such as analog voice networks or digital fiber communications networks; via storage area networks such as fiber channel SANs, or via any other suitable type of network and/or protocol.

The input/output devices 119225 may, in some embodiments, include one or more display terminals, keyboards, keypads, touchpads, scanning devices, voice, or optical recognition devices, or any other devices suitable for entering or accessing data by one or more the computer systems 11008115. Further, various other sensors may be included in the I/O devices 119225, such as imaging sensors, barometers, altimeters, LIDAR, or any suitable environmental sensor. Multiple input/output devices 119225 may be present in the computer system 11008115 or may be distributed on various nodes of the computer system 11008115. In some embodiments, similar input/output devices may be separate from the computer system 11008115 and may interact with one or more nodes of the computer system 11008115 through a wired or wireless connection, such as over the network interface 119220.

As shown in FIG. 119, the memory 1109210 may include program instructions 119230, which may be processor-executable to implement any element or action, as described herein. In one embodiment, the program instructions may implement at least a portion of methods described herein, such as the methods illustrated by FIGS. 4-1027-33. In other embodiments, different elements and data may be included. Note that the data storage 119235 may include any data or information, as described herein.

Those skilled in the art will appreciate that the computer system 11008115 is merely illustrative is not intended to limit the scope of embodiments. In particular, the computer system and devices may include any combination of hardware or software that can perform the indicated functions, including computers, network devices, internet appliances, PDAs, wireless phones, pagers, GPUs, specialized computer systems, information handling apparatus, or the like. The computer system 11008115 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in the memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of these system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 11008115 may be transmitted to the computer system 11008115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon on a computer-accessible medium. Generally speaking, a computer accessible medium may include a non-transitory, computer-readable storage medium or memory medium such as a magnetic or optical media, e.g., disc or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as a network and/or a wireless link.

Thus, the disclosure provides, among other things, a system for performing network interruption remedy operations, including a computing system. The computing system is configured for contemporaneously and continuously sending data pieces or cookies to millions of electronic devices located and mobile around the world and engaged in web browser sessions on millions of different web browsers. The computing system is also configured for contemporaneously and continuously retrieving data pieces and cookies from the millions of electronic devices located and mobile around the world and engaged in web browser sessions on millions of different web browsers. The computing system is further configured for contemporaneously and continuously storing the retrieved data pieces and cookies from the millions of electronic device located and mobile around the world engaged in web browser session on millions of different web browsers in select user profiles stored in a plurality of server. In addition, the computing system is configured for contemporaneously and continuously matching electronic device identifications and items of anonymous personal identification information provided in each of the millions of data pieces and cookies with electronic device identification s and items of anonymous personal identification information in the millions of user profiles stored in the plurality of servers to select the appropriate user profile(s) for storing electronic device identification and items of anonymous personal identification information provided in each of the millions of data pieces and cookies. Various features and advantages of the disclosure are set forth in the following claims.

None of the description in this application should be read as implying that any particular element, step, or function is an essential element that must be included in the claim scope. The scope of patented subject matter is defined only by the claims. Moreover, none of the claims is intended to invoke 35 U.S.C. 112(f) unless the exact words "means for" are followed by a participle.

SECTION VI. METHOD AND SYSTEM FOR DATA COLLECTION AND AGGREGATION IN HETEROGENOUS DATABASES

Additional Background for Section VI

Websites are capable of tracking users who visit and interact with the websites by storing a cookie on the user's web browser. The data stored by the cookie may be saved to a database associated with the website. The term "cookie" is generally used to reference to a piece of data sent from a website and stored by the web browser. The stored data may be data for known users (e.g. users that have registered with the website, for example by making an account) or the stored data may be data for anonymous users (e.g., users that have not registered with the website). It is often difficult to match the data for an anonymous user to a known user or a known identity across multiple websites or databases.

SUMMARY OF SECTION VI

This disclosure provides systems and methods for receiving and aggregating personal identification information (P II) provided during a web browser session.

In a first embodiment, the disclosure provides an apparatus including a computing system that is communicatively linked to a server. The computing system includes a memory and at least one processor. The computing system is configured to receive a data piece associated with a web browser session on a web browser from an electronic device. The data piece contains an item of anonymous personal identification information coupled with a behavior. The computing system is also configured to determine whether to store the behavior in a user profile in a server based on a confidence interval associated with the at least one of the electronic device, the web browser session, or the web browser. The user profile is associated with the item of anonymous personal identification information. The computing system is further configured to store the behavior in the user profile when the confidence interval surpasses a confidence interval threshold.

In a second embodiment, the disclosure provides a computer-implemented method performed by a computing system. The computer-implemented method includes receiving, by the computing system, a data piece associated with a web browser session on a web browser from an electronic device. The data piece contains an item of anonymous personal identification information coupled with a behavior. The computer-implemented method also includes determining, by a computing system, whether to store the behavior in a user profile in a server based on a confidence interval associated with the at least one of the electronic device, the web browser session, or the web browser. The user profile is associated with the item of anonymous personal identification information. The computer-implemented method further includes storing, by the computing system, the behavior in the user profile when the confidence interval surpasses a confidence interval threshold.

In a third embodiment, the disclosure provides a non-transitory, computer-readable storage medium. The non-transitory, computer-readable storage medium stores one or more executable instructions that, when executed by at least one processor, causes the at least one processor to receive a data piece associated with a web browser session on a web browser from an electronic device. The data piece contains an item of anonymous personal identification information coupled with a behavior. The one or more executable instructions that, when executed by at least one processor, also causes the at least one processor to determine whether to store the behavior in a user profile in a server based on a confidence interval associated with the at least one of the electronic device, the web browser session, or the web browser. The user profile is associated with the item of anonymous personal identification information. The one or more executable instructions that, when executed by at least one processor, further causes the at least one processor to store the behavior in the user profile when the confidence interval surpasses a confidence interval threshold.

Other technical features may be readily apparent to one skilled in the art from the following figures, descriptions and claims.

Before undertaking the DETAILED DESCRIPTION below, it may be advantageous the set forth definitions of certain words and phrases used throughout this patent document. The term "couple" and its derivatives refer to any direction or indirect communication between two or more elements, whether or not those elements are in physical contact with one another. The terms "transmit" "receive" and "communicate" as well as derivatives thereof, encompass both direct and indirect communication. The terms "include" and comprise" as well as derivatives thereof, mean inclusion without limitation. The term "or" is inclusive, meaning and/or. The phrase "Associated with" as well derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "At least one of" when used with a list of items, mean that different combinations of one or more of the listed items may be used and only one item in the list may be needed. For example, "at least one of A, B, and C," includes any of the following combinations: "A, B, C, A and B, A and C, B and C, and A and B and C.

Moreover, various functions described below can implemented or supported be one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code and executable code. The phrase "computer readable medium" and "computer readable storage medium" includes any type of medium capable of being accessed by a computer or a processor, such as read only memory (ROM), random access memory (RAM) a hard disk drive, a compact disc (CD), a digital video disc (DVD), or any other type of memory. A "non-transitory" computer-readable medium and a "non-transitory" computer-readable storage medium excludes wired, wireless, optical, or other communication links that transport transitory electrical or other signals. A non-transitory, computer-readable medium and a non-transitory, computer-readable storage medium include media where data can be permanently stored and media where data can be stored and later overwritten such as a rewritable optical disco or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF DRAWINGS

FIG. 1 illustrates a non-limiting example network context 100 for operating a computing system according to certain embodiments of this disclosure.

FIG. 2 illustrates a non-limiting example computing system configured to perform data reception and aggregation operations according to certain embodiments of the disclosure.

FIGS. 3-11 illustrate flow diagrams of methods for data reception and aggregation operations according to certain embodiments of the disclosure; and FIG. 12 illustrates a non-limiting example computer system configured to implement aspects of systems and methods according to certain embodiments of the disclosure.

DETAILED DESCRIPTION OF SECTION VI

FIGS. 1 through 12, The figures discussed below and the various embodiments used to describe the principles of this disclosure in this patent document are by way of illustration only and should not be construed in any way to limit the score of the disclosure. Those skilled in the art will understand that the principles of this disclosure may be implemented in any suitably arranged wireless communication system.

FIG. 18 illustrates a non-limiting, example network context 100 for operating a computing system 8115 according to certain embodiments of this disclosure. One or more components of the network context 8100 may operate as separate components linked by one or more constituent of the network context 8100 may operate as separate components linked by one or more constituent networks of the network 8105. In some embodiments, one or more constituent networks of the network 8105 may include the internet, which can be accessed over both wired connections (e.g. an Ethernet connection) or over a wireless connection (e.g. a wireless local area network "WLAN" connection or a cellular network connection). Additionally, or alternately, one or more constituent networks of the network 8105 may include a combination of private networks (e.g. a local wireless mesh network) and public networks (e.g. a telephone (POTS) network). In certain embodiments, one or more constituent networks of the network 8105 may support multiple communication protocols, including both wireless protocols (e.g. BLUETOOTH™, circuit-switched cellular, 3G, LTE, WiBro) and internet protocols, (e.g. HTTP).

The one or more constituent networks of the network 8105 provide two-way connectivity between each of the electronic devices 8110, the computing system 8115, the one or more servers 8120, and the one or more web browsers 8125. In certain embodiments, the one or more constituent networks of the network 8105 provide two-way connectivity between each of the electronic device 8110, the computing system 8115, the one or more servers 8120, and the one or more web browsers 8125 using one or more same or different channels, protocols, or networks of network 8105. For example, a circuit-switched cellular protocol wireless network of the network 8105 provides connectivity between the iPhone™ 8100a and one or more of the web browsers 8125 while a POTS wireless network of the network 8105 provides connectivity between the smartphone 8110c and at least one of the one or more web browsers 8125.

In certain embodiments, the network context 8100 includes one or more electronic devices 8110. The one or more devices 8110 may include an iPhone™ 8110a, a table 8110b, a desktop computer 110c, a smartphone 8110d, a laptop computer 8110e, or the like. In certain embodiments, each of the one or more electronic devices 8110 are configured to initiate a web browser session with a web browser 8125 or access and display the one or more web browsers 8125 through the network 8105 for viewing by a user and for interaction between the user and the one or more web browsers 8125. In certain embodiments, each of the one or more electronic devices 8110 is configured to store data pieces associated with the web browser 8125. The data piece may contain at least one of an electronic device identification or one or more items of anonymous personal identification information. In certain embodiments, the electronic device 8110 transmits anonymous personal identification information to the web browser 8125 during a web browser session where the anonymous personal identification information also includes an open source software footprint. Additionally, or alternatively, the electronic device 8110 transmits action or behaviors to the web browser 8125 during a web browser session. In certain embodiments, the electronic device 8110 includes an electronic device display screen, an electronic device memory, and at least one electronic device processor. The electronic device may be configured to access and display content from one or more web browsers 8125 on the electronic device display screen.

In certain embodiments, the network context 8100 includes one or more web browsers 8125. As described herein, the one or more web browsers 8125 are configured to contain display content for viewing by an electronic device 8110 when the electronic device 8110 is engaged in a web browser session with the web browser 8125. In certain embodiments, the one or more web browsers 2158125 are configured to transmit data pieces to the electronic device 8110 for storage in a memory of the electronic device 8110 when the electronic device 8110 is engaged in a web browser session with the web browser 8125. The data pieces may contain one or more of an electronic device identification, one or more items of anonymous personal identification information (e.g. a primary item of anonymous personal identification information, a secondary item of anonymous personal identification information), or one or more behaviors performed by a user interacting with the web browser 8125 during a web browser session. The one or more web browsers 8125 may also be configured to receive data from an electronic device 8110 when the electronic device 8110 is engaged in a web browser session with one of more web browsers 8125. The received data may include one or more of an electronic device identification, on or more items of anonymous personal identification information (e.g. a primary item of anonymous personal identification information, a secondary item of anonymous personal identification information), or one or more behaviors performed by a user interacting with the web browser 8125 during a web browser session.

Additionally, the network context 8100 may, according to certain embodiments, include one or more servers 8120. In certain embodiments, the one or more servers 8120 stores user profiles that each may include electronic device identifications, one or more items of anonymous personal identification information (e.g. a primary item of anonymous personal identification information, a secondary item of anonymous personal identification), or one or more behaviors formed by a user interacting with the web browser 8125 during a web browser session. As described herein, the computing system 8115 may store one or more of electronic device identifications, one or more items of anonymous personal identification information (e.g. a primary item of anonymous personal identification information, a secondary item of anonymous personal identification information), or one or more behaviors performed by a user interacting with the web browser 8125 during a web browser session in selected user profiles stored in the one or more servers 8120.

In some embodiments, one or more servers 8120 may store user profiles containing items of anonymous personally identification information and behaviors in a key value data store. Thus by knowing an item of anonymous personal identification information that is indicative of a key value of a user profile (e.g. a primary item of anonymous personal identification information, a hash of an item of anonymous personal location information, a hash of an item of anonymous personal identification information and the electronic device identification), all items of anonymous personal identification information and behaviors stored in the user profile may be identified and viewed via display screen.

In certain embodiments, the network context 8100 includes one or more computing systems 8115. FIG. 29 illustrates a non-limiting, example of the computing system 8115 illustrated in FIG. 18. The computing system 8115 is configured to execute any and all of the embodiments and operations described herein including embodiments for performing data reception and aggregation operations. In certain embodiments, the computer system may perform data and reception and aggregation operations for storing data transmitted through the network 8105115 to aggregate anonymous personal identification information provided during a web browser session in a user profile in a server 8120. In different embodiments, the computing system 8115 may be any of various types of devices, including, but not limited to, a computer embedded in an appliance, a personal computer system, a desktop computer, a handset, a laptop computer, a notebook computer, a table, a slate, a netbook computer, a handheld computer, a consumer device, a portable storage device, a mainframe computer system, a workstation, network computer, a mobile device, an application server, a storage device, a peripheral device such as a switch, modem, router or in general any type of electronic computing device.

Various embodiments of a system and method for data reception and aggregation operations, as described herein, may be executed on one or more computing systems 8115, which may interact with various other devices. In the illustrated embodiment, the computing system 8115 includes one or more processors 9205a, 9205b . . . and 9205n (hereinafter "one or more processors 9205" or "processor 9205") coupled to a memory 9210 via an input/output (I/O) interface 9215. The computing system 8115 further includes a network interface 9220 coupled to I/O interface 9215, and one or more I/O devices 9225, such as cursor control device 940, keyboard 945 and display(s) 950. In some cases, it is contemplated that embodiments may be implemented using a single instance of computing systems, while in other embodiments multiple such systems or multiple notes making up computing system 8115 may be configured to host different portions or instances of embodiments. For example, in one embodiment, some elements may be implemented via one or more notes of computing system 8115 that are distinct from those nodes implementing other elements.

In various embodiments, computing system 8115 may be a uniprocessor system including one processor 9205a, or multiprocessor system including several processors 9205a-n (e.g. two, four, eight, or another suitable number). The processor 9205 may be any suitable processor capable of executing instructions including instructions or operations including data reception and aggregation operations as described herein. For example, in various embodiments, the processor 9205 may be general purpose or embedded with processors implementing any of a variety of instruction set architectures (ISAs) such as the x86, Power PC, SPARC, or MIPS ISAs, or any other suitable ISA. In multiprocessor systems, each of the processors 9205 may commonly, but not necessarily, implement the same ISA.

The memory 9210 may be configured to store the executable instructions or program instructions 9230 or existing state information and ownership transition condition data in the data storage 9235 accessible by the processor 9205. In various embodiments, the memory 9210 may be implemented using any suitable memory technology, such as static random access memory (SRAM), synchronous dynamic ram (SDRAM), nonvolatile/Flash-type memory, or any other type of memory. In the illustrated embodiment, the program instructions 9230 may be configured to implement a system for data reception and aggregation incorporating any of the functionality, as described herein. In some embodiments, program instructions 9230 or data may be received, sent, or stored upon different types of computer-accessible media or on similar media separate from the memory 9210 or the computing system 115. The computing system 8115 is described as implementing at least some of the functionality of functional blocks in the figures described herein.

In certain embodiments, the I/O interface 9215 may be configured to coordinate I/O traffic between the processor 9205, the memory 9210, and any peripheral devices in the computing system 8115, including the network interface 9220 or other peripheral interfaces, such as the input/output devices 9225. In some embodiments, the I/O interface 9215 may perform any necessary protocol, timing or other data transformations to convert data signals from one component (e.g. the memory 9210) into a format suitable for use by another component (e.g. the processor 9205). In some embodiments, the I/O interface 9215 may include support for devices attached through various types of peripheral buses, such as a variant of the Peripheral Component Interconnect (PCI) bus standard or the Universal Serial Bus (USB) standard, for example. In some embodiments, the function of the I/O interface 9215 may be split into two or more separate components, such as a north bridge and a south bridge, for example. Also, in some embodiments some or all of the functionality of the I/O interface 9215, such as an interface to the memory 9210, may be incorporated directly into the processor 9205.

The network interface 9220 may be configured to allow data to be exchanged between the computing system 8115 and other devices attached to the network 8105 (e.g. one or more electronic devices 8110, one or more servers 8120, one or more web browsers 8125) or between nodes of the computing system 8115. The network 8105 may in various embodiments include one or more networks including but not limited to Local Area Networks (LANs) (e.g. an Ethernet or corporate network), Wide Area Networks (WANs) (e.g. the Internet), wireless data networks, some other electronic data network, a combination thereof, or the like. In various embodiments, the network interface 9220 may support communication via wired or wireless telecommunications/telephone networks such as analog voice networks or digital fiber communications networks; via storage area networks such as Fiber Channel SANs, or via any other suitable type of network or protocol.

The input/output devices 9225 may, in some embodiments, include one or more display terminals, keyboards, keypads, touchpads, scanning devices, voice or optical recognition devices, or any other devices suitable for entering or accessing data by one or more of the computing system 8115. Further, various other sensors may be included in the I/O devices 9225 such as imaging sensors, barometers, altimeters, LIDAR, or any suitable environmental sensor. Multiple I/O devices 9225 may be present in the computing system 115 or may be distributed on various nodes of the computing system 8115. In some embodiments, similar I/O devices may be separate from the computing system 8115 and may interact with the one or more nodes of the computing system 8115 through a wired or wireless connection, such as over the network interface 9220.

As shown in FIG. 29, the memory 9210 may include program instructions 9230, which may be processor-executable to implement any element, action, or operation including data reception and aggregation operations, as described herein. In certain embodiments, the program instructions may implement at least a portion of methods described herein, such as the methods illustrated by FIGS. 34-423-11. In other embodiments, different elements and data may be included. Note that the data storage 9235 may include any data or information, as described herein.

Those skilled in the art will appreciate that the computing system 8115 is merely illustrative and is not intended to limit the score of embodiments. In particular, the computing system and devices may include any combination of hardware or software that can perform the indicated functions, including computers, network devices, internet applications, PDAs, wireless phones, pagers, GPUs, specialized computer systems, information handling apparatuses, or the like. The computing system 8115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 8115 via inter-computer communication. Some of all of the system components or data structures may also be stored (e.g. as instructions or structured data) on a computer-accessible medium or a portable article to be read by an appropriate drive, various examples of which are described here. In some embodiments, instructions stored on a computer-accessible medium separate from the computing system 8115 may be transmitted to the computing system 8115 through transmission media or signals such as electronic, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer readable storage medium or memory medium such as magnetic or optical media, e.g. disk or DVD/CD-ROM, volatile or non-volatile media such as RAM (e.g. SDRAM, DDR, RDRAM, SRAM, or the like), ROM, or the like. In some embodiments, a computer-accessible medium may include transmission media or signals such as electrical, electromagnetic, or digital signals conveyed via a communication medium such as network and/or a wireless link.

As described herein, the computing system 8115, utilizing the at least one processor 9205, is configured to perform one or more data reception and aggregation operations. In certain embodiments, the computing system 8115, utilizing one or more processors 9205, receives a data piece associated with a web browser session on a web browser 8125 from an electronic device 8110. The data piece may contain an item of anonymous personal identification information coupled with a behavior. For example, the electronic device 8110 may be used to initiate a web browser session with a web browser 8125 and display content from the web browser 8125 on a display screen. The computing system 8115 utilizing the one or more processors 8125 may be configured to detect or determine that the electronic device 8110 has initiated an engagement into a web browser session with a web browser 8125, that the electronic device 8110 is engaged in a web browser session with a web browser 8125, or that an electronic device 8110 has requested content from the web browser 8125 while the electronic device 8110 is engaged in a web browser session with the web browser 8125. Upon engaging in the web browser session with the web browser 8125, the electronic device 8110 receives a data piece associated with the web browser 8125 and stores the data piece in a memory of electronic device 8110. The data piece received from the web browser 8125 and stored in the memory of electronic device 8110 may include an electronic device identification that is unique to the electronic device 8110. An electronic device identification may include at least one of a MAC address, an IMEI number, an electronic device serial number, a pointer associated with a data port of the electronic device, or the like. In certain embodiments, the data piece comprises a cookie. A cookie (e.g. an HTTP cookie, a web cookie, an Internet cookie, a browser cookie) is a piece of data sent from a website and stored on a memory of an electronic device 8110 by a web browser of the electronic device 8110 while the electronic device is engaged in a browser session.

In certain embodiments, the data piece received from the web browser 125 and stored in the memory of electronic device 8110 may also include one or more items anonymous personal identification information. An item of anonymous personal identification information includes at least one of an email address, a postal address, a user ID, a gender, an age group, a user interest, or the like. In some embodiments, each of the one or more items of anonymous personal identification information may include a hash value. In certain embodiments, the data piece received from the web browser 8125 and stored in the memory of electronic device 8110 may also include one or more behaviors. A behavior may include at least one of a clicked link, a sign-up an opt-in, a scroll, a login, a logout, a clicked selection, or the like. Behaviors may provide an indication of interests associated with the electronic device identification or one or more items of anonymous personal identification information.

In certain embodiments, a data pieces contains a primary item of anonymous personification information, one or more secondary items of anonymous personification information, and one or more behaviors. In some embodiments, the primary item of anonymous personal identification information is a key value used to identify or establish a user profile. In some embodiments, a secondary item of anonymous personal identification information is an item of anonymous personal identification information that is not the primary item of anonymous personal identification information. For example, a primary item of anonymous personal identification information may be a first email address, while a secondary item of anonymous personification information may be a second email address, a postal address, a user ID, a gender, an age group, a user interest, or the like.

After the electronic device 8110 is engaged in a web browser session with a web browser 8125, the electronic device 8110 may transmit one or more items of anonymous personal identification information and one or more behaviors to the web browser 8125 during the web browser session. Contemporaneously, the one or more items of anonymous personal identification information and the one or more behaviors transmitted to the web browser 8125 are also stored in the data piece from the web browser 8125 residing in the memory of electronic device 8110. In certain embodiments, additional data pieces from domains associated with the web browser 8125 and stored in the memory of the electronic device 8110 may also store the one or more items of anonymous personal identification information and the one or more behaviors transmitted to the web browser 125.

After the electronic device 8110 stores the one or more items of anonymous personal identification information and the one or more behaviors in the data piece from the web browser 8125 residing in the memory of the electronic device 8110, the computing system 8115 receives the data piece stored in the memory of the electronic device 8110. For example, the computing system 8115 initiates data piece retrieval to retrieve the data piece residing in the memory of electronic device 8110. The data piece may contain one or more items of anonymous personal identification information coupled with one or more behaviors. An items of anonymous personal identification information coupled with one or more behaviors. An item of anonymous personal identification information may include at least one of an email address, a postal address, a user ID, a gender, an age group, a user interest, or the like. A behavior may include at least one of a clicked link, a sign-up, an opt-in, a scroll, a login, a logout, a clicked selection, or the like.

In certain embodiments, the computing system 8115, utilizing one or more processors 9205, identifies a user profile stored in a server 8120. In certain embodiments, the computing system 8115 identifies a user profile stored in a server 8120 based on an item of anonymous personal identification information contained in the received data piece. For example, the computing system 8115 may search through a plurality of user profiles stored in or more servers 8120 and identify one or more user profiles that contain one or more items of anonymous personal identification information that match or that are associated with one or more items of anonymous personal identification information contained in the received data piece. As another example, the computing system 8115 may search through a plurality of user profiles stored in one or more servers 8120 and determine that none of the searched user profiles contain one or more items of anonymous personal identification information that match or are associated with one or more items of anonymous personal identification information contained in the received data piece. In response, the computing system 8115 may generate or create a new user profile based on an item of anonymous personal identification information contained in the received data piece.

As described herein, the computing system 8115 identifies a user profile based on matching or associated an item of anonymous personification information contained in the received data piece with an item of anonymous personal identification information associated with or stored in the user profile. In certain embodiments, the item of anonymous personal identification information associated with or stored in the user profile is a key value that comprises a hash of the item of anonymous personal identification information. In some embodiments, the user profile is associated with an item of anonymous personal identification information and electronic device identification. Thus the key value of the user profile may be a hash of at least one of the item of anonymous personal identification information and the electronic device identification associated with or stored in the user profile.

In certain embodiments, the computing system 8115, utilizing one or more processors 205, determines whether to store a behavior contained in the received data piece in the identified user profile. In certain embodiments, the computing system 8115 determines whether to store a behavior contained in the received data piece in the identified user profile based on a confidence interval associated with at least one of the electronic device 8110, the web browser session, of the web browser 8125. A confidence interval may be a numerical value or a category that is assigned to a behavior and that indicates a level of reliability or certainty that the behavior contained in the received data piece is indicative of an interest. For example, the computing system 8115 may assign a confidence interval to a clicked link displayed on a web browser 8125 via a display screen of an electronic device 8110 during a web browser session. Based on the confidence interval associated to the link, the computing system 8115 may determine whether to store the indication of the clicked link in the user profile in the server 8120.

In certain embodiments, the confidence interval assigned to the behavior may be associated with the electronic device 8110. For example, the computing system 8115 may be aware that the received data piece is from the electronic device 8110 based on an electronic device identification contained in the data piece or based on an item of anonymous personal identification information contained in the data piece. The computing system 8115 may also determine, for example using the data piece, a location of the electronic device 8110 during the web browser session with the web browser 8125 or a quantity of different items of anonymous personification identification information contained in the data piece. The computing system 8115 may also determine, for example using the data piece, a location of the electronic device 8110 during the web browser session with the web browser 8125 or a quantity of different items of anonymous personification information coupled to or associated with the electronic device identification. In response, the computing system 8115 may assign a confidence interval to one or more behaviors contained in the data piece based on the location of electronic device 8110 during the web browser session with the web browser 8125 or the quantity of different items of anonymous personification information coupled to or associated with the electronic device identification.

As discussed herein, a location of the electronic device 8110 during the web browser session with the web browser 8125 may be used by the computing system 8115 to determine a confidence interval of the behavior contained in a data piece from the electronic device 8110. For example, the computing system 8115, having identified the electronic device 8110 from which the data piece was received, may determine that the electronic device 8110, while engaged in a web browser session with a web browser 8125 was located at a location perceived to be a location where electronic devices provide information including behaviors from data pieces that is not reliable. In response the computing system 8115 may assign a relatively low confidence interval score to the behavior contained in the received data piece from electronic device 8110. Conversely, when the computer system 8115 determines that the electronic device 8110, while engaged in the web browser session with the web browser 8125, was located at a location perceived to be a location where electronic devices provide information including behaviors from data pieces that is very reliable, the computing system 8115 may assign a relatively high confidence interval score to the behavior contained in the received data piece from the electronic device 8110.

As discussed herein, a quantity of different items of anonymous personification information coupled to or associated with the electronic device identification may be used by the computing system 8115 to determine a confidence interval of the behavior contained in a data piece from the electronic device 8110. For example, the computing system 8115, having identified the electronic device 8110 from which the data piece was received, may determine that the electronic device 8110 is associated with many different items of autonomous personal identification information set as key values for different user profiles. In response, the computing system 8115 may assign a relatively low confidence interval score to a behavior contained in the received data piece because the computing system 8115 is unable to determine where to store the behavior contained in the received data piece among the many different user profiles. Conversely, if the computer system 8115 determines that the electronic device 8110 is associated with few different items of autonomous personal identification information set as key values for different user profiles or one item of autonomous personal identification information set as a key value for one user profile, the computing system 8115 may assign a relatively high confidence interval score to a behavior contained in the received data piece because the computing system 8115 is able to determine where to store the behavior contained in the received data piece among the few different user profiles or the one user profile.

In certain embodiments, the confidence interval assigned to the behavior may be associated with the web browser session. For example, the computing system 8115 may be aware that the received data piece is associated with the web browser 8125 based on an indication (e.g. an item of autonomous personal identification information or a behavior) contained in the data piece. The computing system 8115 may also determine, for example using the data piece a duration of the web browser session between the electronic device 8110 and the web browser 8125 or a time that the electronic device 8110 was engaged with the web browser 8125 in the web browser session. In response, the computing system 8115 may assign a confidence interval to one or more behaviors contained in the data piece based on the duration of the web browser session between the electronic device 8110 and the web browser 8125 or a time that the electronic device 8110 was engaged with the web browser 8125 in the web browser section.

As discussed herein, a duration of the web browser session between the electronic device 8110 and the web browser 8125 may be used by the computing system 8115 to determine a confidence interval of the behavior contained in a data piece from the electronic device 8110. For example, the computing system 8115, may determine that the electronic device 8110 was engaged in a web browser session with a web browser 8125 for a duration long enough to view and explore the contents provided by the web browser 8125. In response, the computing system 8115 may assign a relatively high confidence interval score to the behavior contained in the received data piece from electronic device 8110 because the duration was long enough to reflect a genuine interest. Conversely, when the computer system 8115 determines that the electronic device 8110 was engaged in a web browser session with a web browser 8125 for a duration that was not long enough to view and explore the contents provided by the web browser 8125, the computing system 8115 may assign a relatively low confidence interval score to the behavior contained in the received data piece from the electronic device 8110 because the duration was not long enough to reflect a genuine interest.

As discussed herein, a time that the electronic device 8110 was engaged with the web browser 8125 in the web browser session may be used by the computing system 8115 to determine a confidence interval of the behavior contained in a data piece from the electronic device 8110. For example, the computing system 8115 may determine that the electronic device 8110 was engaged in the web browser session at a time that electronic devices are routinely engaged with that web browser 8125 in web browser sessions. In response, the computing system 8115 may assign a relatively high confidence interval score to a behavior contained in the received data piece because the computing system is able to determine with relatively high certainty that an actual user having an actual interest in the content provided by the web browser 8125 is engaged in the web browser session. Conversely, if the computer system 8115 determines that the electronic device 8110 was engaged in the web browser session at a time that electronic devices are not routinely engaged with that web browser 8125 in web browser sessions, the computing system 8115 may assign a relatively low confidence interval score to a behavior contained in the received data piece because the computing system 8115 is not able to determine with a relatively high certainty that an actual user having an actual interest in the content provided by the web browser 8125 is engaged in the web browser session.

In certain embodiments, the confidence interval assigned to the behavior may be associated with the web browser 8125. For example, the computing system 8115 may be aware that the received data piece is from the electronic device 8110 based on an electronic device identification contained in the data piece or based on an item of anonymous personal identification information contained in the data piece. The computing system 8115 may also determine, for example using the data piece or the user profiles, a frequency of web browsers sessions initiated between the electronic device 8110 and the web browser, or a recency of one or more web browsers sessions initiated between the electronic device and the web browser. In response, the computing system 8115 may assign a confidence interval to one or more behaviors contained in the data piece based on a frequency of web browsers sessions initiated between the electronic device 8110 and the web browser, a quantity of web browser sessions initiated between the electronic device and the web browser or a recency of one or more web browser sessions initiated between the electronic device and the web browser.

As discussed herein, a frequency of web browsers sessions initiated between the electronic device 8110 and the web browser may be used by the computing system 8115 to determine a confidence interval of the behavior contained in a data piece from the electronic device 8110. For example, the computing system 8115, having identified several user profiles associated with data (e.g. an item of anonymous personal identification information, a behavior, an electronic device identification) contained in the received data piece, may determine that one or more user profiles of the plurality of user profiles frequently engages in web browser sessions with the web browser 8125. In response, the computing system 8115 may assign a relatively high confidence interval score to the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that frequently engaged in web browser sessions with the web browser 8125, the computing system 8115 may assign a relatively low confidence interval score to the behavior contained in the received data piece from electronic device 8110 because of the low reliability that the behavior is indicative of an interest associated with the web browser 8125.

As discussed herein, a quantity of web browser sessions initiated between the electronic device and the web browser may be used by the computing system 8115 to determine a confidence interval of the behavior contained in a data piece from the electronic device 8110. For example, the computing system 8115, having identified several user profiles associated with data (e.g. an item of anonymous personal identification information, a behavior, an electronic device identification) contained in the received data piece, may determine that one or more user profiles of the plurality of user profiles have engaged in web browser sessions with the web browser 8125 many times since each of the user profiles were created. In response, the computing system 8115 may assign a relatively high confidence interval score to the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that have engaged in web browser sessions with the web browser 8125 many times since each of the user profiles were created, the computing system 8115 may assign a relatively low confidence interval score to the behavior contained in the received data piece from electronic device 8110 because of the low reliability that the behavior is indicative of an interest associated with the web browser 8125.

As discussed herein, a recency of one or more web browsers sessions initiated between the electronic device and the web browser may be used by the computing system 8115 to determine a confidence interval of the behavior contained in a data piece from the electronic device 8110. For example, the computing system 8115, having identified several user profiles associated with data (e.g. an item of anonymous personal identification information, a behavior, an electronic device identification) contained in the received data piece, may determine that one or more user profiles of the plurality of user profiles have engaged in web browser sessions with the web browser 8125. In response, the computing system 8115 may assign a relatively high confidence interval to score the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that have recently engaged in web browser sessions with the web browser 8125, the computing system may assign a relatively low confidence interval score to the behavior contained in the received data piece from electronic device 81110 because of the low reliability that the behavior is indicative of an interest associated with the web browser 8125.

In certain embodiments, the computing system 8115, utilizing one or more processors 9205, stores the behavior in the user profile. In certain embodiments, the computing system 8115 stores the behavior in the user profile when the confidence interval surpasses or exceeds a confidence interval threshold. For example, the computing system 8115 may store a behavior from the received data piece when the confidence interface associated with at least one of the electronic device 8110, the web browser session or the web browser 8125 surpasses or exceeds a confidence interval threshold. Conversely, computing system 8115 may discard or delete a behavior from the received data piece when the confidence interval associated with the at least one of the electronic device 8110, the web browser session, or the web browser 8125 does not surpass or does not exceed a confidence interval threshold. In certain embodiments, the computing system 8115 stores the behavior of the user profile when the confidence interval does not surpass or does not exceed a confidence threshold when the user profile is below a threshold age. For example, a relatively new user profile may have relatively fewer stored items of anonymous personal identification information or behaviors for which computing system 8115 may examine to determine a confidence interval of recently received data from the data piece. Thus even if data (e.g. an item of anonymous personal identification information or the behavior) contained in the received data piece is assigned a relatively low confidence interval, the computing system 8115 may store the data in the user profile due to a relatively young age of the user profile. Conversely, a relatively older user profile may have relatively more stored behaviors or items of anonymous personal identification information for which computing system 8115 may examine to determine a confidence interval of recently received data from the data piece. Thus, data contained in the received data piece that is assigned a relatively low confidence interval may be discarded or deleted due to the stored history of the relatively older user profile. In certain embodiments, the confidence interval threshold increases as the age of the user profile increases at least for a predetermined period of time.

In certain embodiments, the computing system 8115, utilizing one or more processors 9205, assigns a confidence interval score to the behavior. In certain embodiments, the computing system 8115 assigns a confidence interval score to the behavior in order to determine whether to store the behavior in the user profile as described herein. In certain embodiments, the computing system 8115 assigns a confidence interval score to the behavior stored in the user profile based on the confidence interval associated with at least one of the electronic device 8110, the web browser session, or the web browser 8125. The confidence interval score provides an indication of a level of reliability that a behavior is indicative of an interest.

In certain embodiments, the computing system 8115, utilizing one or more processors 9205, ranks the behavior stored in the user profile among one or more other behaviors stored in the user profile. In certain embodiments, the computing system 8115 ranks the behavior stored in the user profile amongst one or more other behaviors stored in the user profile based on the confidence interval score assigned to the behavior and confidence interval scores associated with each of the other one or more behaviors stored in the user profile. For example, after the computing system 8115 assigns a confidence interval score to the behavior contained in the data piece from the electronic device 8110 in order to determine whether to store the behavior in the user profile as described herein, the computing system 8115 stores the behavior in the user profile with the assigned confidence interval score. The computing system 8115 may have previously assigned or may then assign a confidence interval score to the one or more other behaviors stored in the user profile. The computing system 8115 may rank the behavior contained in the data piece and stored in the user profile among the other one or more behaviors stored in the user profile. In certain embodiments, the computing system 8115 may arrange the each of the behaviors stored in the user profile according to rank. Lower ranking behaviors stored in a user profile may be deleted as higher ranking behaviors are stored in the user profile. Ranking behaviors stored in user profiles may be used to separate behaviors with a high confidence interval from behaviors with a low confidence interval.

In certain embodiments, the computing system 8115, utilizing one or more processors 9205, flags the user profile based on a quantity of behaviors stored in the user profile. In certain embodiments, the computing system 8115 flags the user profile in the server 8120 when the behavior stored in the user profile causes a quantity of behaviors stored in the user profile having a same behavior type as a behavior type of the behavior to exceed a maximum quantity of store behaviors or maximum storage frequency of stored behaviors. For example, the user profile may contain a plurality of behaviors having a same behavior type (e.g. click on a same link, an opt-in). After a behavior from a data piece is stored in a user profile, the computing system 8115 may determine that the additional behavior stored in the user profile causes a quantity of behaviors stored in the user profile and having the same behavior type as the behavior type of the behavior from the data piece to exceed a maximum quantity of stored behaviors. When a user profile contains a quantity of behaviors having a same behavior type that exceeds the maximum quantity of stored behaviors, the data (e.g. items of anonymous personal identification information, behaviors) stored in user profile and thus the user profile may be deemed unreliable for containing information indicative of a user preference or a user interest. The computing system 8115 may flag the user profile when the quantity of behaviors stored in the user profile exceeds the maximum quantity of stored behaviors due to the unreliability of the data stored in the user profile.

As another example, the user profile may contain a plurality of behaviors having a same behavior type (e.g. a click on a same link, an opt-in). After a behavior from a data piece is stored in a user profile, the computing system 8115 may determine that the additional behavior stored in the user profile causes a quantity of behaviors stored in the user profile and having the same behavior type as the behavior type of the behavior from the data piece to exceed a maximum storage frequency of stored behaviors. When a user profile receives a quantity of behaviors having a same behavior type and within a predetermined period of time that exceeds the maximum storage frequency of stored behaviors, the data (e.g. items of anonymous personal identification information, behaviors) stored in user profile and thus the user profile may be deemed unreliable for containing information indicative of a user preference or a user interest. The computing system 8115 may flag the user profile when the quantity of behaviors stored in the user profile during the predetermined period of time exceeds the maximum storage frequency of stored behaviors due to the unreliability of the data stored in the user profile. In certain embodiments, the computing system 8115 may flag the user profile for deletion of the user profile or for transfer of the user profile from the server to another server.

In certain embodiments, the computing system 8115, utilizing one or more processors 9205, flags a user profile based on a frequency of behaviors stored in the user profile. In certain embodiments, the computing system 8115, flags the user profile in the server 8120, after the behavior is stored in the user profile, when a frequency of behaviors stored in the user profile remains below a minimum storage frequency for a predetermined time after a generation of the user profile. For example, the user profile may contain very few or no behaviors. The computing system 8115 may determine that the age of the user profile is beyond a minimum age. After a behavior from a data piece is stored in a user profile, the computing system 8115 may determine that the user profile is beyond a minimum age and that the additional behavior stored in the user profile causes a frequency of behaviors being stored in the user profile to remain below a minimum storage frequency. When a user profile does not receive a threshold frequency of data pieces containing behaviors for a predetermined period of time, the data (e.g. items of anonymous personal identification information, behaviors) stored in the user profile and thus the user profile may be deemed unreliable for containing information indicative of a user preference or a user interest. The computing system 8115 may flag the user profile when the frequency quantity of behaviors stored in the user profile remains below a minimum storage frequency of stored behaviors due to the unreliability of the data stored in the user profile. In certain embodiments, the computing system 8115 may flag the user profile for deletion of the user profile or for transfer of the user profile from the server to another server.

In certain embodiments, the computing system 8115, utilizing one or more processors 9205, flags a user profile based on a quantity of received data pieces containing the same item of anonymous personification information indicative of the user profile. In certain embodiments, the computing system 8115 flags the user profile in the server 8120 when the plurality of data pieces each containing the same item of anonymous personal identification information exceeds or surpasses a maximum data piece quantity. For example, the computing system 8115 may receive a plurality of data pieces associated with one or more web browser sessions on one or more web browsers 8125 from one or more electronic devices 8110. The computing system 8115 may determine that each of the plurality of data pieces contains a same item of anonymous personal identification information and may determine that the item of anonymous personal identification information contained in each of the data pieces is associated with a specific user profile. After the computing system 8115 stores the behaviors from each of the data pieces in the user profile, the computing system 8115 may determine that it has received a quantity of data pieces containing the same item of anonymous personal identification information that exceeds or surpasses a maximum data piece quantity. The computing system 8115 may flag the user profile when the quantity of data pieces containing the same item of anonymous personal identification information received and stored in the user profile exceeds or surpasses the maximum data piece quantity due to the unreliability of the data stored in the user profile. In certain embodiments, the computing system may flag the user profile for deletion of the user profile or for transfer of the user profile from the server to another server.

In certain embodiments, the computing system 8115, utilizing one or more processors 9205, flags the user profile based on a quantity of secondary items of anonymous personification information having a same item type and that are stored in the user profile. In certain embodiments, the computing system 8115 flags the user profile when the second items of anonymous personification information from each of a plurality of data pieces cause a quantity of different secondary items of anonymous personal identification information having a same item type and stored in the user profile to exceed the maximum quantity of different second items of anonymous personal identification information having a same item type. For example, the computing system 8115 may receive a plurality of data pieces associated with one or more web browser sessions on one or more web browsers 125 from one or more electronic devices 8110. The computing system may also determine that each of the plurality of received data pieces are associated with a user profile. The computing system may determine that each of the plurality of received data pieces contains a plurality of secondary items of anonymous personal identification information having a same item type (e.g. a plurality of different email addresses, a plurality of different postal addresses, a plurality of different phone numbers). After the computing system 8115 stores the second items of anonymous personal identification information from each of the data pieces in the user profile, the computing system 8115 may determine that the user profile contains a quantity of secondary items of anonymous personal identification information having a same item type that exceeds or surpasses a maximum quantity of different secondary items of anonymous personal identification information having a same times type. The computing system 8115 may flag the user profile when the user profile contains a quantity of secondary items of anonymous personal identification information that have a same item type that exceeds or surpasses a maximum quantity of different secondary items of anonymous personal identification information having a same item type due to the unreliability of the data stored in the user profile. In certain embodiments, the computing system may flag the user profile for deletion of the user profile or for transfer of the user profile from the server to another server.

In certain embodiments, the computing system 8115, utilizing one or more processors 9205, flags the user profile when the user profile does not contain or excludes an item of anonymous personal identification information having a particular item type. In certain embodiments, the computing system 8115 flags the user profile when items of anonymous personal identification information stored in the user profile excluded or do not contain an item of anonymous personification information having a predetermined item type. For example, the computing system 8115 may examine a user profile and determine that the user profile does not contain any email addresses. In response, the computing system 8115 may flag the user profile for not containing any email addresses due to the unreliability of the data stored in the user profile. In certain embodiments, the computing system may flag the user profile for deletion of the user profile or for transfer of the user profile from the server to another server.

In certain embodiments, the computing system 8115, utilizing one or more processors 9205, flags the user profile when the user profile only contains items of anonymous personal identification information and behaviors from a single web browser. In certain embodiments, the computing system 8115 flags the user profile when all behaviors stored in the user profile and all items of anonymous personifications information stored in the user profile are associated with the same web browser. For example, the computing system 8115 may examine a user profile and determine that the user profile contains item of anonymous personal identification information and behaviors from only one specification web browser. In response the computing system 8115 may flag the user profile for containing items of anonymous personal identification information and behaviors from only one specific web browser. In certain embodiments, the computing system may flag the user profile for deletion of the user profile or for transfer of the user profile from the server to another server.

In certain embodiments, the computing system 8115, utilizing one or more processors 9205, determines whether data pieces received from a web browser are received in a pattern or when a quantity of different items of anonymous personal identification information contained in data pieces from a specific web browser is maintained in quantities that are multiples of ten. For example, the computing system 8115 may determine that data pieces are received from a specific web browser at a particular time once a day, on a particular day once a week, or on a particular day once a month. As another example, the computing system 8115 may determine that all data pieces received from a specific web browser 8125 contain secondary items of anonymous personal identification information or behaviors in quantities that are multiples of 10 (e.g. 200 behaviors, 530 secondary items of anonymous personal identification information).

In certain embodiments, the computing system 8115, utilizing one or more processors 9205, flags the data pieces from the web browser when the data pieces from the web browser are received in an identified pattern or when a quantity of different items of anonymous personal identification information contained in each of the data pieces for the web browser maintains a quantity that is a multiple ten. For example, in response to the computing system 8115 determining that data pieces are received from a specific web browser at a particular time once a day, on a particular day once a week, or on a particular day once a month, the computing system 8115 may flag all data pieces received from the web browser 8125. As another example, in response to the computing system 8115 determining that all data pieces received from a specific web browser 8125 contain secondary items of anonymous personal identification information or behaviors in quantities that are multiples of 10 (e.g. 200 behaviors, 530 secondary items of anonymous personal identification information), the computing system 8115 may flag all data pieces received from the web browser 8125.

Figure 34:
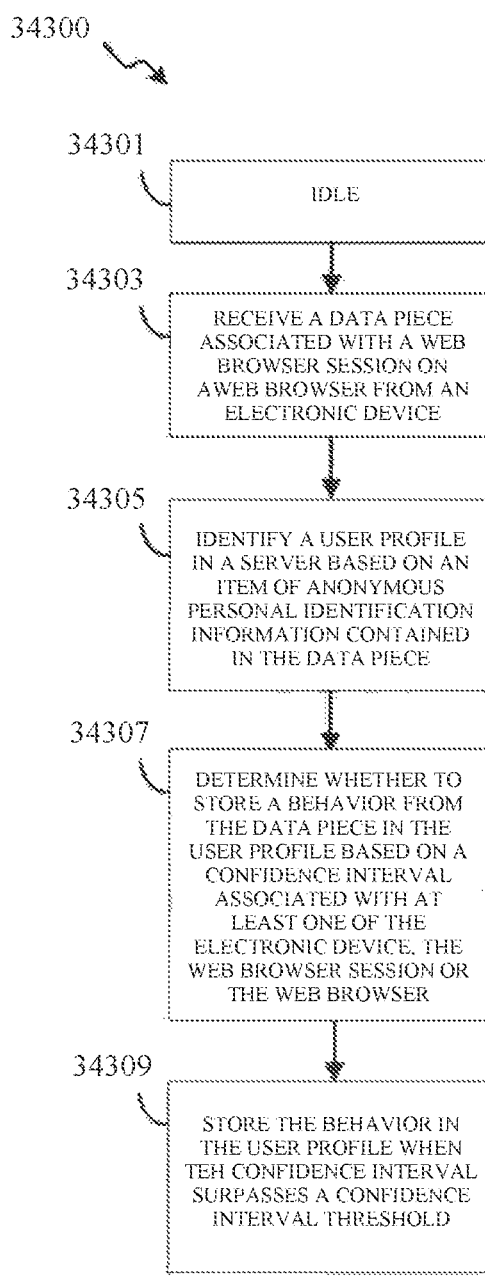
Figure 35:
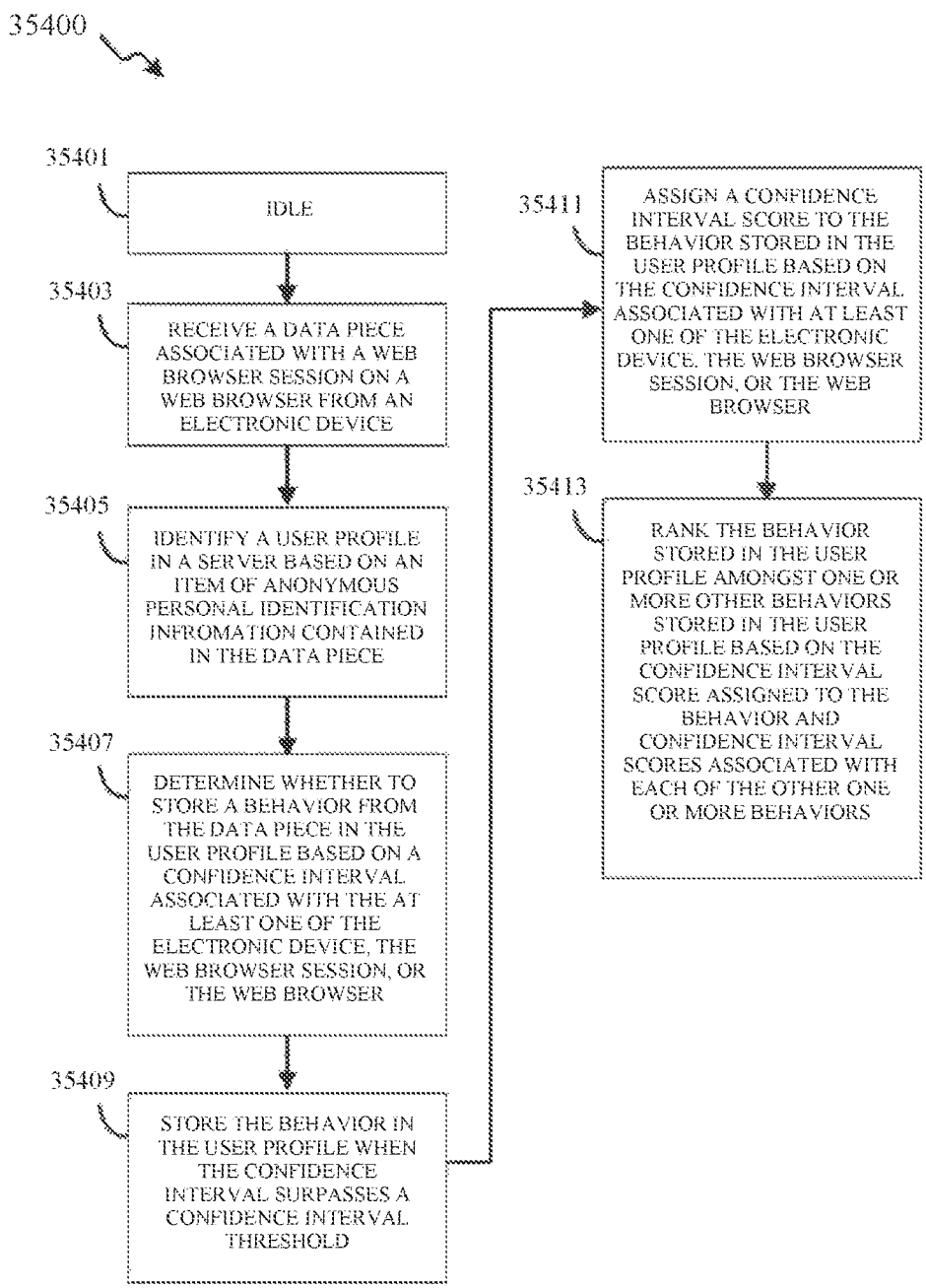
Figure 36:
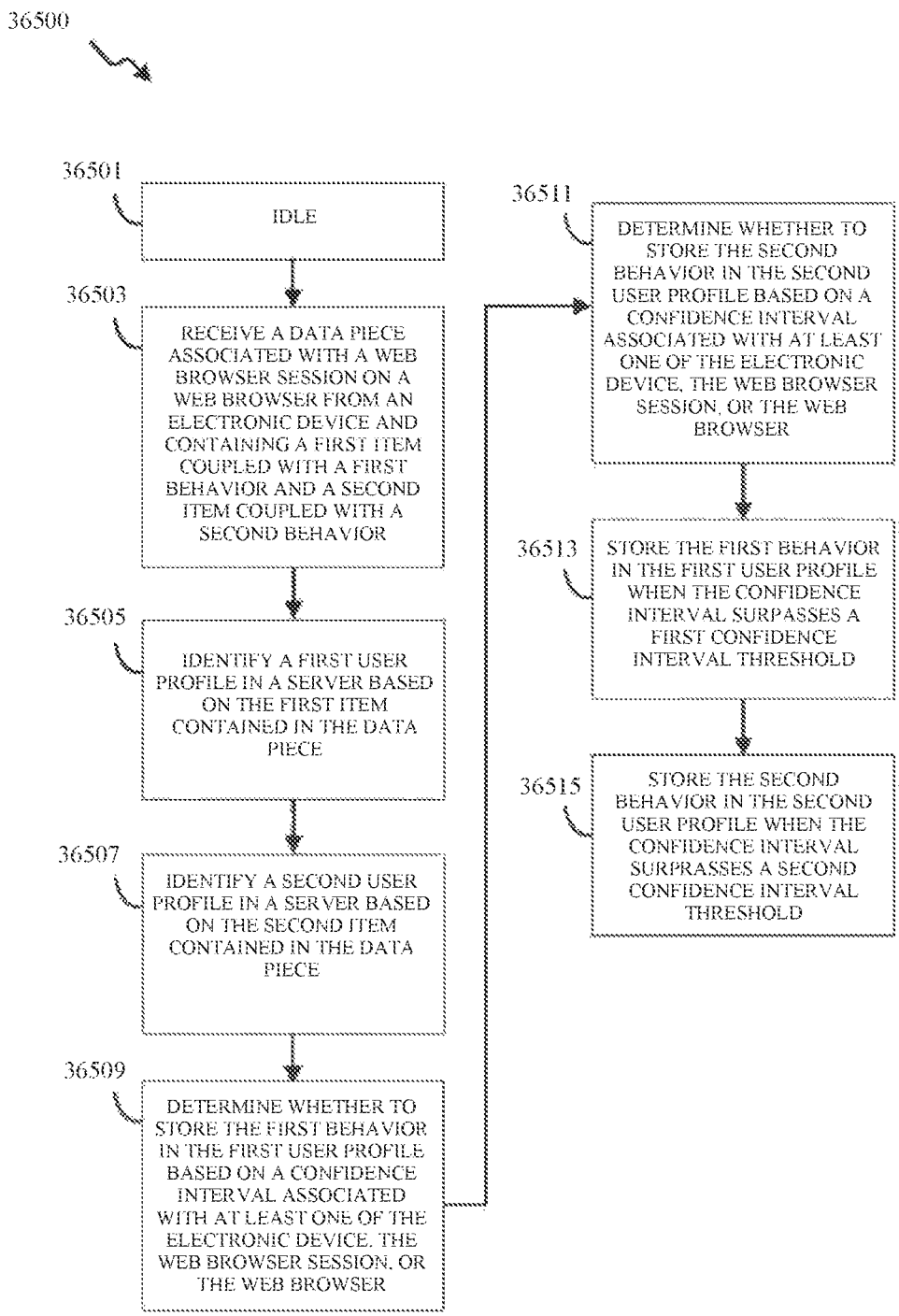
Figure 37:
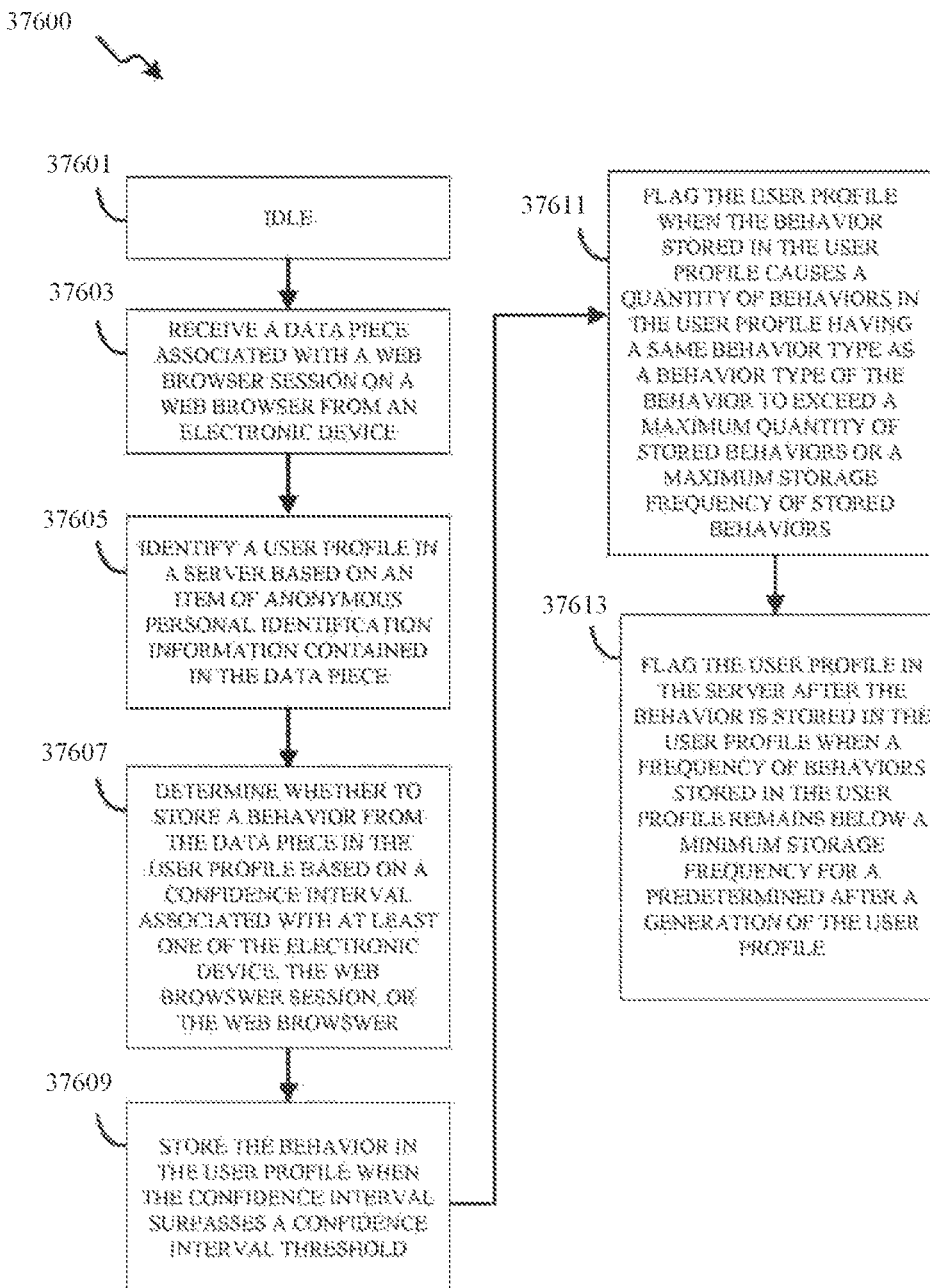
Figure 38:
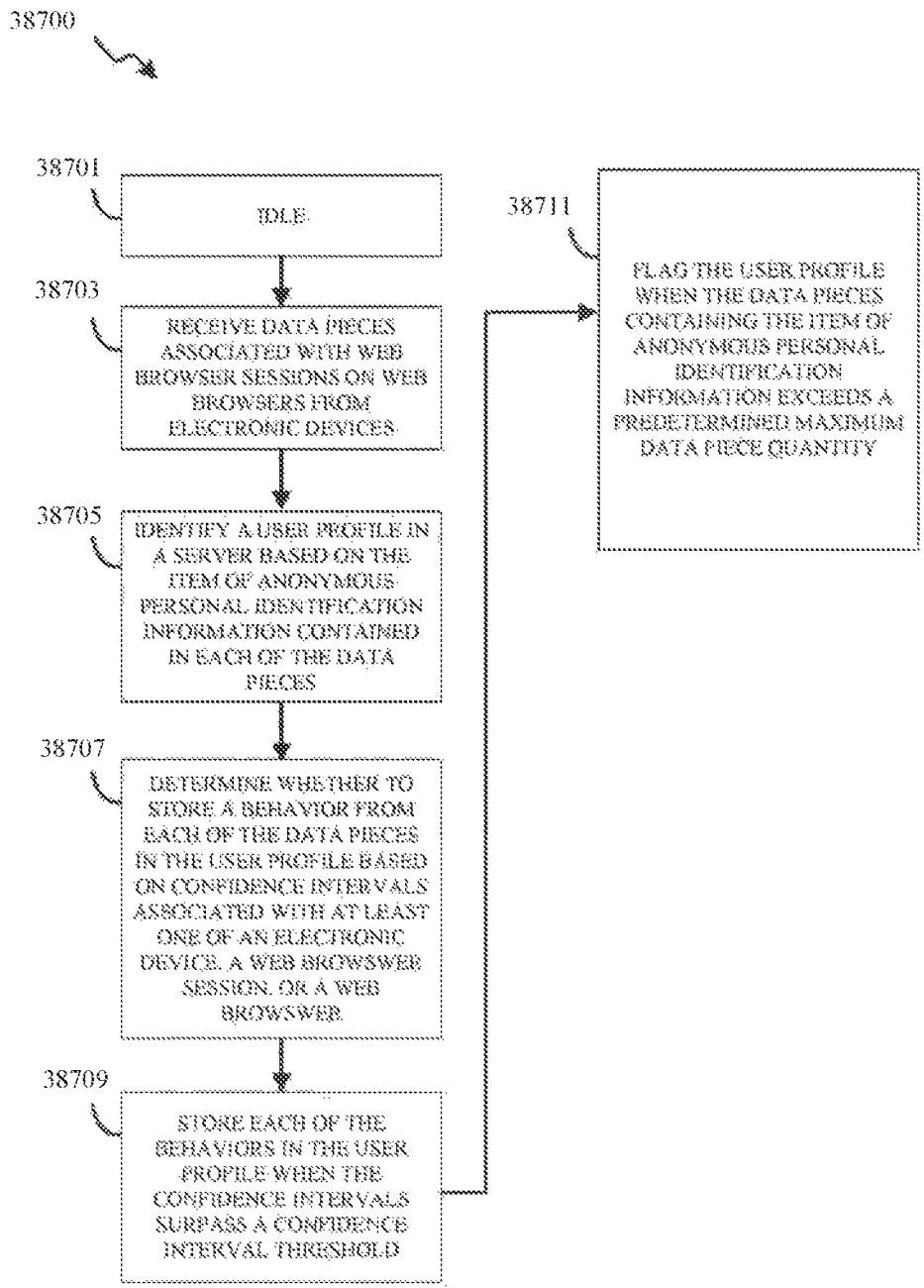
Figure 39:
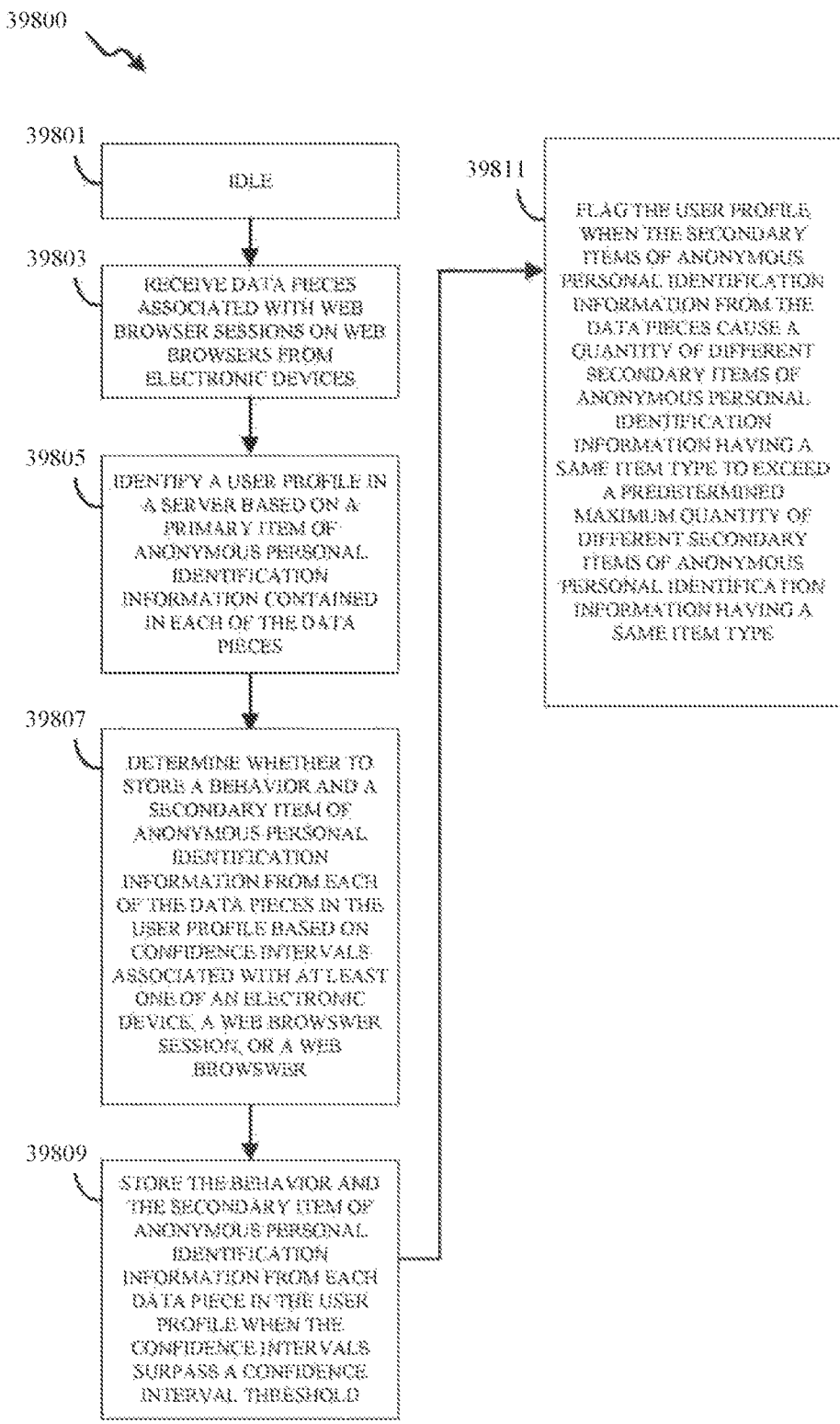
Figure 40:
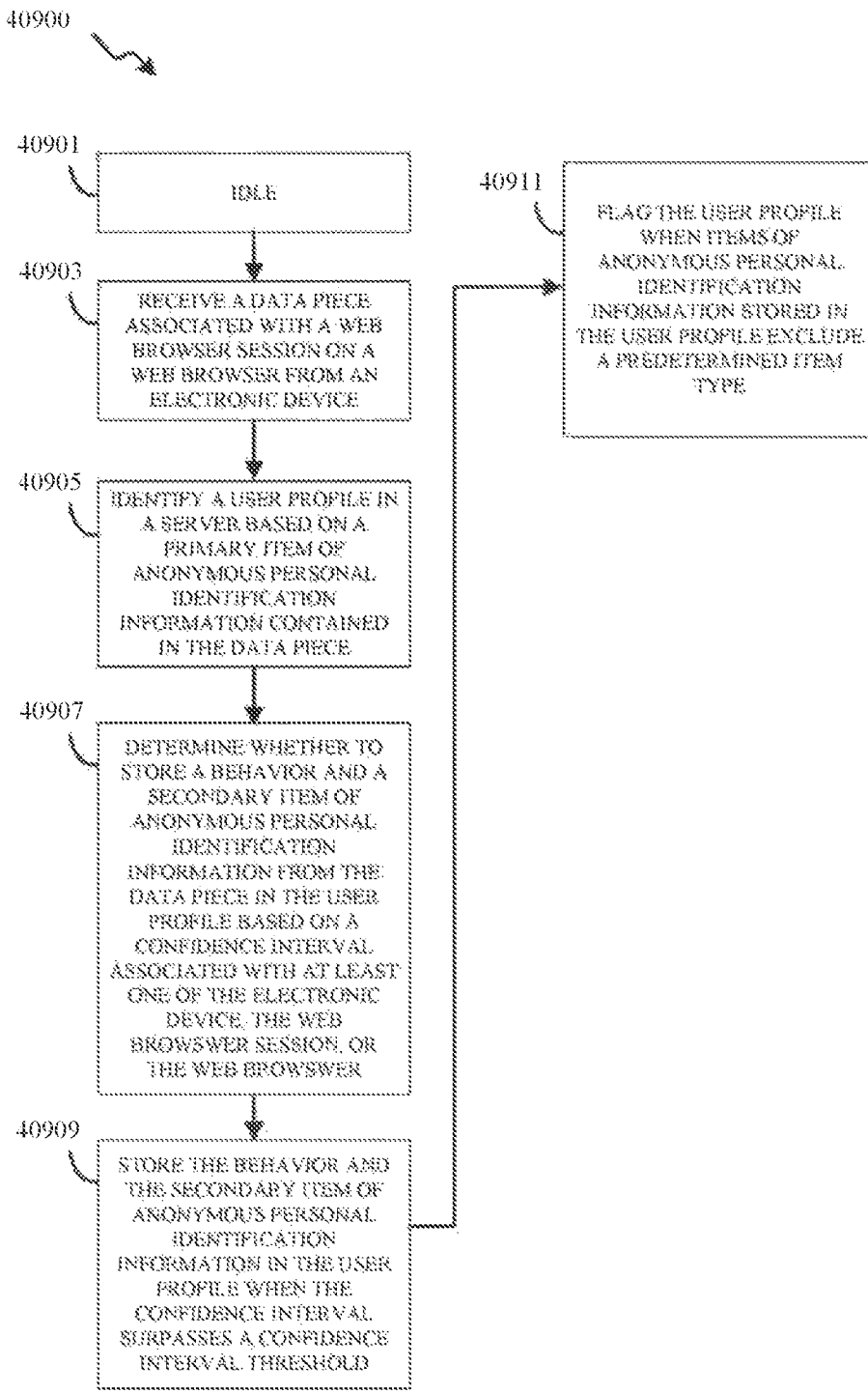
Figure 41:
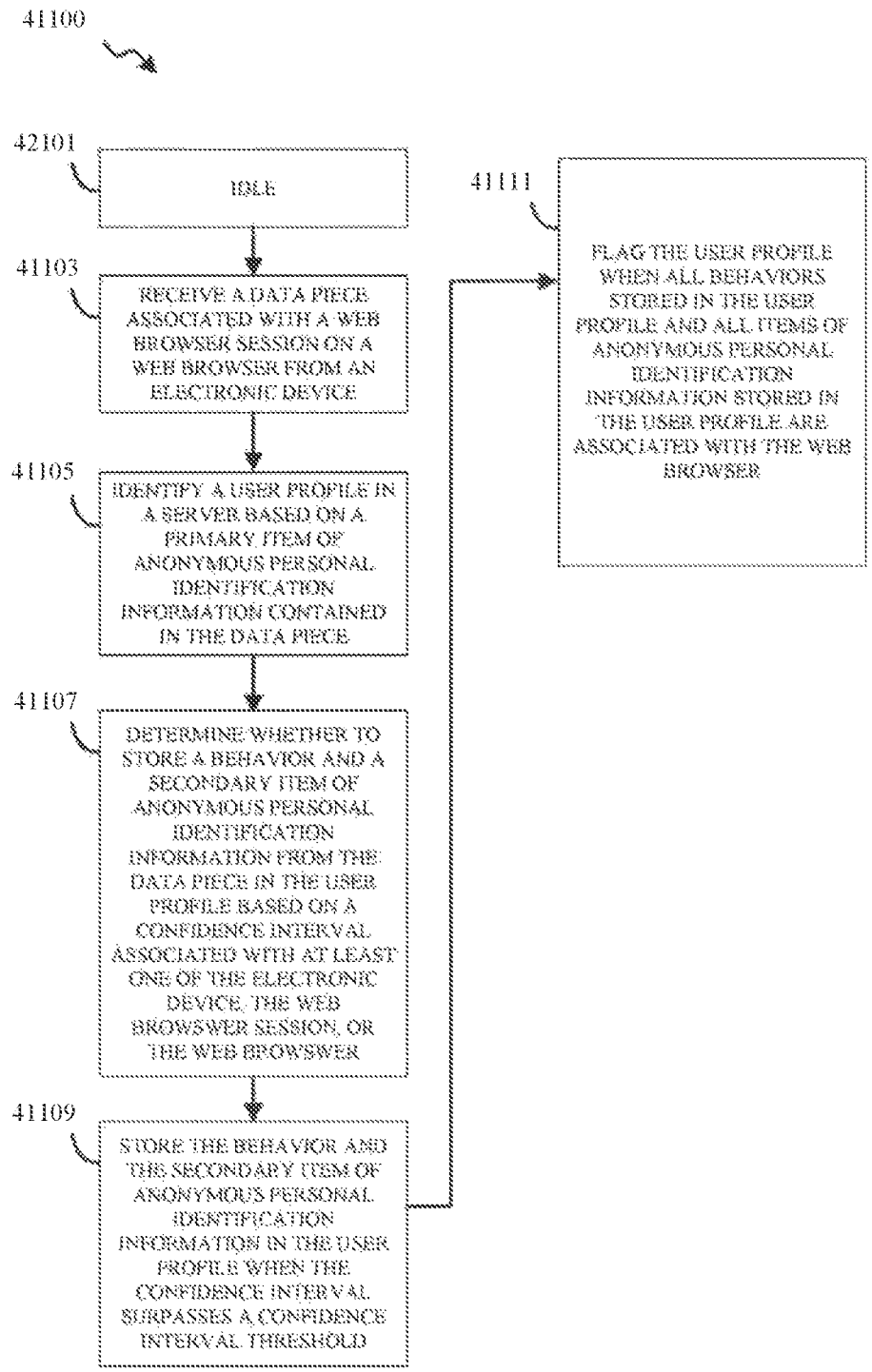

FIG. 34 illustrates a method 34300 implemented by the computing system 8115, utilizing the at least one processor 9205, for performing data reception and aggregation operations according to certain embodiments of this disclosure. Although certain details will be provided with reference to the method 34300 of FIG. 34, it should be understood that other embodiments may include more, less, or different method steps. At step 34301, the computing system 8115 is in an idle state at least with respect to performing data reception and aggregation operations. At step 34303, the computing system 8115 receives a data piece from an electronic device 8110. In certain embodiments, the computing system 8115 receives a data piece associated with a web browser session on a web browser 125 from the electronic device 8110. The computing system 8115 may receive a data piece by retrieving the data piece from the electronic device 8110. The data piece may contain one or more items of anonymous personal identification information coupled with one or more behaviors. An item of anonymous personal identification information may include at least one of an email address, a postal address, a user ID, a gender, an age group, a user interest, or the like. A behavior may include at least one of a clicked link, a sing-up, an opt-in, a scroll, a login, a logout, a clicked selection, or the like.

In certain embodiments, the data piece may also include an electronic device identification associated with the electronic device 8110 from which the data piece was received. An electronic device identification may be a unique identification that identifies a specific electronic device among all electronic devices. For example, the electronic device identification may be an identification that is unique to the electronic device 8110. In certain embodiments, the electronic device identification includes at least one of a MAC address, an IMEI number, an electronic device serial number, a pointer associated with a data port of the electronic device, a combination thereof, or the like.

At step 34305, the computing system 8115 identifies a user profile stored in a server 8120. In certain embodiments, the computing system 8115 identifies a user profile stored in a server 8120 based on an item of anonymous personal identification information contained in the received data piece. For example, the computing system 8115 may search through a plurality of user profiles stored in one or more servers 8120 and identify one or more user profiles that contain one or more items of anonymous personal identification information that match or that are associated with one or more items of anonymous personal identification information contained in the received data piece. As another example, the computing system 8115 may search through a plurality of user profiles stored in one or more servers 8120 and determine that none of the searched user profiles contain one or more items of anonymous personal identification information that match or are associated with one or more items of anonymous personal identification information contained in the received data piece. In response, the computing system 8115 may generate or create a new user profile based on an item of anonymous personal identification information contained in the received data piece. As described herein, the computing system 8115 identifies a user profile based on matching or associated an item of anonymous personification information contained in the received data piece with an item of anonymous personal identification information associated with or stored in the user profile. In certain embodiments, the item of anonymous personal identification information associated with or stored in the user profile is a key value that comprises a hash of the item of anonymous personal identification information. IN some embodiments, the user profile is associated with an item of anonymous personal identification information and electronic device identification. Thus, the key value of the user profile may be a hash of at least one of the item of anonymous personal identification information and the electronic device identification associated with or stored in the user profile.

At step 34307, the computing system 8115 determines whether to store a behavior contained in the received data piece in the identified user profile. In certain embodiments, the computing system 8115 determines whether to store a behavior contained in the received data piece in the identified user profile based on a confidence interval associated with at least one of the electronic device 8110, the web browser session, or the web browser 8125. A confidence interval may be a numerical value or a category that is assigned to a behavior and that indicates a level of reliability or certain that the behavior contained in the received data piece is indicative of an interest. For example, the computing system 8115 may assign a confidence interval to a clicked link displayed on a web browser 8125 via a display screen of an electronic device 8110 during a web browser session. Based on the confidence interval assigned to the link, the computing system 8115 may determine whether to store the indication of the clicked link in the user profile in the server 8120.

In certain embodiments, the confidence interval assigned to the behavior may be associated with the electronic device 8110. For example, the computing system 8115 may be aware that the received data piece is from the electronic device 8110 based on an electronic device identification contained in the data piece or based on an item of anonymous personal identification information contained in the data piece. The computing system 8115 may also determine, for example using the data piece, a location of the electronic device 8110 during the web browser session with the web browser 8125 or a quantity of different items of anonymous personification information coupled to or associated with the electronic device identification. In response, the computing system 8115 may assign a confidence interval to one or more behaviors contained in the dat apiece based on the location of electronic device 8110 during the web browser session with the web browser 8125 or the quantity of different items of anonymous personification information coupled to or associated with the electronic device identification.

As discussed herein, a location of the electronic device 8110 during the web browser session with the web browser 8125 may be used by the computing system 8115 to determine a confidence interval of the behavior contained in a data piece from the electronic device 8110. For example, the computing system 8115, having identified the electronic device 8110 from which the data piece was received, may determine that the electronic device 8110, while engaged in a web browser session with a web browser 8125, was located at a location perceived to be a location where electronic devices provide information including behaviors from data pieces that is not reliable. In response, the computing system 8115 may assign a relatively low confidence interval score to the behavior contained in the received data piece from electronic device 8110. Conversely, when the computer system 8115 determines that the electronic device 8110, while engaged in the web browser session with the web browser 8125, was located at a location perceived to be a location where electronic devices provide information including behaviors from data pieces that is very reliable the computing system 8115 may assign a relatively high confidence interval score to the behavior contained in the received data piece from electronic device 8110.

As discussed herein, a quantity of different items of anonymous personification information coupled to or associated with the electronic device identification may be used by the computing system 8115 to determine a confidence interval of the behavior contained in a data piece from the electronic device 8110. For example, the computing system 8115, having identified the electronic device 8110 from which the data piece was received, may determine that the electronic device 8110 is associated with many different items of autonomous personal identification information set as key values for different user profiles. In response, the computing system 8115 may assign a relatively low confidence interval score to a behavior contained in the received data piece because the computing system 8115 is unable to determine where to store the behavior contained in the received data piece among the many different user profiles. Conversely, if the computer system 8115 determines that the electronic device 8110 is associated with few different items of autonomous personal identification information set as key values for different user profiles or one item of autonomous personal identification information set as a key value for one user profile, the computing system 8115 may assign a relatively high confidence interval score to a behavior contained in the received data piece because the computing system 8115 is able to determine where to score the behavior contained in the received data piece among the few different user profiles or the one user profile.

In certain embodiments, the confidence interval assigned to the behavior may be associated with the web browser session. For example, the computing system 8115 may be aware that the received data piece is associated with the web browser 8125 based on an indication (e.g. an item of autonomous personal identification information or a behavior contained in the data piece). The computing system 8115 may also determine, for example using the data piece, a duration of the web browser session between the electronic device 8110 and the web browser 8125 or a time that the electronic device 8110 was engaged with the web browser 8125 in the web browser session. In response, the computing system 8115 may assign a confidence interval to one or more behaviors contained in the data piece based on the duration of the web browser session between the electronic device 8110 and the web browser 8125 or a time that the electronic device 8110 was engaged with the web browser 8125 in the web browser session.

As discussed herein, a duration of the web browser session between the electronic device 8110 and the web browser 8125 may be used by the computing system 8115 to determine a confidence interval of the behavior contained in a data piece from the electronic device 8110. For example, the computing system 8115, may determine that the electronic device 8110 was engaged in a web browser session with a web browser 8125 for a duration long enough to view and explore the contents provided by the web browser 8125. In response, the computing system 8115 may assign a relatively high confidence interval score to the behavior contained in the received data piece from electronic device 8110 because the duration was long enough to reflect a genuine interest. Conversely, when the computer system 8115 determines that the electronic device 8110 was engaged in a web browser session with a web browser 8125 for a duration that was not long enough to view and explore the contents provided by the web browser 8125, the computing system 8115 may assign a relatively low confidence interval score to the behavior contained in the received data piece from electronic device 8110 because the duration was not long enough to reflect a genuine interest.

As discussed herein, a time that the electronic device 8110 was engaged with the web browser 8125 in the web browser session may be used by the computing system 8115 to determine a confidence interval of the behavior contained in a data piece from the electronic device 8110. For example, the computing system 8115 may determine that the electronic device 8110 was engaged in the web browser session at a time that electronic devices are routinely engaged with that web browser 8125 in web browser sessions. In response, the computing system 8115 may assign a relatively high confidence interval score to a behavior contained in the received data piece because the computing system 8115 is able to determine with relatively high certainty that an actual user having an actual interest in the content provided by the web browser 8125 is engaged in the web browser session. Conversely, if the computer system 8115 determines that the electronic device 8110 was engaged in the web browser session at a time that electronic devices are not routinely engaged with that web browser 8125 in web browser sessions, the computing system 8115 may assign a relatively low confidence interval score to a behavior contained in the received data piece because the computing system 8115 is not able to determine with relatively high certainty that an actual user having an actual interest in the content provided by the web browser 8125 is engaged in the web browser session.

In certain embodiments, the confidence interval assigned to the behavior may be associated with the web browser 8125. For example, the computing system 8115 may be aware that the received data piece is from the electronic device 8110 based on an electronic device identification contained in the data piece or based on an item of anonymous personal identification information contained in the data piece. The computing system 8115 may also determine, for example using the data piece or the user profiles, a frequency of web browsers sessions initiated between the electronic device 8110 and the web browser, a quantity of web browser sessions imitated between the electronic device 8110 and the web browser 8125, or a recency of one or more web browsers sessions initiated between the electronic device 8110 and the web browser 8125. In response the computing system 8115 may assign a confidence interval to one or more behaviors contained in the data piece based on a frequency of web browsers sessions initiated between electronic device 8110 and the web browser 8125, a quantity of web browser sessions initiated between the electronic device 8110 and the web browser 8125, or a recency of one or more web browsers sessions initiated between the electronic device 8110 and the web browser 8125.

As discussed herein, a frequency of web browsers sessions initiated between the electronic device 8110 and the web browser 8125 may be used by the computing system 8115 to determine a confidence interval of the behavior contained in a data piece from the electronic device 8110. For example, the computing system 8115, having identified several user profiles associated with date (e.g. an item of anonymous personal identification information, a behavior, an electronic device identification) contained in the received data piece, may determine that one or more user profiles of the plurality of user profiles frequently engages in web browser sessions with the web browser 8125. In response, the computing system 115 may assign a relatively high confidence interval score to the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that frequently engage in web browser sessions with the web browser 8125, the computing system 8115 may assign a relatively low confidence interval score to the behavior contained in the received data piece from electronic device 8110 because of the low reliability that the behavior is indicative of an interest associated with the web browser 8125.

As discussed herein, a quantity of web browser sessions initiated between the electronic device 8110 and the web browser 8125 may be used by the computing system 8115 to determine a confidence interval of the behavior contained in a data piece from the electronic device 8110. For example, the computing system 8115, having identified several user profiles associated with data (e.g. an item of anonymous personal identification information, a behavior, an electronic device identification) contained in the received data piece, may determine that one or more user profiles of the plurality of user profiles have engaged in web browser sessions with the web browser 8125 many times since each of the user profiles were created. In response, the computing system 8115 may assign a relatively high confidence interval score to the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that have engaged in web browser session with the web browser 8125 many times since each of the user profiles were created, the computing system 8115 may assign a relatively low confidence interval score to the behavior contained in the received data piece from electronic device 8110 because of the low reliability that the behavior is indicative of an interest associated with the web browser 8125.

As discussed herein, a recency of one or more web browsers sessions initiated between the electronic device and the web browser may be used by the computing system 8115 to determine a confidence interval of the behavior contained in a data piece from the electronic device 8110. For example, the computing system 8115, having identified several user profiles associated with data (e.g. an item of anonymous personal identification information, a behavior, an electronic device identification) contained in the received data piece may determine that one or more user profiles of the plurality of user profiles have recently engaged in web browser sessions with the web browser 8125. In response, the computing system 8115 may assign a relatively high confidence interval score to the behavior contained in the received data piece from electronic device 8110 because of the high reliability that the behavior is indicative of an interest associated with the web browser 8125. Conversely, when the computer system 8115 is unable to identify one or more user profiles of the plurality of user profiles that have recently engaged in web browser sessions with the web browser 8125, the computing system 8115 may assign a relatively low confidence interval score to the behavior contained in the received data piece from electronic device 8110 because of the low reliability that the behavior is indicative of an interest associated with the web browser 8125.

At step 34309, the computing system 8115 stores the behavior in the user profile. In certain embodiments, the computing system 8115 stores the behavior in the user profile when the confidence interval surpasses or exceeds a confidence interval threshold. For example, the computing system 8115 may store a behavior from the received data piece when the confidence interval associated with at least one of the electronic device 8110, the web browser session, or the web browser 8125 surpasses or exceeds a confidence interval threshold. Conversely, computing system 8115 may discard or delete a behavior from the received data piece when the confidence interval associated with the at least one of the electronic device 8110, the web browser session, or the web browser 8125 does not surpass or does not exceed a confidence interval threshold. In certain embodiments, the computing system 8115 stores the behavior of the user profile when the confidence interval does not surpass or does not exceed a confidence threshold when the user profile is below a threshold age. For example, a relatively new user profile may have relatively fewer stored items of anonymous personal identification information or behaviors for which computing system 8115 may examine to determine a confidence interval of recently received data from the data piece. Thus, even if, data (e.g. an item of anonymous personal identification information or the behavior) contained in the received data piece is assigned a relatively low confidence interval, the computing system 8115 may store the data in the user profile due to a relatively young age of the user profile. Conversely, a relatively older user profile may have relatively more stored behaviors or items of anonymous personal identification information for which computing system 8115 may examine to determine a confidence interval of recently received data from the data piece. Thus, data contained in the received data piece that is assigned a relatively low confidence interval may be discarded or deleted due to the stored history of the relatively older user profile. In certain embodiments, the confidence interval threshold is applied after a predetermined age of a user profile. In certain embodiments, the confidence interval threshold increases as the age of the user profile increases at least for a predetermined period of time.

FIG. 435 illustrates a method 35400 implemented by a computing system 8115, utilizing at least one processor 9205, for performing data reception and aggregation operations according to certain embodiments of this disclosure. Although certain details will be provided with reference to the method 35400 of FIG. 435, it should be understood that other embodiments may include more, less, or different method steps. At step 35401, the computing system 8115 is in an idle state at least with respect to performing data reception and aggregation operations. Step 35401 is at least similar to step 34301 of method 34300 illustrated in FIG. 34. At step 35403, the computing system 8115 receives a data piece from an electronic device 8110. Step 35403 is at least similar to step 34303 of method 34300 illustrated in FIG. 34. At step 35405, the computing system 8115 identifies a user profile stored in a server 8120. Step 35405 is at least similar to step 34305 of method 34300 illustrated in FIG. 34. At step 35407, the computing system 8115 determines whether to store a behavior contained in the received data piece in the identified user profile. Step 35407 is at least similar to step 34307 of method 34300 illustrated in FIG. 34. At step 35409, the computing system 8115 stores the behavior in the user profile. Step 35409 is at least similar to step 34309 of method 34300 illustrated in FIG. 34.

At step 35411, the computing system 8115 assigns a confidence interval score to the behavior. In certain embodiments, the computing system 8115 assigns a confidence interval score to the behavior in order to determine whether to store the behavior in the user profile as described herein. In certain embodiments, the computing system 8115 assigns a confidence interval score to the behavior stored in the user profile based on the confidence interval associated with at least one of the electronic device 8110, the web browser session, or the web browser 8125. The confidence interval score provides an indication of a level of reliability that a behavior is indicative of an interest.

At step 35413, the computing system 8115 ranks the behavior stored in the user profile among one or more other behaviors stored in the user profile. In certain embodiments, the computing system 8115 ranks the behavior stored in the user profile amongst one or more other behaviors stored in the user profile based on the confidence interval score assigned to the behavior and confidence interval scores associated with each of the other one or more behaviors stored in the user profile. For example, after the computing system 8115 assigns a confidence interval score to the behavior contained in the data piece from the electronic device 8110 in order to determine whether to store the behavior in the user profile as described herein, the computing system 8115 stores the behavior in the user profile with the assigned confidence interval score. The computing system 8115 may have previously assigned or may then assign a confidence interval score to the one or more other behaviors stored in the user profile. The computing system 8115 may rank the behavior contained in the data piece and stored in the user profile among the other one or more behaviors stored in the user profile. In certain embodiments, computing system 115 may arrange the each of the behaviors stored in the user profile according to rank. Lowering ranking behaviors stored in the user profile may be delegated as higher ranking behaviors are stored in the user profile. Ranking behaviors stored in the user profiles may be used to separate behaviors with a high confidence interval from behaviors with a low confidence interval.

FIG. 536 illustrates a method 36500 implemented by a computing system 8115, utilizing at least one processor 9205, for performing data reception and aggregation operations according to certain embodiments of this disclosure. Although certain details with be provided with reference to the method 36500 of FIG. 536, it should be understood that other embodiments may include more, less, or different method steps. At step 36501, the computing system 8115 is in an idle state at least with respect to performing data reception and aggregation operations. Step 36501 is at least similar to step 34301 of method 34300 illustrated in FIG. 34. At step 36503, the computing system 8115 receives a data piece from an electronic device 8110 including a first item of anonymous personal identification information coupled with a first behavior and a second item of anonymous personal authentication information coupled with the second behavior. With the exception of a data piece containing multiple items of anonymous personal identification information each coupled with a behavior, step 36503 is at least similar to step 34303 of method 34300 illustrated in FIG. 34.

At step 36505, the computing system 8115 identifies a first user profile stored in a server 8120. In certain embodiments, the computing system 8115 identifies a first user profile stored in a server 8120 based on the first item of anonymous personal identification information contained in the data piece. For example, the first item of anonymous personal identification information and data piece may be used to identify the first user profile (e.g. when the first item of anonymous personal identification information is a key value for the first user profile). At step 36507, the computing system 8115 identifies a second user profile stored in a sever 8120. In certain embodiments, the computing system 8115 identifies a second user profile stored in a server 8120 based on the second item of anonymous personal identification information contained in the data piece. For example, the second item of anonymous personal identification information and data piece may be used to identify the first user profile (e.g. when the first item of anonymous personal identification information is a key value for the first user profile). At step 36507, the computing system 8115 identifies a second user profile stored in a server 8120. In certain embodiments, the computing system 8115 identifies a second user profile stored in a server 8120 based on a second item of anonymous personal identification information contained in the data piece. For example, the second item of anonymous personal identification information and data piece may be used to identify the second user profile (e.g. when the second item of anonymous personal identification information is a key value for the second user profile). With the exception of a multiple items of anonymous personal identification information each coupled with a behavior coming from a single data piece, steps 36505 and 36507 are at least similar to step 34305 of method 3034300 illustrated in FIG. 34.

At step 36509, the computing system 8115 determines whether to store the first behavior in the first user profile. In certain embodiments, the computing system 8115 determines whether to store the first behavior in the first user profile based on a confidence interval associated with at least one of electronic device 8110, the web browser session, or the web browser 8125. At step 36511, the computer system 8115 determines whether to store the second behavior in the second user profile. In certain embodiments, the computing system 8115 determines whether to store the second behavior in the second user profile based on a confidence interval associated with at least one of electronic device 8110, the web browser session or the web browser 8125. With the exception of multiple behaviors from a single data piece being stored in multiple user profiles (e.g. different user profiles), steps 36509 and 36511 are at least similar to step 34307 of method 34300 illustrated in FIG. 34.

At step 36513, the computing system 8115 stores the first behavior in the first user profile. In certain embodiments, the computing system 8115 stores the first behavior in the first user profile when the confidence interval exceeds or surpasses a first confidence interval threshold. At step 36515, the computing system 8115 stores the second behavior in the second user profile. In certain embodiments, the computing system 8115 stores the second behavior in the second user profile when the confidence interval exceeds or surpasses a second confidence interval threshold. The first confidence interval threshold and the second confidence interval threshold may be a same threshold or a different thresholds. With the exception of multiple behaviors from a single data piece being stored in multiple user profiles (e.g. different user profiles), steps 36513 and 36515 are at least similar to step 34309 of method 34300 illustrated in FIG. 34.

FIG. 637 illustrates a method 37600 implemented by a computing system 8115 utilizing at least one processor 9205, for performing data reception and aggregation operations according to certain embodiments of this disclosure. Although certain details will be provided with reference to the method 37600 of FIG. 637, it should be understood that other embodiments may include more, less, or different method steps. At step 37601, the computing system 8115 is in an idle state at least with respect to data reception and aggregation operations. Step 37601 is at least similar to step 34301 of method 34300 illustrated in FIG. 34. At step 37603, the computing system 8115 receives a data piece from an electronic device 8110. Step 37603 is at least similar to step 34303 of method 34300 illustrated in FIG. 34. At step 37605, the computing system 8115 identifies a user profile stored in a server 8120. Step 37605 is at least similar to step 34305 of method 34300 illustrated in FIG. 34. At step 37607, the computing system 8115 determines whether to store a behavior contained in the received data piece in the identified user profile. Step 37607 is at least similar to step 34307 of method 34300 illustrated in FIG. 34. At step 37609, the computing system 8115 stores the behavior in the user profile. Step 37609 is at least similar to step 34309 of method 34300 illustrated in FIG. 34.

At step 37611, the computing system 8115 flags the user profile based on a quantity of behaviors stored in the user profile. In certain embodiments, the computing system 8115 flags the user profile in the server 8120 when the behavior stored in the user profile causes a quantity of behaviors stored in the user profile having a same behavior type as a behavior type of the behavior to exceed a maximum quantity of stored behaviors or a maximum storage frequency of stored behaviors. For example, the user profile may contain a plurality of behaviors having a same behavior type (e.g. a click on a same link, an opt-in). After a behavior from a data piece is stored in a user profile, the computing system 8115 may determine that the additional behavior stored in the user profile causes a quantity of behaviors stored in the user profile and having the same behavior type as the behavior type of the behavior from the data piece to exceed a maximum quantity of stored behaviors. When a user profile contains a quantity of behaviors having a same behavior type that exceeds the maximum quantity of stored behaviors, the data (e.g. items of anonymous personal identification information, behaviors) stored in the user profile and thus the user profile may be deemed unreliable for containing information indicative of a user preference or a user interest. The computing system 8115 may flag the user profile when the quantity of behaviors stored in the user profile exceeds the maximum quantity of stored behaviors due to the unreliability of the data stored in the user profile.

As another example, the user profile may contain a plurality of behaviors having a same behavior type (e.g. a click on a same link, an opt-in). After a behavior from a data piece is stored in a user profile, the computing system 8115 may determine that the additional behavior stored in the user profile causes a quantity of behaviors stored in the user profile and having the same behavior type as the behavior type of the behavior from the data piece to exceed a maximum storage frequency of stored behaviors. When a user profile receives a quantity of behaviors having a same behavior type and within a predetermined period of time that exceeds the maximum storage frequency of stored behaviors, the date (e.g. items of anonymous personal identification information, behaviors) stored in a user profile and thus the user profile may be deemed unreliable for containing information indicative of a user preference or a user interest. The computing system 8115 may flag the user profile when the quantity of behaviors stored in the user profile during the predetermined period of time exceeds the maximum storage frequency of stored behaviors due to the unreliability of the data stored in the user profile. In certain embodiments, the computing system may flag the user profile for deletion of the user profile or for transfer of the user profile from the server to another server.

At step 37613, the computing system 8115 flags the user profile based on a frequency of behaviors stored in the user profile. In certain embodiments the computing system 8115 flags the user profile in the server 8120, after the behavior is stored in the user profile, when a frequency of behaviors stored in the user profile remains below a minimum storage frequency for a predetermined time after a generation of the user profile. For example, the user profile may contain very few or no behaviors. The computing system 8115 may determine that the age of the user profile is beyond a minimum age. After a behavior from a data piece is stored in a user profile, the computing system 8115 may determine that the user profile is beyond a minimum age and that the additional behavior stored in the user profile causes a frequency of behaviors being stored in the user profile the remain below a minimum storage frequency. When a user profile does not receive a threshold frequency of data pieces containing behaviors for a predetermined period of time, the data (e.g. items of anonymous personal identification information, behaviors) stored in user profile and thus the user profile may be deemed unreliable for containing information indicative of a user preference or a user interest. The computing system 8115 may flag the user profile when the frequency quantity of behaviors stored in the user profile remains below a minimum storage frequency of stored behaviors due to the unreliability of the data stored in the user profile. In certain embodiments, the computing system may flag the user profile for deletion of the user profile or for transfer of the user profile from the server to another server.

FIG. 738 illustrates a method 38700 implemented by a computing system 8115 utilizing at least one processor 9205, for performing data reception and aggregation operations according to certain embodiments of this disclosure. Although certain details will be provided with reference to the method 38700 of FIG. 738, it should be understood that other embodiments may include more, less, or different method steps. At step 38701, the computing system 8115 is in an idle state at least with respect to performing data reception and aggregation operations. Step 38701 is at least similar to step 34301 of method 34300 illustrated in FIG. 34. At step 38703, the computing system 8115 receives a plurality of data pieces associated with a plurality of web browser session on a plurality of web browsers 8125 from a plurality of electronic devices 8110. At step 38705, the computing system 8115 identifies a user profile stored in a server 8120 based on a same item of anonymous personal identification information contained in each of the plurality of data pieces. At step 38707, the computing system 8115 determines whether to store a behavior contained in each of the received data pieces in the identified user profile. In certain embodiments, the computing system 8115 determines whether to store a behavior from each of the data pieces in the user profile based on confidence intervals associated with at least one or of an electronic device 8110, a web browser session, or a web browser 8125 associated with each data piece. Step 38707 is at least similar to step 34307 of method 34300 illustrated in FIG. 34. At step 38709, the computing system 8115 stores the behavior in the user profile. In certain embodiments, the computing system 8115 stores each of the behaviors in the user profile. In certain embodiments, the computing system 8115 stores each of the behaviors in the user profile when the confidence intervals surpass or exceed a confidence interval threshold. Step 38709 is at least similar to step 34309 of method 34300 illustrated in FIG. 34.

At step 38711, the computing system 8115 flags the user profile based on a quantity of received data pieces contained the same item of anonymous personification information indicative of the user profile. In certain embodiments, the computing system 8115 flags the user profile in the server 8120 when the plurality of data pieces each containing the same item of anonymous personal identification information exceeds or surpasses a maximum data piece quantity. For example, the computing system 8115 may receive a plurality of data pieces associated with one or more web browser sessions on one or more web browsers 8125 from one or more electronic devices 8110. The computing system 8115 may determine that each of the plurality of data pieces contains a same item of anonymous personal identification information and may determine that the item of anonymous personal identification information contained in each of the data pieces is associated with a specific user profile. After the computing system 8115 stores the behaviors from each of the data pieces in the user profile, the computing system 8115 may determine that it has received a quantity of data pieces containing the same item of anonymous personal identification information that exceeds or surpasses a maximum data piece quantity. The computing system 8115 may flag the user profile when the quantity of data pieces containing the same item of anonymous personal identification information received and stored in the user profile exceeds or surpasses the maximum data piece quantity due to the unreliability of the data stored in the user profile. In certain embodiments, the computing system may flag the user profile for deletion of the user profile or for transfer of the user profile from the server to another server.

FIG. 839 illustrates a method 39800 implemented by a computing system 8115, utilizing at least one processor 9205, for performing data reception and aggregation operations according to certain embodiments of this disclosure. Although certain details will be provided with reference to the method 39800 of FIG. 839, it should be understood that other embodiments may include more, less, or different method steps. At step 39801, the computing system 8115 is in an idle state at least with respect to performing data reception and aggregation operations. Step 39801 is at least similar to step 34301 of method 34300 illustrated in FIG. 34.

At step 39803, the computing system 8115 receives a plurality of data pieces associated with a plurality of web browser session on a plurality of web browser sessions on a plurality of web browsers 8125 from a plurality of electronic devices 8110. In certain embodiments, each of the plurality of data pieces contains the primary item of anonymous personification information, one or more secondary items of anonymous personification information is a key value used to identify or establish a user profile. In some embodiments, a secondary item of anonymous personal identification information is an item of anonymous personal identification information. For example, a primary item of anonymous personal identification information may be a first email address, while a second item of anonymous personification information may be a second email address, a postal address, a user ID, a gender, an age group, a user interest, or the like.

At step 39805, the computing system 8115 identifies a user profile stored in a server 8120 based on the primary item of anonymous personal identification information contained in each of the plurality data pieces. At step 39807, the computing system 8115 determines whether to store one or more behaviors and one or more secondary items of anonymous personal identification information contained in each of the received data pieces in the identified user profile. In certain embodiments, the computing system 8115 determines whether to store one or more behaviors and one or more secondary items of anonymous personal identification information contained in each of the received data piece in the identified user profile based on confidence intervals associated with at least one of an electronic device 8110, a web browser session, or a web browser 125 associated with each data piece. Step 39807 is at least similar to each step 34307 of method 34300 illustrated in FIG. 34.

At step 39809, the computing system 8115 stores the one or more secondary items of anonymous personal identification information and the one or more behaviors from each of the data pieces in the user profile. In certain embodiments, the computing system 8115 stores the one or more secondary items of anonymous personification information and the one or more behaviors from each of the data pieces in the user profile when a confidence interval surpasses or exceeds a confidence interval threshold for each of the data pieces. Step 39809 is at least similar to step 34307 of method 34300 illustrated in FIG. 34.

At step 39811, the computing system 8115 flags the user profile based on a quantity of secondary items of anonymous personification information having a same item type and that are stored in the user profile. In certain embodiments, the computing system 8115 flags the user profile when the secondary items of anonymous personification information from each of the data pieces cause a quantity of different secondary items of anonymous personal identification information having a same item type and stored in the user profile to exceed the maximum quantity of different secondary items of anonymous personal identification information have a same item type. For example, the computing system 8115 may receive a plurality of data pieces associated with one or more web browser sessions on one or more web browsers 8125 from one or more electronic devices 8110. The computing system also determine that each of the plurality of received data pieces are associated with a user profile. The computing system 8115 may determine that each of the plurality of received data pieces contains a plurality of secondary items of anonymous personal identification information having a same item type (e.g. a plurality of different email addresses, a plurality of different postal address, a plurality of different phone numbers). After the computing system 8115 stores the secondary items of anonymous personal identification information from each of the data pieces in the user profile, the computing system 8115 may determine that the user profile contains a quantity of secondary items of anonymous personal identification information having a same item type that exceeds or surpasses a maximum quantity of different secondary items of anonymous personal identification information having a same item type. The computing system 8115 may flag the user profile when the user profile contains a quantity of secondary items of anonymous personal identification information that have a same item type that exceeds or surpasses a maximum quantity of different secondary items of anonymous personal identification information having a same item type due to the unreliability of the data stored in the user profile. In certain embodiments, the computing system may flag the user profile for deletion of the user profile or for transfer of the user profile from the server to another server.

FIG. 940 illustrates a method 40900 implemented by a computing system 8115, utilizing at least one processor 9205, for performing data reception and aggregation operations according to certain embodiments of this disclosure. Although certain details will be provided with reference to the method 40900 of FIG. 940, it should be understood that other embodiments may include more, less, or different method steps. At step 901, the computing system 8115 is in an idle state at least with respect to performing data reception and aggregation operations. Step 40901 is at least similar to step 34301 of method 34300 illustrated in FIG. 34.

At step 40903, the computing system 8115 receives a data piece from an electronic device 8110. In certain embodiments, the computing system 8115 receives a data piece associated with a web browser session on a web browser 8125 from electronic device 8110. In certain embodiments, a data piece may contain a primary item of anonymous personal identification information, one or more secondary items of anonymous personification information, and one or more behaviors. In some embodiments, the primary item of anonymous personal identification information is a key value used to identify or establish a user profile. In some embodiments, a secondary item of anonymous personal identification information is an item of anonymous personal identification information that is not the primary item of anonymous personal identification information. For example, a primary item of anonymous personal identification information may be a first email address, while a second item of anonymous personification information may be a second email address, a postal address, a user ID, a gender, an age group, a user interest, or the like.

At step 40905, the computing system 8115 identifies a user profile stored in a server 8120 based on the primary item of anonymous personal identification information contained in the data piece. At step 40907, the computing system 8115 determines whether to store one or more behaviors and one or more secondary items of anonymous personal identification information contained in the received data piece in the identified user profile. In certain embodiments, the computing system 8115 determines whether to stored one or more behaviors and one or more secondary items of anonymous personal identification information contained in the received data piece in the identified user profile based on the confidence intervals associated with at least one of an electronic device 8110, a web browser session, or a web browser 8125 associated with each data piece. Step 40907 is at least similar to step 34307 of method 34300 illustrated in FIG. 34.

At step 40909, the computing system 8115 stores the one or more secondary items of anonymous personification information and the one or more behaviors from the data piece in the user profile. In certain embodiments, the computing system 8115 stores the one or more secondary items of anonymous personification information and the one or more behaviors from the data piece in the user profile when a confidence interval surpasses or exceeds a confidence interval threshold from the data piece. Step 40909 is at least similar to step 34309 of method 34300 illustrated in FIG. 34.

At step 40911, the computing system 8115 flags the user profile when the user profile does not contain or excludes an item of anonymous personal identification information having a particular item type. In certain embodiments, the computing system 8115 flags the user profile when items of anonymous personal identification information stored in the user profile exclude or do not contain an item of anonymous personal identification information having a predetermined item type. For example, the computing system 8115 may examine a user profile and determine that the user profile does not contain any email addresses. In response, the computing system 8115 may flag the user profile for not containing any email addresses due to the unreliability of the data stored in the user profile. In certain embodiments, the computing system may flag the user profile for deletion of the user profile or for transfer of the user profile from the server to another server.

FIG. 1041 illustrates a method 100041100 implemented by a computing system 8115, utilizing a least one processor 9205, for performing data reception and aggregation operations according to certain embodiments of this disclosure. Although certain details will be provided with reference to the method 100041100 of FIG. 1041, it should be understood that other embodiments may include more, less or different methods steps. At step 100141101, the computing system 8115 is in an idle state at least with respect to performing data reception and aggregation operations. Step 100141101 is at least similar to step 34301 of method 34300 illustrated in FIG. 34.

At step 100341103, the computing system 8115 receives a data piece from an electronic device 8110. In Certain embodiments, the computing system 8115 receives a data piece associated with a web browser session on a web browser 8125 from electronic device 8110. In certain embodiments, a data piece may contain a primary item of anonymous personification information, one or more secondary items of anonymous personification information, and one or more behaviors. In some embodiments, the primary item of anonymous personal identification information is a key value used to identify or stablish a user profile. In some embodiments, a secondary item of anonymous personal identification information is an item of anonymous personal identification information that is not the primary item of anonymous personal identification information. For example, a primary item of anonymous personal identification information may be a first email address, while a secondary item of anonymous personification information may be a second email address, a postal address, a user ID, a gender, an age group, a user interest, or the like.

At step 100541105, the computing system 8115 identifies a user profile stored in a server 8120 based on the primary item of anonymous personal identification information contained in the data piece. At step 100741107, computing system 8115 determines whether to store one or more behaviors and one or more secondary items of anonymous personal identification information contained in the received data piece in the identified user profile. In certain embodiments, the computing system 8115 determines whether to store one or more behaviors and one or more second items of anonymous personal identifications information contained in the received data piece in the identified user profile based on confidence intervals associated with at least one of an electronic device 8110, a web browser session, or a web browser 8125 associated with each data piece. Step 100741107 is at least similar to step 34307 of method 34300 illustrated in FIG. 34.

At step 100941109 the computing system 8115 stores the one or more secondary items of anonymous personification information and the one or more behaviors from the data piece in the user profile. In certain embodiments, the computing system 8115 stores the one or more secondary items of anonymous personification information and the one or more behaviors from the data piece in the user profile when a confidence interval surpasses or exceeds a confidence interval threshold for the data piece. Step 1009 is at least similar to step 34309 of method 34300 illustrated in FIG. 34.

At step 101141111, the computing system 8115 flags the user profile when the user profile only contains items of anonymous personal identification information and behaviors from a single web browser. In certain embodiments, the computing system 8115 flags the user profile when all behaviors stored in the user profile and all items of anonymous personification information stored in the user profile are associated with the same web browser. For example, the computing system 8115 may examine a user profile and determine that the user profile contains items of anonymous personal identification information and behaviors from only one specific web browser. In response, the computing system 8115 may flag the user profile for containing items of anonymous personal identification information and behaviors from only one specific web browser. In certain embodiments, the computing system may flag the user profile for deletion of the user profile or for transfer of the user profile from the server to another server.

FIG. 1142 illustrates a method 110042100 implemented by a computing system 8115, utilizing at least one processing 9205, for performing data reception and aggregation operations according to certain embodiments of this disclosure. Although certain details will be provided with reference to the method 110042100 of FIG. 1142, it should be understood that other embodiments may include more, less, or different method steps. At step 142101, the computing system 8115 is in an idle state at least with respect to performing data reception and aggregation operations. Step 142101 is at least similar to step 34301 of method 34300 illustrated in FIG. 34.

At step 142103, the computing system 8115 receives a plurality of data pieces associated with a plurality of web browser sessions on a web browser 8124 from a plurality of electronic devices 8110. In certain embodiments, each of the plurality of data pieces contains a primary item of anonymous personification information, one or more secondary items of anonymous personification information, one or more secondary items of anonymous personal identification information, and one or more behaviors. In some embodiments the primary item of anonymous personal identification information is a key value used to identify or establish a user profile. In some embodiments, a secondary item of anonymous personal identification information is an item of anonymous personal identification information that is not the primary item of anonymous personal identification information. For example, a primary item of anonymous personal identification information may be a first email address, while a secondary item of anonymous personification information may be a second email address, a postal address, a user ID, a gender, an age group, a user interest, or the like.

At step 142105, the computing system 8115 identifies a user profile stored in a server 8120 based on the primary item of anonymous personal identification information contained in each of the plurality data pieces. At step 142107, the computing system 8115 determines whether the data pieces are received from the web browser in a pattern or when a quantity of different items of anonymous personal identification information contained in the data pieces from a specific web browser is maintained in quantities that are multiples of ten. For example, the computing system 8115 may determine that data pieces are received from a specific web browser at a particular time once a day, on a particular day once a week, or one a particular day once a month. As another example, the computing system 8115 may determine that all data pieces received from a specific web browser 8125 contain secondary items of anonymous personal identification information or behaviors in quantities that are multiples of 10 (e.g., 200 behaviors, 530 secondary items of anonymous personal identification information).

At step 142109, the computing system 8115 flags the data pieces from the web browser 8125. In certain embodiments, the computing system 8115 flags the data pieces from the web browser when the data pieces from the web browser are received in an identified pattern or when a quantity of different items of anonymous personal identification information contained in each of the data pieces for the web browser is maintained in a quantity that is a multiple of ten. For example, in response to the computing system 8115 determining that data pieces are received from a specific web browser at a particular time once a day, on a particular day once a week, or on a particular day once a month, the computing system 8115 may flag all data pieces received from the web browser 8125. As another example, in response to the computing system 8115 determining that all data pieces received from a specific web browser 8125 contain secondary items of anonymous personal identification information or behaviors in quantities that are multiples of ten (e.g. a first data piece from a web browser contains 200 behaviors, a second pieces from the same web browsers contain 50 behavior, a third data piece from the same web browser contains 380 behaviors, a first data piece from a web browser contains 40 secondary items of anonymous personal identification information, a second piece from the same web browsers contains 320 secondary items of anonymous personal identification information, a third data piece from the same web browser contains 270 secondary items of anonymous personal identification information, the computing system 8115 may flag all data pieces received from the web browser 8125.

Various embodiments of a system and method for receiving and aggregating data, as described herein, may be executed on one or more computing systems 81151200, which may interact with various other devices. In the illustrated embodiment, the computer system 11008115 includes one or more processors 19205 coupled to a system memory 1210 via an input/output (I/O) interface 19215. The computer system 81151200 further includes a network interface 81151200 coupled to I/O interface 1215, and one or more input/output devices 19225, such as cursor control device 158940, keyboard 158U945, and display(s) 158U950. In some cases, it is contemplated that embodiments may be implemented using a single instance of computer system 81151200, while in other embodiments multiple such systems, or multiple nodes making up computer system 81151200, may be configured to host different portions or instances of embodiments. For example, in one embodiments some elements may be implementing other elements.

In various embodiments, computer system 81151200 may be a uniprocessor system including one processor 19205*a*, or a multiprocessor system including several processors 19205*a*-19205*n* (e.g. two, four, eight, or another suitable number). The processors 19205 may be any suitable processor capable of executing instructions. For example, in various embodiments the processors 19205 may be general-purposes or embedded processors implementing any of a variety of instruction set architectures (ISAs) such as the x86, PowerPC, SPARC, or MIPS ISAs, or any other suitable ISA. In multiprocessor systems, each of processor 1205 may commonly, but not necessarily, implement the same ISA.

The system memory 19210 may be configured to store the program instructions 19230 and/or existing state information and ownership transition condition data in the data storage 19235 accessible by the processor 19205. In various embodiments the system memory 19210 may be implemented using any suitable memory technology, such as static random access memory (SRAM), synchronous dynamic RAM (SDRAM), nonvolatile/Flash-type memory, or any other type of memory. IN the illustrated embodiment, the program instructions 19230 may be configured to implement a system for performing data reception and aggregation operations incorporating any of the functionality as described herein. IN some embodiments, program instructions and/or data may be received, sent, or stored upon different types of computer-accessible media or on similar media separate from the system memory 19210 or the computer system 81151200. The computer system 81151200 is described as implementing at least some of the functionality of functional blocks of previous Figures.

In one embodiment, the I/O interface 19215 may be configured to coordinate I/O traffic between the processor 19205, the system memory 19210, and any peripheral devices in the device, including the network interface 19220 or other peripheral interfaces, such as the input/output devices 19225. In some embodiments, the I/O interface 19215 may perform any necessary protocol, timing or other data transformations to convert data signals from one component (e.g. the system memory 19210) into a format suitable for use by another component (e.g. the processor 19205). In some embodiments, the I/O interface 19214 may include support for devices attached through various types of peripheral buses, such as a variant of the Peripheral Component Interconnect (PCI) bus standard or the Universal Serial Bus (USB) standard, for example. In some embodiments, the function of the I/O interface 19215 may be split into two or more separate components, such as a north bridge and a south bridge, for example. Also in some embodiments some or all of the functionality of the I/O interface 19215, such as an interface to the system memory 19210, may be incorporated directly into the processor 19205.

The network interface 81151200 may be configured to allow data to be exchanged between the computer system 81151200 and other devices attached to the network 81045 or between nodes of the computer system 81151200. The network 8105 may in various embodiments include one or more networks including but not limited to Local Area Networks (LANs) (e.g. an Ethernet or corporate network), Wide Area Networks (WANs) (e.g. the Internet), wireless data networks, some other electronic data network, a combination thereof, or the like. In various embodiments, the network interface 19220 may support communication via wired or wireless general data networks, such as any suitable type of Ethernet network, for example, via telecommunications/telephony networks such as analog voice networks or digital fiber communications networks; via storage area networks such as Fiber Channels SANs, or via any other suitable type of network and/or protocol.

The input/output devices 19225 may, in some embodiments, include one or more display terminals, keyboards, keypads, touchpads, scanning devices, voices, or optical recognition devices, or any other devices suitable for entering or accessing data by one or more the computer systems 81151200. Further, various other sensors may be included in the I/O devices 19225, such as imaging sensors, barometers, altimeters, LIDAR, or any suitable environmental sensor. Multiple input/output devices 19225 may be present in the computer system 81151100 or may be distributed on various nodes of the computer system 81151200. In some embodiments, similar input/output devices may be separate from the computer system 81151200 and may interact with one or more nodes of the computer system 81151200 through a wired or wireless connection, such as over the network interface 19220.

Figure 42:
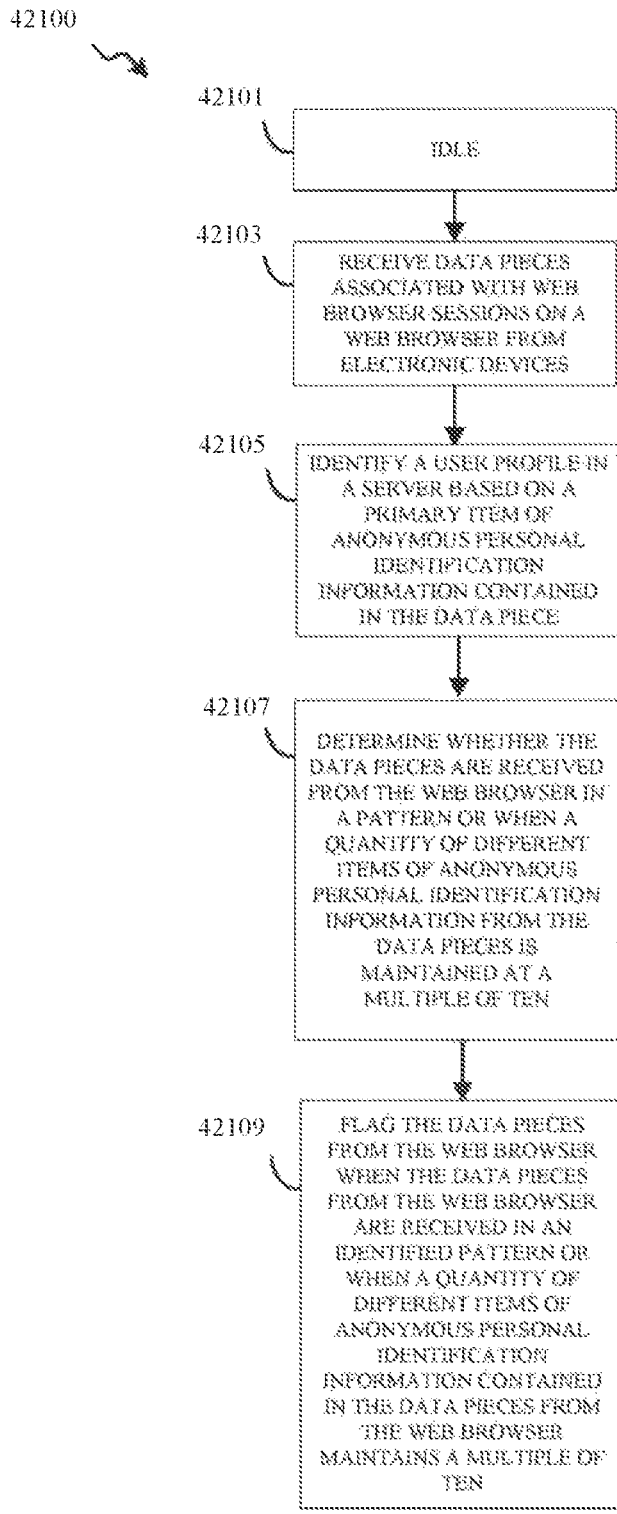
Figure 45:
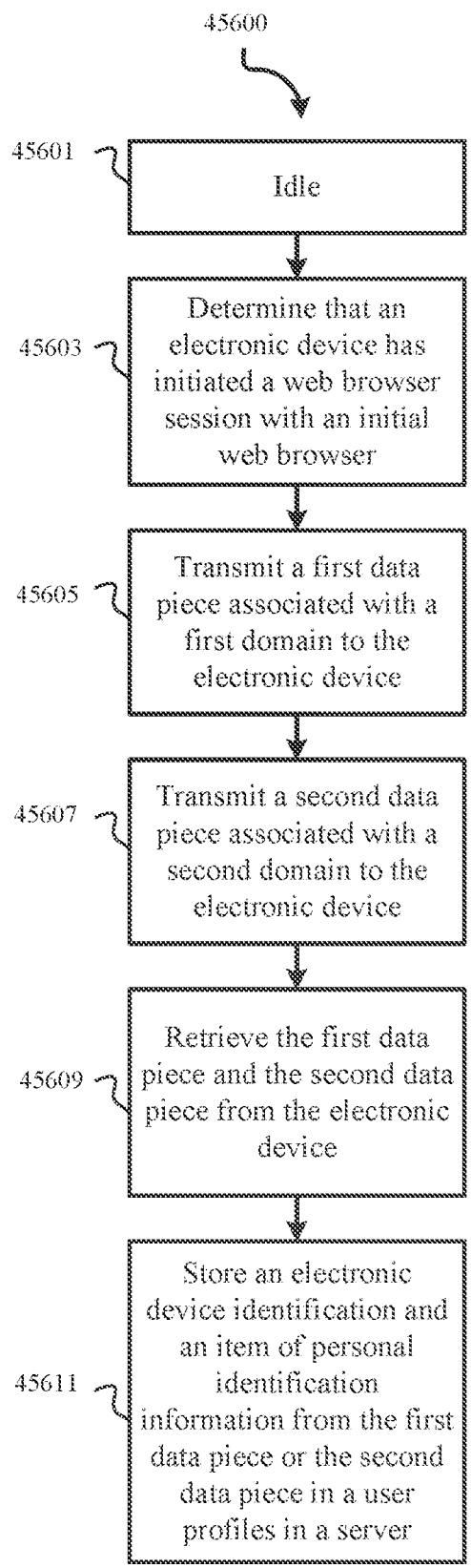
Figure 46:
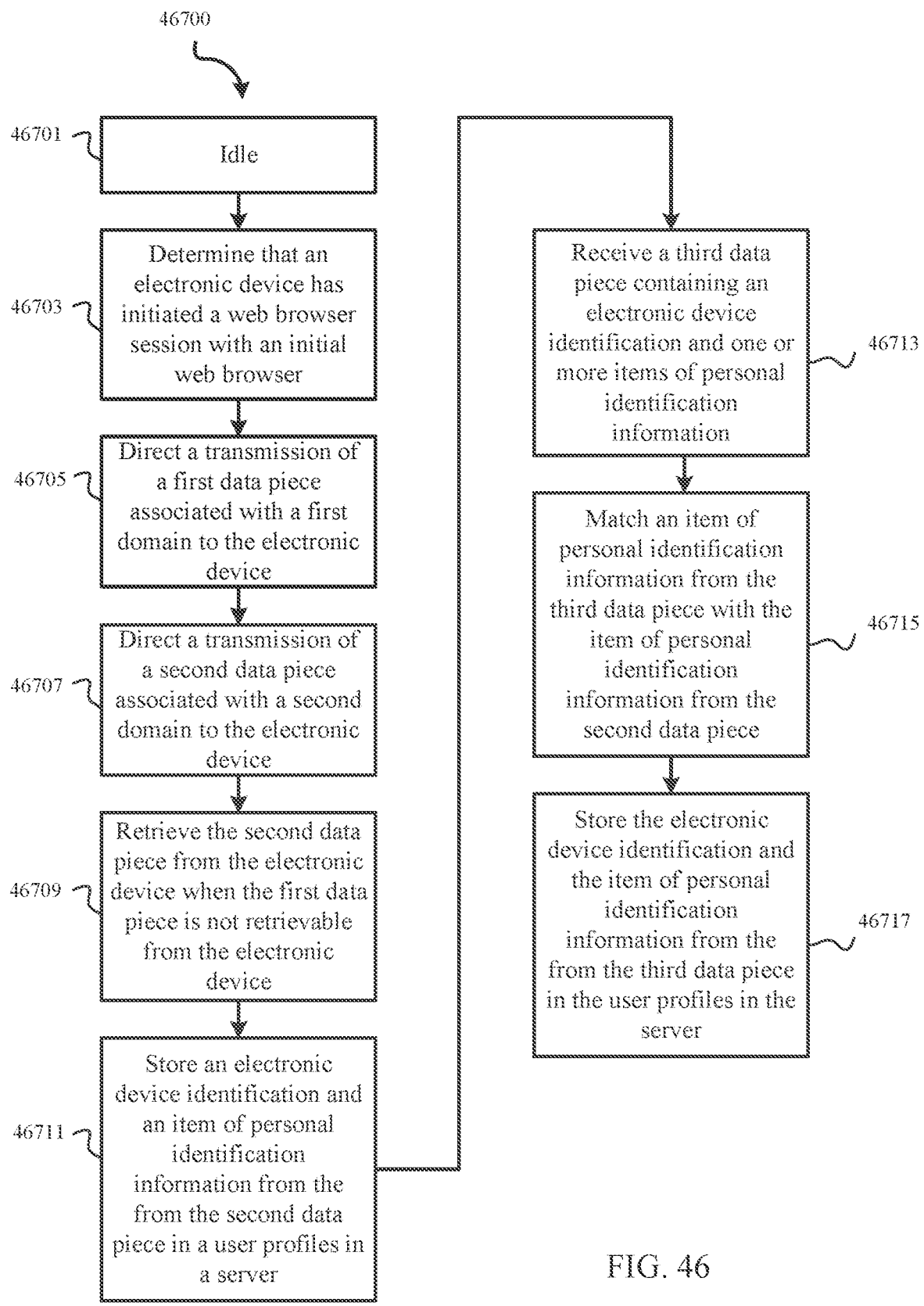
Figure 47:
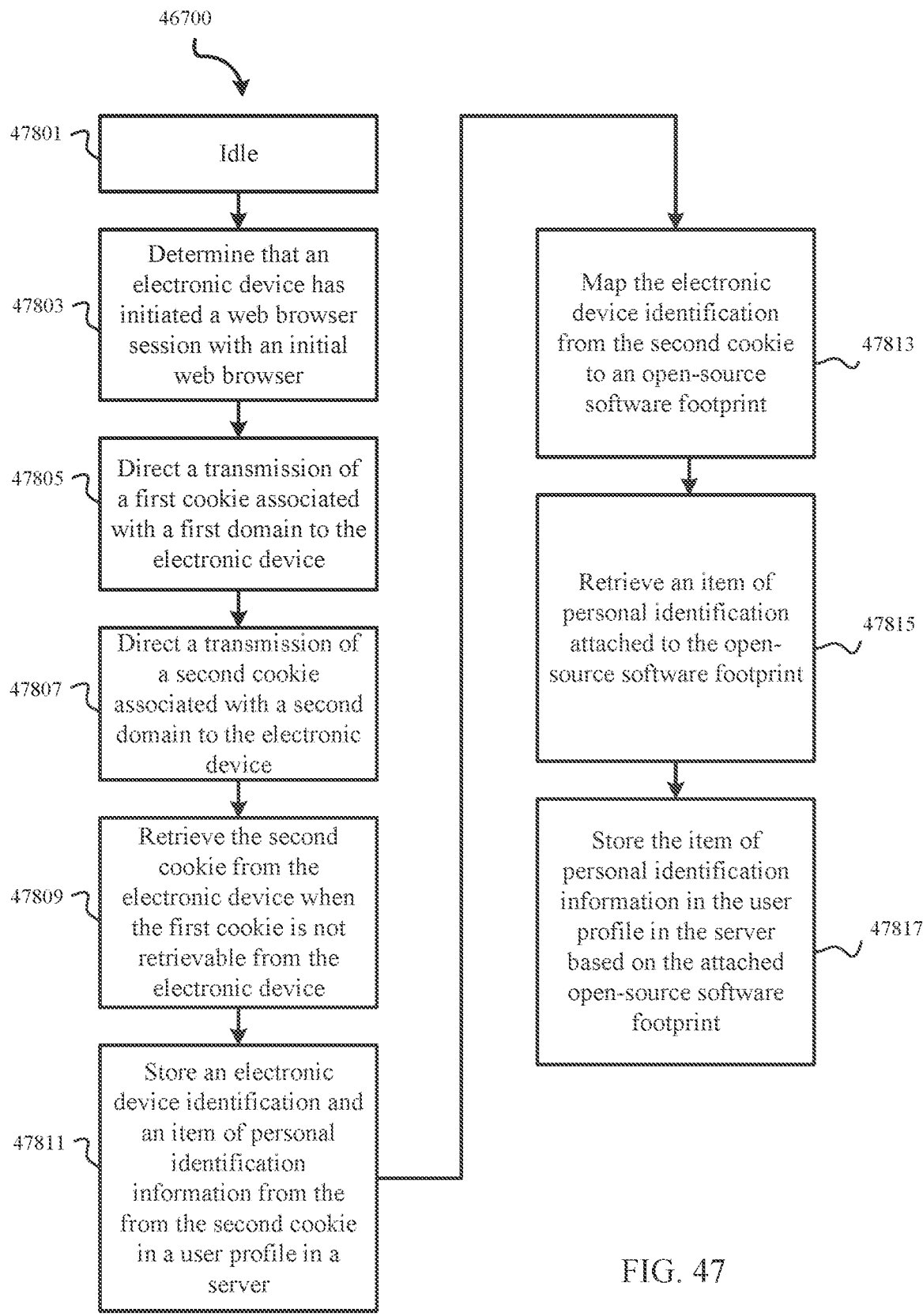
Figure 48:
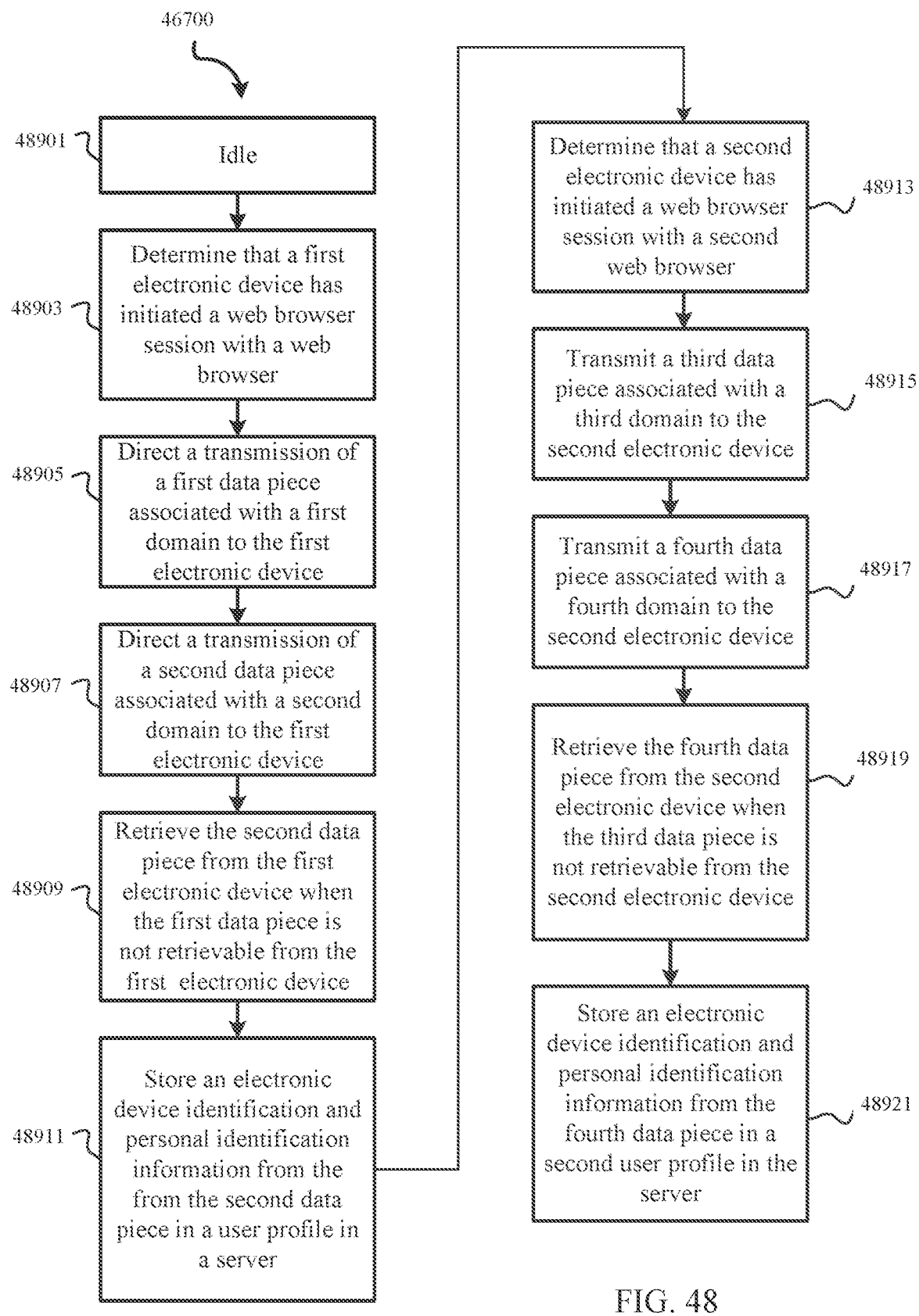

As shown in FIG. 129, the memory 19210 may include program instructions 1230, which may be processor-executable to implement may implement at least a portion of methods described herein, such as the method illustrated by FIGS. 3-1134-42. In other embodiments, different elements and data may be included. Note that the data storage 19235 may include any data or information, as described herein.

Those skilled in the art will appreciate that the computer system 81151200 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 81151200 may also be connected to other devices that are not illustrated or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another devices and communicate with the illustrated computer system via inter-computer communication. Some or all of the system components or data structures may also be stored (e.g. as instructions, structed data) one a computer-accessible medium or a portable article to be read by an appropriate drive, various examples of which are described here. In some embodiments, instructions stored on a computer-accessible medium separate from the computer system 81151200 may be transmitted to the computer system 81151200 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing descriptions upon a computer-accessible medium. Generally speaking, a computer-accessible medium may include a non-transitory, computer-readable storage medium or memory medium may include a non-transitory, computer-readable storage medium or memory medium such as a magnetic or optical medium e.g. disk or DVD/CD-ROM, volatile or non-volatile media such as RAM (e.g. SDRAM, DDR, RDRAM, SRAM, or the like), ROM, or the like. In some embodiments, a computer-accessible medium may include transmission media or signals such as electronical, electromagnetic, or digital signals, conveyed via a communications medium such as network and/or wireless link.

Thus, the disclosure provides, among other things, a system for performing data reception and aggregation operations, including a computing system. Unlike previous data aggregation system that look at stereotypes in the home to determine interests of individual people, the computing system described herein assigns a confidence interval or a weighting to received data and parses the received data into individual user profiles to determine interests associated with individual people.

SECTION VII. METHOD AND SYSTEM FOR ASYNCHRONOUS CORRELATION OF DATA ENTRIES IN SPATIAL INSTANCES OF HETEROGENEOUS DATABASES

Technical Field

The present disclosure relates to storing user data from web browsing sessions in a user profile and retrieving a specific subset of the stored user data.

Additional Background for Section VII

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

Summary for Section VII

This disclosure provides systems and methods for overcoming interruptions in network traffic to access personal identification information (PII) provided during a web browser session.

In a first embodiment, the disclosure provides an apparatus including a computing system that is communicatively linked to a server. The computing system includes a memory and at least one processor. The computing system is configured to direct a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computing system is also configured to direct a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The computing system is further configured to retrieve the second data piece from the electronic device memory when the computing system is not able to retrieve the first data piece from the electronic device memory. The second data piece retrieved from the electronic device contains the electronic device identification and one or more items of anonymous personal identification information provided by the electronic device during the initial web browser session.

In a second embodiment, the disclosure provides a computer-implemented method performed by a computing system. The computer-implemented method includes directing, by the computing system, a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computer-implemented method also includes directing, by the computing system, a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The computer-implemented method further includes retrieving, by the computing system, the second data piece from the electronic device memory when the computing system is not able to retrieve the first data piece from the electronic device memory. The second data piece retrieved from the electronic device contains the electronic device identification and one or more items of anonymous personal identification information provided by the electronic device during the initial web browser session.

In a third embodiment, the disclosure provides a non-transitory, computer-readable storage medium. The non-transitory, computer-readable storage medium stores one or more executable instructions that, when executed by at least one processor. causes the at least one processor to direct a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The one or more executable instructions that, when executed by at least one processor, also causes the at least one processor to direct a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The one or more executable instructions that, when executed by at least one processor, further causes the at least one processor to retrieve the second data piece from the electronic device memory when the at least one processor is not able to retrieve the first data piece from the electronic device memory. The second data piece retrieved from the electronic device contains the electronic device identification and one or more items of anonymous personal identification information provided by the electronic device during the initial web browser session.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a control ler may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances. such definitions apply to prior as well as future uses of such defined words and phrases.

DETAILED DESCRIPTION FOR SECTION VII

FIGS. 1 through 11, The figures discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates a non-limiting, example network context 100 for operating a computing system 115 according to certain embodiments of this disclosure. One or more components of the network context 100 may operate as separate components linked by one or more constituent networks of the network 105. In some embodiments, one or more constituent networks of the network 105 may include the internet which can be accessed over both wired connections (e.g., an Ethernet connection) or over a wireless connection (e.g., a wireless local area network "WLAN" connection or a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit-switched cellular, 30, LTE, WiBro) and internet protocols (e.g., HTTP).

The one or more constituent networks of the network 8105 provide two-way connectivity between each of the electronic devices 8110, the computing system 8115, the one or more servers 8120, and the one or more web browsers 8125. In certain embodiments, the one or more constituent networks of the network 8105 provide two-way connectivity between each of the electronic device 8110, the computing system 8115, the one or more servers 8120, and the one or more web browsers 8125 using one or more same or different channels, protocols, or networks of network 8105. For example, a circuit-switched cellular protocol wireless network of the network 8105 provides connectivity between the iPhone™ 8110a and one or more of the web browsers 8125 while a POTS wireless network of the network 8105 provides connectivity between the smartphone 8110c11Oc and at least one of the one or more web browsers 8125.

In certain embodiments, the network context 8100 includes one or more electronic devices 8110. The one or more electronic devices 8110 may include an iPhone™ 8110a, a tablet 8110b, a desktop computer 8110c, a smartphone 8110d, a laptop computer 8110e, or the like. In certain embodiments, each of the one or more electronic devices 8110 are configured to initiate a web browser session with a web browser 8125 or access and display the one or more web browsers 8125 through the network 8105 for viewing by a user and for interaction between the user and the one or more web browsers 8125. In certain embodiments, each of the one or more electronic devices 8110 are configured to store data pieces associated with the web browser 8125. The data piece may contain at least one of an electronic device identification or one or more items of anonymous personal identification information. In certain embodiments, the electronic device 8110 transmits anonymous personal identification information to the web browser 8125 during a web browser session where the anonymous personal identification information also includes an open source software footprint. In certain embodiments, the electronic device 8110 includes an electronic device display screen, an electronic device memory, and at least one electronic device processor. The electronic device may be configured to access and display content from one or more web browsers 8125 on the electronic device display screen.

In certain embodiments, the network context 8100 includes one or more web browsers 8125. As described herein, the one or more web browsers 8125 are configured to contain display content for viewing by an electronic device 8110 when the electronic device 8110 is engaged in a web browser session with the web browser 8125. In certain embodiments, the one or more web browsers are configured to transmit data pieces to the electronic device 8110 for storage in a memory of the electronic device 8110 when the electronic device 8110 is engaged in a web browser session with the web browser 8125. The one or more web browsers 8125 may also be configured to receive anonymous personal identification information from an electronic device 8110 when the electronic device 8110 is engage in a web browser session with the one or more web browsers 8125.

Additionally, the network context 8100 may. according to certain embodiments, include one or more servers 8120. In certain embodiments. the one or more servers 8120 stores user profiles that include electronic device identifications and items of anonymous personal identification information. As described herein, the computing system 8115 may store electronic device identifications and one or more items of anonymous personal identification information in selected user profiles stored in the one or more servers 8120.

In certain embodiments, the network context 8100 includes one or more computing systems 8115. FIG. 29 illustrates a non-limiting, example of the computing system 8115 illustrated in FIG. 18. The computing system 8115 is configured to execute any and all of the embodiments and operations described herein including embodiments for performing network interruption remedy operations. In certain embodiments, the computing system 8115 may perform network interruption remedy operations for overcoming interruptions in network traffic to access anonymous personal identification information provided during a web browser session. In different embodiments, the computing system 8115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing network interruption remedy operations, as described herein, may be executed on one or more computing systems 8115, which may interact with various other devices. In the illustrated embodiment, the computing system 8115 includes one or more processors 9205a, 9205b, . . . , and 9205n (hereinafter "one or more processors 9205," "processor 9205," or "processors 9205") coupled to a memory 9210 via an input/output (I/O) interface 9215. The computing system 8115 further includes a network interface 220 coupled to I/O interface 9215, and one or more input/output devices 9225, such as cursor control device 940, keyboard 945, and display(s) 950. In some cases, it is contemplated that embodiments may be implemented using a single instance of the computing system 8115, while in other embodiments multiple such systems, or multiple nodes making up the computing system 8115, may be configured to host different portions or instances of embodiments. For example, in one embodiment, some elements may be implemented via one or more nodes of the computing system 8115 that are distinct from those nodes implementing other elements.

In various embodiments, the computing system 8115 may be a uniprocessor system including one processor 9205a, or a multiprocessor system including several processors 9205a-9205n (e.g., two, four, eight, or another suitable number). The processor 9205 may be any suitable processor capable of executing instructions or operations including networking interference remedy operations as described herein. For example, in various embodiments the processor 205 may be general-purpose or embedded processors implementing any of a variety of instruction set architectures (ISAs), such as the x86, PowerPC, SPARC, or MIPS ISAs, or any other suitable ISA. In multiprocessor systems. each of processors 9205 may commonly, but not necessarily, implement the same ISA.

The memory 9210 may be configured to store the executable instructions or program instructions 9230 or existing state information and ownership transition condition data in the data storage 9235 accessible by the processor 9205. In various embodiments, the memory 9210 may be implemented using any suitable memory technology, such as static random-access memory (SRAM), synchronous dynamic RAM (SDRAM), nonvolatile/Flash-type memory, or any other type of memory. In the illustrated embodiment, the program instructions 9230 may be configured to implement a system for overcoming network interruptions incorporating any of the functionality, as described herein. In some embodiments, program instructions 9230 or data may be received, sent, or stored upon different types of computer-accessible media or on similar media separate from the memory 9210 or the computing system 8115. The computing system 8115 is described as implementing at least some of the functionality of functional blocks in the figures described herein.

In certain embodiments, the data storage 9235 of the memory 9210 stores a plurality of domains that can be linked to one or more web browsers 8125. FIGS. 326A and 326B illustrate an example matrix 26305 of a plurality of domains 26310 stored in the data storage 9235 of the memory 9210 and capable of being linked with one or more web browsers 8125 according to certain embodiments of this disclosure. As shown in FIG. 3A, the matrix 26305 contains a plurality of rows and a plurality of columns forming a plurality of fields each containing a domain (e.g., "A.com," "G.com,""S.com"). Each of the plurality of rows may be assigned an order that the at least one processor 9205 uses for directing an electronic device 8110 to transmit anonymous personal identification information to domains and for domains to transmit data pieces containing the transmitted anonymous personal identification information for storage in a memory of the electronic device 8110, as described herein. As shown in FIG. 326A, the web browser 8125 is positioned in the 0th Order Domain row 26315a, the domains "A.com." "B.com," "C.com," "D.com," and "E.com" are positioned in the 1st Order Domain row 26315b, the domains "F.com," "G.com," "H.com," "I.com," and "J.com" are positioned in the 2nd Order Domain row 26315c, the domains "K.com," "L.com," "M.com," "N.com," and "O.com" are positioned in the 3rd Order Domain row 26315d, the domains "P.com," "Q.com," "R.com," "S.com," and "T.com" are positioned in the 4th Order Domain row 26315e, and the domains "V.com," "W.com," "X.com," "Y.com," and "Z.com" are positioned in the Nth Order Domain row 26315n.

It should be understood that the matrix 26305 can include a plurality of columns (e.g., hundreds of columns, thousands of columns, millions of columns) and a plurality of rows (e.g., hundreds of rows, thousands of rows, millions of rows) and thus, a plurality of domains (e.g., hundreds of domains, thousands of domains, millions of domains) may be stored in the matrix 26305. In addition, the data storage 9235 of the memory 9210 may store a plurality of matrices (e.g. hundreds of matrices, thousands of matrices, millions of matrices) each of which having a different web browser 8125 in the 0th Order Domain and thus, each of which being associated with a different web browser 8125. Additionally, or alternatively, the data storage 9235 of the memory 9210 may store one or more matrices 26305 that are each associated with two or more different web browsers 8125. The matrix 26305 provides the at least one processor 9205 with a road map having alternative pathways through the domain orders for directing an electronic device 8110 to communicate items of anonymous personal identification information to domains in each of the domain orders. The electronic device 8110 may then receive and store data pieces from those domains on the electronic device 8110 when the electronic device 8110 is engaged in browser sessions on web browsers 8125. The data pieces stored on the electronic device 8110 may contain the transmitted items of personal identification information and an electronic device identification. The data pieces can subsequently be retrieved by the at least one processor 205 so that the at least one processor 9205 may store electronic device identifications and items of anonymous personal identification information from the retrieved data pieces in user profiles in one or more servers 8120.

In certain embodiments, the I/O interface 9215 may be configured to coordinate I/O traffic between the processor 9205, the memory 9210, and any peripheral devices in the computing system 8115, including the network interface 9220 or other peripheral interfaces, such as the input/output devices 9225. In some embodiments, the I/O interface 9215 may perform any necessary protocol, timing or other data transformations to convert data signals from one component (e.g., the memory 9210) into a format suitable for use by another component (e.g., the processor 9205). In some embodiments, the I/O interface 9215 may include support for devices attached through various types of peripheral buses, such as a variant of the Peripheral Component Interconnect (PCI) bus standard or the Universal Serial Bus (USB) standard, for example. In some embodiments, the function of the I/O interface 9215 may be split into two or more separate components, such as a north bridge and a south bridge, for example. Also, in some embodiments some or all of the functionality of the I/O interface 9215, such as an interface to the memory 9210, may be incorporated directly into the processor 9205.

The network interface 9220 may be configured to allow data to be exchanged between the computing system 8115 and other devices attached to the network 8105 (e.g., one or more electronic devices 8110, one or more servers 8120, one or more web browsers 8125) or between nodes of the computing system 8115. The network 8105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 9220 may support communication via wired or wireless general data networks, such as any suitable type of Ethernet network, for example; via telecommunications/telephony networks such as analog vice networks or digital fiber communications networks; via storage area networks such as Fiber Channel SANs, or via any other suitable type of network or protocol.

The input/output devices 9225 may, in some embodiments, include one or more display terminals, keyboards, keypads, touchpads, scanning devices, voice, or optical recognition devices, or any other devices suitable for entering or accessing data by one or more the computing system 8115. Further, various other sensors may be included in the I/O devices 9225, such as imaging sensors, barometers, altimeters, UDAR, or any suitable environmental sensor. Multiple input/output devices 225 may be present in the computing system 8115 or may be distributed on various nodes of the computing system 8115. In some embodiments, similar input/output devices may be separate from the computing system 8115 and may interact with one or more nodes of the computing system 8115 through a wired or wireless connection, such as over the network interface 9220.

Figure 49:
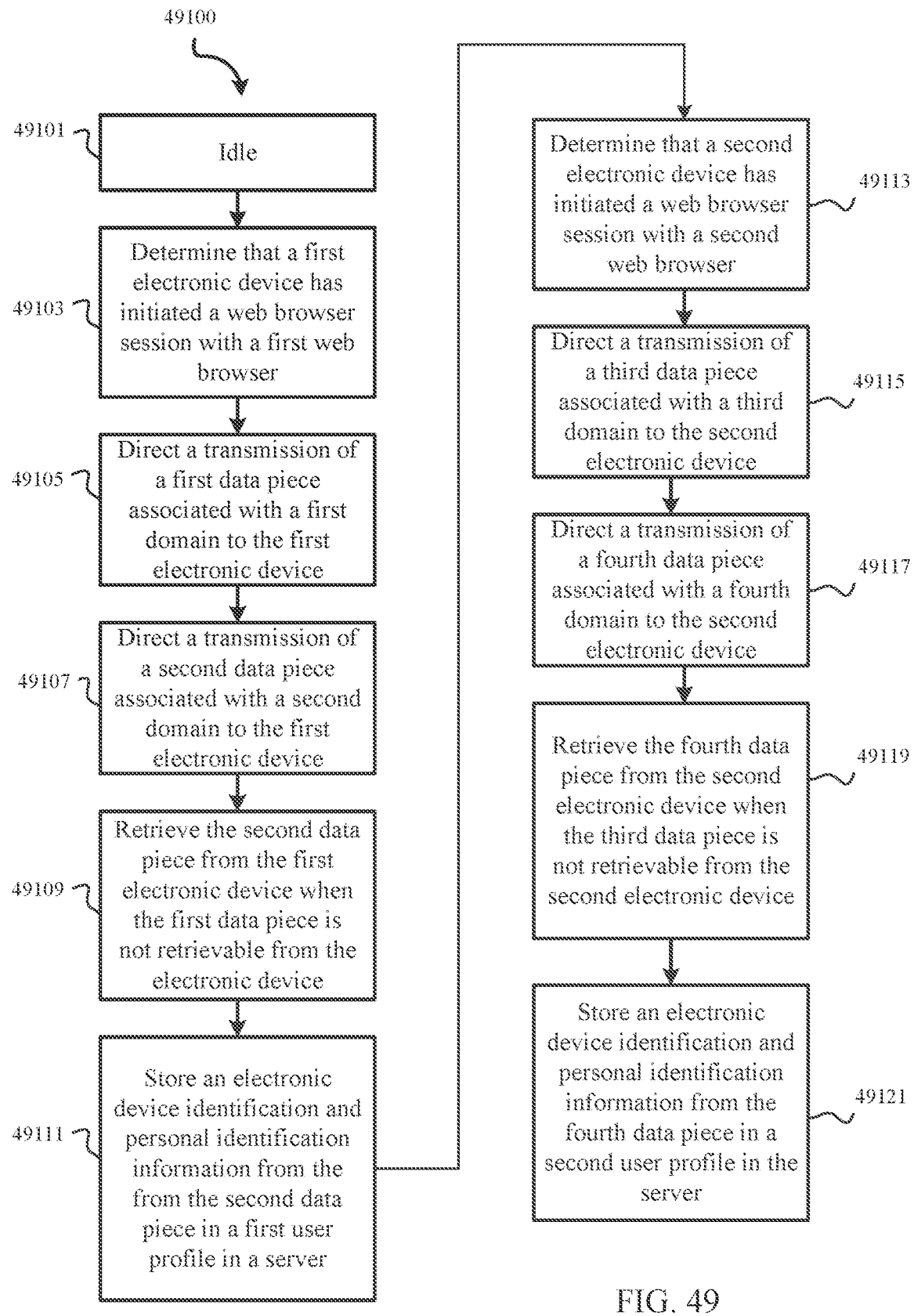

As shown in FIG. 29, the memory 9210 may include program instructions 9230, which may be processor-executable to implement any element, action, or operation including network interruption remedy operations, as described herein. In certain embodiment, the program instructions may implement at least a portion of methods described herein, such as the methods illustrated by FIGS. 4-1043-49. In other embodiments, different elements and data may be included. Note that the data storage 9235 may include any data or information, as described herein.

Those skilled in the art will appreciate that the computing system 8115 is merely illustrative and is not intended to limit the scope of embodiments. In particular, the computing system and devices may include any combination of hardware or software that can perform the indicated functions, including computers, network devices, Internet appliances, PDAs, wireless phones, pagers, GPUs, specialized computer systems, information handling apparatuses, or the like. The computing system 8115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 8115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 8115 may be transmitted to the computing system 8115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

As described herein, the computing system 8115, utilizing the at least one processor 9205, is configured to perform one or more networking interruption remedy operations. In certain embodiments, the computing system 8115, utilizing one or more processors 9205 determines that an electronic device 8110 has initiated an engagement in a web browser session with the web browser 8125 or that an electronic device 8110 has requested content from the web browser 8125. For example, the electronic device 8110 may be used to initiate a web browser session with a web browser 8125 and display content from the web browser 8125 on a display screen. The computing system 8115 utilizing the one or more processors 8125 may be configured to detect or determine that the electronic device 8110 has initiated an engagement into a web browser session with a web browser 8125, that the electronic device 8110 is engaged in a web browser session with a web browser 8125, or that an electronic device 8110 has requested content from the web browser 8125 while the electronic device 8110 is engaged in a web browser session with the web browser 8125. Upon engaging in the web browser session with the 'web browser 8125, the electronic device 8110 receives a data piece associated with the web browser 8125 and stores the data piece in a memory of electronic device 8110. The data piece received from the web browser 8125 and stored in the memory of electronic device 8110 includes an electronic device identification that is unique to the electronic device 8110. An electronic device identification may include at least one of a MAC addresses, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email addresses, a postal address, a user ID, a gender, an age group, a user interest, or the like. In certain embodiments, each of the one or more items of anonymous personal identification information may include a hash value.

Subsequently, the computing system 8115 accesses one or more matrices 26305 stored in the data storage 9235 of the memory 9210. The one or more matrices 26305 may be associated with one or more types of data piece blocking software that may be stored on the electronic device 8110. Additionally, or alternatively, the one or more matrices 26305 may be associated with the web browser 8125 that the electronic device 8110 is engaged with. Turning to FIG. 326B, the computing system 8115 identifies a plurality of domains 26310 from the matrix 26305 that are associated with the web browser 8125 and determines which of those domains can transmit data pieces to the electronic device 8110 that are retrievable by the computing system 8115 during or after the web browser session between the electronic device 8110 and the web browser 8125.

In certain embodiments, the one or more electronic devices 8110 may store and execute data piece blocking software (e.g., anti-identification software, pop-up blocker software, advertisement (ad) blocker software). The data piece locking software may flag or block specific strings of HTML code contained in certain data pieces or may flag or block data pieces have associated with entire domains. The data piece blocking software may flag or block a data piece due to a specific string of HTML code contained in the data piece. Additionally, or alternatively, the data piece blocking software may block access to all data pieces from particular domains which are residing in the electronic device memory. In certain embodiments, the data piece blocking software may not flag or block particular data pieces due to a lack of a specific string of HTML code contained in the particular data pieces that would cause the data piece blocking software to block the particular data pieces. Additionally, or alternatively, the data piece blocking software may not block access to data pieces from particular domains which are residing in the electronic device memory.

When the computing system 8115 accesses the one or more matrices 305 stored in the data storage 9235 of the memory 9210, the computing system 8115 or the web browser 8125 generates a data piece to be transmitted by the web browser 8125. The data piece is configured for storage in the memory of the electronic device 8110 and includes electronic device information and one or more items of anonymous personal identification information transmitted by the electronic device 8110 to the web browser 8125. Subsequently, the computing system 8115 may retrieve or receive the electronic device information and the one or more items of anonymous personal identification information contained in the data piece stored in the memory of the electronic device 8110.

In addition, the data piece may contain a first instruction to the electronic device 8110. The first instruction may identify one or more domains in the 1st Order Domain 26315*b* and instruct the electronic device 8110 to initiate communication with those one or more domains. For example, after receiving the first instruction, the electronic device 8110 may initiate communication with or transmit one or more items of anonymous personal identification information to a first domain of the one or more domains in the 1st Order Domain 26315*b* indicated in the first instruction. After initiating communication with or transmitting the one or more items of anonymous personal identification information to the first domain of the one or more domains from the 1st Order Domain 26315*b*, the data piece blocking software executed by the electronic device 8110 may block the reception of a data piece from the first domain of the one or more domains in the 1st Order Domain 26315*b* identified in the first instruction.

While the electronic device 8110 initiates communication with or transmits one or more items of anonymous to the first domain of the 1st Order Domain 26315*b* or during or after (e.g., in response to) the data piece blocking software on the electronic device 8110 blocks the data piece from the first domain of the 1st Order Domain 26315*b*, the first instruction may instruct the electronic device 8110 to initiate communication with or transmit one or more items of anonymous personal identification information to a second domain of the one or more domains in the 1st Order Domain 26315*b* indicated in the first instruction. After initiating communication with or transmitting the one or more items of anonymous personal identification information to the second domain of the one or more domains from the 1st Order Domain 26315*b*, a data piece (e.g., generated by the computing system 8115, generated by the second domain) may be transmitted to the electronic device 8110 from the second domain and stored in a memory of the electronic device 8110. Subsequently, the computing system 8115 may attempt to retrieve (e.g., through the second domain) an electronic device identification and one or more item of anonymous personal identification information contained in the data piece from the second domain. During or after the computing system 8115 attempts to retrieve the electronic device identification and the one or more item of anonymous personal identification information stored in the data piece from the second domain, the data piece blocking software may block the retrieval of the electronic device identification and the one or more item of anonymous personal identification information stored in the data piece from the second domain.

In certain embodiments, after the computing system 8115 successfully receives the electronic device identification and the one or more item of anonymous personal identification information stored in the data piece from a domain from the 1st Order Domain 26315*b*, the first instruction may instruct the electronic device 8110 to not transmit one or more item of anonymous personal identification information to another domain of the 1st Order Domain 26315*b*. In this case, a second instruction included in a data piece that was successfully received by computing system 8115 from the electronic device 8110 may instruct the electronic device to initiate communication with or transmit one or more item of anonymous personal identification information to one or more domains in a 2nd Order Domain 26315*c* indicated in the second instruction, described herein.

Alternatively, the first instruction may instruct the electronic device 8110 to initiate communication with or transmit one or more item of anonymous personal identification information to all of the domain of the 1st Order Domain 26315*b* indicated by the first instruction before initiating instructions contained in a data piece from a domain of the 1st Order Domain 26315*b*. For example, while the electronic device 8110 communicates with or transmits one or more item of anonymous personal identification information to the third domain of the 1st Order Domain 26315*b* or during or after (e.g., in response to) the computing system 8115 receives a data piece from the third domain of the 1st Order Domain 26315*b*, the first instruction may instruct the electronic device 8110 to initiate communication with or transmit one or more items of anonymous personal identification information to a fourth domain of the one or more domains in the 1st Order Domain 26315*b* indicated in the first instruction. After initiating communication with or transmitting the one or more items of anonymous personal identification information to the fourth domain of the one or more domains from the 1st Order Domain 26315*b*, a data piece (e.g., generated by the computing system 8115. generated by the fourth domain) may be transmitted to the electronic device 8110 from the fourth domain and stored in a memory of the electronic device 8110. Subsequently, the computing system 8115 may successfully retrieve (e.g., through the fourth domain) an electronic device identification and one or more item of anonymous personal identification information stored in the data piece from the fourth domain.

The first instruction may cause the electronic device 8110 to initiate communication with or transmit one or more items of anonymous personal identification information to each domain of the one or more domains from the 1st Order Domain 26315*b* identified in the first instruction. Thus, the computing system 8115 may be able to retrieve, from an electronic device 8110, electronic device information and one or more items of anonymous personal identification information stored in data pieces from one or more domains of the 1st Order domain 26315*b* that are not blocked from storing data pieces in the memory of the electronic device 8110 by data piece blocking software. Additionally, or alternatively, the computing system 8115 may be able to retrieve, from an electronic device 8110, electronic device information and one or more items of anonymous personal identification information stored in data pieces from one or more domains of the 1st Order domain 26315*b* that are not blocked by data piece blocking software from being access from the memory of the electronic device 8110. In certain embodiments, upon receiving electronic device information and one or more items of anonymous personal identification information from at least one domain of the one or more domains from the 1st Order Domain 26315*b* identified by the first instruction, the computing system 8115 may determine which domains provided data pieces that are blocked and that are not blocked by data piece blocking software on the electronic device 8110. The computing system 8115 may designate a matrix for the data piece blocking software or the electronic device 8115 and indicate (e.g., record a notation in the matrix) which domains are blocked and not blocked by the electronic device 8110 or the data piece blocking software executed on the electronic device 8110.

In certain embodiments, a data piece transmitted to an electronic device 8110 through a domain of the one or more domains in the 1st Order Domain 26315*b* and stored in a memory of the electronic device 8110 may contain a second instruction. The second instruction may identify one or more domains in the 2nd Order Domain 26315*c* and instruct the electronic device 8110 to initiate communication with those one or more domains. For example, a data piece from a domain of the 1st Order Domain 26315*b* may not have been blocked by data piece blocking software and thus may be stored in a memory of an electric device 8110. In certain embodiments, access to the data piece, after the data piece is stored in the memory of the electronic device 8110, may not be blocked by data piece blocking software and thus may be accessible by a processor of the electronic device 8110 or the computing system 8115. The data piece from the domain of the 1st Order Domain 26315*b* may contain a second instruction.

After receiving the second instruction, the electronic device 8110 may process the second instruction and initiate communication with or transmit one or more items of anonymous personal identification information to a first domain of one or more domains in the 2nd Order Domain 26315*c* indicated in the second instruction. After initiating communication with or transmitting the one or more items of anonymous personal identification information to the first domain of the one or more domains from the 2nd Order Domain 26315*c*, the data piece blocking software executed by the electronic device 8110 may block the reception of a data piece from the first domain of the 2nd Order Domain 26315*c* identified in the second instruction.

While the electronic device 8110 communicates with or transmits one or more items of anonymous to the first domain of the 2nd Order Domain 26315*c* or during or after (e.g., in response to) the data piece blocking software on the electronic device 8110 blocks the data piece from the first domain of the 2nd Order Domain 26315*c*, the second instruction may instruct the electronic device 8110 to initiate communication with or transmit one or more items of anonymous personal identification information to a second domain of the one or more domains in the 2nd Order Domain 26315*c* indicated in the second instruction. After initiating communication with or transmitting the one or more items of anonymous personal identification information to the second domain of the one or more domains from the 2nd Order Domain 26315*c*, a data piece (e.g., generated by the computing system 8115, generated by the second domain) may be transmitted to the electronic device 8110 from the second domain and stored in a memory of the electronic device 8110. Subsequently, the computing system 8115 may attempt to retrieve (e.g., through the second domain) electronic device identification and one or more item of anonymous personal identification information contained in the data piece from the second domain. During or after the computing system 8115 attempts to retrieve the electronic device identification and the one or more item of anonymous personal identification information stored in the data piece from the second domain, the data piece blocking software may block the retrieval of the electronic device identification and the one or more item of anonymous personal identification information stored in the data piece from the second domain.

While the electronic device 8110 communicates with or transmits one or more items of anonymous to the second domain of the 2nd Order Domain 26315*c* or during or after (e.g., in response to) the data piece blocking software on the electronic device 8110 blocks access to the data piece from the second domain of the 2nd Order Domain 26315*c*, the second instruction may instruct the electronic device 8110 to initiate communication with or transmit one or more items of anonymous personal identification information to a third domain of the one or more domains in the 2nd Order Domain 26315*b* indicated in the second instruction. After initiating communication with or transmitting the one or more items of anonymous personal identification information to the third domain of the one or more domains from the 2nd Order Domain 26315*c*, a data piece (e.g., generated by the computing system 8115, generated by the third domain) may be transmitted to the electronic device 8110 from the third domain and stored in a memory of the electronic device 8110. Subsequently. the computing system 8115 may successfully retrieve (e.g., through the third domain) electronic device identification and one or more item of anonymous personal identification information stored in the data piece from the third domain.

In certain embodiments, after the computing system 8115 successfully receives the electronic device identification and the one or more item of anonymous personal identification information stored in the data piece from a domain from the 2nd Order Domain 26315*c*, the second instruction may instruct the electronic device 8110 to not initiate communication with or not transmit one or more item of anonymous personal identification information to another domain of the 2nd Order Domain 26315*c*. In this case, a third instruction included in a data piece that was successfully received by computing system 8115 may instruct the electronic device to initiate communication with or transmit one or more item of anonymous personal identification information to one or more domains in a 3rd Order Domain 26315*d* indicated m the third instruction.

Alternatively, the second instruction may instruct the electronic device 8110 to initiate communication with or transmit one or more item of anonymous personal identification information to all of the domain of the 2nd Order Domain 26315*c* indicated by the second instruction before initiating the instructions contained in a data piece from a domain of the 2nd Order Domain 26315*c*. For example, while the electronic device 8110 communicates with or transmits one or more items of anonymous personal identification information to the third domain of the 2nd Order Domain 26315*c* or during or after (e.g., in response to) the computing system 8115 receives the data piece from the third domain of the 2nd Order Domain 26315*c*, the second instruction may instruct the electronic device 8110 to initiate communication with or transmit one or more items of anonymous personal identification information to a fourth domain of the one or more domains in the 2nd Order Domain 26315*c* indicated in the second instruction. After initiating communication with or transmitting the one or more items of anonymous personal identification information to the fourth domain of the one or more domains from the 2nd Order Domain 26315*c*, a data piece (e.g., generated by the computing system 8115, generated by the fourth domain) may be transmitted to the electronic device 8110 from the fourth domain and stored in a memory of the electronic device 8110. Subsequently, the computing system 8115 may successfully retrieve (e.g., through the fourth domain) the electronic device identification and the one or more item of anonymous personal identification information stored in the data piece from the fourth domain.

As described herein, the second instruction may cause the electronic device 8110 to initiate communication with or transmit one or more items of anonymous personal identification information to each domain of the one or more domains from the 2nd Order Domain 26315*c* identified in the second instruction. Thus, the computing system 8115 may be able to retrieve, from an electronic device 8110, electronic device information and one or more items of anonymous personal identification information stored in data pieces from one or more domains of the 2nd Order domain 26315*c* that are not blocked from storing data pieces in the memory of the electronic device 8110 by data piece blocking software. Additionally, or alternatively, the computing system 8115 may be able to retrieve, from an electronic device 8110, electronic device information and one or more items of anonymous personal identification information stored in data pieces from one or more domains of the 2nd Order domain 26315*c* that are not blocked by data piece blocking software from being access from the memory of the electronic device 8110.

In certain embodiments, upon receiving electronic device information and one or more items of anonymous personal identification information from at least one domain of the one or more domains from the 2nd Order Domain 26315*c* identified by the first instruction, the computing system 8115 may determine which domains provided data pieces that are blocked and that are not blocked by data piece blocking software on the electronic device 8110. The computing system 8115 may use the designated matrix for the data piece blocking software or the electronic device 8115 and indicate (e.g., record a notation in the matrix) which domains are blocked and not blocked by the electronic device 8110 or the data piece blocking software executed on the electronic device 8110. The electronic device 8110 may receive data pieces from a plurality of domains in a plurality of Order Domains from the 3rd Order Domain 26315*d*, to the 4th Order Domain 26315*e*. to the Nth Order Domain 26315*n*.

In certain embodiments, after the data pieces are transmitted to the electronic device 8110 and stored in the memory of electronic device 8110, the computing system 8115 attempts to retrieve each of the data pieces stored in the memory of electronic device 8110 (e.g., through each of the domains). In certain embodiments, the computing system 8115 attempts to retrieve each of the data pieces stored in the memory electronic device 8110 regardless of whether the electronic device 8110 has transmitted one or more items of anonymous personal identification information to the web browser 8125. For example, after the computing system 8115 has transmitted each of the data pieces through the domains to the electronic device 8110 for storage in the memory of electronic device 8110, the computing system 8115 initiates a retrieval test to determine which, if any, data pieces the computing system 8110 is able to retrieve. The retrieval test may allow the computing system 8115 to determine which data pieces are not retrievable from the memory of electronic device 8110 due to data piece blocking software and what data pieces are retrievable from the memory of the device 8110. The retrieval test may be performed by attempting to retrieve the electronic device identification contained in each of the data pieces. Thus, the computing system 8115 may determine which data pieces can be retrieved from the memory of electronic device 8110 and which data pieces cannot be retrieved from the memory of the electronic device 8110 regardless of whether the electronic device 8110 has transmitted items of anonymous personal identification information to the web browser 8125. Subsequently, the computing system 8115 may seek to retrieve from the memory of electronic device 8110 only those data pieces determined to be retrievable by the retrieval test for storage of electronic device identifications and items of anonymous personal identification information for storage in the server 8120.

In certain embodiments, the computing system 8115 attempts to retrieve each of the data pieces stored in the memory of electronic device 8110 after the electronic device 8110 has transmitted one or more items of anonymous personal identification information to the web browser 8125 (e.g., through each of the domains). For example, after the computing system 8115 has transmitted each of the data pieces to the electronic device 8110 for storage in the memory of electronic device 8110 and after the electronic device 8110 has transmitted one or more items of anonymous personal identification information to the web browser 8125 during the web browser session, the computing system 8115 initiates data piece retrieval to retrieve the data pieces associated with the each of the domains from the matrix 26305 and stored in the memory of electronic device 8110. In response to initiating the data piece retrieval, the computing system 8115 retrieves only some of the data pieces previously stored in the memory of electronic device 8110. Based on determining which data pieces have been retrieved and which data pieces have not been retrieved, the computing system 8115 determines which, if any, data pieces the computing system 8110 is able to retrieve. Subsequently, the computing system 8115 may seek to retrieve from the memory of electronic device 8110 only those data pieces determined to be retrievable and containing subsequently transmitted electronic device identifications and items of anonymous personal information for storage in the server 8120.

After (e.g., in response to) determining which data pieces can be retrieved from the memory of the electronic device 8110 and which data pieces cannot be retrieved from the memory of the electronic device 8110, the computing system 8115 marks each of the domains in the matrix 26305 that are associated with data pieces that cannot be retrieved and links each of the domains in the matrix 26305 into one or more chains of data pieces that can provide retrievable data pieces from the memory of electronic device 8110 by the computing system 8115. For example, as shown in FIG. 326B, the computing system 8115 marks "B.com" and "D.com" from the 1st Order Domain 26315*b*, "K.com" from the 3rd Order Domain 26315*d*, "P.com" and "R.com" from the 4th Order Domain, and "Y.com" from the Nth Order Domain as domains that are associated with data pieces that are not retrievable by the computing system 8115. The computing system 8115 also forms a first chain 26320*a* of domains ("A.com," "F.com," "L.com," "Q.com," and "V.com"), a second chain 26320*b* of domains ("C.com," "H.com," "M.com," "S.com," and "X.com"), and third chain 26320*c* of domains ("E.com," "J.com," "O.com," "T.com," and "Z.com") that are retrievable by the computing system 8115 from the memory of electronic device 8110. Each of the chains includes a domain from each of the ordered domains 26315*a* through 26315*n*. Thus, using the matrix 26305 stored in the data storage 9235, the computing system 8115 is able to determine which data pieces are retrievable to provide electronic device identification and one or more items of anonymous personal identification information provided by the electronic device 8110 during a current web browser session and subsequent web browser sessions with the web browser 8125.

In certain embodiments, domains that are linked to the web browser 8125 and thus the computing system 8115 may be domains that transmit data pieces containing instructions that direct an electronic device 110 to initiate communication with or transmit one or more items of anonymous personal identification information to a domain in an order domain. In certain embodiments, domains that are linked to the web browser 8125 and thus the computing system 8115 may be domains that provide data pieces that are retrievable by the computing system 8115 when those data pieces are stored in a memory of the electronic device 8110. In certain embodiments, domains and a web browser 8125 that are linked to the computing system 8115 may be domains and a web browser that each transmits data pieces generated by the computing system 8115 including instructions as described herein.

In certain embodiments, the computing system 8115, utilizing one or more processors 9205 retrieves the data pieces determined to be retrievable by the computing system 8115 from the memory of the electronic device 8110. The data pieces retrieved by the computing system 8115 include an electronic device identification and one or more items of anonymous personal identification information provided by the electronic device 8110 during the web browser session with the web browser 8115. In some embodiments, the electronic device 8110 will not be storing data piece blocking software and thus all data pieces stored on the memory of the electronic device 8110 by the computing system 8115 are retrievable and thus retrieved by the computing system 8115. In some embodiments, some data pieces generated by the computing system 8115 and stored in the memory of electronic device 8110 may not be retrievable by the computing system 8115 from the memory of electronic device 8110 due to data piece blocking software stored and executed on electronic device 8110. In some embodiments, all data pieces generated by the computing system 8115 and stored in the memory of the electronic device 8110 may not be retrieval by the computing system 8115 from the memory of electronic device 8110 due to data piece blocking software stored in the memory of the electronic device 8110.

In certain embodiments, the computing system 8115, utilizing the at least one processor 205, stores the electronic device identification and the one or more items of anonymous personal identification information from the retrieved data pieces in user profiles of the one or more servers 8120. In certain embodiments, the computing system 8115 stores the electronic device identification and the one or more items of anonymous personal identification information from the retrieved data pieces in one or more user profile previously created and stored on the one or more servers 8120. For example, the computing system 8115 may have previously generated one or more user profiles each containing at least one of an electronic device identification or one or more items of anonymous personal identification information provided in a previously obtained data piece. When the computing system 8115 receives the retrieved data pieces each containing an electronic device identification and one or more items of anonymous personal identification information, the computing system 8115 may match at least one of the electronic device identification or at least one of the one or more items of anonymous personal identification information from a retrieved data piece with at least one of the electronic device identification or at least one of the one or more items of anonymous personal identification information stored in a user profile. When the computing system 8115 identifies a match, the computing system 8115 may store the electronic device identification and the one or more items anonymous personal identification information from the retrieved data piece in the user profile in the servers 8120.

In certain embodiments, the computing system 8115, utilizing the at least one processor 9205, stores electronic device identification and the one or more items of anonymous personal identity information from the received data pieces in newly created user profiles stored in the one or more servers 8120. For example, the computing system 8115 may search through the server 8120 to identify (e.g., find, locate) user profiles containing at least one of electronic device identification or one of one or more items of anonymous personal identification information that matches at least one of the electronic device identifications or one of the one or more items of anonymous personal identification information contained in a retrieved data piece. After searching through the server 8120. the computing system 8115 may determine that no match exists between at least one of the electronic device identifications or one of the one or more items of anonymous personal identification information contained in the retrieved data piece and at least one of electronic device identification or one of one or more items of anonymous personal identification information contained in a user profile of the one or more servers 8120. In response. the computing system 8115 may create a new user profile in the server 8120 and store the electronic device identification and the one or more items of anonymous personal identification information from the retrieved data piece in the newly created user profile.

In certain embodiments, the computing system 8115, utilizing the at least one processor 9205, stores an additional data piece in the user profile in the server 8120 after the computing system 8110 has stored retrieved data piece in the same user profile. For example, in response to matching at least one item of the one or more items of anonymous personal identification information from the retrieved data piece with one or more items of anonymous personal identification information from an additional data piece, the computing system 8115 may store the additional data piece in the user profile in the server 8120. The additional data piece may have obtained from one or more other servers (e.g., not the one or more servers 8120) or from another data piece retrieved from another electronic device 8110.

In certain embodiments, the data pieces generated by the computing system 8115 and retrieved from the electronic device 8110 may include a cookie. A cookie (e.g., an HTTP cookie, a web cookie, an Internet cookie, a browser cookie) is a piece of data sent from a website and stored on a memory of an electronic device 8110 by a web browser of the electronic device 8110 while the electronic device is engaged in a browser session. In certain embodiments, the computing system 8115, utilizing the at least one processor 9205, maps or associates electronic device identification from a cookie to an open-source software footprint. An open-source software footprint may be a unique set of traceable digital activities, actions, contributions, or communications that are manifested in open-source code on the internet or on electronic devices. The electronic device 8110 may transmit one or more items of anonymous personal identification information to the web browser 8125 during a browser session. The one or more items of anonymous personal identification information transmitted from the electronic device 8110 includes an open-source software footprint that is unique to the electronic device 8110 or that provides the computing system 8115 with an acceptable level of certainty that the specific electronic device 8110 is transmitting the one or more items of anonymous personal identification information.

When the electronic device 8110 transmits the one or more items of anonymous personal identification information to the web browser 8125, the one or more items of anonymous personal identification information may also be stored in each of the cookies stored in the memory of the electronic device 8110 and associated with domains from the matrix 26305. While the transmitted one or more items of anonymous personal identification information may not include the electronic device identification, each of the cookies associated with the domains from the matrix 26305 includes the electronic device identification. In addition, the one or more items of anonymous personal identification information stored in each of the cookies associated with the domains in the matrix may also include the open-source software footprint. Thus, when the computing system 8115 retrieves a cookie associated with a domain in the matrix from the memory of the electronic device 8110, the computing system 8115 maps or associates the open-source software footprint from the retrieved cookie to the electronic device identification from the retrieved cookie. Accordingly, the computing system 8115 maps or associates the open-source software footprint with the specific electronic device 8110.

In certain embodiments, the computing system 8115, utilizing the at least one processor 9205, retrieves an item of personal identification information that is attached to the open-source software footprint. For example, after the computing system 8115 has mapped or associated the open-source software footprint from the retrieved cookie to the electronic device identification from the retrieved cookie and the computing system 8115 has stored the electronic device identification and the one or more items of anonymous personal identification information from the retrieved cookie in the user profile in the server 8120, the electronic device 8110 may engage in a subsequent web browser session with a web browser 8125 (e.g., the same web browser, another web browser). During the subsequent web browser session, the electronic device 8110 may transmit one or more items of anonymous personal identification information to the web browser 8125. The one or more items of anonymous personal notification information transmitted to the web browser 8125 during the subsequent web browser session may be different items of anonymous personal identification information from the one or more items of anonymous personal identification information transmitted the web browser during the initial web browser session.

The one or more items of anonymous personal identification information transmitted from the electronic device 8110 during the subsequent web browser session may include the open-source software footprint. The computing system 8115 may intercept, receive, or retrieve the transmitted one or more items of anonymous personal identification information transmitted from the electronic device 8110 during the subsequent web browser session and identify that the one or more items of anonymous personal identification information includes the open-source software footprint. The computing system 8115 may then map or associate the one or more items of anonymous personal identification information transmitted by the electronic device 8110 during the subsequent web browser session with the previously provided electronic device identification from the retrieved cookie based on the open-source software footprint. Based on mapping the electronic device identification with the open-source software footprint during the initial web browser session. the computing system 8115 may identify that the electronic device 8110 is the source of the one or more items of anonymous personal identification information transmitted during the subsequent web browser session without relying on a cookie.

In certain embodiments, the computing system 8115, utilizing the at least one processor 9205, stores the one or more items of anonymous personal identification information in the user profile in the server 8120 based on the attached open—source software footprint In certain embodiments, the computing system 8115 stores the one or more items of anonymous personal identification information transmitted during the subsequent browser session in the user profile in the server 8120 based on the attached open-source software footprint. For example, the computing system 8115 may have determined that the one or more items of anonymous personal identification information transmitted during the subsequent web browser session is associated with the electronic device 8110 that stored the retrieved cookie from the initial web browser session. The computing system 8115 may store the one or more items of anonymous personal identification information in the same user profile that contains the electronic device identification and the one or more items of anonymous personal identification information contained in the retrieved cookie from the initial web browser session based on mapping or associating the open-source software footprint attached to the one or more items of anonymous personal identification information obtained during the subsequent web browser session with the electronic device identification stored in the user profile in the server 8120. Accordingly. the computing system 8115 may store items of anonymous personal identification information in user profiles associated with specific electronic devices 8110 without relying on the ability of the computing system to retrieve cookies stored in the memories of the electronic devices 8110.

It should be understood that the computing system 8115, utilizing the at least one processor 9205, is configured to contemporaneously and continuously direct the transmission of data pieces to millions of electronic devices 8110 located and mobile around the world and engaged in web browser sessions on millions of different web browsers. The computing system 8115, utilizing the at least one processor 9205, is also configured to contemporaneously and continuously receive or retrieve data pieces from the millions of electronic devices located and mobile around the world and engaged in web browser sessions on millions of different web browsers. The computing system 8115, utilizing the at least one processor 9205, is further configured to contemporaneously and continuously store the retrieved data pieces from the millions of electronic devices located and mobile around the world and engaged in web browser sessions on millions of different web browsers in select user profiles stored in a plurality of servers 8120. In addition, the computing system, utilizing the at least one processor 9205, is configured to contemporaneously and continuously match electronic device identifications and items of anonymous personal identification information provided in each of the millions of data pieces with electronic device identifications and items of anonymous personal identification information in the millions of user profiles stored in the plurality of servers 8120 to select the appropriate user profile(s) for storing electronic device identifications and items of anonymous personal identification information provided in each of the millions of data pieces and cookies. Thus, the computing system 8115, utilizing the at least one processor 9205, gathers electronic device identification and items of anonymous personal identification information continuously and contemporaneously in real time to provide and store the most up-to-date information and accordingly cannot be performed by human interaction.

FIG. 43 illustrates a method 43400 implemented by the computing system 8115 utilizing the at least one processor 9205, for performing network interruption remedy operations according to certain embodiments of this disclosure. Although certain details will be provided with reference to the method 43400 of FIG. 43, it should be understood that other embodiments may include more, less, or different method steps. At step 43401, the computing system 8115 is in an idle state at least with respect to performing network interruption remedy operations. At step 43403, the computing system 8115 determines that an electronic device 8110 has initiated an engagement in a web browser session with the web browser 8125 (e.g., an initial web browser) or that an electronic device 8110 has requested content from the web browser 8125.

At step 43405, the computing system 8115 directs a transmission of a first data piece associated with a first domain to the electronic device 8110. In certain embodiments, the computing system 8115 directs a transmission of the first data piece to the electronic device 8110, when the electronic device 8110 is engaged in an initial web browser session on the web browser 8125, for storage in an electronic device memory. The first data piece may be associated with a first domain that is linked to the web browser 8125 (e.g., the web browser domain). The first data piece may also contain an electronic device identification. The electronic device identification may be a unique identification that identifies a specific electronic device among all electronic devices. For example, the electronic device identification may be an identification that is unique to the electronic device 8110. In certain embodiments, the electronic device identification includes at least one of a MAC addresses, an IMEI number, an electronic device serial number, a pointer associated with a data port of the electronic device, a combination thereof, or the like.

At step 43407, the computing system 8115 directs a transmission of a second data piece associated with a second domain to the electronic device 8110. In certain embodiments, the computing system 8115 directs a transmission of a second data piece to the electronic device 8110, when the electronic device 8110 is engaged in the initial web browser session on the web browser 8125, for storage in the electronic device memory. The second data piece may be associated with a second domain that is linked to the web browser 8125 (e.g., the web browser domain). The second data piece may also contain an electronic device identification. The electronic device identification contained in the second data piece may be a same electronic device identification as the electronic device identification contained in the first data piece.

At step 43409, the computing system 8115 retrieves the second data piece from the electronic device 8110 when the first data piece is not retrievable from the electronic device 8110. In certain embodiments, the computing system 8115 retrieves the second data piece from the electronic device memory when the computing system 8115 is not able to retrieve the first data piece from the electronic device memory. The electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory. In certain embodiments, the data piece blocking software may not have flagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory.

The data piece blocking software stored and executed on the electronic device 110 may have prevented the computing system 8115 from retrieving the first data piece from the memory of the electronic device 8110. For example, the data piece blocking software may have blocked data pieces from being stored on a memory of electronic device 8110 when the electronic device 8110 is engaged in a web browser session on a web browser. Additionally. or alternatively, the data piece blocking software may have nagged data pieces that are stored in the memory of the electronic device 8110 to prevent access to those nagged data pieces stored in the memory of the electronic device 8110 when or after the electronic device 8110 is engaged in the web browser session on the web browser.

In certain embodiments, the second data piece retrieved from the electronic device 8110 contains the electronic device identification and one or more items of anonymous personal identification information provided by the electronic device 8110 during the web browser session. For example, when the electronic device 8110 initiates the web browser session with the web browser 8125, the computing system 8115 may direct the web browser 8125 to transmit a data piece to the memory of electronic device 8110. Similarly, the computing system 8115 my direct a first domain to transmit the first data piece associated with the first domain and a second domain to transmit the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece, and the second data piece are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the data piece from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of electronic device 8110. Thus, when the computing system 8115 retrieves the second data piece from the memory of the electronic device 8110, the second data piece includes the electronic device identification and the one or more items of anonymous personal identification information provided by the electronic device 8110 during the web browser session.

At step 43411, the computing system 8115 stores the electronic device identification and the one or more items of anonymous personal identification information from the second data piece in a user profile of a server 8120. In certain embodiments, the computing system 8115 stores the electronic device identification and the one or more items of anonymous personal identification information from the second data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the second data piece in the user profile in the server 8120.

In certain embodiments, the computing system 8115 stores electronic device identification and the one or more items of anonymous personal identity information from the second data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the second data piece. After searching through the server 8120. the computing system 8115 may determine that no match exists between at least one of the electronic device identifications or one of the one or more items of anonymous personal identification information contained in the second data piece and at least one of electronic device identification or one of one or more items of anonymous personal identification information contained in a user profile of the server 8120. In response, the computing system 8115 may create a naive user profile in the server 8120 and store the electronic device identification and the one or more items of anonymous personal identification information from the second data piece in the newly created user profile.

FIG. 544 illustrates a method 44500 implemented by a computing system 8115 for performing network interruption remedy operations according to certain embodiments of this disclosure. Although certain details will be provided with reference to the method 44500 of FIG. 544, it should be understood that other embodiments may include more, less, or different method steps. At step 44501, the computing system 8115 is in an idle state at least with respect to performing network interruption remedy operations. Step 44501 is at least similar to step 43401 of method 43400 illustrated in FIG. 43. At step 44503, the computing system 8115 determines that an electronic device 8110 has initiated an engagement in a web browser session with a web browser 8125 (e.g., an initial web browser) or that an electronic device 8110 has requested content from the web browser 8125. Step 44503 is at least similar to step 43403 of method 43400 illustrated in FIG. 43. At step 44505, the computing system 8115 directs a transmission of a first data piece associated with a first domain to the electronic device 8110. Step 44505 is at least similar to step 43405 of method 43400 illustrated in FIG. 43. At step 44507, the computing system 8115 directs a transmission of a second data piece associated with a second domain to the electronic device 8110. Step 44507 is at least similar to step 43407 of method 43400 illustrated in FIG. 43.

At step 44509, the computing system 8115 retrieves the first data piece from the electronic device 8110 when the second data piece is not retrievable from the electronic device 8110. In certain embodiments, the computing system 8115 retrieves the first data piece from the electronic device 8110 memory when the computing system 8115 is not able to retrieve the second data piece from the electronic device memory. The electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the second data piece due to a specific string of HTML code contained in the second data piece. Additionally, or alternatively, the data piece blocking software may have blocked access to all data pieces from the second domain including the second data piece residing in the electronic device memory.

The data piece blocking software stored and executed on the electronic device 8110 may have prevented the computing system 8115 from retrieving the second data piece from the memory of the electronic device 8110. For example, the data piece blocking software may have blocked data pieces from being stored on a memory of electronic device 8110 when the electronic device 8110 is engaged in a web browser session on a web browser. Additional 111y, or alternatively, the data piece blocking software may have flagged data pieces that are stored in the memory of the electronic device 8110 to prevent access to those nagged data pieces stored in the memory of the electronic device 8110 when or after the electronic device 8110 is engaged in the web browser session on the web browser. In certain embodiments, the data piece blocking software may not have flagged or blocked the first data piece due to a lack of a specific string of HTML code contained in the first data piece that would cause the data piece blocking software to block the first data piece. Additionally, or alternatively, the data piece blocking software may not have blocked access to data pieces from the first domain including the first data piece residing in the electronic device memory.

In certain embodiments, the first data piece retrieved from the electronic device 8110 contains the electronic device identification and one or more items of anonymous personal identification information provided by the electronic device 8110 during the web browser session. For example, when the electronic device 8110 initiates the web browser session with the web browser 8125, the computing system 8115 may direct the web browser 8125 to transmit a data piece to the memory of electronic device 8110. Similarly, the computing system 8115 directs the transmission of the first data piece associated with the first domain and the transmission of the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece, and the second data piece are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the data piece from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of electronic device 8110. Thus., when the computing system 8115 retrieves the first data piece from the memory of electronic device 8110, the first data piece includes the electronic device identification and the one or more items of anonymous personal identification information provided by the electronic device 8110 during the web browser session.

At step 44511, the computing system 8115 stores the electronic device identification and the one or more items of anonymous personal identification information from the first data piece in a user profile of a server 8120. In certain embodiments, the computing system 8115 stores the electronic device identification and the one or more items of anonymous personal identification information from the first data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the first data piece containing the electronic device identification and the one or more items of anonymous personal identification information, the computing system 8115 may match at least one of the electronic device identification or at least one of the one or more items of anonymous personal identification information from the first data piece with at least one of the electronic device identification or at least one of the one or more items of anonymous personal identification information stored in the user profile. When the computing system 8115 identifies a match. the computing system 8115 may store the electronic device identification and the one or more items anonymous personal identification information from the first data piece in the user profile in the server 8120.

In certain embodiments, the computing system 8115 stores electronic device identification and the one or more items of anonymous personal identity information from the first data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the first data piece. After searching through the server 8120, the computing system 8115 may determine that no match exists between at least one of the electronic device's identification or one of the one or more items of anonymous personal identification information contained in the first data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the first data piece in the newly created user profile.

FIG. 645 illustrates a method 45600 implemented by a computing system 8115 for performing network interruption remedy operations according to certain embodiments of this disclosure. Although certain details will be provided with reference to the method 45600 of FIG. 645, it should be understood that other embodiments may include more, less, or different method steps. At step 45601 the computing system 8115 is in an idle state at least with respect to performing network interruption remedy operations. Step 45601 is at least similar to step 43401 of method 43400 illustrated in FIG. 43. At step 45603, the computing system 8115 determines that an electronic device 8110 has initiated an engagement in a web browser session with a web browser 8125 (e.g. an initial web browser) or that an electronic device 8110 has requested content from the web browser 8125. Step 45603 is at least similar to step 43403 of method 43400 illustrated in FIG. 43. At step 45605, the computing system 8115 directs a transmission of a first data piece associated with a first domain to the electronic device 8110. Step 45605 is at least similar to step 43405 of method 43400 illustrated in FIG. 43. At step 45607, the computing system 8115 directs a transmission of a second data piece associated with a second domain to the electronic device 8110. Step 45607 is at least similar to step 43407 of method 43400 illustrated in FIG. 43.

At step 45609, the computing system 8115 retrieves the first data piece and the second data piece from the electronic device 8110. In certain embodiments, the computing system 8115 retrieves the first data piece and the second data piece from the electronic device memory when the first data piece and the second data piece are retrievable from the electronic device 8110. The electronic device 8110 may store and execute data piece blocking software (e.g., anti-identification software, pop-up blocker software, advertisement (ad) blocker software). For example. the data piece blocking software may flag or block specific strings of HTML code contained in certain data pieces or may flag or block data pieces associated with entire domains. The data piece blocking software may not have flagged or blocked the first data piece and the second data piece due to a lack of a specific string of HTML code contained in the first data piece or the second data piece that would cause the data piece blocking software to block the first data piece and the second data piece. Additionally, or alternatively, the data piece blocking software may not have blocked access to data pieces from the first domain and the second domain including the first data piece and the second data piece residing in the electronic device memory.

The data piece blocking software stored and executed on the electronic device 8110 may not have prevented the computing system 8115 from retrieving the first data piece and the second data piece from the memory of the electronic device 8110. For example, the data piece blocking software may not have blocked some data pieces from being stored on a memory of electronic device 8110 when the electronic device 8110 is engaged in a web browser session on a web browser. Additionally, or alternatively, the data piece blocking software may not have flagged some data pieces that are stored in the memory of the electronic device 8110 to permit access to those flagged data pieces stored in the memory of the electronic device 8110 when or after the electronic device 8110 is engaged in the web browser session on the web browser.

In certain embodiments, the first data piece and the second data piece retrieved from the electronic device 8110 contains the electronic device identification and one or more items of anonymous personal identification information provided by the electronic device 8110 during the web browser session. For example, when the electronic device 8110 initiates the web browser session with the web browser 8125, the computing system 8115 may direct the web browser 8125 to transmit a data piece to the memory of electronic device 8110. Similarly, the computing system 8115 directs the transmission of the first data piece associated with the first domain and the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece, and the second data piece are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group. a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the electronic device 8110. The one or more items of anonymous personal identification information may be stored in the data piece from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of electronic device 8110. Thus, when the computing system 8115 retrieves the first data piece and the second data piece from the memory of electronic device 8110, the first data piece and the second data piece each includes the electronic device identification and the one or more items of anonymous personal identification information provided by the electronic device 8110 during the web browser session.

At step 45611, the computing system 8115 stores the electronic device identification and the one or more items of anonymous personal identification information from the first data piece or the second data piece in a user profile of a server 8120. In certain embodiments, the computing system 8115 stores the electronic device identification and the one or more items of anonymous personal identification information from the first data piece or the second data piece in a user profile previously created and stored on the server 8120. For example, the computing device identification or one or more items of anonymous personal identification information system 8115 may have previously generated a user profile containing at least one of an electronic provided in a previously obtained data piece. When the computing system 8115 receives the first data piece and the second data piece each containing the electronic device identification and the one or more items of anonymous personal identification information, the computing system 8115 may match at least one of the electronic device identification or at least one of the one or more items of anonymous personal identification information from the first data piece and the second data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the first data piece or the second data piece in the user profile in the server 8120.

In certain embodiments, the computing system 8115 stores electronic device identification and the one or more items of anonymous personal identity information from the first data piece or the second data piece in a newly created user profile stored in the server 8120. For example, the computing system 8115 may search through the server 8120 to identify a user profile containing at least one of electronic device identification or one of one or more items of anonymous personal identification information that matches at least one of the electronic device identifications or one of the one or more items of anonymous personal identification information contained in the first data piece and the second data piece. After searching through the server 8120, the computing system 8115 may determine that no match exists between at least one of the electronic device identification or one of the one or more items of anonymous personal identification information contained in the first data piece and contained in the second data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the first data piece or the second data piece in the newly created user profile.

In certain embodiments, the computing system 8115 determines that the electronic device identification and the one or more items of anonymous personal identification information from the first data piece matches the electronic device identification and the one or more items of anonymous personal identification information from the second data piece. In response, the computing system 8115 may delete one of the first data piece or the second data piece and store the electronic device identification and the one or more items of anonymous personal identification information from the remaining (e.g., not deleted) data piece in the user profile in the server 8120. Alternatively, in response, the computing system 8115 may store the electronic device identification and the one or more items of anonymous personal identification information from both the first data piece and the second data piece in the user profile in the server 8120.

FIG. 467 illustrates a method 46700 implemented by a computing system 8115 for performing network interruption remedy operations according to certain embodiments of this disclosure. Although certain details will be provided with reference to the method 46700 of FIG. 746, it should be understood that other embodiments may include more, less, or different method steps. At step 46701, the computing system 8115 is in an idle state at least with respect to performing network interruption remedy operations. Step 46701 is at least similar to step 43401 of method 43400 illustrated in FIG. 43. At step 46703, the computing system 8115 determines that an electronic device 8110 has initiated an engagement in a web browser session with a web browser 8125 (e.g., an initial web browser) or that an electronic device 8110 has requested content from the web browser 8125. Step 46703 is at least similar to step 43403 of method 43400 illustrated in FIG. 43. At step 46705, the computing system 8115 directs a transmission of a first data piece associated with a first domain to the electronic device 8110. Step 46705 is at least similar to step 43405 of method 43400 illustrated in FIG. 43. At step 46707, the computing system 8115 directs a transmission of a second data piece associated with a second domain to the electronic device 8110. Step 46707 is at least similar to step 43407 of method 43400 illustrated in FIG. 43. At step 46709, the computing system 8115 retrieves the second data piece from the electronic device 8110 when the first data piece is not retrievable from the electronic device 8110. Step 46709 is at least similar to step 43409 of method 43400 illustrated in FIG. 43. At step 46711, the computing system 8115 stores the electronic device identification and the one or more items of anonymous personal identification information from the second data piece in a user profile of a server 8120. Step 46711 is at least similar to step 43411 of method 43400 illustrated in FIG. 43.

At step 46713, the computing system 8115 receives a third data piece containing at least one of an electronic device identification or one or more items of anonymous personal identification information. In certain embodiments, the computing system 8115 may have received the third data piece in same or similar manner as described herein with respect to the first data piece or the second data piece. Alternatively, the computing system 8115 may have received the third data piece through a data transfers from one or more other servers. In response to receiving the third data piece, the computing system 8115 may search through the server 8120 to identify one or more user profiles containing electronic device identification and one or more items of anonymous personal identification information that match at least the electronic device identification or one of the one or more items anonymous personal identification information contained in the third data piece.

At step 46715, the computing system 8115 determines that at least one of the electronic device identifications or one of the one or more items of anonymous personal identification information contained in the third data piece matches at least one of the electronic device identifications or one of the one or more items of anonymous personal identification information stored in a user profile in the server 8120. For example, the computing system 8115 may search through the server 8120 and identify at least one user profile in the server 8120 that contains an electronic device identification that matches the electronic device identification contained in the third data piece. As another example, the computing system 8115 may search the server and identify at least one user profile in the server that contains a phone number that matches a phone number contained in the third data piece.

At step 46717, the computing system 8115 stores the electronic device identification and the one or more items of anonymous personal identification information in a user profile in the server 8120. For example, the third data piece may contain an electronic device identification that matches the electronic device identification stored in the user profile. In response, the computing system 8115 may store the electronic device identification and the one or more items of anonymous personal identification information from the third data piece in the user profile based on a match between the electronic device identification contained in the third data piece and the electronic device identification stored in the user profile. As another example, the third data piece may contain an email address that matches an email address stored in the user profile. In response, the computing system 8115 may store the electronic device identification and the one or more items of anonymous personal identification information from the third data piece in the user profile based on a match between the email address contained in the third data piece and an email address stored in the user profile. In certain embodiments, the computing system 8115 may store the electronic device identification and the one or more items of anonymous personal identification information from the third data piece in a user profile that includes the electronic device identification and the one or more items of anonymous personal identification information from the first data piece or the second data piece. Additionally, or alternatively, the computing system 8115 may store the electronic device identification and the one or more items of anonymous personal identification information from the third data piece in a user profile that does not include the electronic device identification and the one or more items of anonymous personal identification information from the first data piece and the second data piece.

In certain embodiments, the computing system 8115 stores the electronic device identification and the one or more items of anonymous personal identity information from the third data piece in a newly created user profile stored in the server 8120. For example, the computing system 8115 may search through the server 8120 to identify a user profile containing at least one of electronic device identification or one of one or more items of anonymous personal identification information that matches at least one of the electronic device identifications or one of the one or more items of anonymous personal identification information contained in the third data piece. After searching through the server 8120, the computing system 8115 may determine that no match exists between at least one of the electronic device identifications or one of the one or more items of anonymous personal identification information contained in the third data piece and at least one of electronic device identification or one of one or more items of anonymous personal identification information stored in any user profile in the server 8120. In response, the computing system 8115 may create a new user profile in the server 8120 and store the electronic device identification and the one or more items of anonymous personal identification information from the third data piece in the newly created user profile.

FIG. 847 illustrates a method 47800 implemented by the computing system 8115 for performing network interruption remedy operations according to certain embodiments of this disclosure. Although certain details will be provided with reference to the method 47800 of FIG. 847. it should be understood that other embodiments may include more, less, or different method steps. In certain embodiments, a data pieces may include a cookie. A cookie (e.g., an HTTP cookie, a web cookie, an Internet cookie, a browser cookie) is a piece of data sent from a website and stored on a memory of an electronic device 8110 by a web browser of the electronic device 8110 while the electronic device is engaged in a browser session. At step 47801, the computing system 8115 is in an idle state at least with respect to performing network interruption remedy operations. Step 47801 is at least similar to step 43401 of method 43400 illustrated in FIG. 43. At step 47803, the computing system 8115 determines that an electronic device 8110 has initiated an engagement in a Web browser session with the Web browser 8125 (e.g., an initial web browser) or that an electronic device 8110 has requested content from the web browser 8125.

At step 47805, the computing system 8115 directs the transmission of a first cookie associated with a first domain to the electronic device 8110. In certain embodiments, the computing system 8115 directs the transmission of the first cookie to the electronic device 8110, when the electronic device 8110 is engaged in an initial web browser session on the web browser 8125, for storage in an electronic device memory. The first cookie may be associated with a first domain that is linked to the web browser 8125 (e.g., the web browser domain). The first cookie may also contain an electronic device identification. The electronic device identification may be a unique identification that identifies a specific electronic device among all electronic devices. For example, the electronic device identification may be an identification that is unique to the electronic device 8110. In certain embodiments, the electronic device identification includes at least one of a MAC addresses, an IMEI number, an electronic device serial number, a pointer associated with a data port of the electronic device, a combination thereof, or the like.

At step 47807, the computing system 8115 directs the transmission of a second cookie associated with a second domain to the electronic device 8110. In certain embodiments, the computing system 8115 directs the transmission of a second cookie to the electronic device 8110, when the electronic device 8110 is engaged in the initial web browser session on the web browser 8125, for storage in the electronic device memory. The second cookie may be associated with a second domain that is linked to the web browser 8125 (e.g., the web browser domain). The second cookie may also contain an electronic device identification. The electronic device identification contained in the second cookie may be a same electronic device identification as the electronic device identification contained in the first cookie.

At step 47809, the computing system 8115 retrieves the second cookie from the electronic device 8110 when the first cookie is not retrievable from the electronic device 8110. In certain embodiments, the computing system 8115 retrieves the second cookie from the electronic device memory when the computing system 8115 is not able to retrieve the first cookie from the electronic device memory. The electronic device 8110 may store and execute cookie blocking software (e.g., anti-identification software, pop-up blocker software, advertisement (ad) blocker software). For example, the cookie blocking software may flag or block specific strings of HTML code contained in certain cookies or may flag or block cookies associated with entire domains. The cookie blocking software may have flagged or blocked the first cookie due to a specific string of HTML code contained in the first cookie. Additionally, or alternatively, the cookie blocking software may have blocked access to all cookies from the first domain including the first cookie residing in the electronic device memory. In certain embodiments, the cookie blocking software may not have flagged or blocked the second cookie due to a lack of a specific suing of HTML code contained in the second cookie that would cause the cookie blocking software to block the second cookie. Additionally, or alternatively, the cookie blocking software may not have blocked access to cookies from the second domain including the second cookie residing in the electronic device memory.

The data piece blocking software stored and executed on the electronic device 110 may have prevented the computing system 8115 from retrieving the first data piece from the memory of the electronic device 8110. For example, the data piece blocking software may have blocked data pieces from being stored on a memory of electronic device 8110 when the electronic device 8110 is engaged in a web browser session on a 'web browser. Additionally, or alternatively, the data piece blocking software may have flagged data pieces that are stored in the memory of the electronic device 8110 to prevent access to those flagged data pieces stored in the memory of the electronic device 8110 when or after the electronic device 8110 is engaged in the web browser session on the web browser.

In certain embodiments, the second cookie retrieved from the electronic device 8110 contains the electronic device identification and one or more items of anonymous personal identification information provided by the electronic device 8110 during the web browser session. For example, when the electronic device 8110 initiates the web browser session with the web browser 8125, the web browser 8125 transmits a cookie to the memory of electronic device 8110. Similarly, the computing system 8115 transmits the first cookie associated with the first domain and the second cookie associated with the second domain. Before the cookie from the web browser 8125, the first cookie, and the second cookie are stored in the memory of the electronic device 8110, each of the cookie from the web browser 8125, the first cookie, and the second cookie include the electronic device identification. After the cookie from the web browser 8125, the first cookie, and the second cookie are stored in the memory of the electronic device 8110, the electronic device 8110 may transmit one or more items of anonymous personal identification information to the web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the cookie from the web browser 8125 residing in the memory of the electronic device 8110. The one or more items of anonymous personal identification information may be stored in the cookie from the web browser 8125 residing in the memory of the electronic device 8110 so that the electronic device 8110 or the web browser 8125 may quickly and easily access the anonymous personal identification information during a subsequent web browser session between the electronic device 8110 and the web browser 8125. In addition, because the first cookie and the second cookie are linked to the web browser 8125 via the first domain and the second domain, respectively, the anonymous personal identification information may also be stored in the first cookie and the second cookie residing in the memory of electronic device 8110. Thus, when the computing system 8115 retrieves the second cookie from the memory of the electronic device 8110, the second cookie includes the electronic device identification and the one or more items of anonymous personal identification information provided by the electronic device 8110 during the web browser session.

At step 47811, the computing system 8115 stores the electronic device identification and the one or more items of anonymous personal identification information from the second cookie in a user profile of a server 8120. In certain embodiments, the computing system 8115 stores the electronic device identification and the one or more items of anonymous personal identification information from the second cookie in a user profile previously created and stored on the server 8120. For example, the computing system 8115 may have previously generated a user profile containing at least one of an electronic device identification or one or more items of anonymous personal identification information provided in a previously obtained cookie. When the computing system 8115 receives the second cookie containing the electronic device identification and the one or more items of anonymous personal identification information, the computing system 8115 may match at least one of the electronic device identification or at least one of the one or more items of anonymous personal identification information from the second cookie with at least one of the electronic device identification or at least one of the one or more items of anonymous personal identification information stored in the user profile. When the computing system 8115 identifies a match, the computing system 8115 may store the electronic device identification and the one or more items anonymous personal identification information from the second cookie in the user profile in the server 8120.

In certain embodiments, the computing system 8115 stores electronic device identification and the one or more items of anonymous personal identity information from the second cookie in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the second cookie. After searching through the server 8120, the computing system 8115 may determine that no match exists between at least one of the electronic device identifications or one of the one or more items of anonymous personal identification information contained in the second cookie and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the second cookie in the newly created user profile.

At step 47813, the computing system 8115 maps or associates the electronic device identification from the second cookie to an open-source software footprint. An open-source software footprint may be a unique set of traceable digital activities, actions, contributions, or communications that are manifested in open-source code on the internet or on electronic devices. The electronic device 8110 may transmit one or more items of anonymous personal identification information to the web browser 8125 during a browser session (e.g., an initial browser session). The one or more items of anonymous personal identification information transmitted from the electronic device 8110 includes an open-source software footprint that is unique to the electronic device 8110 or that provides the computing system 8115 with an acceptable level of certainty that the specific electronic device 8110 is transmitting the one or more items of anonymous personal identification information.

As discussed herein, when the electronic device 8110 transmits the one or more items of anonymous personal identification information to the web browser 8125, the one or more items of anonymous personal identification information may also be stored in the cookie of the web browser 8125, the first cookie, and the second cookie each stored in the memory of the electronic device 8110. While the transmitted one or more items of anonymous personal identification information may not include the electronic device identification, the cookie of the web browser 8125, the first cookie, and the second cookie each includes the electronic device identification. In addition, the one or more items of anonymous personal identification information stored in each of the cookie of the web browser 8125, the first cookie, and the second cookie may also include the open-source software footprint. Thus, when the computing system 8115 retrieves the second cookie from the memory of the electronic device 8110, the computing system 8115 maps or associates the open-source software footprint from the second cookie to the electronic device identification from the second cookie. Accordingly, the computing system 8115 maps or associates the open-source software footprint with the specific electronic device 8110.

At step 47815, the computing system 8115 retrieves an item of personal identification information that is attached to the open-source software footprint. For example, after the computing system 8115 has mapped or associated the open-source software footprint from the second cookie to the electronic device identification from the second cookie and the computing system 8115 has stored the electronic device identification and the one or more items of anonymous personal identification information from the second cookie in the user profile in the server 8120, the electronic device 8110 may engage in a subsequent web browser session with a web browser 8125 (e.g., the same web browser. another web browser). During the subsequent web browser session, the electronic device 8110 may transmit one or more items of anonymous personal identification information to the web browser 8125. The one or more items of anonymous personal notification information transmitted to the web browser 8125 during the subsequent web browser session may be different items of anonymous personal identification information from the one or more items of anonymous personal identification information transmitted the web browser during the initial web browser session.

The one or more items of anonymous personal identification information transmitted from the electronic device 8110 during the subsequent web browser session may include the open—source software footprint. The computing system 8115 may intercept, receive, or retrieve the transmitted one or more items of anonymous personal identification information transmitted from the electronic device 8110 during the subsequent web browser session and identify that the one or more items of anonymous personal identification information includes the open-source software footprint. The computing system 8115 may then map or associate the one or more items of anonymous personal identification information transmitted by the electronic device 8110 during the subsequent web browser session with the previously provided footprint. Based on mapping the electronic device identification with the open-source software footprint during the initial web browser session, the computing system 8115 may identify that the electronic device 8110 is the source of the one or more items of anonymous personal identification information transmitted during the subsequent web browser session without relying on a cookie.

At step 47817, the computing system 8115 stores the one or more items of anonymous personal identification information in the user profile in the server 8120 based on the attached open-source software footprint. In certain embodiments, the computing system 8115 stores the one or more items of anonymous personal identification information transmitted during the subsequent browser session in the user profile in the server 8120 based on the attached open—source software footprint For example, the computing system 8115 may have determined that the one or more items of anonymous personal identification information transmitted during the subsequent web browser session is associated with the electronic device 8110 that stored the second cookie from the initial web browser session. The computing system 8115 may store the one or more items of anonymous personal identification information in the same user profile that contains the electronic device identification and the one or more items of anonymous personal identification information contained in the second cookie from the initial web browser session based on mapping or associating the open-source software footprint attached to the one or more items of anonymous personal identification information obtained during the subsequent web browser session with the electronic device identification stored in the user profile in the server 8120. Accordingly, the computing system 8115 may store items of anonymous personal identification information in user profiles associated with specific electronic devices 8110 without relying on the ability of the computing system to retrieve cookies stored in the memories of the electronic devices 8110.

FIG. 948 illustrates a method 48900 implemented by the computing system 8115 for performing network interruption remedy operations according to certain embodiments of this disclosure. Although certain details will be provided with reference to the method 48900 of FIG. 948, it should be understood that other embodiments may include more, less, or different method steps. At step 48901, the computing system 8115 is in an idle state at least with respect to performing network interruption remedy operations. At step 48903, the computing system 8115 determines that a first electronic device 8110 has initiated an engagement in a first web browser session with a web browser 8125 or that a first electronic device 8110 has requested content from a web browser 8125.

At step 48905, the computing system 8115 directs the transmission of a first data piece associated with a first domain to the first electronic device 8110. In certain embodiments, the computing system 8115 directs the transmission of the first data piece to the first electronic device 8110, when the first electronic device 8110 is engaged in the first web browser session on the web browser 8125, for storage in an electronic device memory of the first electronic device 8110. The first data piece may be associated with a first domain that is linked to the web browser 8125 (e.g., the web browser domain). The first data piece may also contain an electronic device identification. The electronic device identification may be a unique identification that identifies the first electronic device among all electronic devices. For example, the electronic device identification may be an identification that is unique to the first electronic device 8110. In certain embodiments, the electronic device identification includes at least one of a MAC addresses, an IMEI number, an electronic device serial number, a pointer associated with a data port of the electronic device, a combination thereof, or the like.

At step 48907, the computing system 8115 directs the transmission of a second data piece associated with a second domain to the first electronic device 8110. In certain embodiments, the computing system 8115 directs the transmission of a second data piece to the first electronic device 8110, when the first electronic device 8110 is engaged in the first web browser session on the web browser 8125, for storage in the electronic device memory of the first electronic device 8110. The second data piece may be associated with a second domain that is linked to the web browser 8125 (e.g., the web browser domain). The second data piece may also contain an electronic device identification. The electronic device identification contained in the second data piece may be a same electronic device identification as the electronic device identification contained in the first data piece.

At step 48909, the computing system 8115 retrieves the second data piece from the first electronic device 8110 when the first data piece is not retrievable from the first electronic device 8110. In certain embodiments, the computing system 8115 retrieves the second data piece from the electronic device memory of the first electronic device 8110 when the computing system 8115 is not able to retrieve the first data piece from the electronic device memory of the first electronic device 8110. The first electronic device 8110 may store and execute data piece blocking software (e.g., anti-identification software, pop. up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory of the first electronic device 110. In certain embodiments, the data piece blocking software may not have nagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory of the first electronic device 8110.

The data piece blocking software stored and executed on the first electronic device 8110 may have prevented the computing system 8115 from retrieving the first data piece from the memory of the first electronic device 8110. For example, the data piece blocking software may have blocked data pieces from being stored on a memory of first electronic device 8110 when the first electronic device 8110 is engaged in the first web browser session on the web browser. Additionally, or alternatively, the data piece blocking software may have flagged data pieces that are stored in the memory of the first electronic device 8110 to prevent access to those flagged data pieces stored in the memory of the first electronic device 8110 when or after the first electronic device 8110 is engaged in the first web browser session on the web browser.

In certain embodiments, the second data piece retrieved from the first electronic device 8110 contains the electronic device identification and one or more items of anonymous personal identification information provided by the electronic device 8110 during the first web browser session. For example, when the first electronic device 8110 initiates the first web browser session with the web browser 8125, the web browser 8125 transmits a data piece to the memory of first electronic device 8110. Similarly, the computing system 8115 transmits the first data piece associated with the first domain and the second data piece associated with the second domain. Before the data piece from the web browser 8125, the first data piece, and the second data piece are stored in the memory of the electronic device 8110, each of the data piece from the web browser 8125, the first data piece, and the second data piece include the electronic device identification. After the data piece from the web browser 8125, the first data piece. and the second data piece are stored in the memory of the first electronic device 8110, the first electronic device 8110 may transmit one or more items of anonymous personal identification information to the web browser 8125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the first electronic device 8110. The one or more items of anonymous personal identification information may be stored in the data piece from the web browser 8125 residing in the memory of the first electronic device 8110 so that the first electronic device 8110 or the web browser 8125 may quickly and easily access the anonymous personal identification information during a subsequent web browser session between the first electronic device 8110 and the web browser 8125. In addition, because the first data piece and the second data piece are linked to the web browser 8125 via the first domain and the second domain, respectively, the anonymous personal identification information may also be stored in the first data piece and the second data piece residing in the memory of first electronic device 8110. Thus, when the computing system 8115 retrieves the second data piece from the memory of the first electronic device 8110, the second data piece includes the electronic device identification and the one or more items of anonymous personal identification information provided by the first electronic device 8110 during the first web browser session.

At step 48911, the computing system 8115 stores the electronic device identification and the one or more items of anonymous personal identification information from the second data piece in a user profile of a server 8120. In certain embodiments, the computing system 8115 stores the electronic device identification and the one or more items of anonymous personal identification information from the second data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the second data piece in the user profile in the server 8120.

In certain embodiments, the computing system 8115 stores electronic device identification and the one or more items of anonymous personal identity information from the second data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the second data piece. After searching through the server 8120, the computing system 8115 may determine that no match exists between at least one of the electronic device identifications or one of the one or more items of anonymous personal identification information contained in the second data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the second data piece in the newly created user profile.

At step 48913, the computing system 8115 determines that a second electronic device 8110 has initiated an engagement in a second web browser session with the web browser 8125 or that a second electronic device 8110 has requested content from the web browser 8125. At step 48915, the computing system 8115 directs the transmission of a third data piece associated with a third domain to the second electronic device 8110. In certain embodiments, the computing system 8115 directs the transmission of the third data piece to the second electronic device 8110, when the second electronic device 8110 is engaged in a second web browser session on the web browser 8125, for storage in an electronic device memory of the second electronic device 8110. The third data piece may be associated with a third domain that is linked to the 'web browser 8125 (e.g., the web browser domain). The third data piece may also contain an electronic device identification. The electronic device identification may be a unique identification that identifies a specific electronic device among all electronic devices. For example, the electronic device identification may be an identification that is unique to the second electronic device 8110. In certain embodiments, the electronic device identification includes at least one of a MAC addresses, an IMEI number, an electronic device serial number, a pointer associated with a data port of the electronic device, a combination thereof, or the like.

At step 48917, the computing system 8115 directs the transmission of a fourth data piece associated with a forth domain to the second electronic device 8110. In certain embodiments, the computing system 8115 directs the transmission of a fourth data piece to the second electronic device 8110, when the second electronic device 8110 is engaged in the second web browser session on the web browser 8125, for storage in the electronic device memory of the second electronic device 8110. The fourth data piece may be associated with a fourth domain that is linked to the web browser 8125 (e.g., the web browser domain). The fourth data piece may also contain an electronic device identification. The electronic device identification contained in the fourth data piece may be a same electronic device identification as the electronic device identification contained in the third data piece.

At step 48919, the computing system 8115 retrieves the fourth data piece from the second electronic device 8110 when the third data piece is not retrievable from the second electronic device 8110. In certain embodiments, the computing system 8115 retrieves the fourth data piece from the electronic device memory of the second electronic device 8110 when the computing system 8115 is not able to retrieve the third data piece from the electronic device memory of the second electronic device 8110. The second electronic device 8110 may store and execute data piece blocking software (e.g., anti-identification software, pop. up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively, the data piece blocking software may have blocked access to all data pieces from the third domain including the third data piece residing in the electronic device memory of the second electronic device 8110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 8110.

The data piece blocking software stored and executed on the second electronic device 8110 may have prevented the computing system 8115 from retrieving the third data piece from the memory of the second electronic device 8110. For example, the data piece blocking software may have blocked data pieces from being stored on a memory of the second electronic device 8110 when the second electronic device 8110 is engaged in a second web browser session on the web browser. Additionally, or alternatively, the data piece blocking software may have flagged data pieces that are stored in the memory of the second electronic device 8110 to prevent access to those flagged data pieces stored in the memory of the second electronic device 8110 when or after the second electronic device 8110 is engaged in the second web browser session on the web browser.

In certain embodiments, the fourth data piece retrieved from the second electronic device 8110 contains the electronic device identification and one or more items of anonymous personal identification information provided by the second electronic device 8110 during the second web browser session. For example, when the second electronic device 8110 initiates the second web browser session with the web browser 8125, the web browser 8125 transmits a data piece to the memory of second electronic device 8110. Similarly, the computing system 8115 transmits the third data piece associated with the third domain and the fourth data piece associated with the fourth domain. Before the data piece from the web browser 8125, the third data piece, and the fourth data piece are stored in the memory of the second electronic device 8110, each of the data piece from the web browser 8125, the third data piece, and the fourth data piece includes the electronic device identification. After the data piece from the web browser 8125, the third data piece, and the fourth data piece are stored in the memory of the second electronic device 8110, the second electronic device 8110 may transmit one or more items of anonymous personal identification information to the web browser 8125 during the second web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 8125 residing in the memory of the second electronic device 8110. The one or more items of anonymous personal identification information may be stored in the data piece from the web browser 8125 residing in the memory of the second electronic device 8110 so that the second electronic device 8110 or the web browser 8125 may quickly and easily access the anonymous personal identification information during a subsequent web browser session between the electronic device 8110 and the web browser 8125. In addition, because the third data piece and the fourth data piece are linked to the web browser 8125 via the third domain and the fourth domain, respectively, the anonymous personal identification information may also be stored in the third data piece and the fourth data piece residing in the memory of second electronic device 8110. Thus, when the computing system 8115 retrieves the fourth data piece from the memory of the second electronic device 8110, the fourth data piece includes the electronic device identification and the one or more items of anonymous personal identification information provided by the second electronic device 8110 during the second web browser session.

At step 48921, the computing system 8115 stores the electronic device identification and the one or more items of anonymous personal identification information from the fourth data piece in a user profile of a server 8120. In certain embodiments, the computing system 8115 stores the electronic device identification and the one or more items of anonymous personal identification information from the fourth data piece in a user profile previously created and stored on the server 8120. For example, the computing system 8115 may have previously generated a user profile containing at least one of an electronic device identification or one or more items of anonymous personal identification information provided in a previously obtained data piece. When the computing system 8115 receives the fourth data piece containing the electronic device identification and the one or more items of anonymous personal identification information, the computing system 8115 may match at least one of the electronic device identification or at least one of the one or more items of anonymous personal identification information from the fourth data piece with at least one of the electronic device identification or at least one of the one or more items of anonymous personal identification information stored in the user profile. When the computing system 8115 identifies a match, the computing system 8115 may store the electronic device identification and the one or more items anonymous personal identification information from the fourth data piece in the user profile in the server 8120.

In certain embodiments, the computing system 8115 stores electronic device identification and the one or more items of anonymous personal identity information from the fourth data piece in a newly created user profile stored in the server 8120. For example, the computing system 8115 may search through the server 8120 to identify (e.g., find, locate) a user profile containing at least one of electronic device identification or one of one or more items of anonymous personal identification information that matches at least one of the electronic devices identification or one of the one or more items of anonymous personal identification information contained in the fourth data piece. After searching through the server 8120, the computing system 8115 may determine that no match exists between at least one of the electronic device identifications or one of the one or more items of anonymous personal identification information contained in the fourth data piece and at least one of electronic device identification or one of one or more items of anonymous personal identification information contained in a user profile of the server 8120. In response, the computing system 8115 may create a new user profile in the server 8120 and store the electronic device identification and the one or more items of anonymous personal identification information from the fourth data piece in the newly created user profile.

FIG. 1049 illustrates a method 100049100 unlamented by the computing system 8115 for performing network interruption remedy operations according to certain embodiments of this disclosure. Although certain details will be provided with reference to the method 100049100 of FIG. 10 1049, it should be understood that other embodiments may include more, less, or different method steps. At step 100149101, the computing system 8115 is in an idle state at least with respect to performing network interruption remedy operations. At step 100349103, the computing system 8115 determines that a first electronic device 8110 has initiated an engagement in a web browser session with a first web browser 8125 or that a first electronic device 8110 has requested content from a first web browser 8125.

At step 100549105, the computing system 8115 directs the transmission of a first data piece associated with a first domain to the first electronic device 8110. In certain embodiments, the computing system 8115 directs the transmission of the first data piece to the first electronic device 8110, when the first electronic device 8110 is engaged in the web browser session on the first web browser 8125, for storage in an electronic device memory of the first electronic device 8110. The first data piece may be associated with a first domain that is linked to the first web browser 8125 (e.g., the web browser domain). The first data piece may also contain an electronic device identification. The electronic device identification may be a unique identification that identifies the first electronic device among all electronic devices. For example, the electronic device identification may be an identification that is unique to the first electronic device

8110. In certain embodiments, the electronic device identification includes at least one of a MAC addresses, an IMEI number, an electronic device serial number, a pointer associated with a data port of the electronic device, a combination thereof, or the like.

At step 100749107, the computing system 8115 directs the transmission of a second data piece associated with a second domain to the first electronic device 8110. In certain embodiments, the computing system 8115 directs the transmission of a second data piece to the first electronic device 8110, when the first electronic device 8110 is engaged in the 'web browser session on the first web browser 8125, for storage in the electronic device memory of the first electronic device 8110. The second data piece may be associated with a second domain that is linked to the first web browser 8125 (e.g., the first web browser domain). The second data piece may also contain an electronic device identification. The electronic device identification contained in the second data piece may be a same electronic device identification as the electronic device identification contained in the first data piece.

At step 100949109, the computing system 8115 retrieves the second data piece from the first electronic device 8110 when the first data piece is not retrievable from the first electronic device 8110. In certain embodiments, the computing system 8115 retrieves the second data piece from the electronic device memory of the first electronic device 8110 when the computing system 8115 is not able to retrieve the first data piece from the electronic device memory of the first electronic device 8110. The first electronic device 8110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have nagged or blocked the first data piece due to a specific string of HTML code contained in the first data piece. Additionally, or alternatively, the data piece blocking software may have blocked access to all data pieces from the first domain including the first data piece residing in the electronic device memory of the first electronic device 8110. In certain embodiments, the data piece blocking software may not have nagged or blocked the second data piece due to a lack of a specific string of HTML code contained in the second data piece that would cause the data piece blocking software to block the second data piece. Additional 111y, or alternatively, the data piece blocking software may not have blocked access to data pieces from the second domain including the second data piece residing in the electronic device memory of the first electronic device 8110.

The data piece blocking software stored and executed on the first electronic device 8110 may have prevented the computing system 8115 from retrieving the first data piece from the memory of the first electronic device 8110. For example, the data piece blocking software may have blocked data pieces from being stored on a memory of first electronic device 8110 when the first electronic device 8110 is engaged in the web browser session on the first web browser. Additionally, or alternatively, the data piece blocking software may have flagged data pieces that are stored in the memory of the first electronic device 8110 to prevent access to those flagged data pieces stored in the memory of the first electronic device 8110 when or after the first electronic device 8110 is engaged in the web browser session on the first web browser.

In certain embodiments, the second data piece retrieved from the first electronic device 8110 contains the electronic device identification and one or more items of anonymous personal identification information provided by the first electronic device 8110 during the web browser session on the first web browser 8125. For example, when the first electronic device 8110 initiates the web browser session with the first web browser 8125, the first web browser 8125 transmits a data piece to the memory of first electronic device 8110. Similarly, the computing system 8115 transmits the first data piece associated with the first domain and the second data piece associated with the second domain. Before the data piece from the first web browser 8125, the first data piece, and the second data piece are stored in the memory of the first electronic device 8110, each of the data piece from the first web browser 8125, the first data piece, and the second data piece include the electronic device identification. After the data piece from the first web browser 8125, the first data piece, and the second data piece are stored in the memory of the first electronic device 8110, the first electronic device 8110 may transmit one or more items of anonymous personal identification information to the first web browser 8125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the first web browser 8125 residing in the memory of the first electronic device 8110. The one or more items of anonymous personal identification information may be stored in the data piece from the first web browser 8125 residing in the memory of the first electronic device 8110 so that the first electronic device 8110 or the first web browser 8125 may quickly and easily access the anonymous personal identification information during a subsequent web browser session between the first electronic device 8110 and the first web browser 8125. In addition, because the first data piece and the second data piece are linked to the first web browser 8125 via the first domain and the second domain, respectively, the anonymous personal identification information may also be stored in the first data piece and the second data piece residing in the memory of first electronic device 8110. Thus, when the computing system 8115 retrieves the second data piece from the memory of the first electronic device 8110, the second data piece includes the electronic device identification and the one or more items of anonymous personal identification information provided by the first electronic device 8110 during the web browser session.

At step 101149111, the computing system 8115 stores the electronic device identification and the one or more items of anonymous personal identification information from the second data piece in a first user profile of a server 8120. In certain embodiments, the computing system 8115 stores the electronic device identification and the one or more items of anonymous personal identification information from the second data piece in a first user profile previously created and stored on the server 8120. For example, the computing system 8115 may have previously generated a first user profile containing at least one of an electronic device identification or one or more items of anonymous personal identification information provided in a previously obtained data piece. When the computing system 8115 receives the second data piece containing the electronic device identification and the one or more items of anonymous personal identification information, the computing system 8115 may match at least one of the electronic device identification or at least one of the one or more items of anonymous personal identification information from the second data piece with at least one of the electronic device identification or at least one of the one or more items of anonymous personal identification information stored in the first user profile. When the computing system 8115 identifies a match, the computing system 8115 may store the electronic device identification and the one or more items anonymous personal identification information from the second data piece in the first user profile in the server 8120.

In certain embodiments, the computing system 8115 stores electronic device identification and the one or more items of anonymous personal identity information from the second data piece in a newly created first user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the second data piece. After searching through the server 8120, the computing system 8115 may determine that no match exists between at least one of the electronic device identifications or one of the one or more items of anonymous personal identification information contained in the second data piece and at least one of electronic device identification or one of one or more items of anonymous personal identification information contained in a user profile of the server 8120. In response, the computing system 8115 may create a new first user profile in the server 8120 and store the electronic device identification and the one or more items of anonymous personal identification information from the second data piece in the newly created first user profile.

At step 101349113, the computing system 8115 determines that a second electronic device 8110 has initiated an engagement in a web browser session with a second web browser 8125 or that a second electronic device 8110 has requested content from a second web browser 8125. At step 101549115, the computing system 8115 directs the transmission of a third data piece associated with a third domain to the second electronic device 8110. In certain embodiments, the computing system 8115 directs the transmission of the third data piece to the second electronic device 8110, when the second electronic device 8110 is engaged in a web browser session on the second web browser 8125, for storage in an electronic device memory of the second electronic device 8110. The third data piece may be associated with a third domain that is linked to the second web browser 8125 (e.g., the second web browser domain). The third data piece may also contain an electronic device identification. The electronic device identification may be a unique identification that identifies a specific electronic device among all electronic devices. For example, the electronic device identification may be an identification that is unique to the second electronic device 8110. In certain embodiments, the electronic device identification includes at least one of a MAC addresses, an IMEI number, an electronic device serial number, a pointer associated with a data port of the electronic device, a combination thereof, or the like.

At step 101749117, the computing system 8115 directs the transmission of a fourth data piece associated with a fourth domain to the second electronic device 8110. In certain embodiments, the computing system 8115 directs the transmission of a fourth data piece to the second electronic device 8110, when the second electronic device 8110 is engaged in the web browser session on the second web browser 8125, for storage in the electronic device memory of the second electronic device 8110. The fourth data piece may be associated with a fourth domain that is linked to the second web browser 8125 (e.g., the second web browser domain). The fourth data piece may also contain an electronic device identification. The electronic device identification contained in the fourth data piece may be a same electronic device identification as the electronic device identification contained in the third data piece.

At step 101949119, the computing system 8115 retrieves the fourth data piece from the second electronic device 8110 when the third data piece is not retrievable from the second electronic device 8110. In certain embodiments, the computing system 8115 retrieves the fourth data piece from the electronic device memory of the second electronic device 8110 when the computing system 8115 is not able to retrieve the third data piece from the electronic device memory of the second electronic device 8110. The second electronic device 8110 may store and execute data piece blocking software (e.g., anti-identification software, pop. up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively, the data piece blocking software may have blocked access to all data pieces from the third domain including the third data piece residing in the electronic device memory of the second electronic device 8110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 8110.

The data piece blocking software stored and executed on the second electronic device 8110 may have prevented the computing system 8115 from retrieving the third data piece from the memory of the second electronic device 8110. For example, the data piece blocking software may have blocked data pieces from being stored on a memory of the second electronic device 8110 when the second electronic device 8110 is engaged in the web browser session on the second 'web browser. Additionally, or alternatively, the data piece blocking software may have flagged data pieces that are stored in the memory of the second electronic device 8110 to prevent access to those flagged data pieces stored in the memory of the second electronic device 8110 when or after the second electronic device 8110 is engaged in the web browser session on the second web browser.

In certain embodiments, the fourth data piece retrieved from the second electronic device 8110 contains the electronic device identification and one or more items of anonymous personal identification information provided by the second electronic device 8110 during the web browser session on the second web browser 8125. For example, when the second electronic device 8110 initiates the web browser session with the second web browser 8125. the second web browser 8125 transmits a data piece to the memory of the second electronic device 8110. Similarly, the computing system 8115 transmits the third data piece associated with the third domain and the fourth data piece associated with the fourth domain. Before the data piece from the second web browser 8125, the third data piece, and the fourth data piece are stored in the memory of the second electronic device 8110, each of the data piece from the second web browser 8125, the third data piece, and the fourth data piece includes the electronic device identification. After the data piece from the second web browser 8125, the third data piece, and the fourth data piece are stored in the memory of the second electronic device 8110, the second electronic device 8110 may transmit one or more items of anonymous personal identification information to the second web browser 8125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the second web browser 8125 residing in the memory of the second electronic device 8110. The one or more items of anonymous personal identification information may be stored in the data piece from the second web browser 8125 residing in the memory of the second electronic device 8110 so that the second electronic device 8110 or the second web browser 8125 may quickly and easily access the anonymous personal identification information during a subsequent web browser session between the electronic device 8110 and the subsequent web browser 8125. In addition, because the third data piece and the fourth data piece are linked to the second web browser 8125 via the third domain and the fourth domain, respectively, the anonymous personal identification information may also be stored in the third data piece and the fourth data piece residing in the memory of second electronic device 8110. Thus, when the computing system 8115 retrieves the fourth data piece from the memory of the second electronic device 8110, the fourth data piece includes the electronic device identification and the one or more items of anonymous personal identification information provided by the second electronic device 8110 during the web browser session on the second web browser.

At step 102149121, the computing system 8115 stores the electronic device identification and the one or more items of anonymous personal identification information from the fourth data piece in a second user profile of a server 8120. In certain embodiments, the computing system 8115 stores the electronic device identification and the one or more items of anonymous personal identification information from the fourth data piece in a second user profile previously created and stored on the server 8120. For example, the computing system 8115 may have previously generated a second user profile containing at least one of an electronic device identification or one or more items of anonymous personal identification information provided in a previously obtained data piece. When the computing system 8115 receives the fourth data piece containing the electronic device identification and the one or more items of anonymous personal identification information, the computing system 8115 may match at least one of the electronic device identification or at least one of the one or more items of anonymous personal identification information from the fourth data piece with at least one of the electronic device identification or at least one of the one or more items of anonymous personal identification information stored in the second user profile. When the computing system 8115 identifies a match, the computing system 8115 may store the electronic device identification and the one or more items anonymous personal identification information from the fourth data piece in the second user profile in the server 8120.

In certain embodiments, the computing system 8115 stores electronic device identification and the one or more items of anonymous personal identity information from the fourth data piece in a newly created second user profile stored in the server 8120. For example, the computing system 8115 may search through the server 8120 to identify (e.g., find, locate) a user profile containing at least one of electronic device identification or one of one or more items of anonymous personal identification information that matches at least one of the electronic device identifications or one of the one or more items of anonymous personal identification information contained in the fourth data piece. After searching through the server 8120, the computing system 8115 may determine that no match exists between at least one of the electronic device identifications or one of the one or more items of anonymous personal identification information contained in the fourth data piece and at least one of electronic device identification or one of one or more items of anonymous personal identification information contained in a user profile of the server 8120. In response, the computing system 8115 may create a new second user profile in the server 8120 and store the electronic device identification and the one or more items of anonymous personal identification information from the fourth data piece in the newly created second user profile.

FIG. 11 illustrates a non-limiting, example computer system 1100 configured to implement systems and methods for performing network interruption remedy operations according to certain embodiments of this disclosure. FIG. 11 illustrates a computer system 1100 that is configured to execute any and all of the embodiments described herein. In certain embodiments, the computer system 1100 describes at least some of the components of computing system 115 illustrated in FIGS. 1 and 2. In certain embodiments, the computer system 11008115 describes at least some of the components of the one or more electronic devices 8110, the one or more servers 8120, or electronics that provide the one or more web browsers 8125 illustrated in FIG. 18. In different embodiments, the computer system 11008115 may be any of various types of devices, including, but not limited to, a computer embedded in a vehicle, a computer embedded in an appliance, a personal computer system, a desktop computer, a handset, a laptop computer, a notebook computer, a tablet, a slate, a netbook computer, a camera, a handheld video game device, a handheld computer, a video recording device, a consumer device, a portable storage device, a mainframe computer system, a workstation, network computer, a set top box, a video game console, a mobile device, an application server, a storage device, a television, a peripheral device such as a switch, a modem, a router, or in general any type of computing or electronic device.

Various embodiments of a system and method for performing network interruption remedy operations, as described herein, may be executed on one or more computer systems 11008115, which may interact with various other devices. In the illustrated embodiment, the computer system 11008115 includes one or more processors 119205 coupled to a system memory 119210 via an input/output (I/O) interface 119215. The computer system 11008115 further includes a network interface 119220 coupled to I/O interface 119215, and one or more input/output devices 119225, such as cursor control device 940, keyboard 945, and display(s) 950. In some cases, it is contemplated that embodiments may be implemented using a single instance of computer system 11008115, while in other embodiments multiple such systems, or multiple nodes making up computer system 11008115, may be configured to host different portions or instances of embodiments. For example, in one embodiment some elements may be implemented via one or more nodes of computer system 11008115 that are distinct from those nodes implementing other dements.

In various embodiments, computer system 11008115 may be a uniprocessor system including one processor 119205a, or a multiprocessor system including several processors 119205a-119205, (e.g., two, four, eight, or another suitable number). The processors 119205 may be any suitable processor capable of executing instructions. For example, in various embodiments the processors 119205 may be general-purpose or embedded processors implementing any of a variety of instruction set architectures (ISAs), such as the x86, PowerPC, SPARC, or MIPS ISAs, or any other suitable ISA. In multiprocessor systems, each of processors 119205 may commonly, but not necessarily, implement the same ISA.

The system memory 119210 may be configured to store the program instructions 1130 and/or existing state information and ownership transition condition data in the data storage 119235 accessible by the processor 119205. In various embodiments, the system memory 119210 may be implemented using any suitable memory technology, such as static random-access memory (SRAM), synchronous dynamic RAM (SDRAM), nonvolatile/Flash-type memory, or any other type of memory. In the illustrated embodiment, the program instructions 119230 may be configured to implement a system for performing network interruption remedy operations incorporating any of the functionality, as described herein. In some embodiments, program instructions and/or data may be received, sent, or stored upon different types of computer-accessible media or on similar media separate from the system memory 119210 or the computer system 11008115. The computer system 11008115 is described as implementing at least some of the functionality of functional blocks of previous Figures.

In one embodiment, the I/O interface 119215 may be configured to coordinate I/O traffic between the processor 119205, the system memory 119210, and any peripheral devices in the device, including the network interface 119220 or other peripheral interfaces, such as the input/output devices 119225. In some embodiments, the I/O interface 119215 may perform any necessary protocol, timing or other data transformations to convert data signals from one component (e.g., the system memory 119210) into a format suitable for use by another component (e.g., the processor 119205). In some embodiments, the I/O interface 119215 may include support for devices attached through various types of peripheral buses, such as a variant of the Peripheral Component Interconnect (PCI) bus standard or the Universal Serial Bus (USB) standard, for example. In some embodiments, the function of the I/O interface 119215 may be split into two or more separate components, such as a north bridge and a south bridge, for example. Also, in some embodiments some or all of the functionality of the I/O interface 119215, such as an interface to the system memory 119210, may be incorporated directly into the processor 119205.

The network interface 119220 may be configured to allow data to be exchanged between the computer system 11008115 and other devices attached to the network 8105 or between nodes of the computer system 11008115. The network 8105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof or the like. In various embodiments, the network interface 119220 may support communication via wired or wireless general data networks, such as any suitable type of Ethernet network. for example; via telecommunications/telephony networks such as analog voice networks or digital fiber communications networks; via storage area networks such as Fiber Channel SANs. or via any other suitable type of network and/or protocol.

The input/output devices 119225 may, in some embodiments, include one or more display terminals, keyboards, keypads, touchpads, scanning devices, voice, or optical recognition devices, or any other devices suitable for entering or accessing data by one or more the computer systems 11008115. Further, various other sensors may be included in the I/O devices 119225, such as imaging sensors, barometers, altimeters, LIDAR, or any suitable environmental sensor. Multiple input/output devices 119225 may be present in the computer system 11008115 or may be distributed on various nodes of the computer system 11008115. In some embodiments, similar input/output devices may be separate from the computer system 11008115 and may interact with one or more nodes of the computer system 11008115 through a wired or wireless connection, such as over the network interface 119220.

As shown in FIG. 119, the memory 119210 may include program instructions 119230, which may be processor-executable to implement any element or action, as described herein. In one embodiment, the program instructions may implement at least a portion of methods described herein, such as the methods illustrated by FIGS. 4-1043-49. In other embodiments, different elements and data may be included. Note that the data storage 119235 may include any data or information, as described herein.

Those skilled in the art will appreciate that the computer system 11008115 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 11008115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 11008115 may be transmitted to the computer system 11008115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for performing network intemption remedy operations, including a computing system. The computing system is configured for contemporaneously and continuously sending data pieces or cookies to millions of electronic devices located and mobile around the world and engaged in web browser sessions on millions of different web browsers. The computing system is also configured for contemporaneously and continuously retrieving data pieces and cookies from the millions of electronic devices located and mobile around the world and engaged in web browser sessions on millions of different web browsers. The computing system is further configured for contemporaneously and continuously storing the retrieved data pieces and cookies from the millions of electronic devices located and mobile around the world and engaged in web browser sessions on millions of different web browsers in select user profiles stored in a plurality of server. In addition, the computing system is configured for contemporaneously and continuously matching electronic device identifications and items of anonymous personal identification information provided in each of the millions of data pieces and cookies with electronic device identifications and items of anonymous personal identification information in the millions of users profiles stored in the plurality of servers to select the appropriate user profile(s) for storing electronic device identifications and items of anonymous personal identification information provided in each of the millions of data pieces and cookies. Various features and advantages of the disclosure are set forth in the following claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method comprising:
   querying a first user information database on a first server for a piece of user information, wherein the first user information database comprises a user profile that includes an initial piece of user information corresponding to a user, and wherein the initial piece of user information includes at least user identification data from a session;
   responsive to not identifying the piece of user information in the first user information database, querying a second user information database stored on a second server for the piece of user information associated with the initial piece of user information;
   retrieving the piece of user information from the second database;
   updating the user profile by storing the piece of user information in the user profile of the first user information database;
   determining a likelihood that the piece of user information corresponds to the user;
   comparing the likelihood to a predetermined threshold; and
   providing at least a portion of the updated user profile associated with the piece of user information to a requestor when the likelihood that the piece of user information corresponds to the user exceeds the predetermined threshold based on the comparison.

2. The computer-implemented method of claim 1, wherein the initial piece of information includes a cookie or a hash value.

3. The computer-implemented method of claim 1, wherein the piece of user information includes at least anonymous user identification data related to the initial piece of user information, and the method further comprises:
   querying a third user information database stored on a third server, the third user information database different than the second user information database, with the piece of user information; and
   identifying a match in the third database, and saving the third piece of user information and an identity of the third user information database to the user profile in the first user information database.

4. The computer-implemented method of claim 3, wherein the third piece of user information includes personal identifying information.

5. The computer-implemented method of claim 4, wherein the personal identifying information includes one of a gender, a postal address, an age group, or a user interest.

6. The computer-implemented method of claim 3, wherein the method further comprises providing both the initial piece of user information and the piece of user information to one or more requestors.

7. The computer-implemented method of claim 3, further comprises calculating a likelihood that the third piece of user information corresponds to the user.

8. The computer-implemented method of claim 7, further comprising providing the third piece of user information to one or more requestors if the likelihood that the third piece of user information corresponds to the user is at least a predetermined likelihood, wherein the likelihood that the third piece of user information corresponds to the user comprises a probability.

9. A non-transitory, computer-readable storage medium storing one or more executable instructions that, when executed by at least one processor, causes the at least one processor to:

query a first user information database on a first server for a piece of user information, wherein the first user information database comprises a user profile that includes an initial piece of user information corresponding to a user, and wherein the initial piece of user information includes at least user identification data from a session;

responsive to not identifying the piece of user information in the first user information database, query a second user information database stored on a second server for the piece of user information associated with the initial piece of user information; and retrieve the piece of user information from the second database and update the user profile by storing the piece of user information and an identity of the second user information database to the user profile of the first user information database.

10. The non-transitory, computer-readable storage medium of claim 9, wherein the initial piece of information includes a cookie or a hash value.

11. The non-transitory, computer-readable storage medium of claim 9, wherein the piece of user information includes at least anonymous user identification data related to the initial piece of user information, and the non-transitory, computer-readable storage medium storing one or more executable instructions that, when executed by at least one processor, causes the at least one processor to:

query a third user information database stored on a third server, the third user information database different than the second user information database, with the piece of user information, identify a match in the third database, and save the third piece of user information to the user profile in the first user information database.

12. The non-transitory, computer-readable storage medium of claim 11, wherein the third piece of user information includes personal identifying information.

13. The non-transitory, computer-readable storage medium of claim 12, wherein the personal identifying information includes one of a gender, a postal address, an age group, or a user interest.

14. The non-transitory, computer-readable storage medium of claim 11, wherein the non-transitory, computer-readable storage medium storing one or more executable instructions further includes instructions that, when executed by at least one processor, cause the at least one processor to provide both the initial piece of user information and the piece of user information to a requestor.

15. The non-transitory, computer-readable storage medium of claim 11, wherein the non-transitory, computer-readable storage medium storing one or more executable further includes instructions that, when executed by at least one processor, causes the at least one processor to calculate a probability that the third piece of user information corresponds to the user.

16. The non-transitory, computer-readable storage medium of claim 15, the non-transitory, computer-readable storage medium storing one or more executable instructions further includes instructions that, when executed by at least one processor, cause the at least one processor to provide the third piece of user information to a requestor if the probability that the third piece of user information corresponds to the user is at least a predetermined probability.

17. A system comprising:

a first server in communication with a first computing system including a first memory and at least one processor; and a second server in communication with a second computing system, the second computing system including a second memory and a second processor, the second server in communication with the first server;

wherein the first memory comprises program instructions executable by the at least one processor of the first computing system to:

query a first user information database on the first server for a piece of user information, wherein the first user information database comprises a user profile that includes an initial piece of user information corresponding to a user, and wherein the initial piece of user information includes at least user identification data from a session;

responsive to not identifying the piece of user information in the first user information database, query a second user information database stored on the second server for the piece of user information associated with the initial piece of user information;

retrieve the piece of user information from the second database and update the user profile by storing the piece of user information and an identity of the second user information database to the user profile of the first user information database;

determine a likelihood that the piece of user information corresponds to the user;

compare the likelihood to a predetermined threshold; and provide at least a portion of the updated user profile associated with the piece of user information to a requestor when the likelihood that the piece of user information corresponds to the user exceeds the predetermined threshold based on the comparison.

18. The system of claim 17, wherein the initial piece of information includes a cookie or a hash value.

19. The system of claim 17, wherein the piece of user information includes at least anonymous user identification data related to the initial piece of user information, and the first memory comprises program instructions executable by the at least one processor of the first computing system to:

query a third user information database stored on a third server, the third user information database different than the second user information database, with the piece of user information;

identify a match in the third database; and save the third piece of user information to the user profile in the first user information data base.

20. The system of claim 19, wherein the third piece of user information includes personal identifying information.

* * * * *